US005448618A

United States Patent [19]

Sandlerman

[11] Patent Number: 5,448,618

[45] Date of Patent: Sep. 5, 1995

[54] EMERGENCY MOBILIZATION SYSTEM

[75] Inventor: Nimrod Sandlerman, Ramat Gan, Israel

[73] Assignee: Comberse Technology Inc., Woodbury, N.Y.

[21] Appl. No.: 575

[22] Filed: Jan. 5, 1993

Related U.S. Application Data

[63] Continuation of Ser. No. 597,699, Oct. 5, 1990, abandoned.

[30] Foreign Application Priority Data

Oct. 6, 1989 [IL] Israel ........................................ 91922

[51] Int. Cl.[6] ............................................ H04M 11/00

[52] U.S. Cl. ........................................ 379/41; 379/40; 379/45; 379/46; 379/51; 379/88; 379/57; 379/58; 379/100

[58] Field of Search ........................ 379/41, 39, 49, 57, 379/58, 59, 179, 182, 183, 45, 37, 38, 40, 42, 43, 44, 46, 50, 51

[56] References Cited

U.S. PATENT DOCUMENTS

| | | | |
|---|---|---|---|
| 3,993,862 | 11/1976 | Karr . | |
| 4,065,642 | 12/1977 | McClure . | |
| 4,273,961 | 6/1981 | Blank et al. . | |
| 4,347,607 | 8/1982 | Nixon et al. . | |
| 4,371,752 | 2/1983 | Matthews et al. . | |
| 4,447,872 | 5/1984 | Nothaft | 364/200 |

(List continued on next page.)

FOREIGN PATENT DOCUMENTS

| | | | |
|---|---|---|---|
| 0278451 | 8/1988 | European Pat. Off. | H04M 11/00 |
| 3826243 | 8/1989 | Germany | 379/45 |
| 4653 | 1/1982 | Japan . | |
| 38055 | 3/1982 | Japan . | |
| 119537 | 7/1982 | Japan . | |

(List continued on next page.)

OTHER PUBLICATIONS

"Japan is Making INS a Reality", M. Kuwabara, Telephone, Oct. 24, 1983, pp. 64, 68, 70, 74, 76, 78 and 81.

"Integrated Digital Switching System . . . ", S. Hattori et al, International Conference on Communications, Seattle, Wash., USA, Jun., 1980.

(List continued on next page.)

*Primary Examiner*—Curtis Kuntz
*Assistant Examiner*—Stella L. Woo
*Attorney, Agent, or Firm*—Cushman, Darby & Cushman

[57] ABSTRACT

An emergency mobilization system and a method of emergency mobilization is disclosed. The system includes a network of mobilization devices each including apparatus for producing messages and apparatus for transmitting at least one message by telephone to each of a plurality of recipient apparatus each associated with at least one recipient. The method includes the steps of instructing an originator mobilization device to perform a specified mobilization and instruction by said originator mobilization device to a plurality of mobilization devices belonging to a network each to mobilize a specific group of recipients.

30 Claims, 141 Drawing Sheets

U.S. PATENT DOCUMENTS

| | | | |
|---|---|---|---|
| 4,450,320 | 5/1984 | Ostermann et al. . | |
| 4,518,989 | 5/1985 | Yabiki et al. . | |
| 4,523,055 | 6/1985 | Hohl et al. . | |
| 4,547,778 | 10/1985 | Hinkle et al. . | |
| 4,696,028 | 9/1987 | Morganstein et al. . | |
| 4,724,538 | 9/1988 | Farrell | 379/59 |
| 4,837,798 | 6/1989 | Cohen et al. . | |
| 4,875,038 | 10/1989 | Siwiak et al. | 379/57 |
| 4,918,722 | 4/1990 | Duehren et al. . | |
| 4,922,514 | 5/1990 | Bergeron et al. | 379/49 |
| 4,956,860 | 9/1990 | Murata | 379/100 |
| 5,077,788 | 12/1991 | Cook et al. | 379/45 |
| 5,109,399 | 4/1992 | Thompson | 379/45 |

FOREIGN PATENT DOCUMENTS

| | | | |
|---|---|---|---|
| 119541 | 7/1982 | Japan . | |
| 192167 | 11/1982 | Japan . | |
| 138148 | 8/1983 | Japan . | |
| 138162 | 8/1983 | Japan . | |
| 165452 | 9/1983 | Japan . | |
| 175342 | 10/1983 | Japan . | |
| 187055 | 11/1983 | Japan . | |
| 27664 | 2/1984 | Japan . | |
| 30352 | 2/1984 | Japan . | |
| 99846 | 6/1984 | Japan . | |
| 117845 | 7/1984 | Japan . | |
| 214366 | 12/1984 | Japan . | |
| 46647 | 3/1985 | Japan . | |
| 119161 | 6/1985 | Japan . | |
| 119164 | 6/1985 | Japan . | |
| 134554 | 7/1985 | Japan . | |
| 197059 | 10/1985 | Japan . | |
| 248057 | 12/1985 | Japan . | |
| 132464 | 6/1987 | Japan . | |
| 2098833 | 11/1982 | United Kingdom | H04B 17/00 |
| 2225194 | 5/1990 | United Kingdom | 379/49 |

OTHER PUBLICATIONS

"The EMS Communications Systems . . . ", G. Mierzowsky, Telecom Report 8, 1985 No. 1.

"Meridian SL Information Services", L. Lee et al, Telesis 1985 two, pp. 12–19.

Product Brochure for "Trilogue" Message Management System, manufactured by Comverse Technology, Inc.

Product Brochure for "Call Text 5000" manufactured by Speech Plus Inc.

Product Brochure for PC Scan manufactured by DEST Corporation.

G. T. Almes et al, "Edmas: An Object–Oriented, . . . ", IEEE Trans. on Software Eng., vol. SE–13, No. 4, Sep., 1987. pp. 1001–1009.

H. Inamori et al, "An Automatically Repeated Call Model . . . " Teletraffic Issues . . . , ITC–11, Elsevier Science Publishers B.V., North Holland, 1985, pp. 1017–1023.

W. B. E. D. Hilal, "Designing Large Electronic Mail Systems", IEEE Inst. of Electrical and Electronics Eng., Computer Society Press, 8th Int. Conf. on . . . , Jun., 1988, pp. 402–409.

T. I. Maude, "Distribution Lists . . . ", Computer Communications, vol. 9, No. 5, Oct. 1986, Guilford, Surrey, GB, pp. 227–233.

G. Clement et al, "Message Handling System DPX400", Electrical Communication, vol. 62 No. 2, Nov. 1988, Brussels, BE, pp. 168–173.

NOTE:
UNLESS OTHERWISE SPECIFIED
1.CAPACITORS VALUES ARE IN MICROFARAD +80%,-20%
2.RESISTANCE VALUES ARE IN OHMS 1/4W, 5%
3.PROGRAMMED DEVICE

EMERGENCY MOBILIZATION SYSTEM

This is a continuation of application Ser. No. 07/597,699, filed on Oct. 5, 1990, which was abandoned upon the filing hereof.

FIELD OF THE INVENTION

The present invention relates to message management systems generally and to emergency mobilization message management systems in particular.

BACKGROUND OF THE INVENTION

Various types of store and forward systems are known. One such system, which provides voice, facsimile (fax), data and cyptographic store and forward capability, is described in U.S. Pat. No. 4,371,752. Other voice store and Forward systems are available from major computer manufacturers, such as Wang and IBM.

In the article, "The EMS Communications System Integrates the Flow of Information,", Telcom Report 8, (1985) No. 1 (Siemens), Gunther Mierzowsky discloses a communications system designed for a factory situation. The communications system enables voice and text messages to be passed between workers. Additionally, it notifies each worker when a message is sent to him.

In the article, "Meridian SL Information Services," by L. Lee et al, Telesis 1985 two, (Bell Northern Research Ltd.), an information service apparatus is discloses which enables text and voice messages to be combined and sent to various workers in a company.

SUMMARY OF THE INVENTION

The present invention seeks to provide a highly efficient and economical emergency crew mobilization system.

There is thus provided in accordance with a preferred embodiment of the present invention an emergency mobilization system comprising a network of mobilization devices each comprising apparatus for producing messages and apparatus for transmitting at least one message by telephone to each of a plurality of recipient apparatus each associated with at least one recipient. Each recipient apparatus typically comprises at least one of the following: facsimile machines, pagers, telephones or computer terminals connected to a host computer.

Additionally, in accordance with a preferred embodiment of the present invention, the apparatus for transmitting comprises apparatus for receiving acknowledgements of receipt of the messages from the recipients. The acknowledgements can be in the form of vocal replies or in the form of a code entered in DTMF or in pulse or speech or in the form of a fax and can be transferred to the sender of the message in the form of spoken messages for vocal replies or in the form of a fax or in the form of a printed or displayed report.

Further, in accordance with a preferred embodiment of the present invention, the message may be a recorded mobilization message or a notification that a mobilization message awaits the recipient.

Still further, in accordance with a preferred embodiment of the present invention, the apparatus for transmitting comprises apparatus for dialling to the recipient apparatus and apparatus for outputting the mobilization message to a recipient only if the recipient apparatus goes OFF-HOOK. Alternatively, the apparatus for transmitting comprises apparatus For sending the mobilization message to mailboxes belonging to the recipients, apparatus for dialling to the recipient apparatus and apparatus for outputting a notification that a message awaits the recipient in the mailbox to each recipient only if his recipient apparatus goes OFF-HOOK. Once the recipient has identified himself to the mailbox, the mobilization message is transmitted to the recipient.

Additionally, in accordance with a preferred embodiment of the present invention, if the recipient apparatus is OFF-HOOK or the recipient does not answer within a predetermined time, the apparatus for dialling redials to the recipient apparatus until either the recipient responds or a predetermined number of redials has elapsed. Alternatively, if the mobilization message was sent to a recipient's mailbox and the recipient apparatus is OFF-HOOK or the recipient does not answer within a predetermined time, the apparatus for dialling redials to the recipient apparatus until either the recipient accesses his mailbox or a predetermined number of redials has elapsed. The redialling to the recipient apparatus is performed in accordance with a predefined plan which states the number of redials and the time between the redials in accordance with the dial result and with the priority attached to the mobilization message.

Moreover, in accordance with a preferred embodiment of the present invention, the mobilization apparatus includes apparatus for defining a backup recipient for each recipient where the backup recipient will receive the mobilization message if the recipient is unavailable, i.e. if a predetermined number of retries has taken place without success.

Further, in accordance with a preferred embodiment of the present invention, each mobilization apparatus includes apparatus for creating and storing a plurality of mobilization lists wherein each of the mobilization lists is a list of at least one recipient to be mobilized. The mobilization list can also comprise a locating list for mobilizing a first predefined number of recipients on the mobilization list who are successfully contacted. The apparatus for creating and storing comprises a telephone, a console attached to the mobilization device, or a host computer connected to the mobilization device.

Still further, in accordance with a preferred embodiment of the present invention, the mobilization message comprises a prerecorded message. Alternatively, the apparatus for producing messages can record the mobilization message shortly before the time of transmission of the mobilization message.

Additionally, in accordance with a preferred embodiment of the present invention, the apparatus for transmitting concurrently and asynchronously sends a multiplicity of copies of the messages on a multiplicity of separate telephone lines. Alternatively, a multiplicity of versions of the messages can be sent.

Moreover, in accordance with a preferred embodiment of the present invention, each mobilization device also includes apparatus for providing information on the status of the mobilization to an authorized supervisor via telephones, terminal displays, facsimile reports, printers, or communication with a host computer.

Further, in accordance with a preferred embodiment of the present invention, means is provided to enable one of the mobilization devices in the network to originate an emergency mobilization procedure and instruct a multiplicity of the mobilization devices in the network to perform the mobilization. It is appreciated that the mobilization of different groups may be performed concurrently and independently for each group.

Still further, in accordance with a preferred embodiment of the present invention, each mobilization device includes apparatus for receiving a multiplicity of instruction inputs for selectably mobilizing a multiplicity of groups of recipient apparatus within the plurality of recipient apparatus.

Additionally, in accordance with a preferred embodiment of the present invention, each mobilization device mobilizes recipient apparatus located within a local region of the mobilization device. For each of the mobilization devices in the network at least one backup mobilization device is defined wherein the backup mobilization device belongs to the network. Additional redundancy is achieved through building each mobilization device as a twin mobilization device.

Moreover, in accordance with a preferred embodiment of the present invention, initiation of a local mobilization procedure may be performed on any one of the mobilization devices in the network via any suitable telephone.

Further, in accordance with a preferred embodiment of the present invention, the apparatus for producing messages comprises at least one of the following: telephone apparatus, telephone apparatus in association with DTMF acoustic diallets, telephone apparatus in association with facsimile machines and telephone apparatus associated with computer apparatus.

Still further, in accordance with a preferred embodiment of the present invention, each mobilization device also comprises apparatus fop providing a store and forward function. The apparatus for providing a store and forward function also comprises interconnect subsystem apparatus arranged to interconnect with telephone switching apparatus, a control subsystem for providing control instructions to the interconnect subsystem apparatus, including instructions for transmitting and receiving voice and fax messages, and mass storage subsystem apparatus coupled to the control subsystem for storing voice transmissions.

Additionally, each mobilization device may also comprise apparatus for storing voice messages, images, and messages combining voice and images.

There is further provided in accordance with a preferred embodiment of the present invention a method of mobilizing emergency personnel including the steps of instructing an originator mobilization device to perform a specified mobilization and instruction by the originator mobilization device to a plurality of mobilization devices belonging to a network each to mobilize a specific group of recipients.

Additionally, in accordance with a preferred embodiment of the present invention, the step of instruction includes the steps of transmission of at least one message from one of the plurality of mobilization devices to each one of its respective specific group of recipients and of recording the success or failure to transmit the at least one message.

Further, in accordance with a preferred embodiment of the present invention, the step of transmission of messages includes the steps of receiving an acknowledgement receipt from a multiplicity of the recipients and of recording the acknowledgement receipts.

Finally, in accordance with a preferred embodiment of the present invention, the method of mobilizing emergency personnel also includes the step of reporting the status of the mobilization.

BRIEF DESCRIPTION OF THE DRAWINGS

The present invention will be understood and appreciated more fully from the following detailed description, taken in conjunction with the drawings in which:

FIGS. 18A–18C, 19A–19C, 20A and 20B, and 21A–21D are schematic illustrations of the TIU circuitry shown in FIG. 17;

DETAILED DESCRIPTION OF A PREFERRED EMBODIMENT

Figure 1:
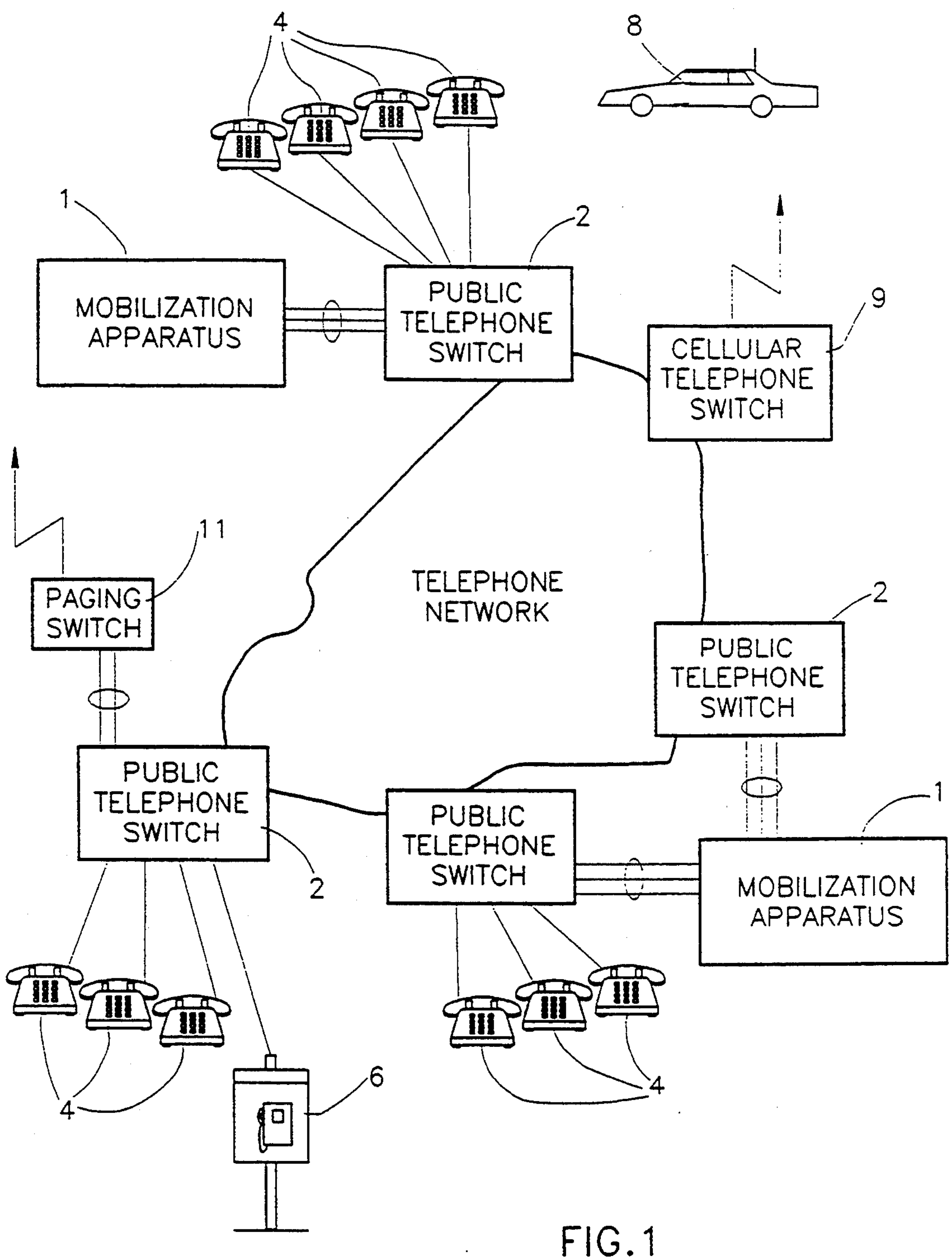
FIG. 1 is a block diagram illustration of the interaction of an emergency mobilization apparatus constructed and operative in accordance with a preferred embodiment of the present invention with a telephony environment.
Figure 2:
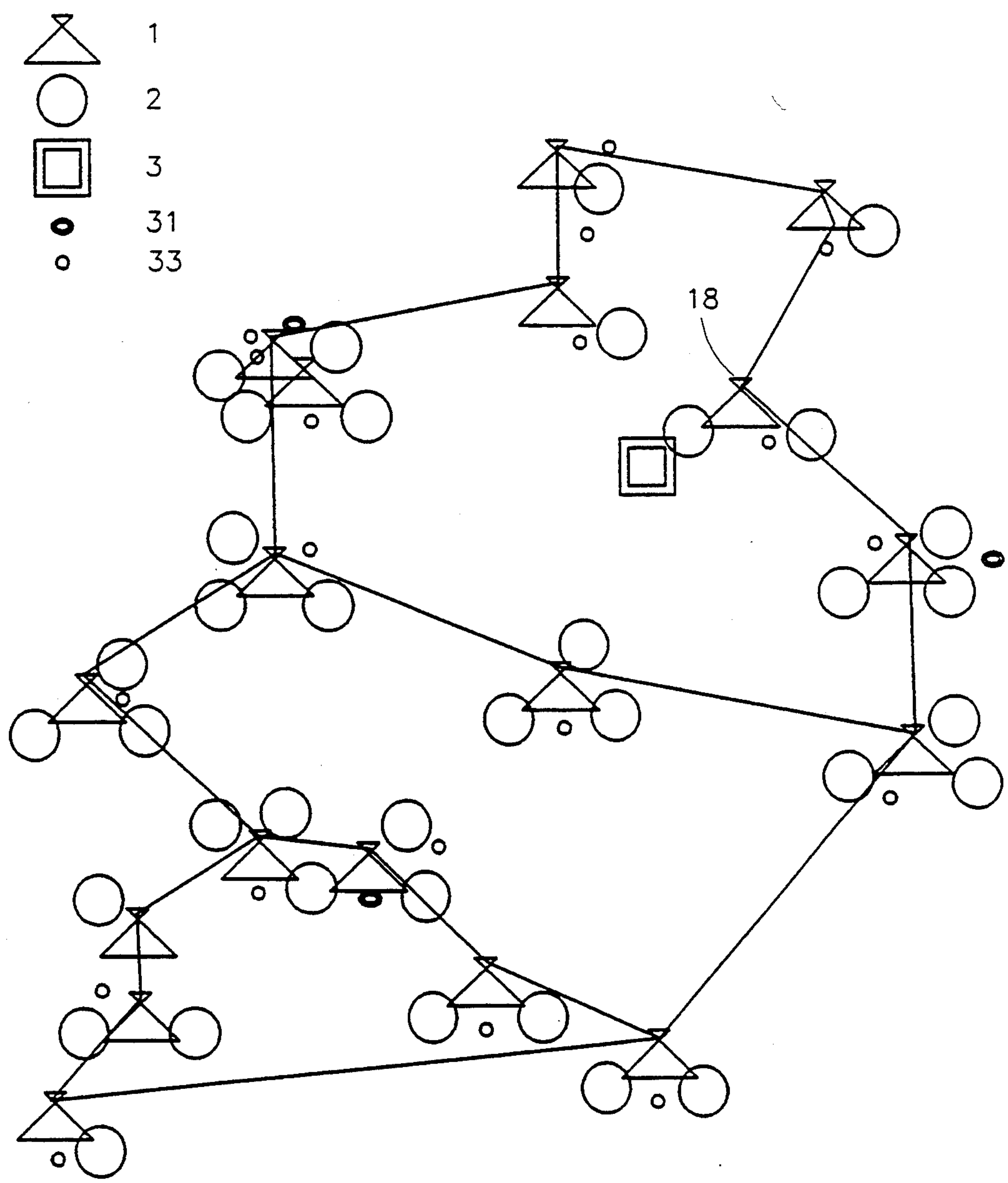
FIG. 2 is a pictorial illustration of the geographical distribution of elements of an emergency mobilization system in conjunction with a single alert network, constructed and operative in accordance with a preferred embodiment of the invention.

Reference is made to FIGS. 1 and 2 which illustrate a number of elements of the emergency mobilization system of the present invention. The emergency mobilization system comprises a multiplicity of mobilization apparatus 1 each in telephonic communication with at least one public telephone switch 2. Additionally, the emergency mobilization system of the present invention typically operates in conjunction with at least one alert network which comprises the hierarchy of people to be mobilized.

When an emergency mobilization is required, an initator in an alert network control center 3 (FIG. 2) responsible for the mobilization dials the mobilization apparatus corresponding to that control center 3, creates a mobilization message, and instructs the apparatus 1 to perform a specific mobilization procedure. The initiator is a preliminary message sender; other mobilization personnel can create and send mobilization messages, as will be described hereinbelow.

A mobilization procedure typically is performed by mobilizing personnel who are identified on a mobilization list. To that end, the mobilization apparatus 1 typically has stored in it a number of previously defined lists of personnel to be mobilized. The personnel to be mobilized will be known hereinafter as 'recipients'. Recipients are divided into two classes, subscribers, for each whom there is defined in apparatus 1 a private profile record and optionally, a private mailbox, and non-subscribers whose name and telephone numbers at which they can be reached are recorded on the mobilization list.

The private profile record typically comprises definitions of private parameters, such as an address and a plurality of telephone numbers, at which the subscriber can be reached. The subscriber's private mailbox is defined as a storage place in apparatus 1 which typically stores arriving messages.

The mobilization list is typically created and modified via a console which may be an element of mobilization apparatus 1, via a host computer connected to mobilization apparatus 1 or via a telephone. The mobilization list, or lists, may be created before the moment of the emergency and stored within the mobilization apparatus 1. Alternatively, it may be created at the time of initiation of the mobilization.

The mobilization list may comprise a record for a single recipient or it may comprise a plurality of records, one per a plurality of recipients. Additionally, the recipients may be subscribers and/or non-subscribers.

Upon notification of a mobilization, mobilization apparatus 1 dials to each of the recipients on the mobilization list, via the public telephone switches 2 in its region. The recipient may receive the phone call either at a private telephone 4, a public telephone 6, a cellular phone 8 via a cellular telephone switch 9, via a pager 11, or via any other suitable telephonic means.

For a non-subscriber recipient, the mobilization apparatus 1 plays the mobilization message, typically twice, when someone at the telephone number of the non-subscriber responds to the phone call. If the person answering the telephone is not the non-subsciber, it is expected that that person will transmit the mobilization message to the non-subscriber.

For subscriber recipients, mobilization apparatus 1 typically sends the mobilization message to each subscriber's mailbox. Apparatus 1 dials each subscriber and plays a predefined notification message which notifies the subscriber to access his mailbox. If desired by the recipient, the notification can be made repeatedly, typically until the subscriber accesses his mailbox. The mobilization apparatus plays the notification message to whomever picks up the telephone. If the subscriber is the one to pick up the telephone, the subscriber can immediately identify himself to the system and receive the mobilization message. If somebody else picked up the telephone and then notified the subscriber, the subscriber can dial to the system, identify himself and receive the mobilization message. This method of sending messages enhances the confidentiality of the mobilization and enables the sender to create detailed messages.

The amount of time between attempts to notify a subscriber, or to access a non-subscriber, as well as the number of such attempts is typically defined according to a predefined plan and is a function of the dial result, such as busy, no answer, etc., the number of tries previously attempted, and of the priority given to the notification or mobilization message, respectively. The retry periodicity may be a function of the number of previous unsuccessful attempts.

The mobilization message may have been recorded some time before the start of the mobilization or a sender may record it immediately before sending it.

The mobilization apparatus i typically is capable of concurrently and asynchronously accessing multiple, typically 32, recipients via the at least one telephone switch 2. Apparatus 1 typically will play the same mobilization message to each of the multiple recipients. Alternatively, a multiplicity of different messages can be played. In either case, for each recipient, the message is played starting from the beginning of the message.

Upon accessing a recipient, mobilization apparatus 1 may request an acknowledgement of receipt of the message. The acknowledgement typically comprises the recording of a vocal reply of the entering of a code, either via pulse or DTMF dialling, or via speech recognition. Any unreceived messages are returned to the sender after a predetermined number of retries have occurred or a predetermined amount of time has elapsed.

In accordance with a preferred embodiment of the present invention, each recipient is associated with a backup recipient who will receive his messages if he does not answer within the predetermined amount of time. This is known as cascading and it is typically organized by having each recipient define who his backup recipient is.

Figure 3:
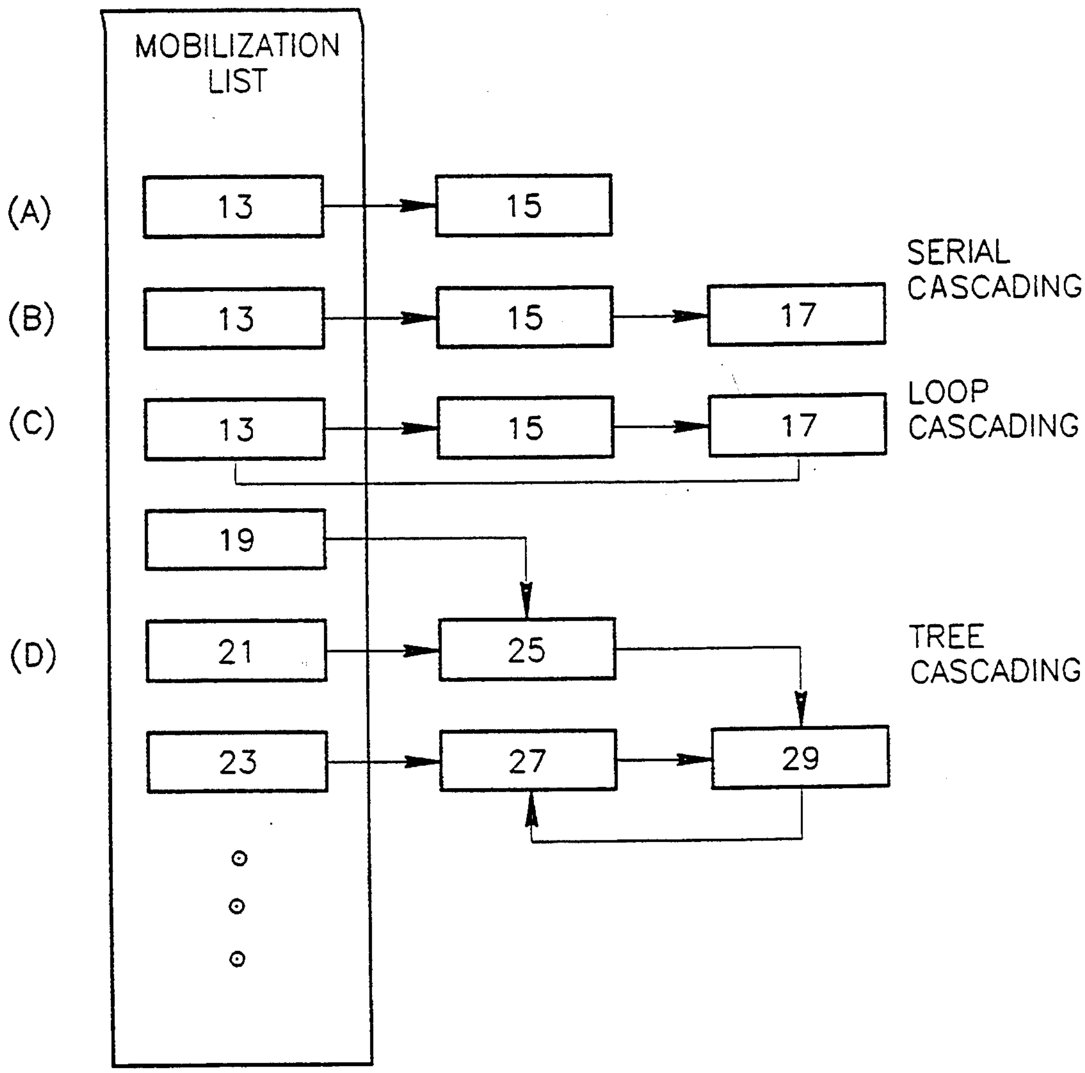
FIG. 3 is a diagram of a subscriber list and a plurality of methods of accessing further subscribers if the main subscriber is unavailable, useful in the system of FIGS. 1 and 2.

The cascading can be organized in a number of ways, as shown in FIG. 3. The recipients can be serially cascaded, as shown by (a), such that the apparatus 1 first attempts to access a main recipient 13. If main recipient 13 is unavailable, the apparatus 1 attempts to access a backup recipient 15. If the backup recipient 15 is unavailable, the apparatus 1 returns a message to the sender indicating its inability to access anyone. Alternatively, the serially cascading can be longer, as shown in (b).

Should a person organizing the cascading require that someone successfully receive the message, and thus, be mobilized, the cascading is typically organized in a loop as shown in (c) where apparatus 1 first dials recipient 13, then recipient 15 and then recipient 17. If none of them respond, then apparatus 1 retries recipient 13 and so on until a reply is received.

Finally, the recipients can be organized in a tree structure, as shown in (d). In the example shown, recipients 19 and 21 are backed up by recipient 25 who, in turn, is backed up by recipient 29. Recipient 23 is backed up by recipient 27 who is also backed up by recipient 29. A loop can be included, as shown between recipients 27 and 29.

The mobilization list can be utilized as a mailing list, where the message is sent to all recipients. Apparatus 1 notifies the sender of recipients which received and those who did not receive the message. Alternatively, the mobilization list can be utilized as a locating list where the sender requires that the message be received by a predetermined number of recipients listed on the mobilization list. Typically, once the predetermined number of recipients have responded, mobilization apparatus 1 no longer attempts to mobilize the remaining personnel on the list, if any exist.

Since each apparatus 1 typically only accesses recipients located in the area near its location, the originally notified apparatus 1 may additionally notify other apparatus 1 to send the mobilization message to recipients in their areas. Moreover, the apparatus 1 can be organized into a network covering a large area, in order to effect the mobilization of a large population. Additionally, by spreading the mobilization activity among a multiplicity of regional mobilization apparatus 1, the number of long-distance telephone calls is reduced.

FIG. 2 illustrates an example network of apparatus 1. The network comprises a plurality of apparatus 1 distributed throughout a given region, typically of a state or country, where each apparatus 1 serves the geographical region in which it is located. Additionally, the at least one alert network comprises the alert network control center 3, a multiplicity of regional control centers 31 and a plurality of local control centers 33. Each local control center 33 is responsible for overseeing the mobilization occurring within a small geographic location and for reporting to a regional control center 31. Each regional control center 31 receives information as to the status of the mobilization within its region and reports that information to the alert network control center 3, which is responsible for the overall mobilization.

As mentioned hereinabove, the mobilization is typically initiated from the alert network control center 3 which dials the mobilization apparatus 1 assigned to it, marked 1A on FIG. 2. Apparatus 1A is typically the apparatus 1 which is closest to alert network control center 3.

Apparatus 1A then dials the other apparatus 1 which service the alert network, in accordance with instructions from the alert network control center 3, and transmits to them information regarding the current emergency mobilization, such as the message to send, the specific mobilization list or lists to use, etc.

Each of the apparatus 1 which receives mobilization instructions, including apparatus 1A, performs the mobilization procedure described hereinabove. Mobilizations are typically performed hierarchically, beginning with mobilization of personnel with state-wide or national responsibilities, proceeding through mobilization of personnel with regional responsibilities and through mobilization of personnel with local responsibilites. The mobilization typically terminates with mobilization of the required personnel. Each person mobilized is called by the apparatus 1 located nearest to his home and/or place of work.

If the mobilization requires personnel with certain skills, then the initiator selects, or creates, a mobilization list of those personnel. If only a few of the personnel with the required skills are needed, apparatus 1 will then use the list as a locating list and will mobilize the required number of people. If the personnel with the skills are located in a number of regions, then one of the apparatus 1 will be assigned the job of mobilizing them, thus requiring it to mobilize some people outside of its region.

In order to ensure that the mobilization is proceeding properly, controllers in each local control center 33 dial their respective apparatus 1 and receive reports from the apparatus 1 on the status of the mobilization procedure (e.g. number of acknowledgements, the acknowledgements themselves, a list of people unsuccessfully contacted, etc). They then can instruct the apparatus 1 assigned to them with additional instructions, such as the sending of new mobilization messages or the mobilization of a new group of people. Additionally, the local controllers report to the regional control center 31 typically by sending messages from their apparatus 1 to mailboxes of the regional controllers in the apparatus 1 assigned to the regional control center 31.

The reports can be received via a telephone, via a facsimile machine, via a printer or via a display apparatus connected to a host computer.

The regional control center 31 receives status reports from a plurality of local controllers. Similarly to the local controllers, the regional controllers can issue additional mobilization instructions to the apparatus 1 assigned to them and they can report the status of the regional mobilization to the alert network control center 3- They can also send messages to the local controllers with instructions concerning additional mobilizations to perform or with other information concerning the emergency mobilization.

The alert network control center 3 receives reports from the regional controllers via apparatus 1A. It additionally can request reports from apparatus 1A describing the status of the mobilization of the personnel in the local area near control center 3. However, typically, there is a local control center 33 assigned to apparatus 1A, which receives the status reports from apparatus 1A and reports the results to the regional control center 31 who then reports to alert network control center 3.

In accordance with a preferred embodiment of the present invention, each apparatus 1 additionally stores the mobilization lists and other information concerning the recipients of at least one neighboring apparatus 1. This provides redundancy in the mobilization system of the present invention and ensures that a mobilization can be performed even if a portion of the apparatus i and/or the telephony environment is not functioning. Additionally, for redundancy purposes, each apparatus 1 is a twin apparatus 1 to ensure that if one of twins is not functioning, the other one is operative.

Figure 4:
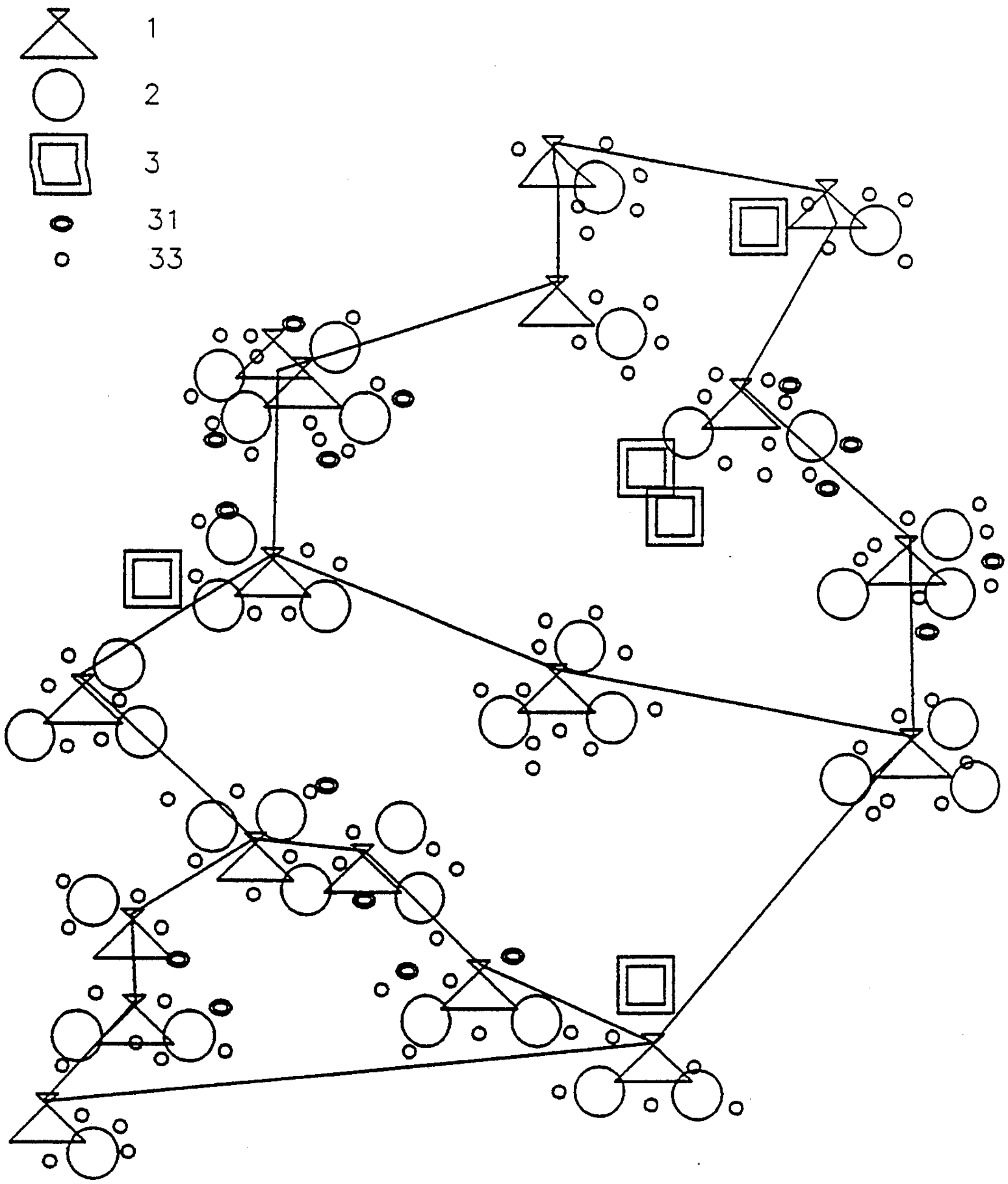
FIG. 4 is a pictorial illustration of the geographical distribution of elements of an emergency mobilization system in conjunction with a plurality of national alert networks, useful in the sytem of FIGS. 1 and 2.

In accordance with a preferred embodiment of the present invention, a plurality of independent alert networks can typically be defined over the network of apparatus 1, as illustrated in FIG. 4. For example, if the network of FIG. 4 belonged to a state, the state may choose to utilize it to define independent alert networks for the state police, the army, the reserves, local fire and police departments, and for hospitals. Each organization can define multiple alert networks, typically ranging from total mobilization to partial mobilization, such as a skeleton mobilization.

With multiple alert networks, mobilization of any organization can be performed in stages, if necessary. It can begin with a skeleton mobilization and then proceed through a partial mobilization to a full mobilization. A staggered mobilization, such as is described hereinabove, can be performed manually, by dialling the apparatus 1A each time a different level of mobilization is required and at that time, instructing apparatus 1A as to which mobilization list to use, or it can be performed automatically, by assigning a specific time when a mobilization list is to be used or by assigning priorities to the messages sent by the different mobilization lists.

The automatic priority mobilization will be performed by allocating the entirety of the resources of the network of apparatus 1 to the mobilization lists having the highest priority. As more and more of the highest priority personnel have been contacted, the network allocates more and more resources to the next highest priority mobilization list. The process proceeds until all personnel on the mobilization lists have been contacted.

It should be noted that the mobilization procedure described hereinabove pertains to a multi-regional emergency mobilization. It is also possible to perform a local mobilization utilizing one or a few of the apparatus 1. In the local case, the local or regional controllers are responsible for the mobilization and there is no need for them to report to an alert network control center.

It will be appreciated by those skilled in the art that the detailed control of the mobilization process provided by the system of the present invention enables the mobilizing organization to employ fewer people to perform the mobilization while being continually aware of the status of the mobilization. This enables the mobilizing organization to make informed decisions about other aspects of the mobilization, such as transportation of those mobilized to their respective locations for duty.

The emergency mobilization apparatus of the present invention supports a message file system and receives and stores voice and image records in subscriber's mailboxes.

The mobilization apparatus 1 of the present invention is capable of informing a subscriber when a voice message of a facsimile record, has been placed in his mailbox. As mentioned hereinabove, the apparatus 1 informs the subscriber by calling him over the telephone or by any other suitable technique.

The apparatus, using any DTMF telephone or DTMF acoustic diallet, scans the subscriber's mailbox for messages which are either voice messages or facsimile records. The subscriber can then hear or view his messages, delete or keep them, reply to the sender, or forward them to another subscriber, while optionally adding annotation.

The subscriber can also forward his voice or facsimile messages to any other subscriber's mailbox anywhere over the telephone network via a telephone, a specially equipped personal computer or a facsimile system. The user can also retrieve the facsimile message immediately at a facsimile machine or at a specially equipped PC connected to his telephone line. He can control both transmission and retrieval of the facsimile message from his telephone keypad. Equipment for suitable adaptation of a PC is available from TITN Inc. and GAMALINK both of the U.S.A.

As noted above, the apparatus 1 supports the addition of a voice annotation to a facsimile record and linking of facsimile records into multirecord facsimile files.

Any subscriber, can create and send a voice message or a facsimile record to any telephone number or subscriber. Any non-subscriber may create and send a voice message or a facsimile record to any subscriber.

Voice or facsimile records may be sent to a subscriber's mailbox by specifying his ID or extension number within an office and to a facsimile system (or specially equipped PC) by specifying its extension number within an office. Voice or facsimile records may be sent to a non-subscriber's facsimile by specifying its telephone number as well as to a list of subscribers, non-subscribers, and facsimile systems.

Notification of the arrival of a voice or facsimile record to a subscriber's mailbox is preferably provided by a telephone call to a prespecified telephone number. Additionally, the notification may be made by activating a 'message waiting' indicator light on the subscriber's telephone, by activating a pager, or by display of the subscriber's mailbox identification code on a display or a printer.

The entire interaction of the user (subscriber or non-subscriber) with the apparatus 1 is typically carried out over the telephone. The user is guided with voice prompts and controls the apparatus 1 with DTMF keystrokes of with voice commands. Sending a facsimile to a subscriber and receiving it and programming the telephone number for notification are all done over the telephone.

A special option of the apparatus 1 is the support of DID lines with associated subscribers' mailboxes. The user may call such an appropriate DID number to send or receive a voice message or facsimile. This eliminates the need for DTMF telephone sets.

The emergency mobilization apparatus of the present invention typically supports up to 32 lines of voice where, of those 32 lines, 20 lines may support facsimile data.

Figure 5:
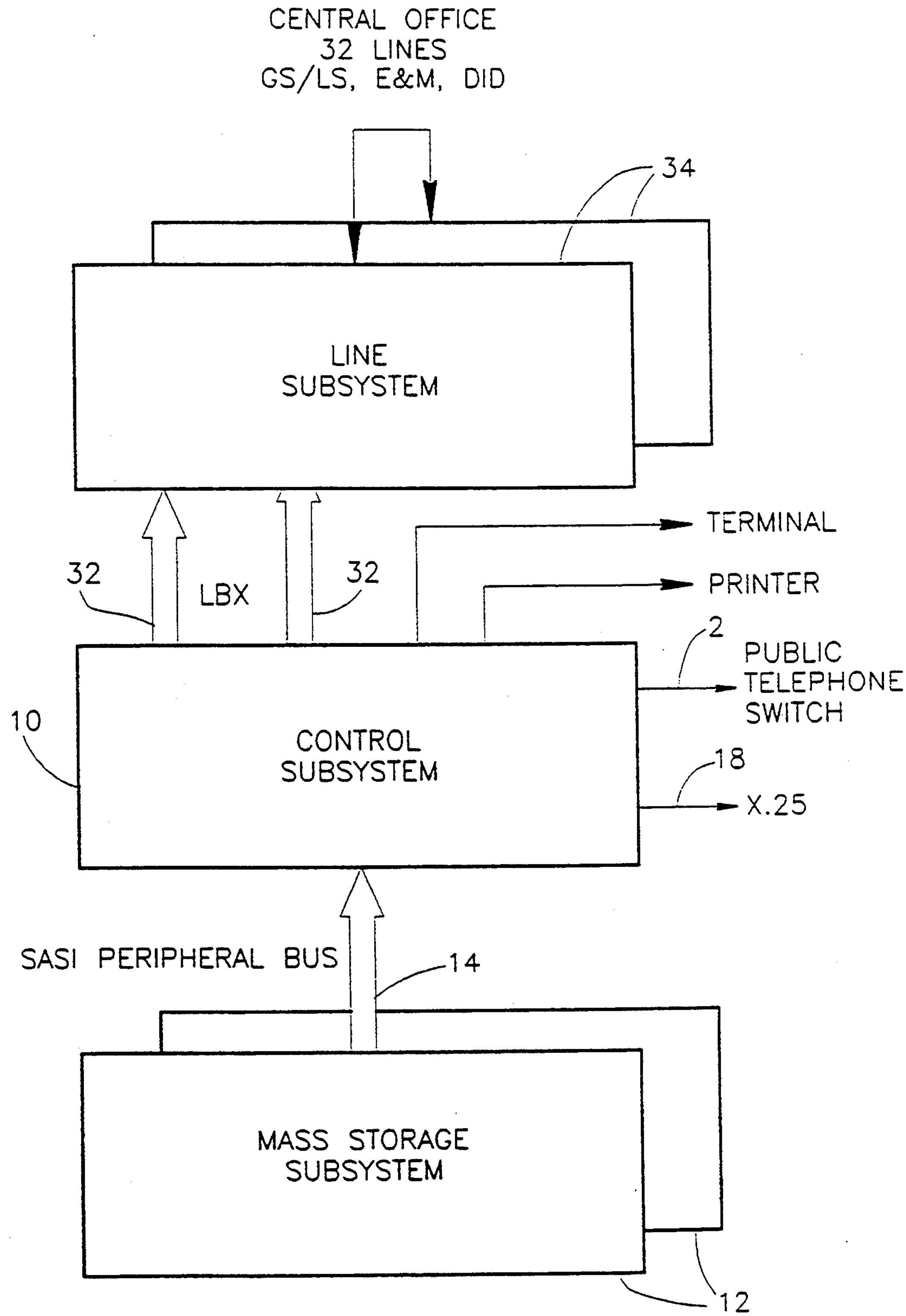
FIG. 5 is a block diagram illustration of the mobilization apparatus of FIG. 1.

Reference is now made to FIG. 5, which illustrates in block diagram form, the mobilization apparatus 1 constructed and operative in accordance with a preferred embodiment of the present invention. The apparatus 1 comprises a control subsystem which is coupled to one or more mass storage subsystems via a SASI bus 14. The control subsystem 10 is also coupled to a host computer (not shown) via an RS 232, Ethernet link (not shown) or an X.25 network 18. The X.25 network 18 additionally allows each apparatus 1 to communicate with other apparatus 1. Control subsystem 10 is also coupled to a public telephone switch 2 for communication with telephonic environments.

Control subsystem 10 is coupled via one or more LBX busses 32 to a plurality of line subsystems 34, each of which is adapted to interface with a public telephone switch 2 as well as with telephones and facsimile machines, directly or via a central telephone office.

Figure 6:
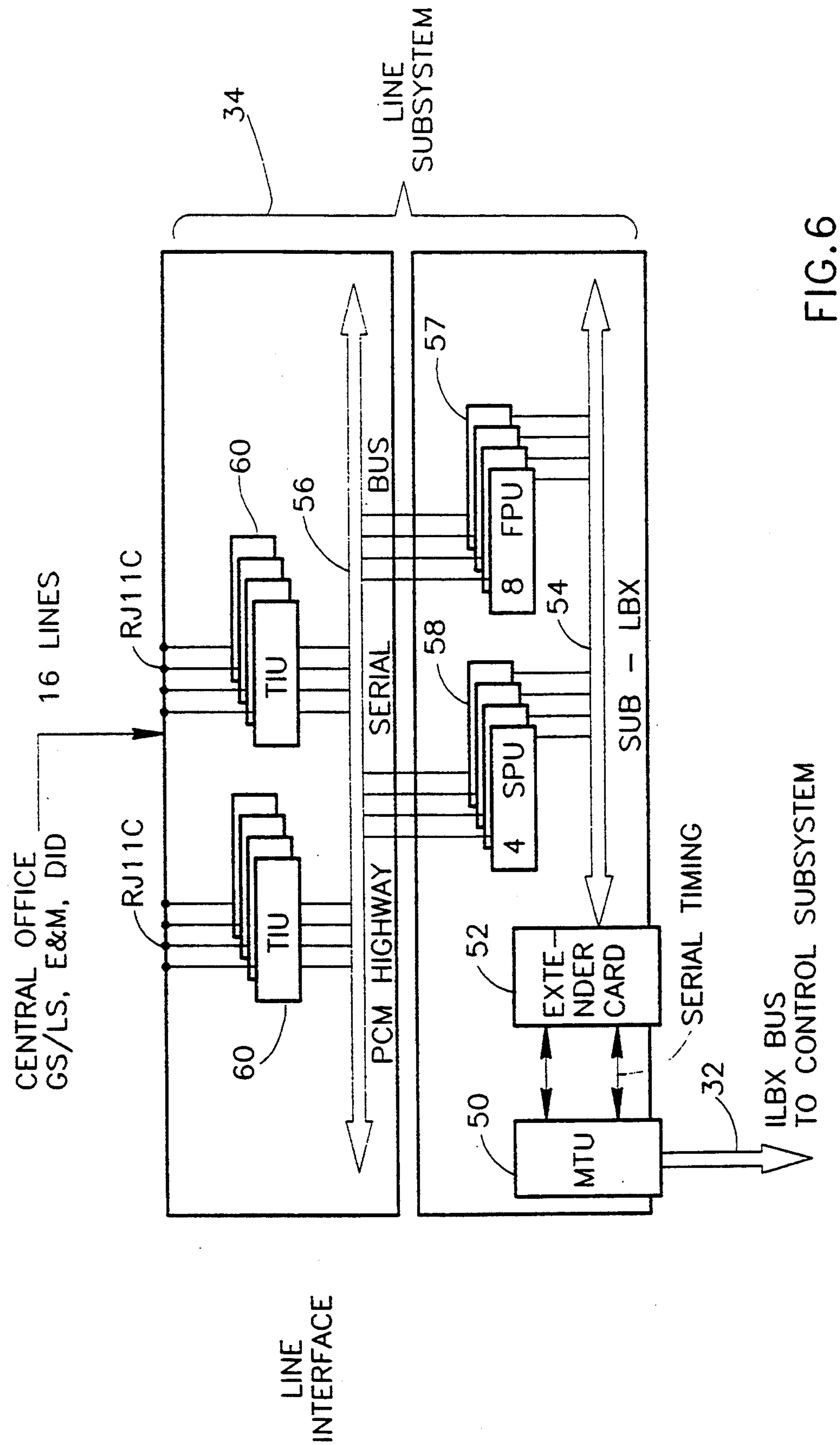
FIG. 6 is a block diagram illustration of a line subsystem forming part of the system of FIG. 5.

Reference is now made to FIG. 6, which illustrates, in block diagram form, a line subsystem 34. The line subsystem comprises an MTU interface card 50, which is described hereinbelow in connection with FIG. 9, and which is connected to the control subsystem via the LBX bus 32 (FIG. 5). The MTU interface card 50 is coupled via an extender card 52 to a sub LBX parallel bus 54 and to a PCM highway serial bus 56. A plurality of signal processing units (SPU) 58, and optionally, a facsimile processing unit (FPU) 57, are coupled to the busses 54 and 56. A schematic illustration of a preferred facsimile processing unit (FPU) appears at FIG. 41. A parts listing for this schematic illustration is provided in Annex A. A software object listing for the FPU is provided in Annex B. A plurality of telephone interface units (TIU) 60 are connected to the PCM highway bus 56 and are connected to telephone lines via an RJIIC connection.

Figure 7:
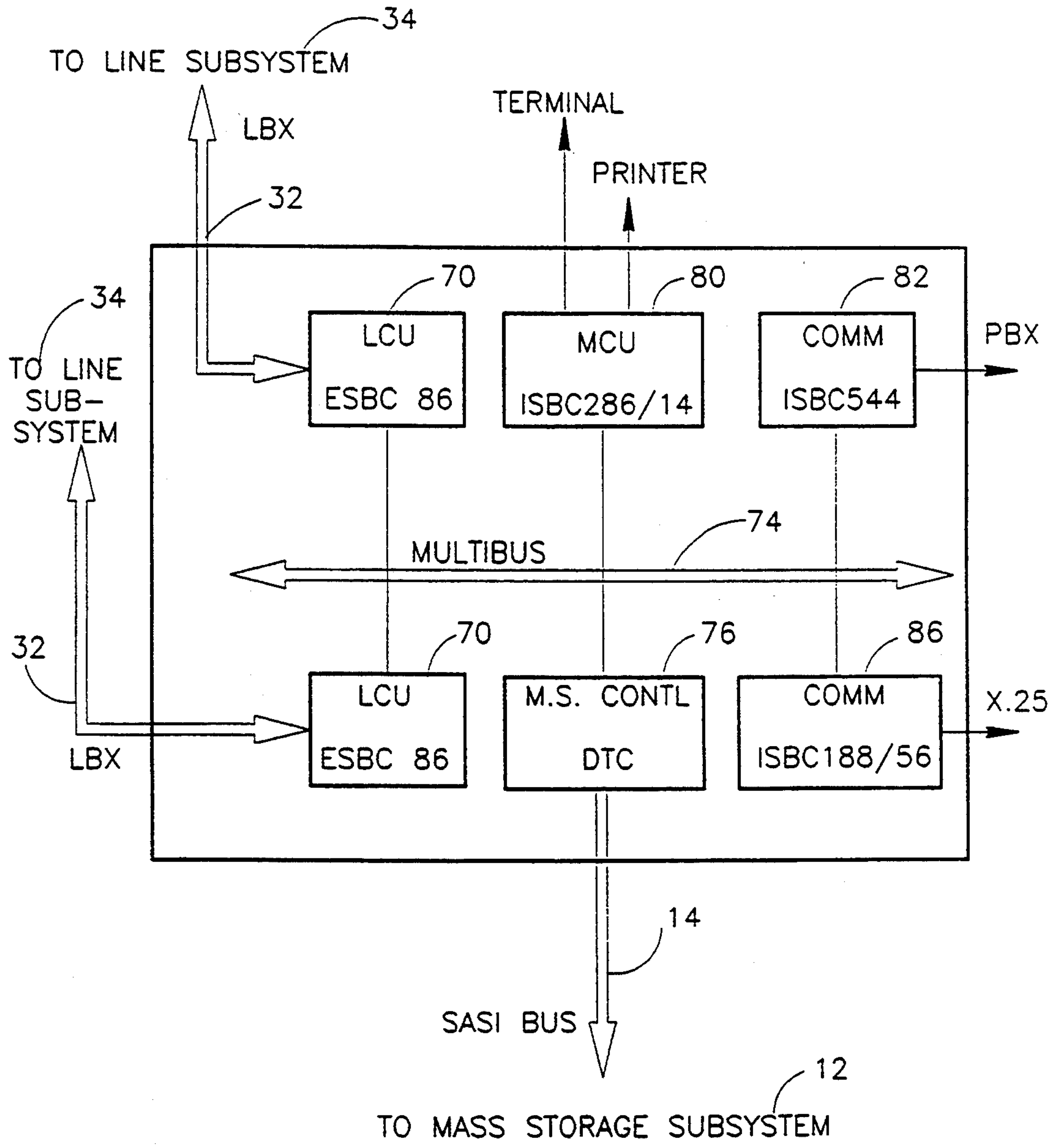
FIG. 7 is a block diagram illustration of a control subsystem forming part of the apparatus of FIG. 5.

Reference is now made to FIG. 7, which illustrates, in block diagram form, the control subsystem 10 of FIG. 5. The control subsystem 10 comprises two line CPUs (LCU) 70, such as an ESBC 86 manufactured by the present applicants/assignees and illustrated in detail in FIG. 42. A parts list for the schematic of FIG. 42 is provided at Annex C. The LCU 70 is preferably similar to a combination of the ISBC 186/03 of Intel and a memory, such as an Intel SBC12 CX memory. Each LCU 70 is coupled a line subsystem 34 via an LBX bus 32. A preferred software object listing for the EPROM of LCU 70, when embodied in an ESBC 86 is attached hereto as Software Annex D.

The LCUs 70 are connected to a multibus 74. Also connected to multibus 74 are a mass storage controller 76, coupled via SASI bus 14 to the mass storage subsystem 12, a main CPU (MCU) 80, such as an SBC 286/14 of Intel, a host computer interface 82, such as an Intel SBC 544, an optional ethernet interface (not shown), such as an Intel SBC 552, and an X.25 interface 86, such as an Intel SBC 188/56. A preferred software object listing for the EPROM of the MCU 80, when embodied in an Intel 286/14 is attached hereto as Software Annex E. A preferred software object listing For the RAM of the LCU 70, when it is embodied in an ESBC 86 card is attached hereto as Software Annex F (Bootstrap Loaded). A preferred software object listing For the RAM of the MCU 80, when it is embodied in an Intel 286/14 is attached hereto as Software Annex G (Bootstrap Loaded), and Software Annex H (Run Time Loaded).

Figure 8:
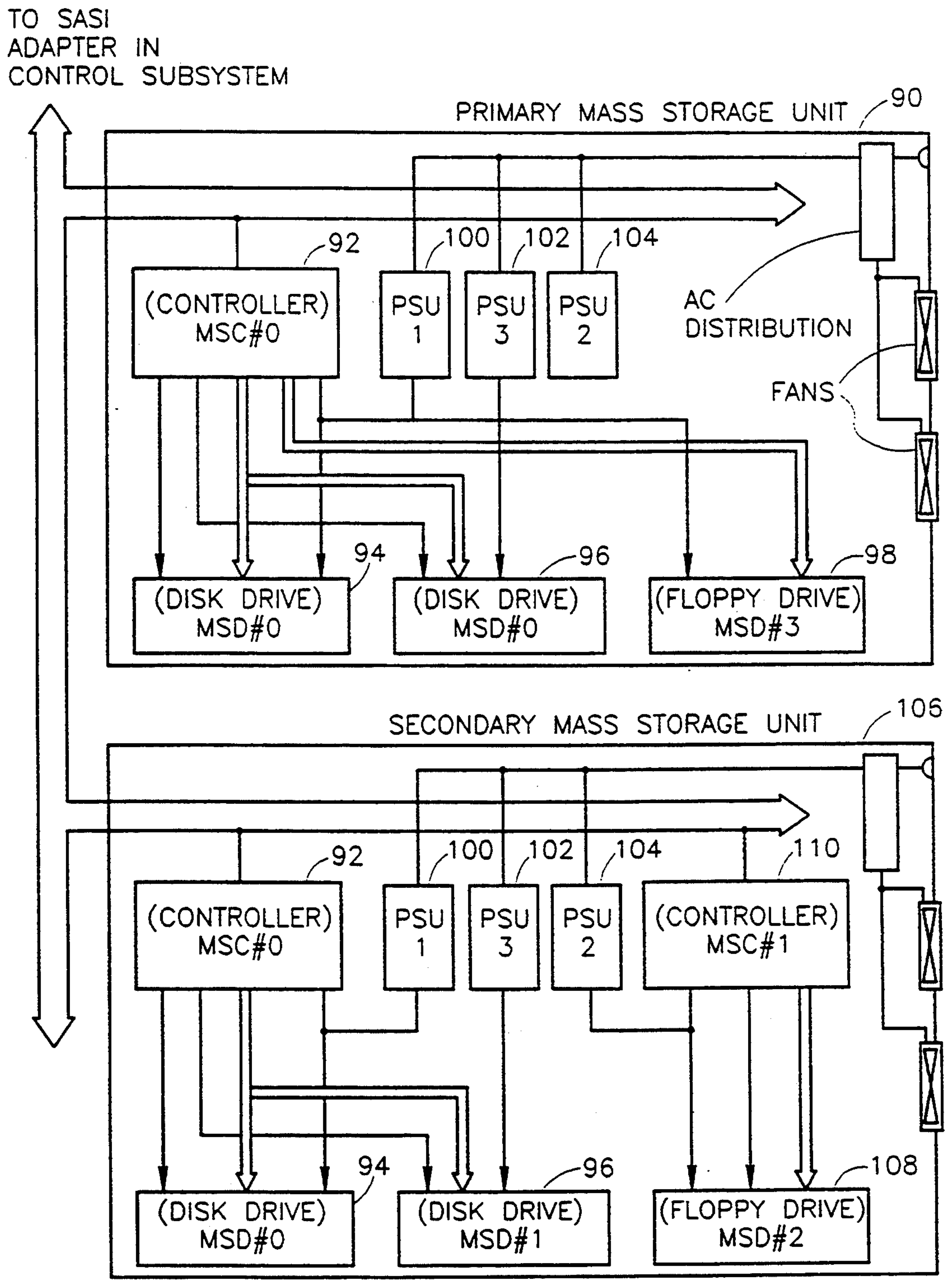
FIG. 8 is a block diagram illustration of a mass storage subsystem forming part of the apparatus of FIG. 5.

Reference is now made to FIG. 8, which illustrates the mass storage subsystem 12. It is seen that subsystem 12 comprises a primary mass storage unit 90 including a plurality of controllers 92, such as OMTI 5200 cards, each of which operates a pair of disk drives 94 and 96. Each mass storage subsystem may also include a floppy drive 98.

Subsystem 12 also typically comprises a secondary mass storage unit 106 which is similar to unit 90 except that it typically comprises at least one additional disk drive 108, operated by a separate controller 110. PSU circuits 100, 102 and 104 provide power to the various components.

A preferred installation software object listing for the RAMs of the MCU 80 when it is embodied in an Intel 286/14 card is attached hereto as Software Annex I.

Figure 9A:
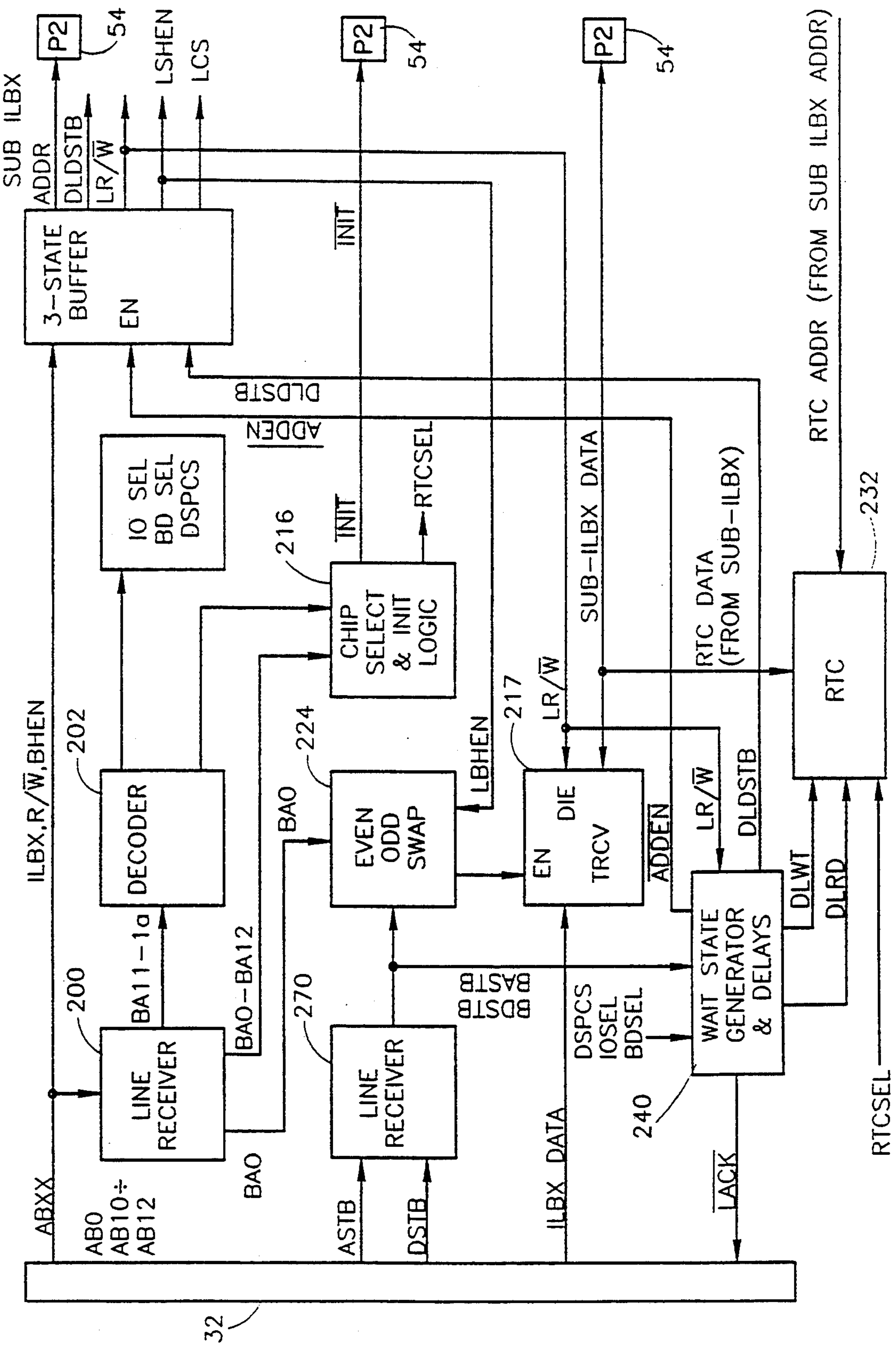
FIGS. 9A and 9B are block diagram illustrations of MTU circuitry forming part of the line subsystem shown in FIG. 6.
Figure 9B:
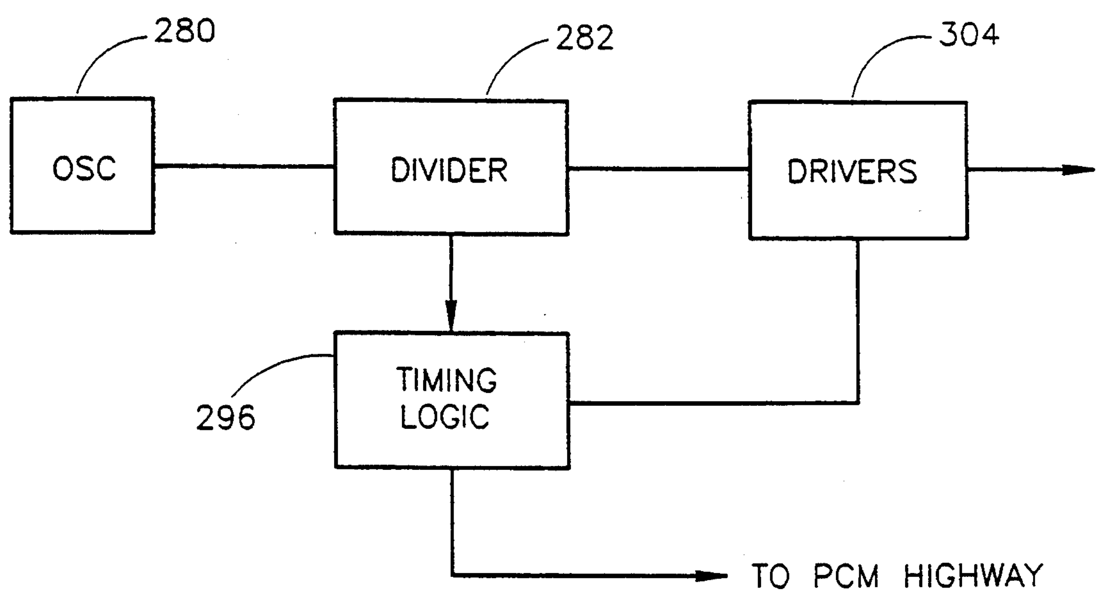
Figure 10A:
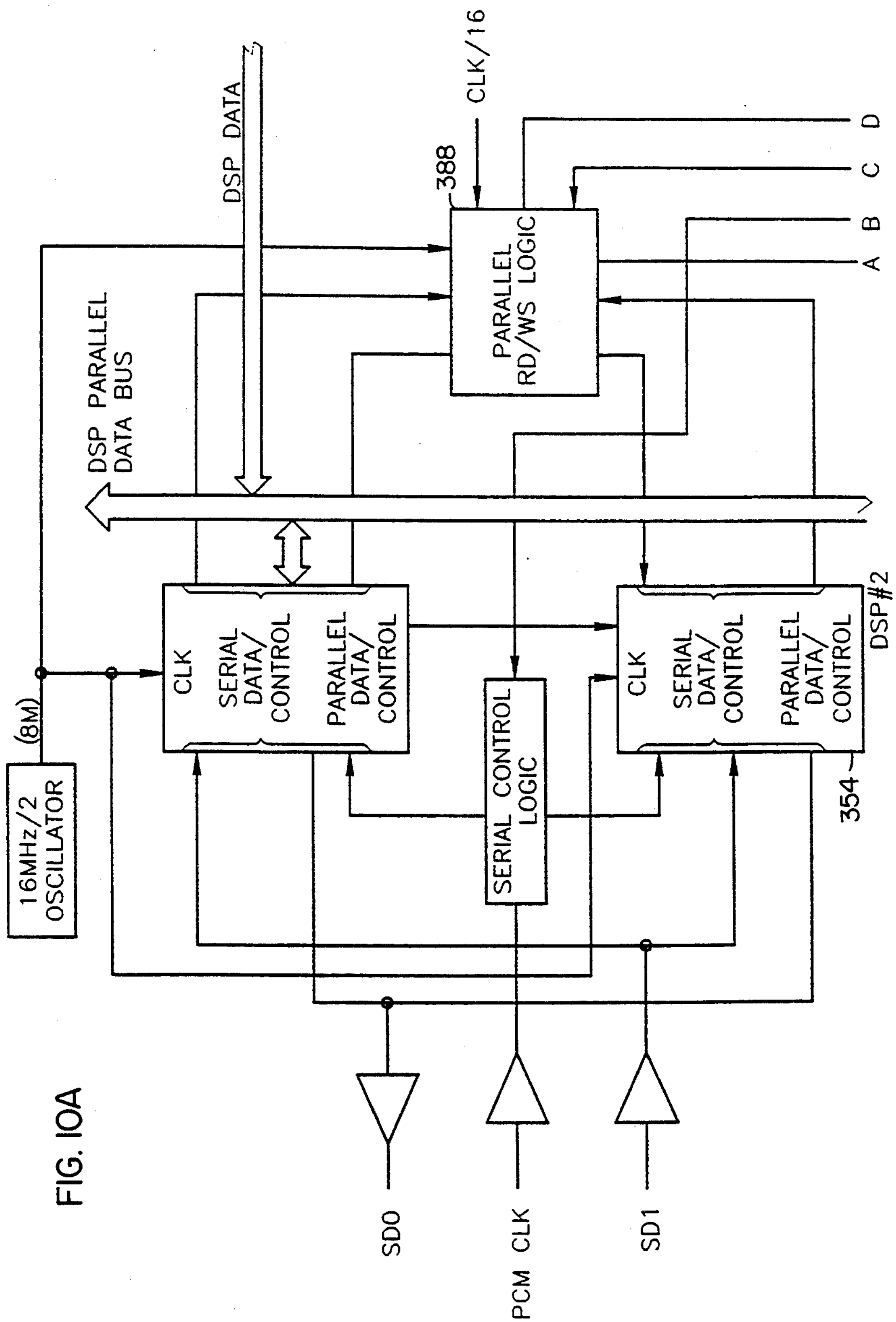
FIGS. 10A–10D are block diagram illustrations of SPU circuitry forming part of the line subsystem shown in FIG. 6.
Figure 10B:
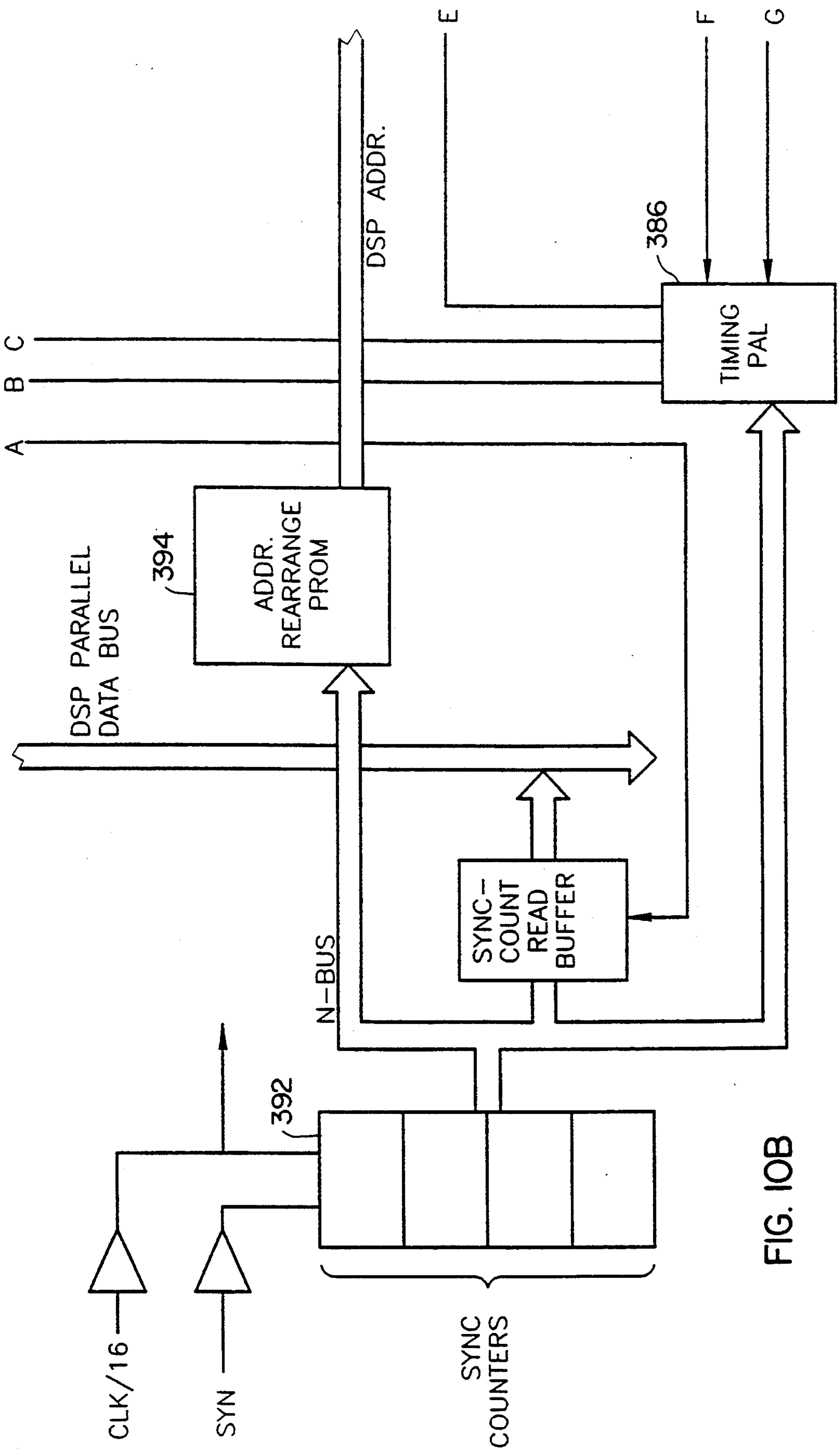
Figure 10C:
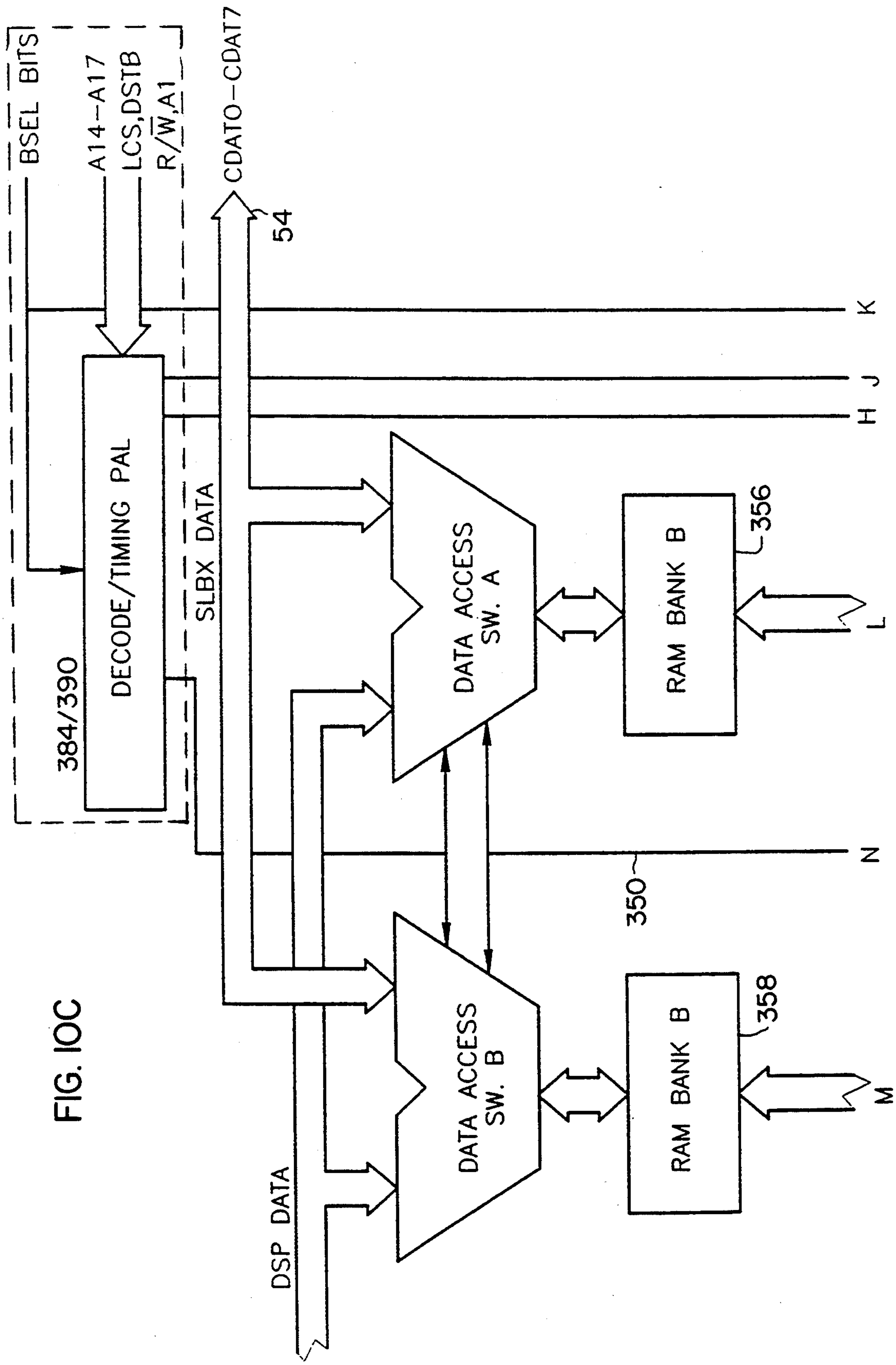
Figure 10D:
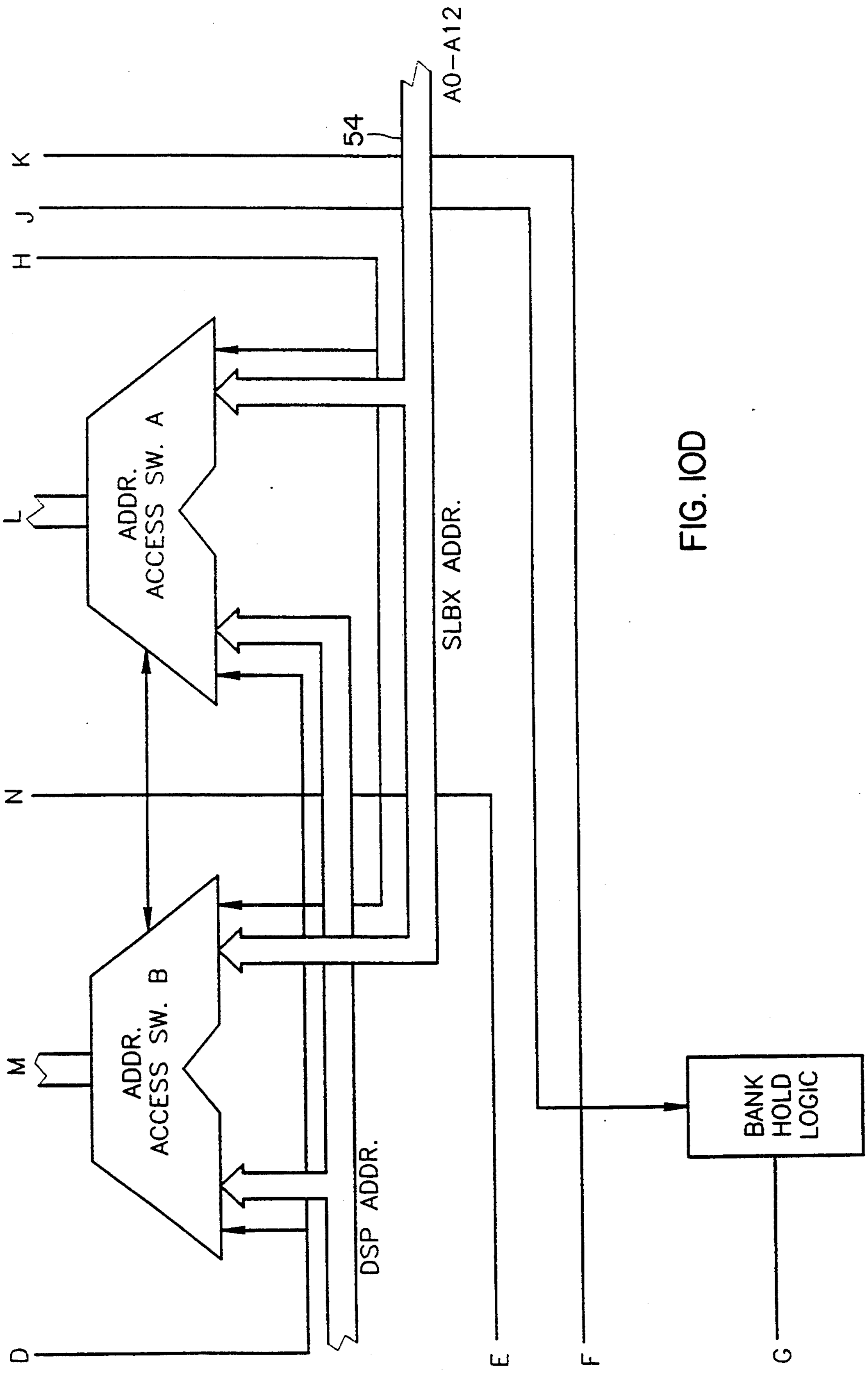
Figure 11A:
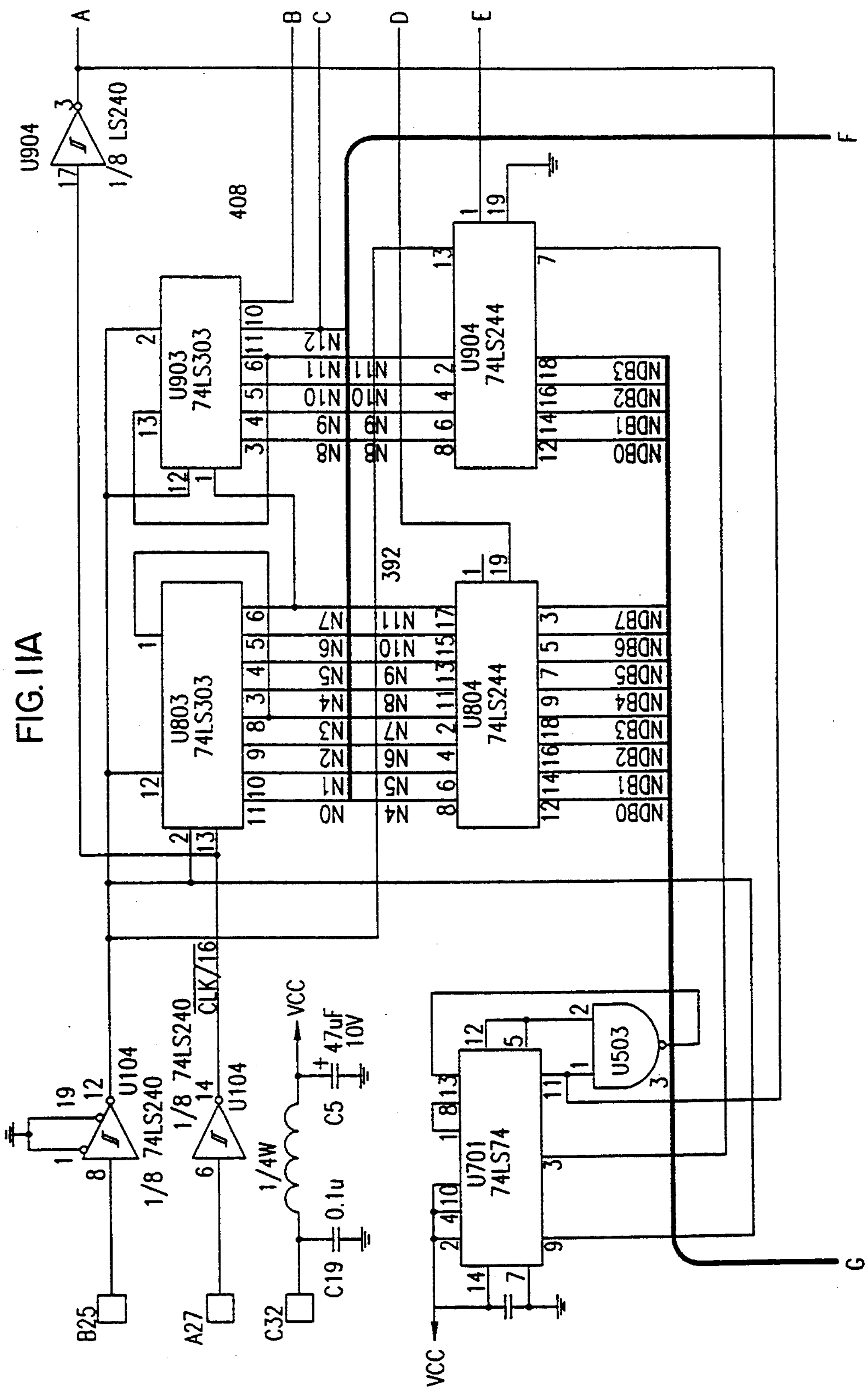
FIGS. 11A–11D and 12A–12E collectively define a schematic illustration of a preferred embodiment of SPU circuitry iilustrated in FIGS. 10A–10D.
Figure 11B:
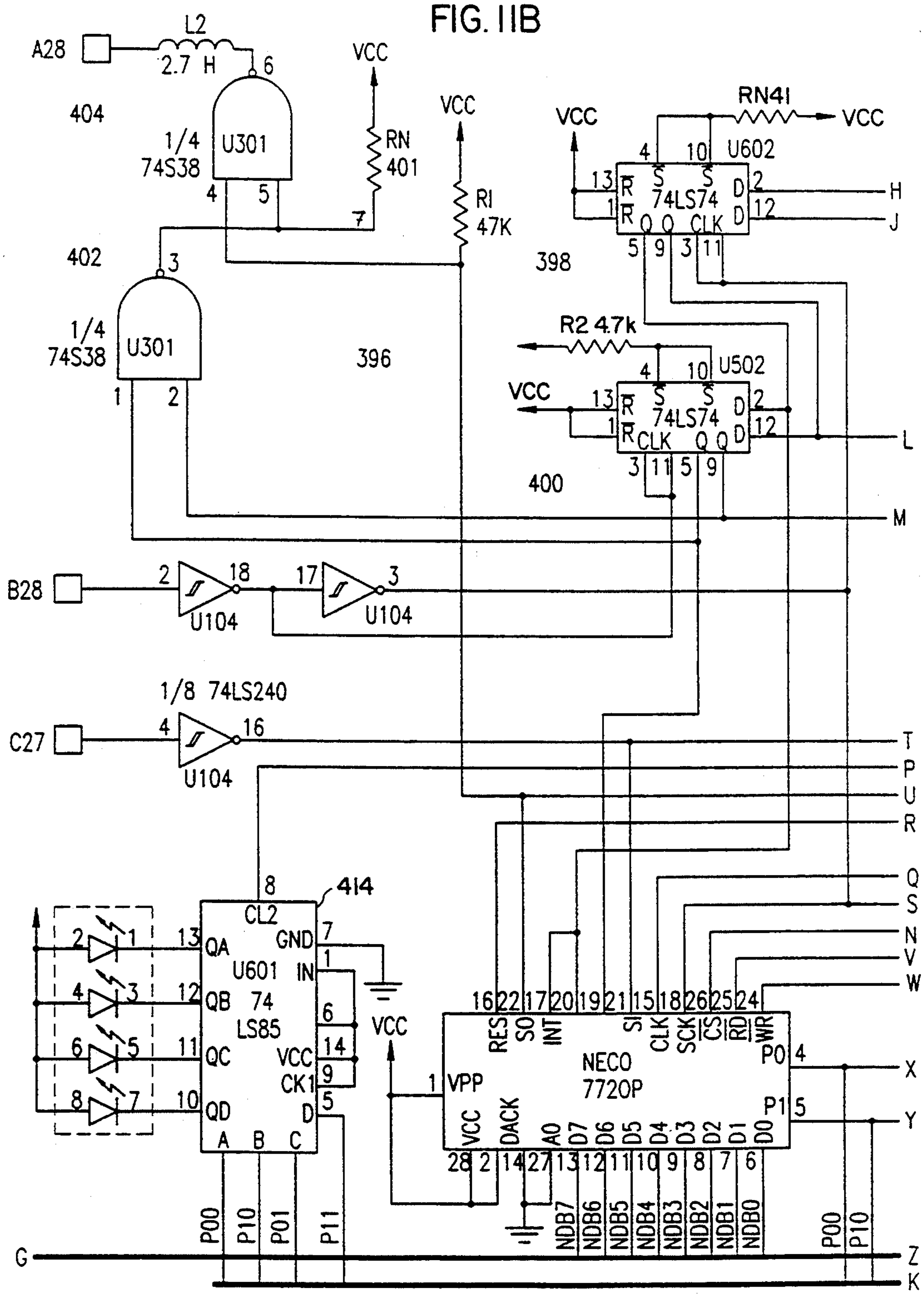
Figure 11C:
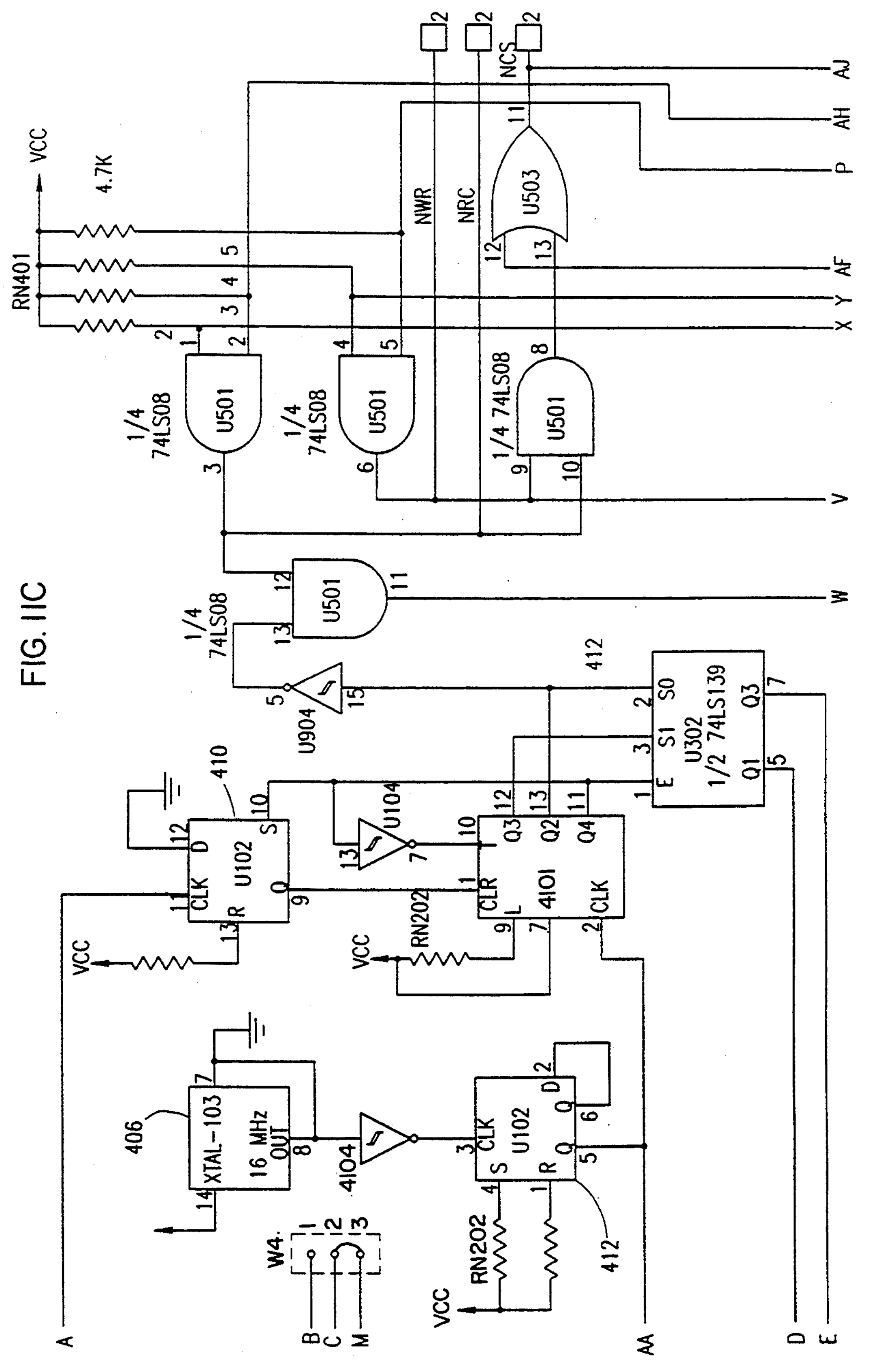
Figure 11D:
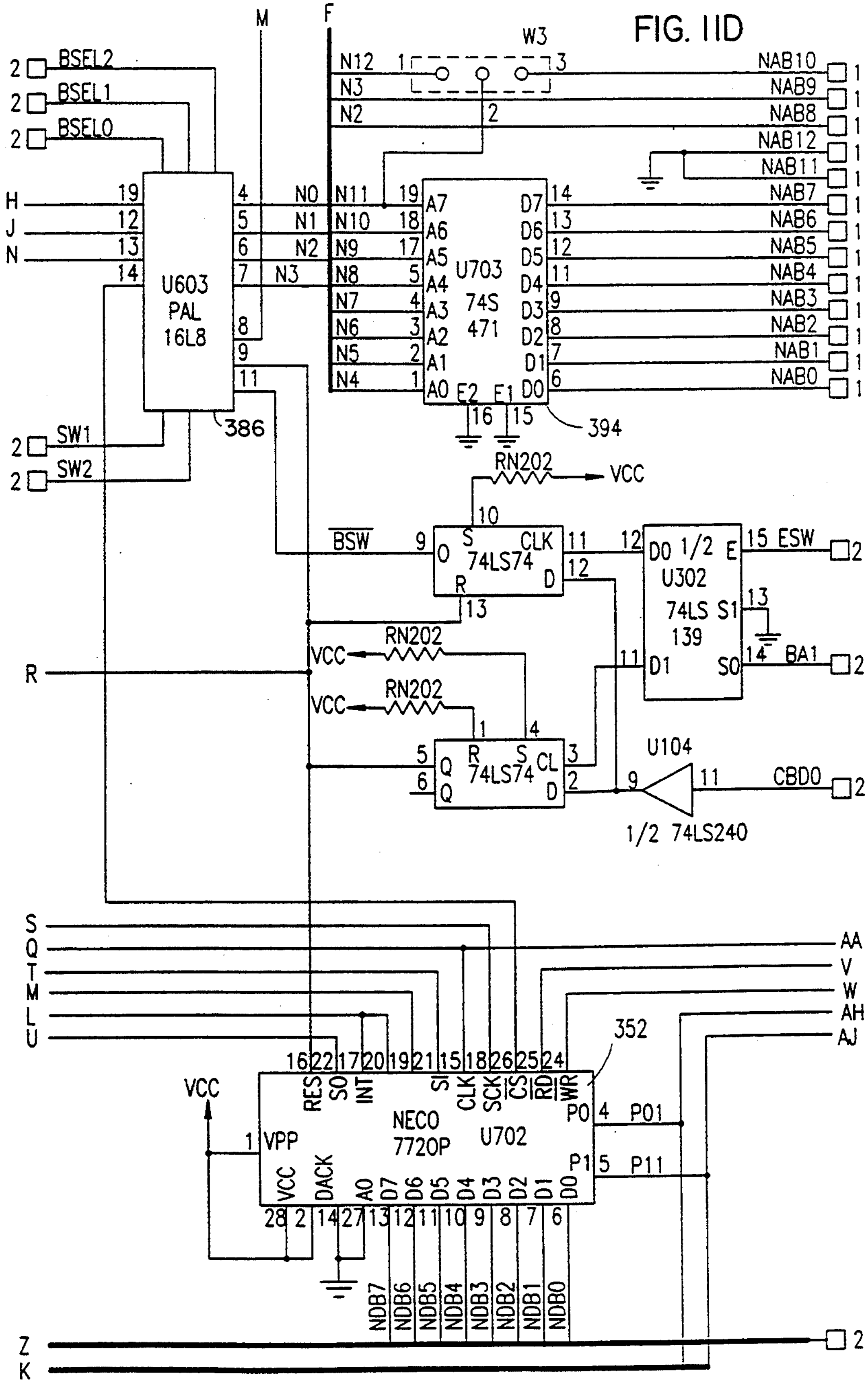
Figure 12A:
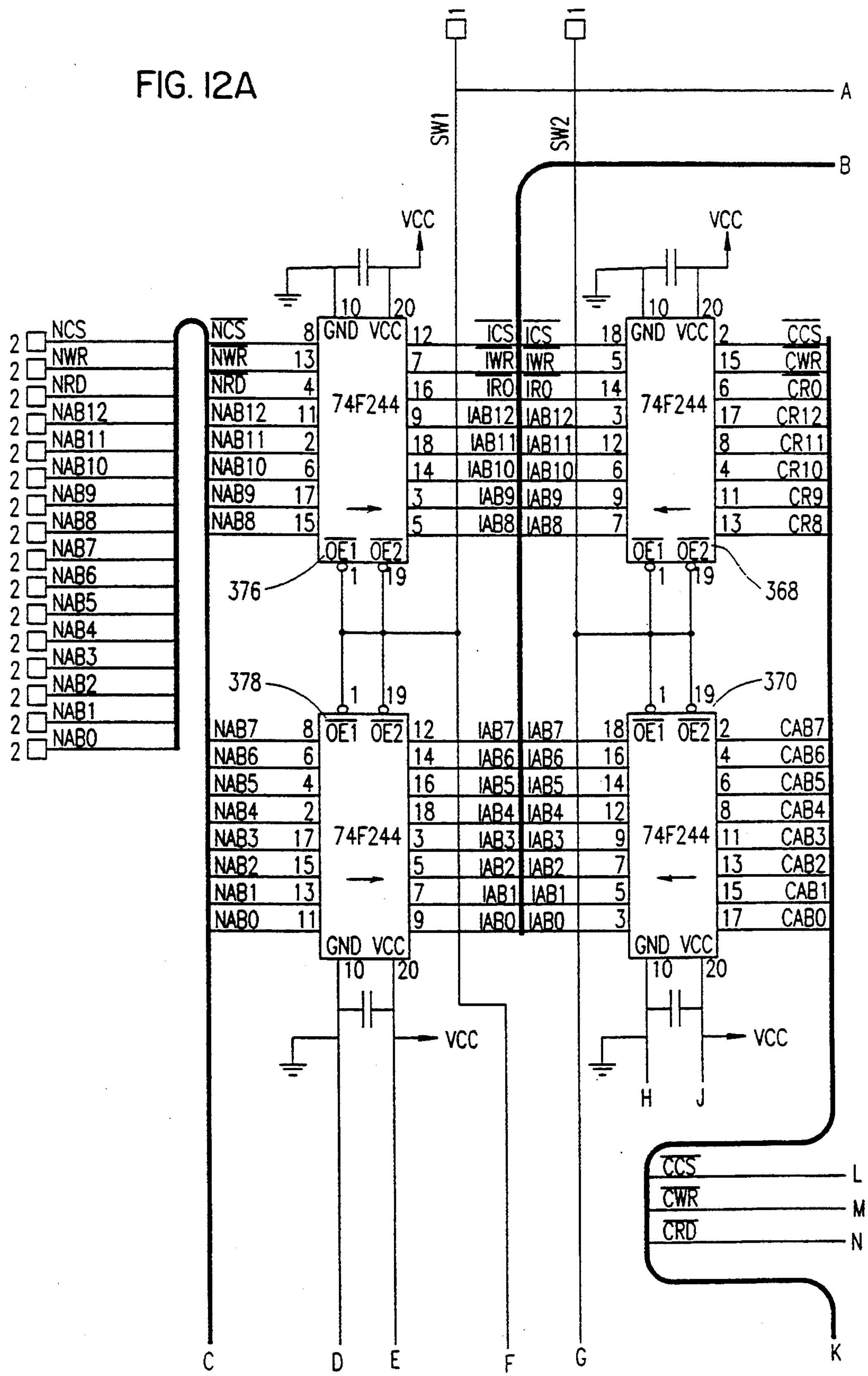
Figure 12B:
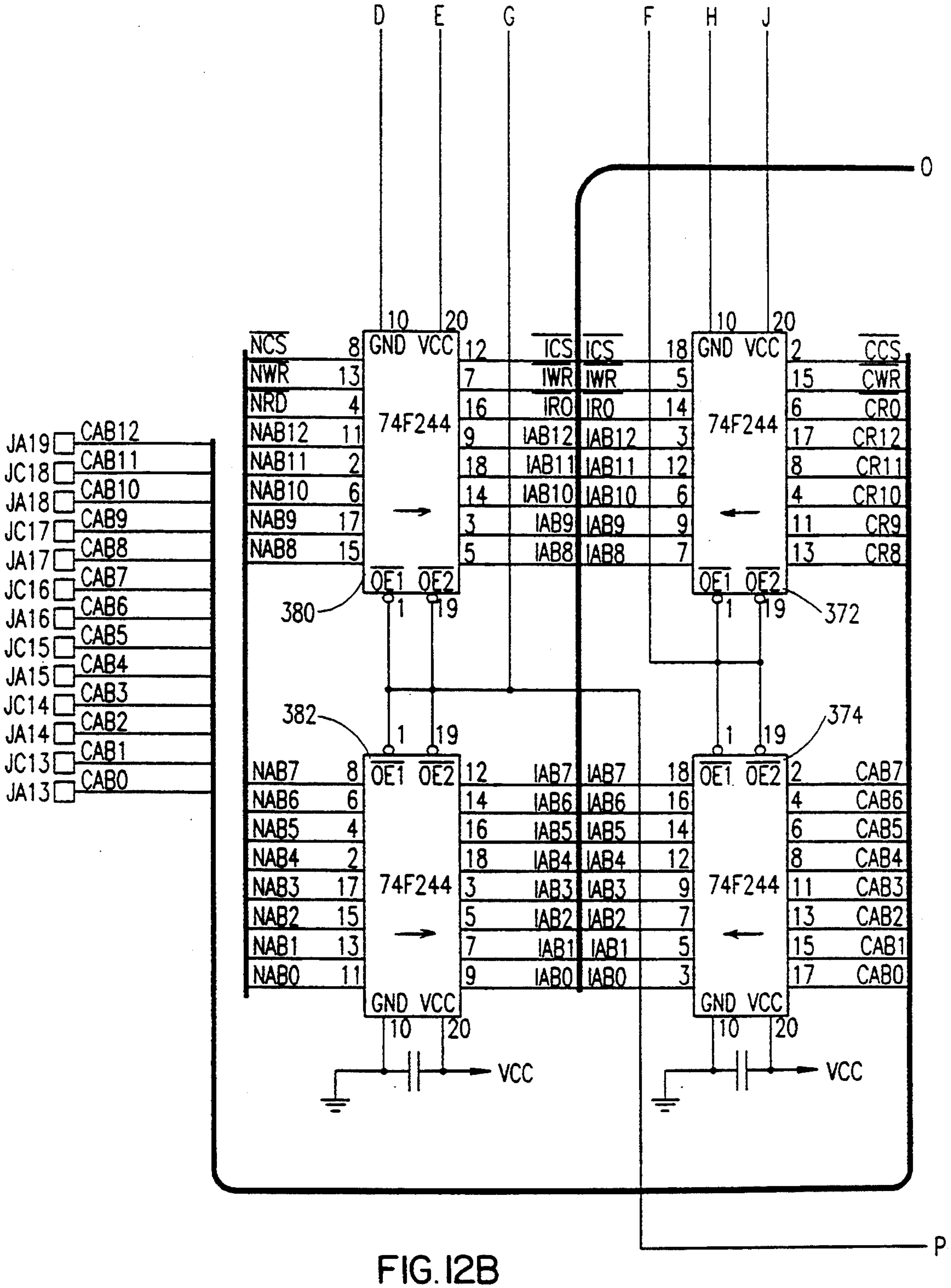
Figure 12C:
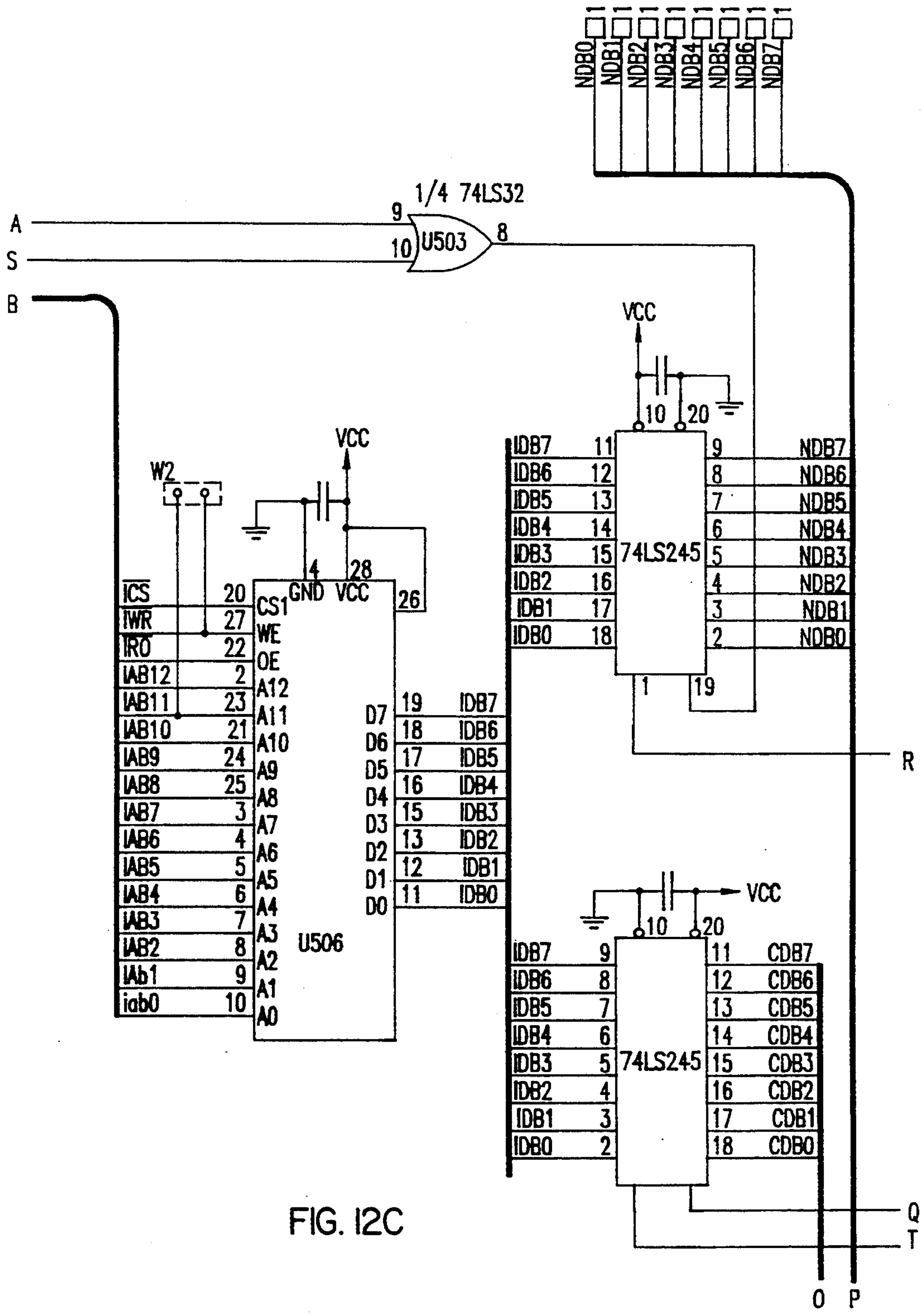
Figure 12D:
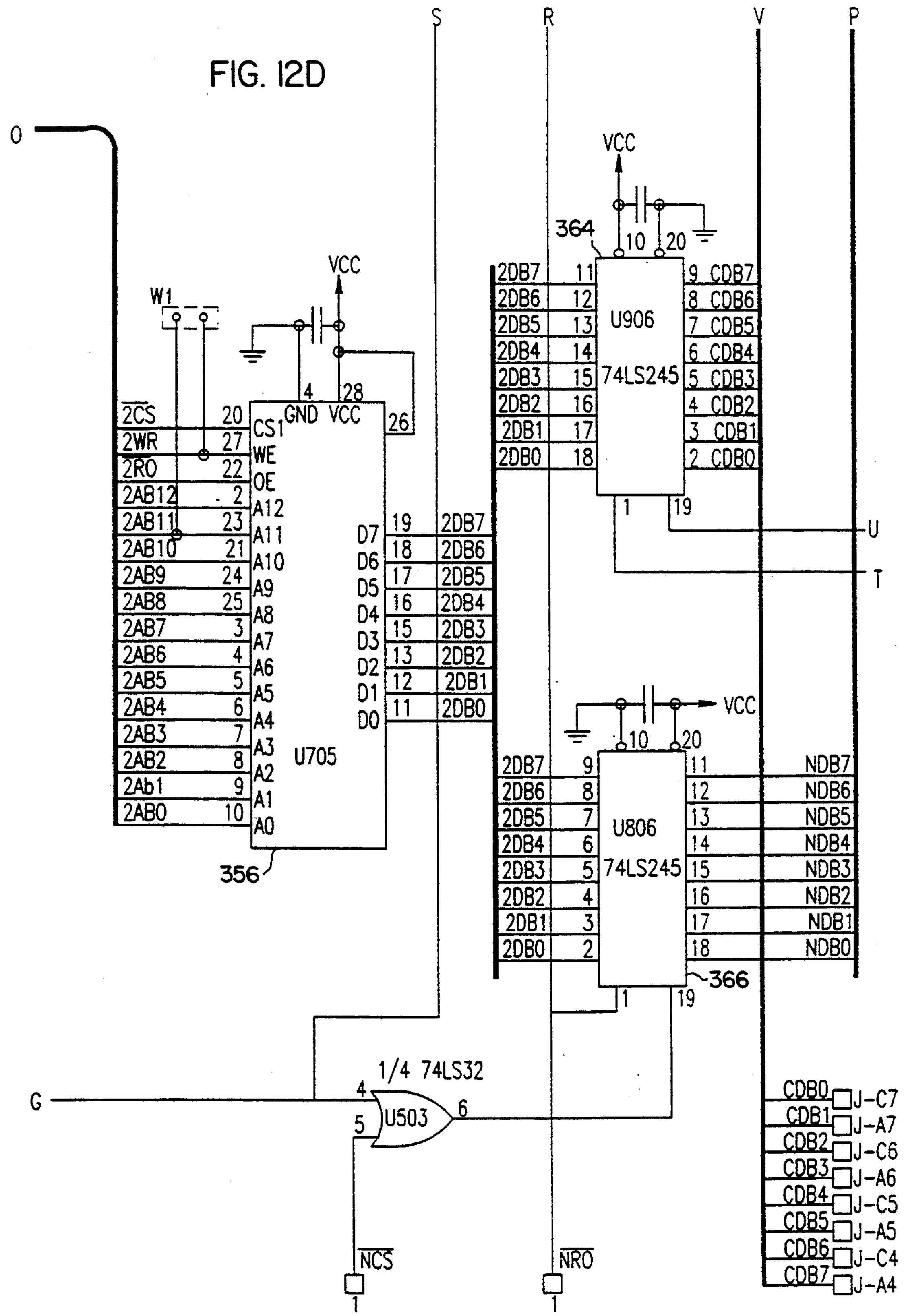
Figure 12E:
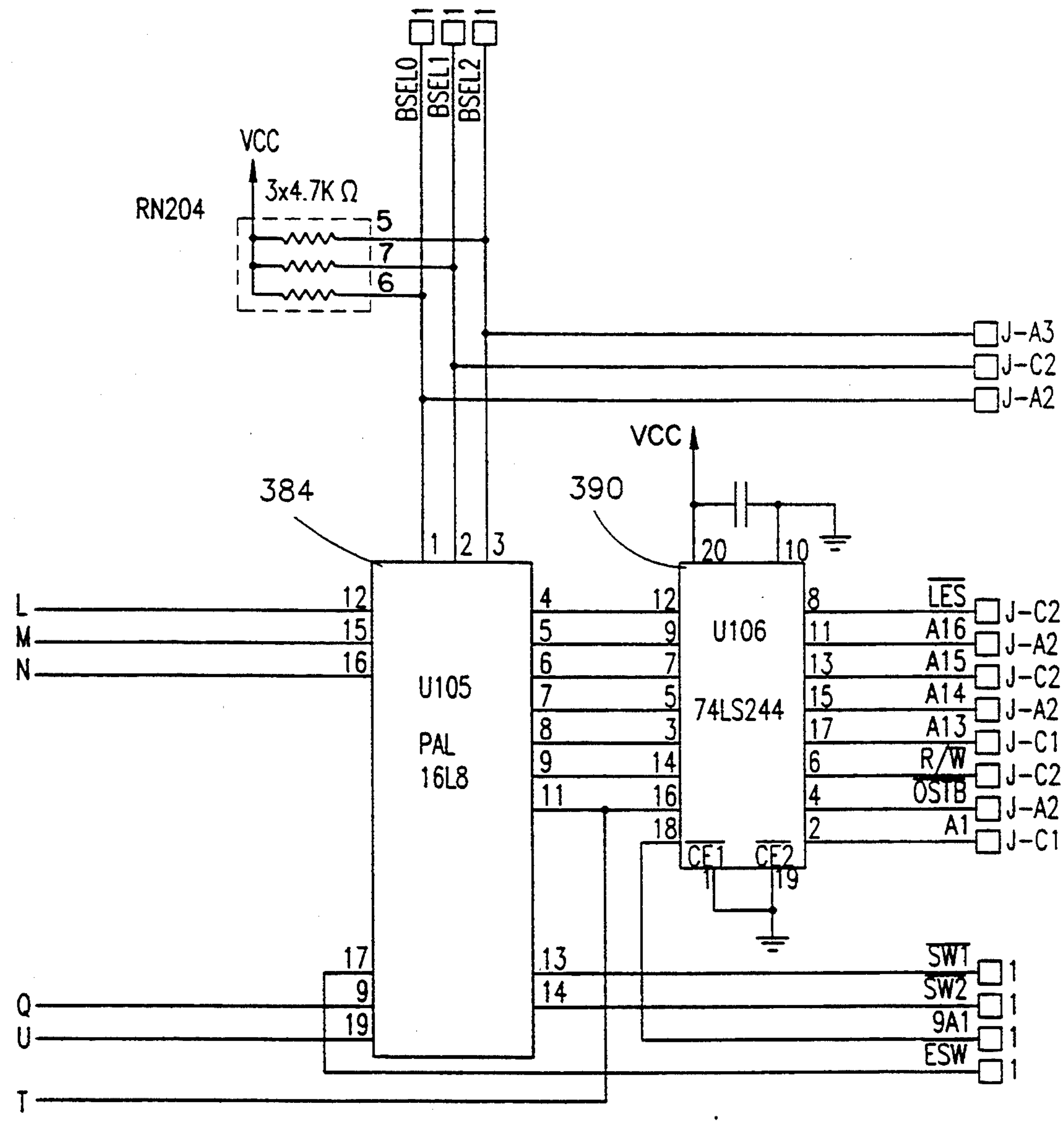
Figure 13A:
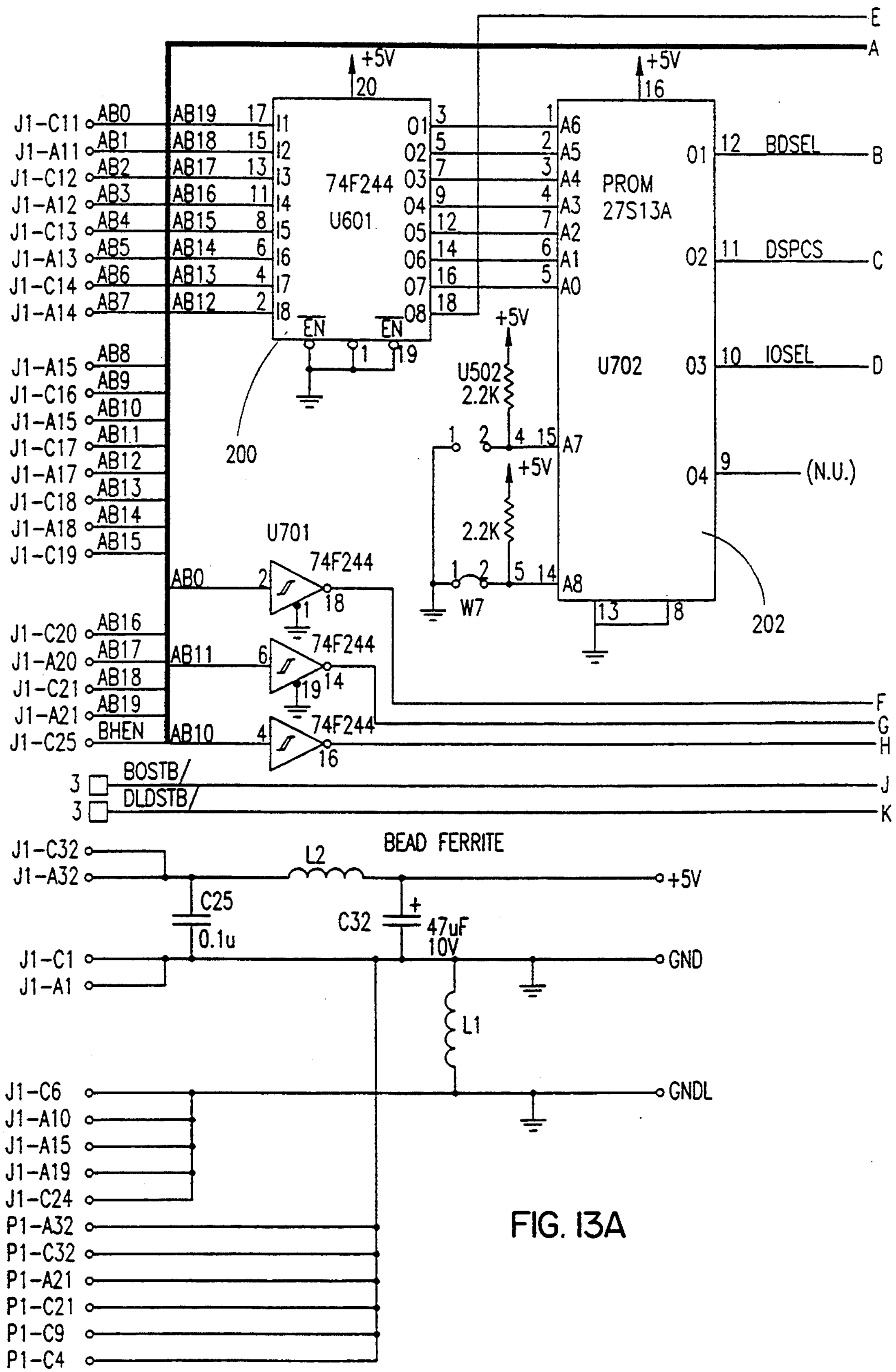
FIGS. 13A and 13B, 14A–14C, 15A and 15B, and 16A–16C collectively define a schematic illustration of a preferred embodiment of the MTU circuitry illustrated in FIGS. 9A and 9B.
Figure 13B:
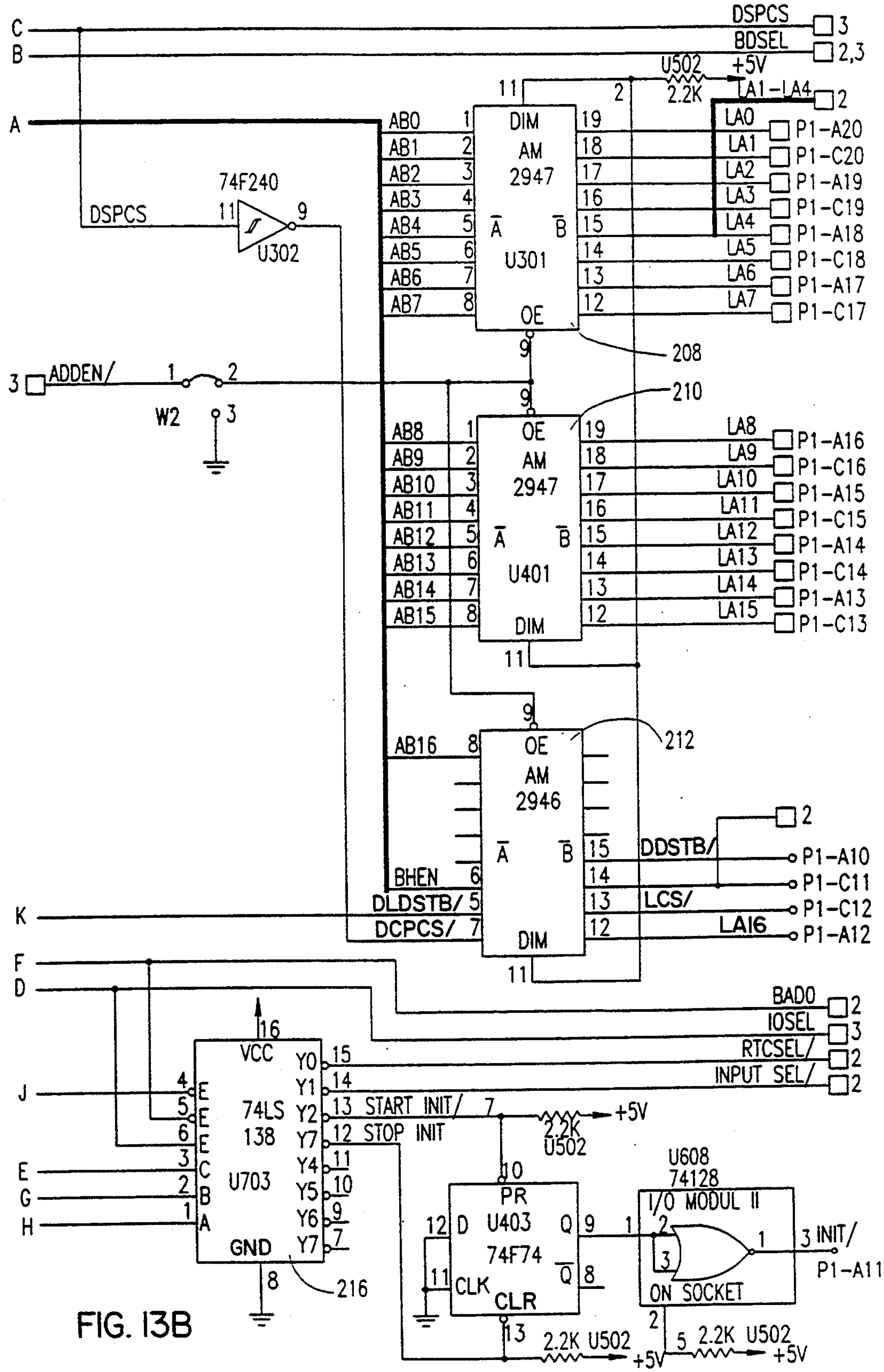
Figure 14A:
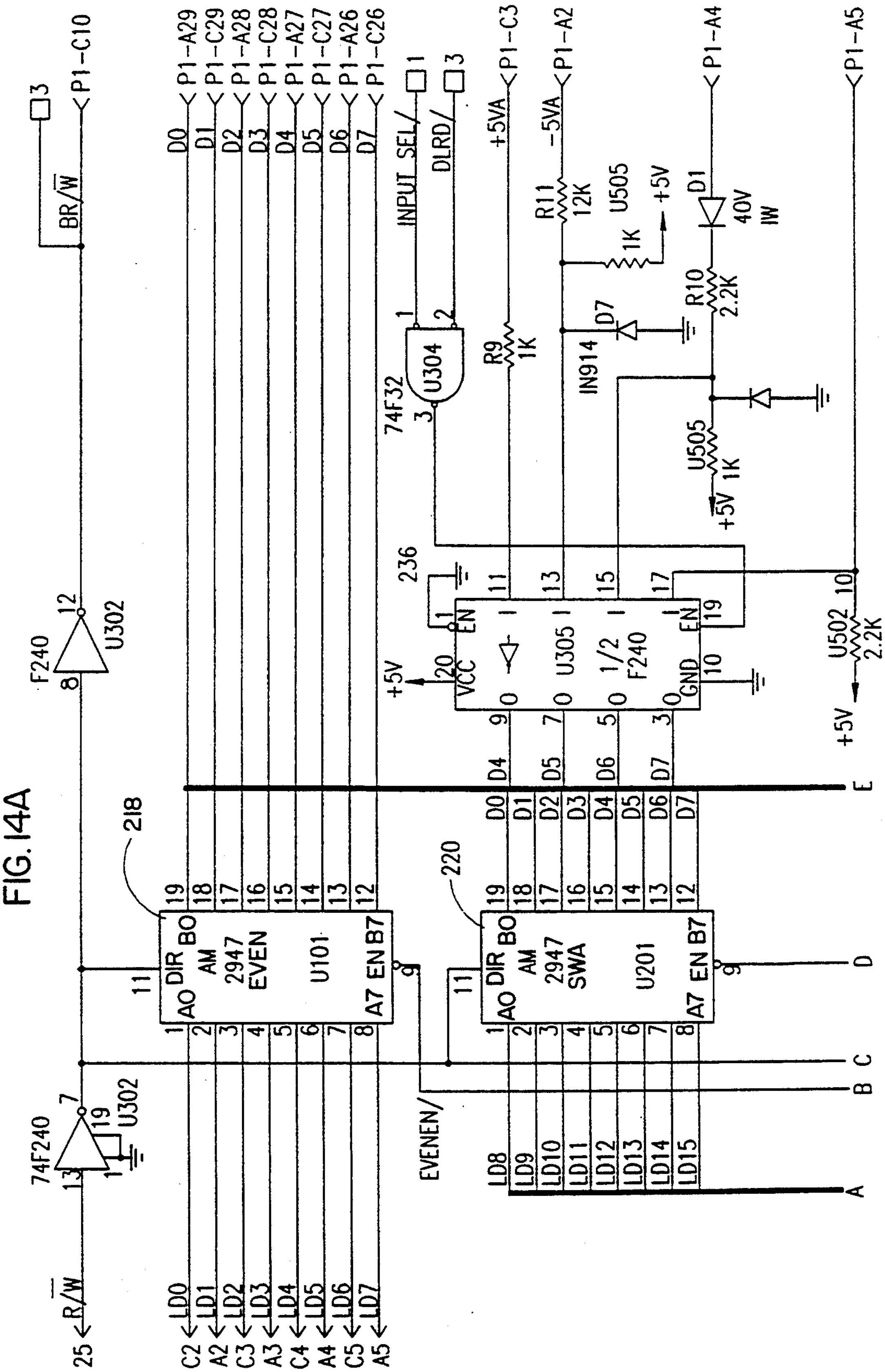
Figure 14B:
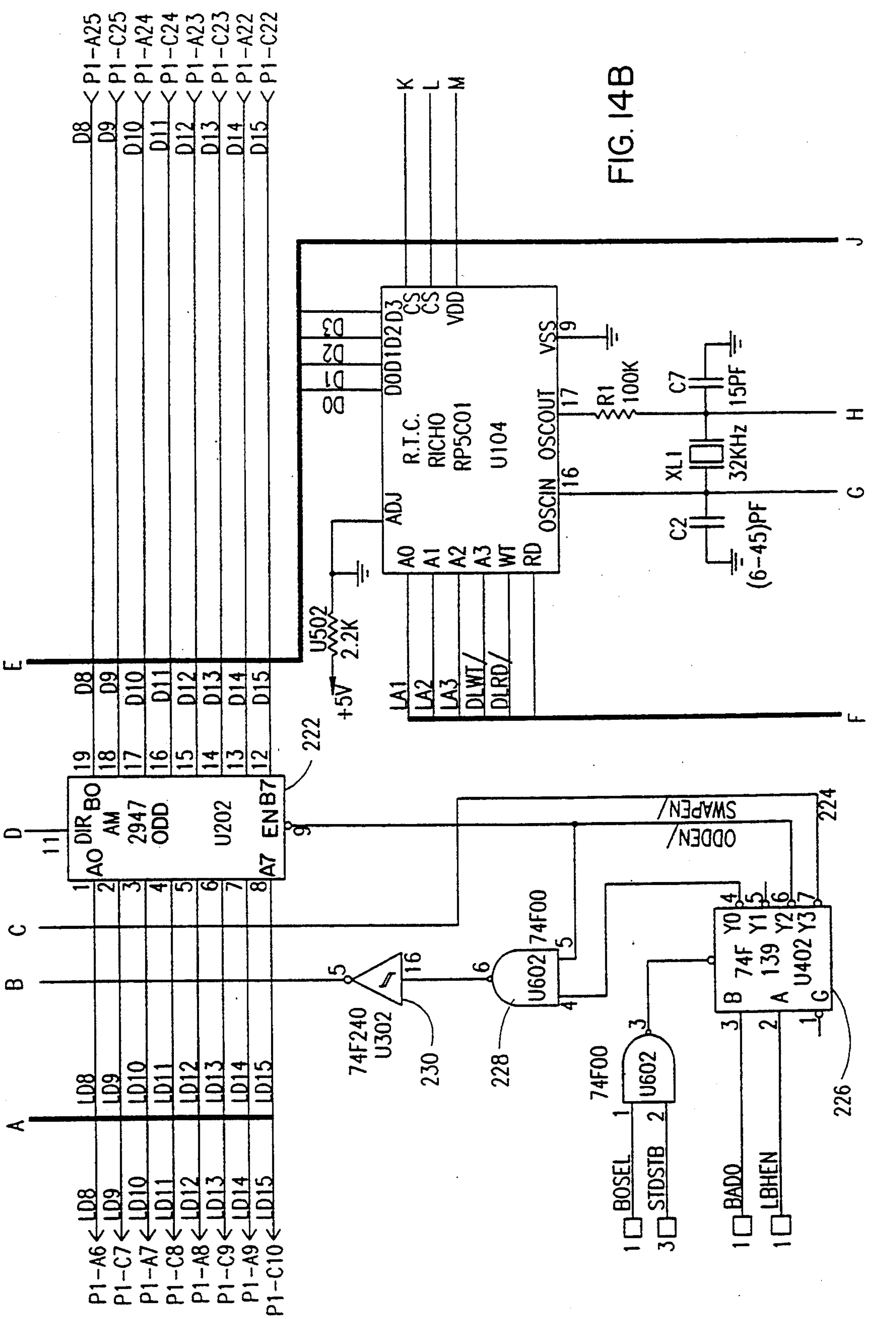
Figure 14C:
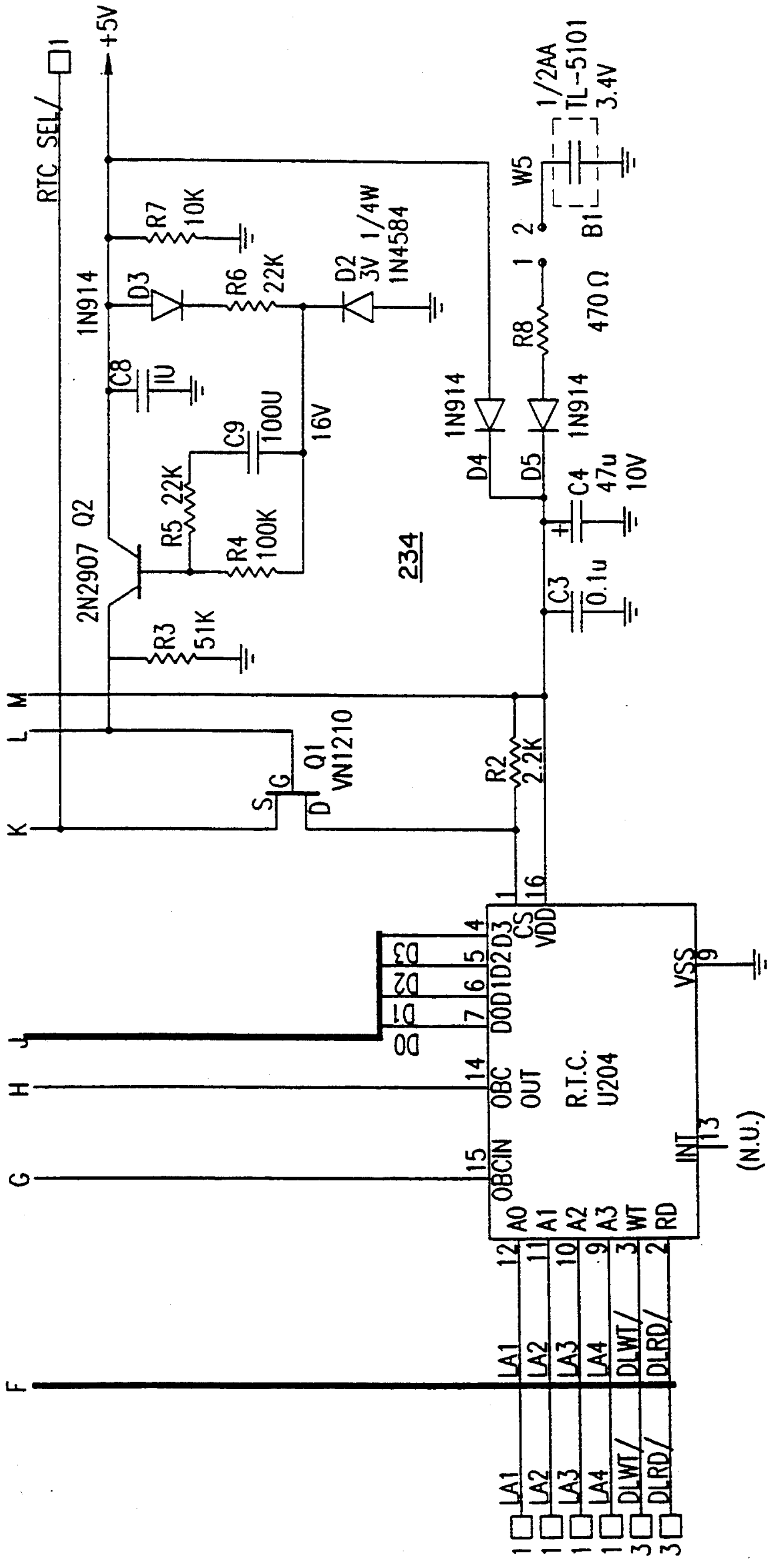
Figure 15A:
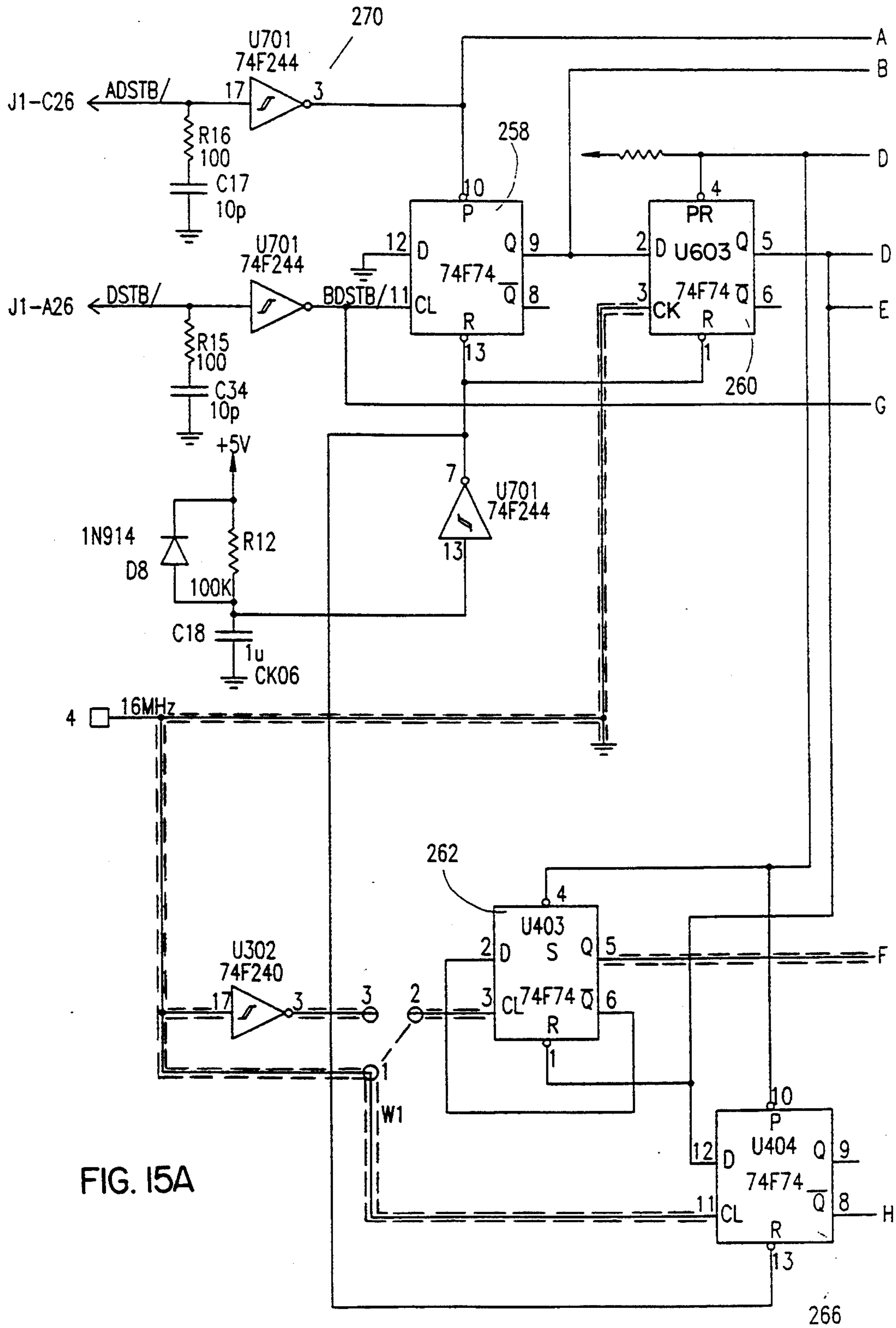
Figure 15B:
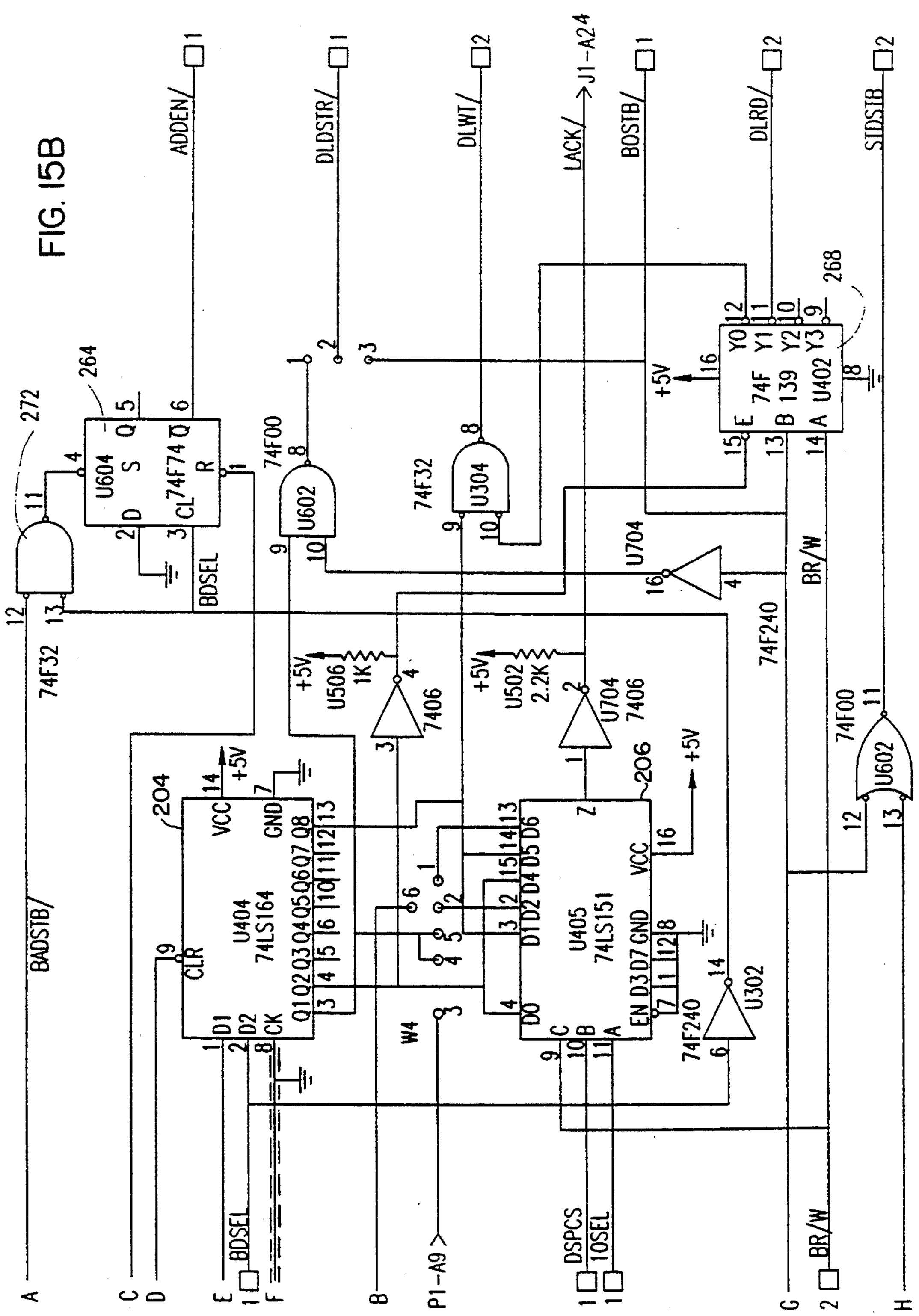
Figure 16A:
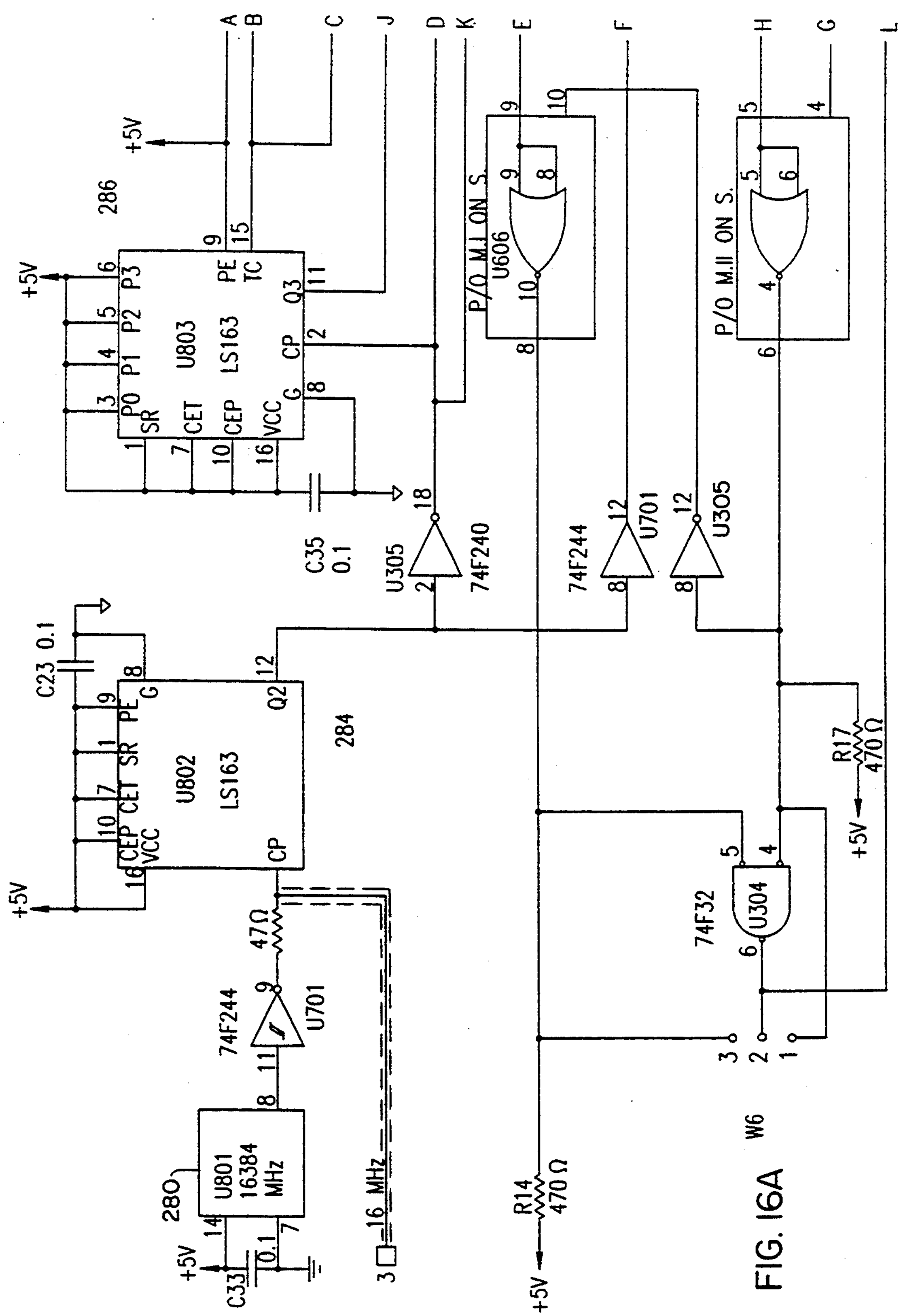
Figure 16B:
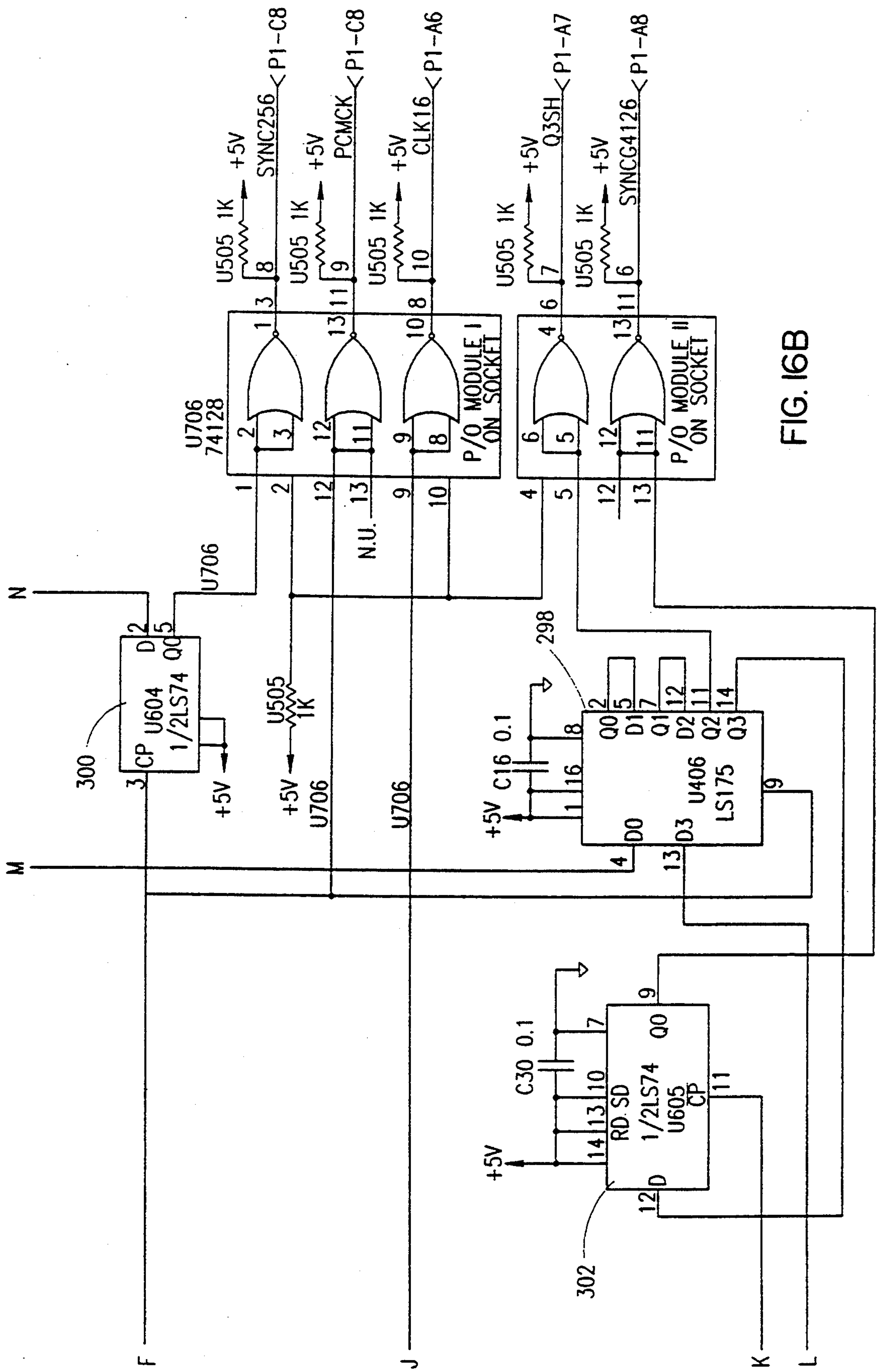
Figure 16C:
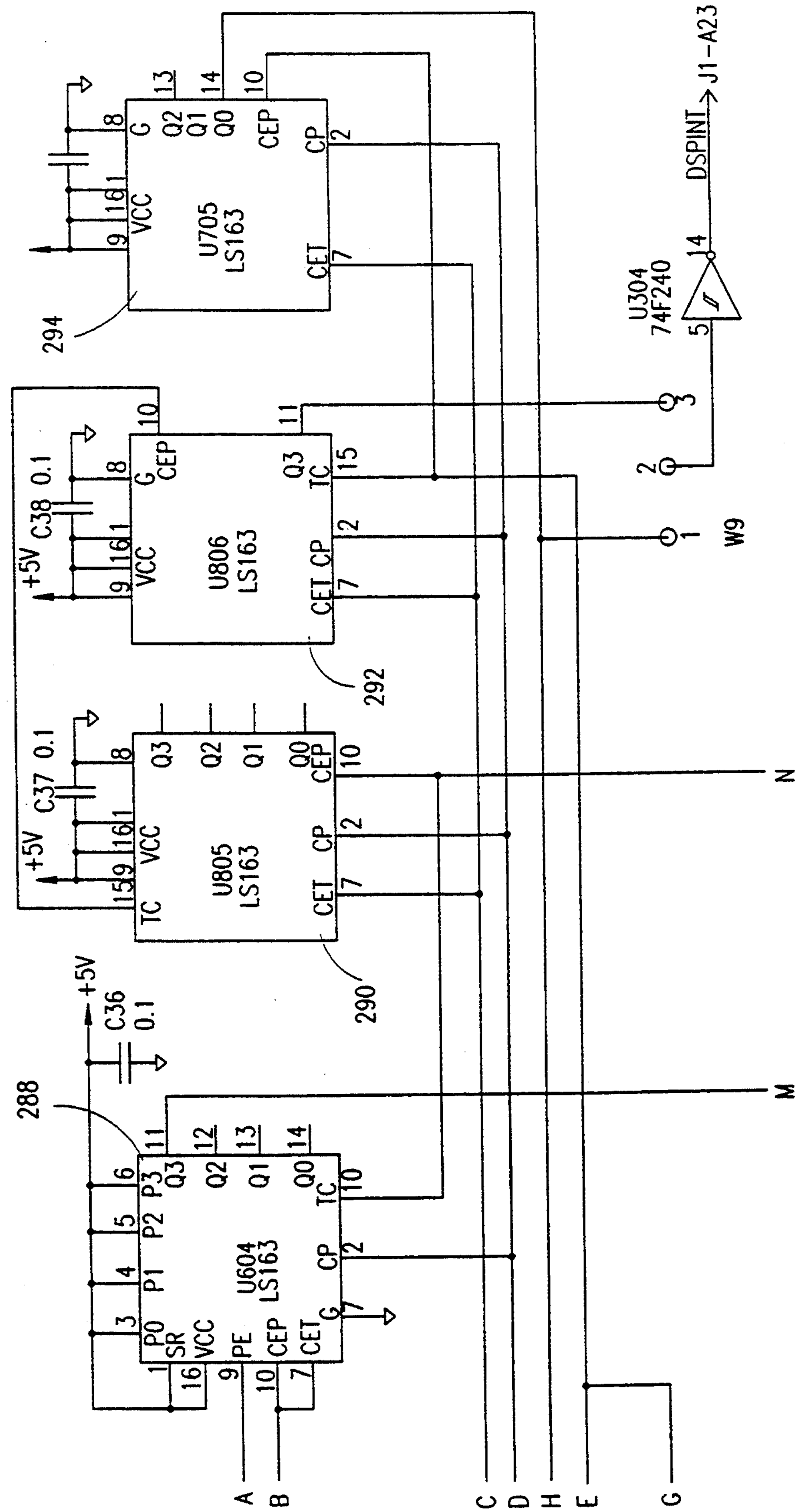

Reference is now made to FIGS. 9A and 9B, which are block diagram illustrations of MTU circuitry forming part of the line subsystem shown in FIG. 6. Reference is also made to FIGS. 13A–16C which are schematic illustrations of the circuitry of FIGS. 9A and 9B. The general function of the MTU circuitry is to provide an interface between the LBX bus 32 and the sub-LBX parallel bus 54 enabling a LCU 70 (FIG. 7) to access the SPU circuits 58 (FIG. 6). In addition the MTU circuitry generates the necessary timing signals for providing control of the operation of the TIU circuits 60.

Address bus signals AB0–AB19, received along the LBX bus, are processed in the following manner: Signals AB0, AB10—AB19 are fed to a line receiver 200 which shapes the signals and outputs to an address decoder 202, which generates timing signals BDSEL, DSPCS and IOSEL. Timing signal IOSEL is employed to gate the access of the LCU 70 to the MTU circuitry 50. Timing signal DSPCS is employed to gate the access of the LCU 70 to the SPU circuits 58. Timing signal BDSEL is employed to gate timing generation circuitry 204 and 206. Address decoder 202 is typically embodied in a PROM having a firmware program which is attached hereto as Software Annex J.

Address signals AB0–AB16 supplied from LBX bus 32 ape supplied to line drivers 208, 210 and 212 which define a three state buffer 214, which outputs buffered signals LA0–LA 16 to the sub LBX parallel bus 54.

Buffered address signals BAD0, BAD10 and BAD11 from line receiver 200 and timing signal IOSEL are supplied to an address decoder 216, which provides chip selection and initialization logic functions.

Data signals LD0–LD15 From LBX bus 32 are coupled to transceivers 218, 220 and 222, which are collectively indicated on FIG. 9 by reference numeral 217. The transceivers, which operate in both directions, shape and buffer the signals, and are are also coupled to subLBX data signals D0–D15. Data transceiver 220 is employed to provide a swapping operation for a double 8 bit transfer by a 16 bit bus. The operations of transceivers 218, 220 and 222 are controlled by timing signals EVENEN/, SWAPEN/and ODDEN/, generated by timing circuitry 224.

The operation of timing circuitry 224 is described hereinbelow: Timing signals BDSEL, STDSTB, LBHEN and BADO are fed to timing circuitry 224, an address decoder 226 and logic gates 228 and 230.

A real time clock 232 supplies real time information (time and date) to the LCU 70, which accesses clock 232 using timing and address signals LA1–LA4, DLWT/, DLRD/ and data bus signals D0–D3. The clock 232 receives electrical power from a power supply back up circuitry 234.

Status input circuitry 236 provides conversion of analog signals from the subLBX bus to digital signals that can be read by the LCU 70 and includes a line receiver 238.

Wait state generator and delay circuitry 240 includes shift register 204 and 206 flip flops 258, 260, 262, 264 and 266 and a decoder 268. Gating signals ADSTB/ and DSTB are buffered by a line receiver 270 which outputs a buffered signal BDSTB to flip flop 266 and a buffered signal BADSTB/ to flip flop 264 via a gate 272.

A clock signal CLK8 HZ together with gating signals BLSEL, DSPCS and IOSEL are supplied to shift registers 204 and 206 which output timing signals DLDSTB, DLWT/, LACK/. These timing signals are delayed versions of the corresponding inputs to the shift registers 204 and 206 and are used to gate inputouput operations of the rest of the circuitry.

The MTU circuitry 50 also includes timing circuitry For the the TIU and SPU circuitry 58 and 60 respectively. This timing circuitry comprises an oscillator 280, which outputs a 16 MHZ clock signal to divider circuitry 282, which includes counters 284, 286, 288, 290, 292 and 294. Outputs of these counters are supplied to timing logic circuitry 296, which comprises a shift register 298 and flip flops 300 and 302. Outputs from timing logic circuitry 296 and divider circuitry 282 are supplied to line driver circuitry 304 which outputs the following timing signals to the subLBX bus 54: SYNC256, PCNCK, CLK16, Q3SH and SINC64.

Reference is now made to FIGS. 10A–10D, which are block diagram illustration of SPU circuitry forming part of the line subsystem shown in FIG. 6. Reference is also made to FIGS. 11A–12E and 12 which are schematic illustrations of the circuitry of FIG. 10. The general functions of the SPU circuitry will now be set forth:

A. Conversion of a 64 kbs PCM signal from the TIU circuitry 60 into 32 kbs ADPCM data and vice versa.

B. Detection of ring signals in cooperation with the TIU circuitry 60.

C. Detection of pulse dialing signals and, in cooperation with the TIU, detection of the DTMF dialing signals.

D. Detection of signaling tones in cooperation with the TIU circuitry 60.

E. Voice energy calculation for automatic gain control and pause compression.

F. Control of output gain via the TIU circuitry 60.

The SPU circuitry of FIGS. 10A–10D comprises interface circuitry indicated generally by reference numerals 350 and 351 in addition to digital signal processing devices 352 and 354. Interface circuitry 350 provides switch bank based communication between devices 352 and 354 on the one hand and LCU 70 on the other hand via subLBX bus 54. A preferred software object listing for the EPROMs of devices 352 and 354 when they are embodied in an NEC 7720 digital signal processor is attached hereto as Software Annex K.

The circuitry of FIGS. 10A–10D may also be adapted to provide fax modem functions.

The operation of the switch bank based communication will now be described: At any given moment, the LCU 70 can access RAM banks A or B, respectively indicated by reference numerals 356 and 358 via six of twelve 3-state transceivers 360, 362, 364 and 366 and 3-state buffers 368, 370, 372, 374, 376, 378, 380 and 382. 3-state buffers 368, 370, 372 and 374 are used to switch the address signals CAB0–CAB12 from the subLBX bus 54 and control signals CCS, SWR and CRD from a decoder 384 to the RAM banks A and B, while 3-state buffers 376, 378, 380 and 382 are used to switch the address signals NAB0–NAB12 from address translation circuitry 394 and control signals NCS, SWR and NED from parallel read-write logic circuitry 388 to RAM banks A and B.

Three-state transceivers 360, 362, 364 and 366 are used to switch data signals CDB0–CDB7 from subLBX bus 54 and NDB0– NDB7 from devices 352 and 354 to the RAM banks A and B.

The switching operation is controlled by timing signals SW1 and SW2 from decoder 384. A line receiver 390 shapes control signals A1, DSTB, R/W, A13–16, and LES from the subLBX bus 54. Line receiver 390 outputs corresponding buffered signals to decoder 384, which in turn, outputs control signals SW1, SW2 and ESW which are directed to the remainder of the SPU circuitry. Decoder 384 is typically embodied in a PAL 16L8 chip having firmware, whose listing is attached hereto as Software Annex L.

Sync counters 392 and address translation circuitry 394 ape employed to generate address signals NAB-0–NAB12. Address translation circuitry is typically embodied in a PROM 74S471 having firmware, whose listing is attached hereto as Software Annex M.

Timing circuitry 396, which comprises flip flops 398 and 400 and logic gates 402 and 404, together with decoder 386 generate timing signals used to read the serial PCM information into the devices 352 and 354. Decoder 386 is typically embodied in a PAL 16L8 chip having firmware, whose listing is attached hereto as Software Annex N.

Figure 17:
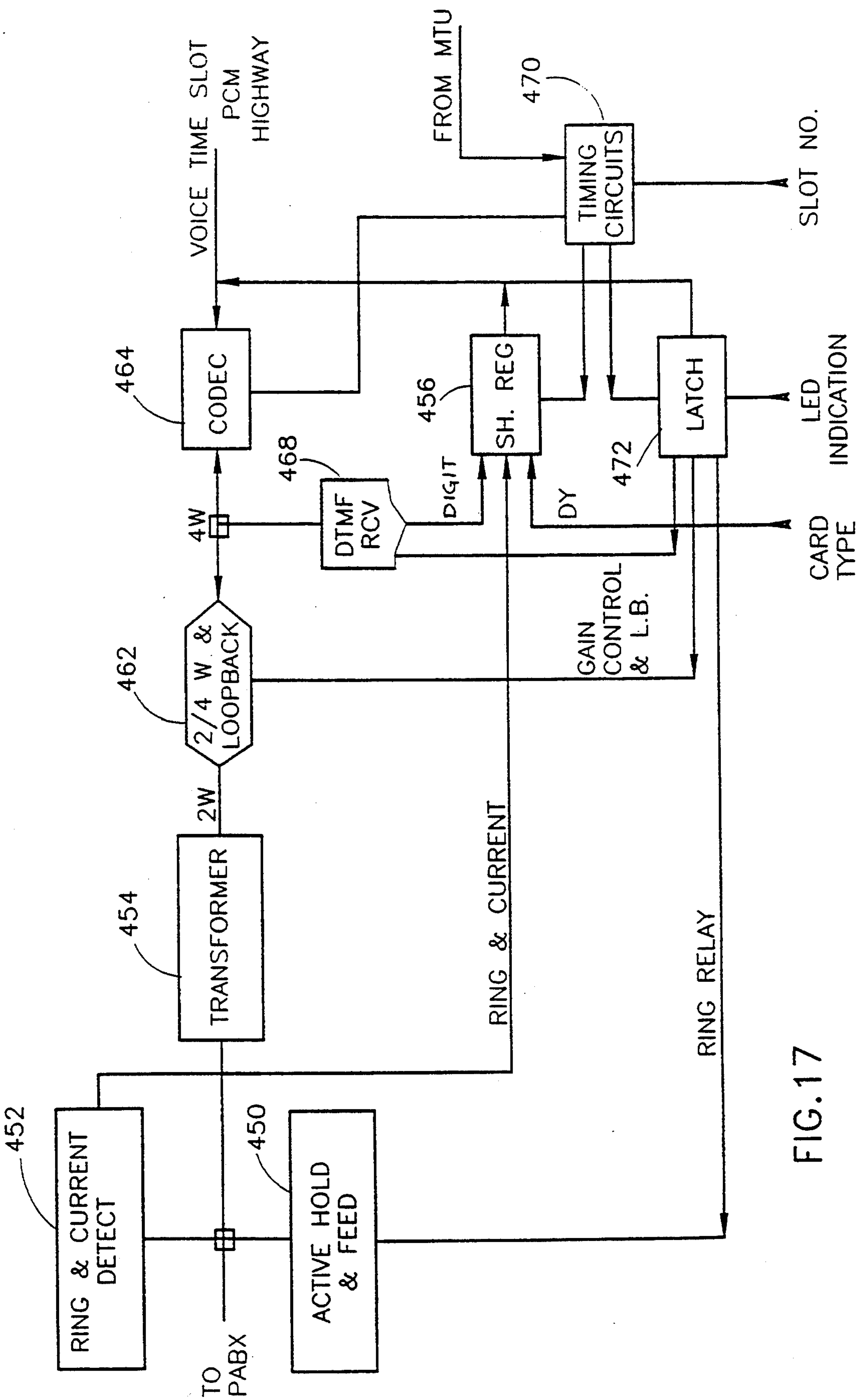
FIG. 17 is a block diagram illustration of TIU circuitry employed in the apparatus of FIG. 6.

Reference is now made to FIG. 17 which is a block diagram illustration of the TIU circuitry and to FIGS. 18A–21D which together are a schematic illustration of this circuitry. The general function of the TIU circuitry is to interface the store and forward system of the present invention to subscriber telephone lines. The TIU circuitry converts the analog signals on the subscriber telephone lines to digital form suitable fop further processing by the SPU circuits 58. Additionally the TIU circuitry controls the conventional telephone operations such as OFF HOOK/ON HOOK.

A subscriber telephone line is connected to an active hold and feed circuit 450, to ring and current detect circuit 452 and to a transformer 454. When the subscriber calls the apparatus 1, ring detect circuit 452 converts the ringing signal into a logic level which is transferred to parallel to serial conversion circuits 456. These circuits transmit the converted signal through PCM highway 56 (FIG. 6) to the SPU circuits for further processing.

When the apparatus 1 answers the subscriber's call, it provides an OFF HOOK operation in the following manner:

A relay 458 is switched on closing a current loop through the subscriber line and active hold circuitry 460. Ring and current detect circuitry 452 detects the current flow through the loop and supplies a digital indication to the parallel to serial converter 456, which, in turn, transmits data through the PCM highway 56 to the SPU circuitry 58.

Any audio signal coming from the telephone subscriber line is fed to transformer 454 which provides DC isolation of 2/4 wire conversion circuitry 462 from the subscriber telephone line, while permitting passage of the audio AC signals therethrough. The 2/4 wire conversion circuitry 462 routes the incoming audio signal to a programmable gain amplifier 463 which amplifies the signal according to a digital code supplied by control latches 472. The amplified signal is fed to an analog to digital converter (codec) 464, which converts the analog signal into a PCM equivalent waveform.

This waveform is transmitted along PCM highway 56 to the SPU circuitry 58 for compression and further processing. The apparatus 1 outputs audio signals to the subscriber line using the following method:

PCM coded audio signals are transferred From the SPU circuitry through the PCM highway 56 to coded 464 which converts the signal to an analog waveform. This waveform is routed by the 2/4 wire conversion circuitry 462 and through the transformer 454 to the subscriber line.

The audio from the transformer 454 is also fed to the DTMF receiver 468. This receiver detects DTMF dialing tones and converts them into 4 bit digital data. This data is coupled onto the PCM highway 56 and transmitted to the SPU circuitry 58 for further processing.

Figure 18A:
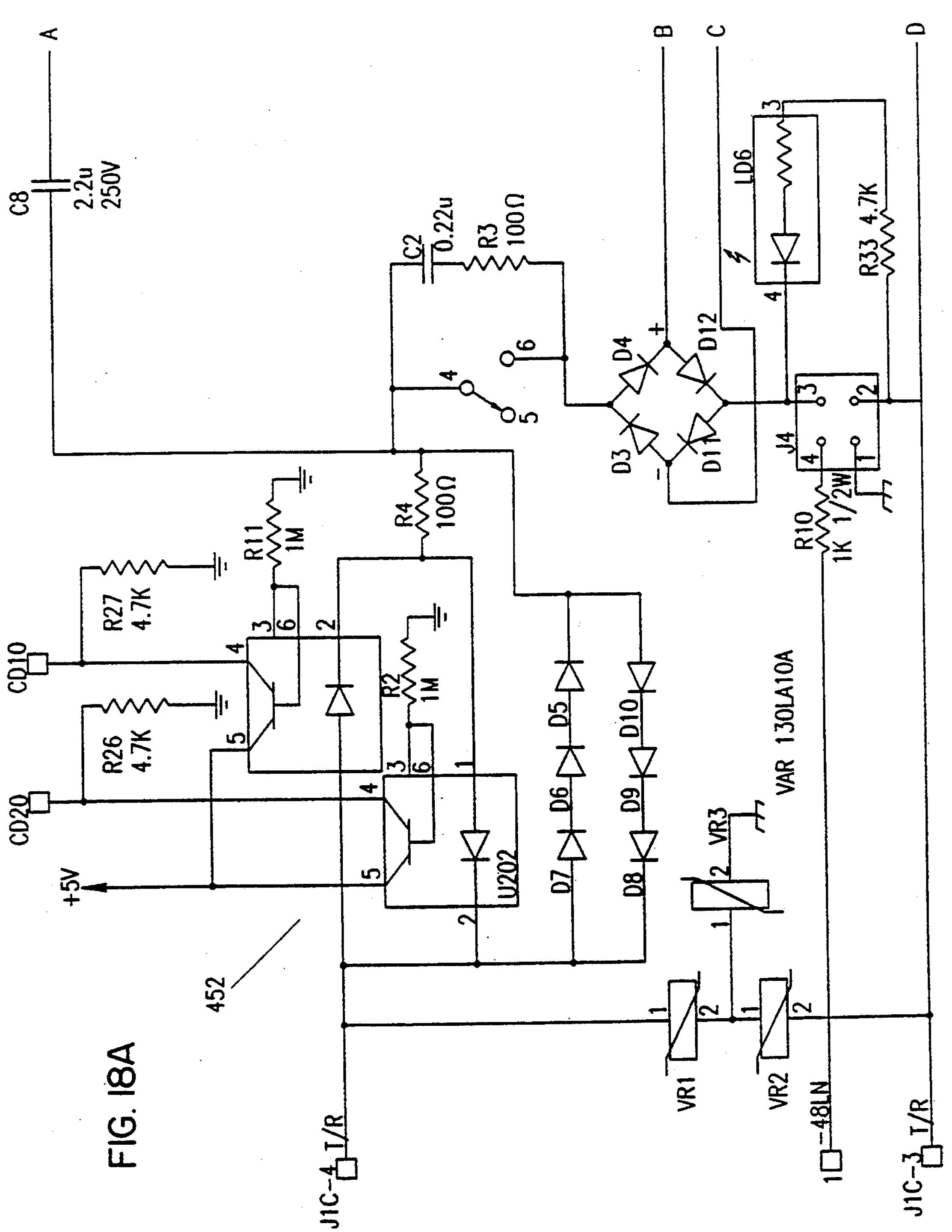
Figure 18B:
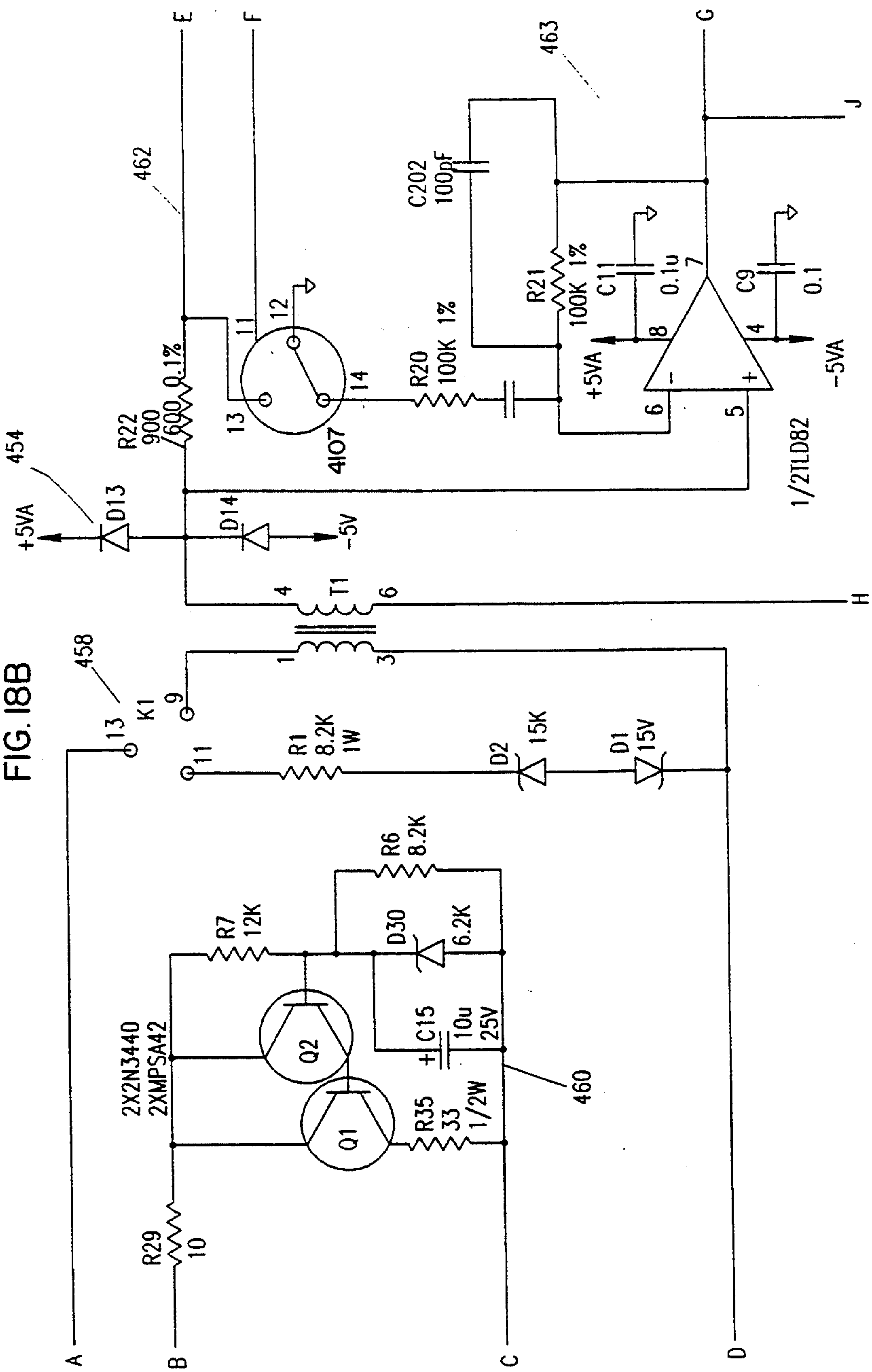
Figure 18C:
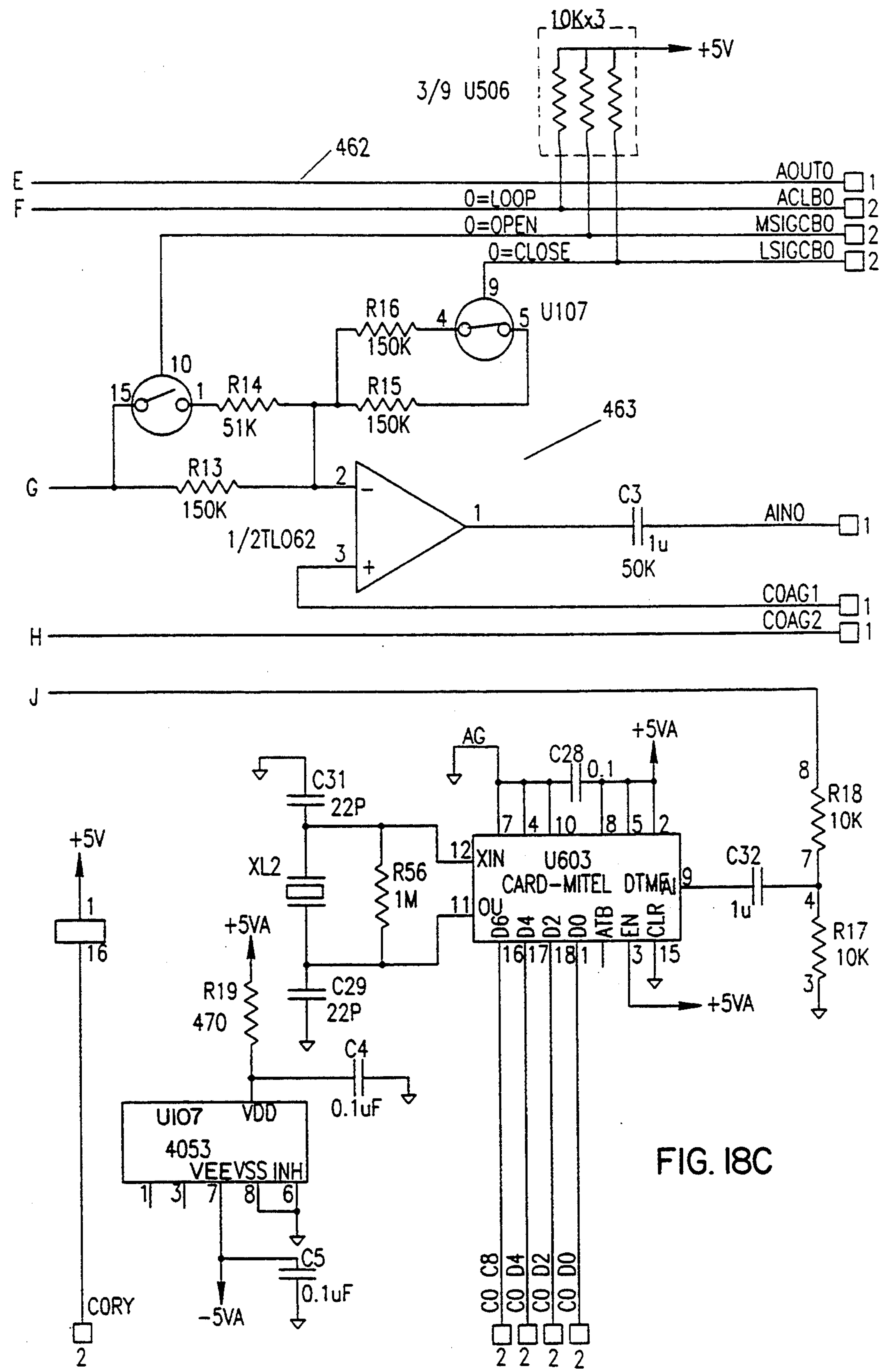
Figure 19A:
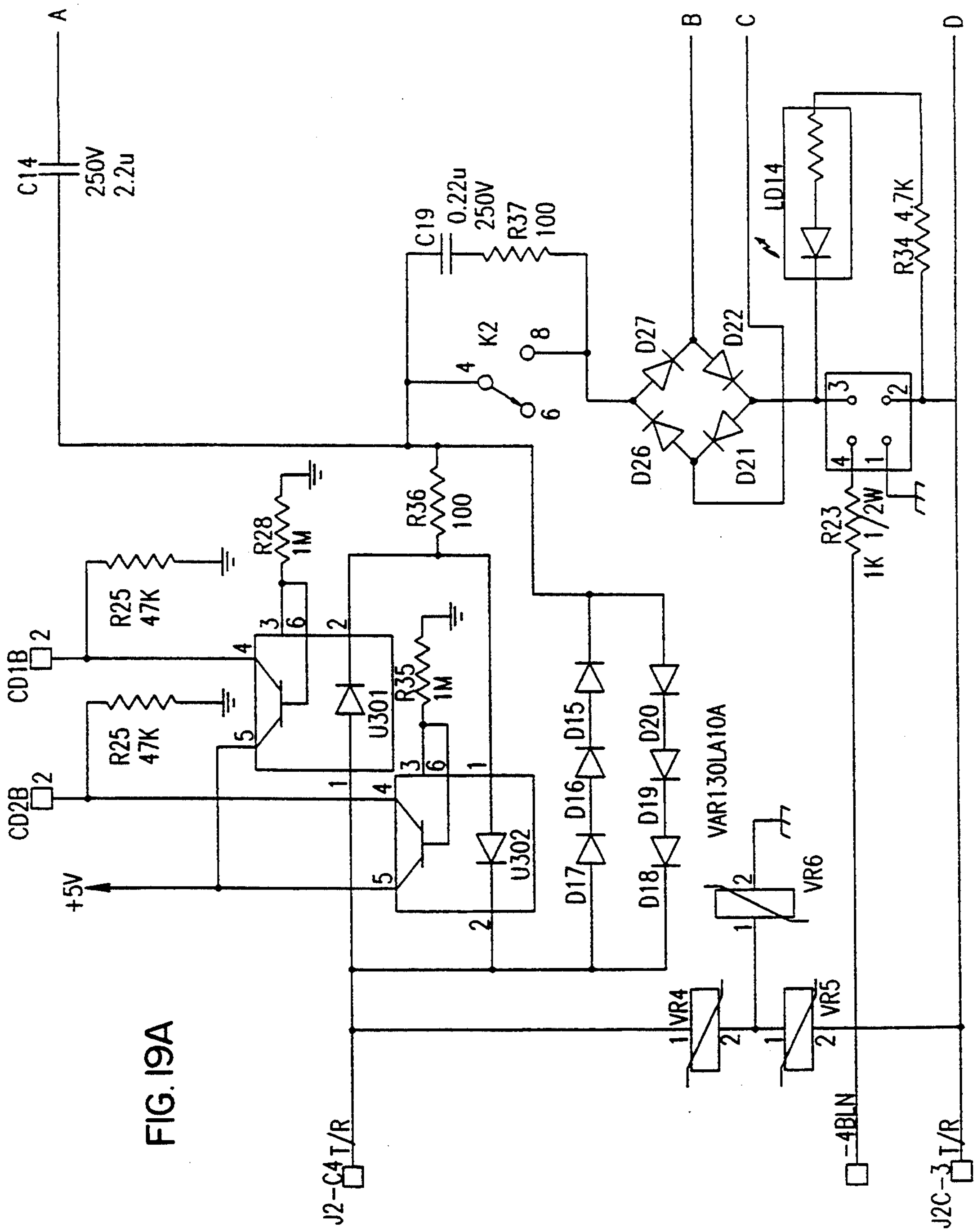
Figure 19B:
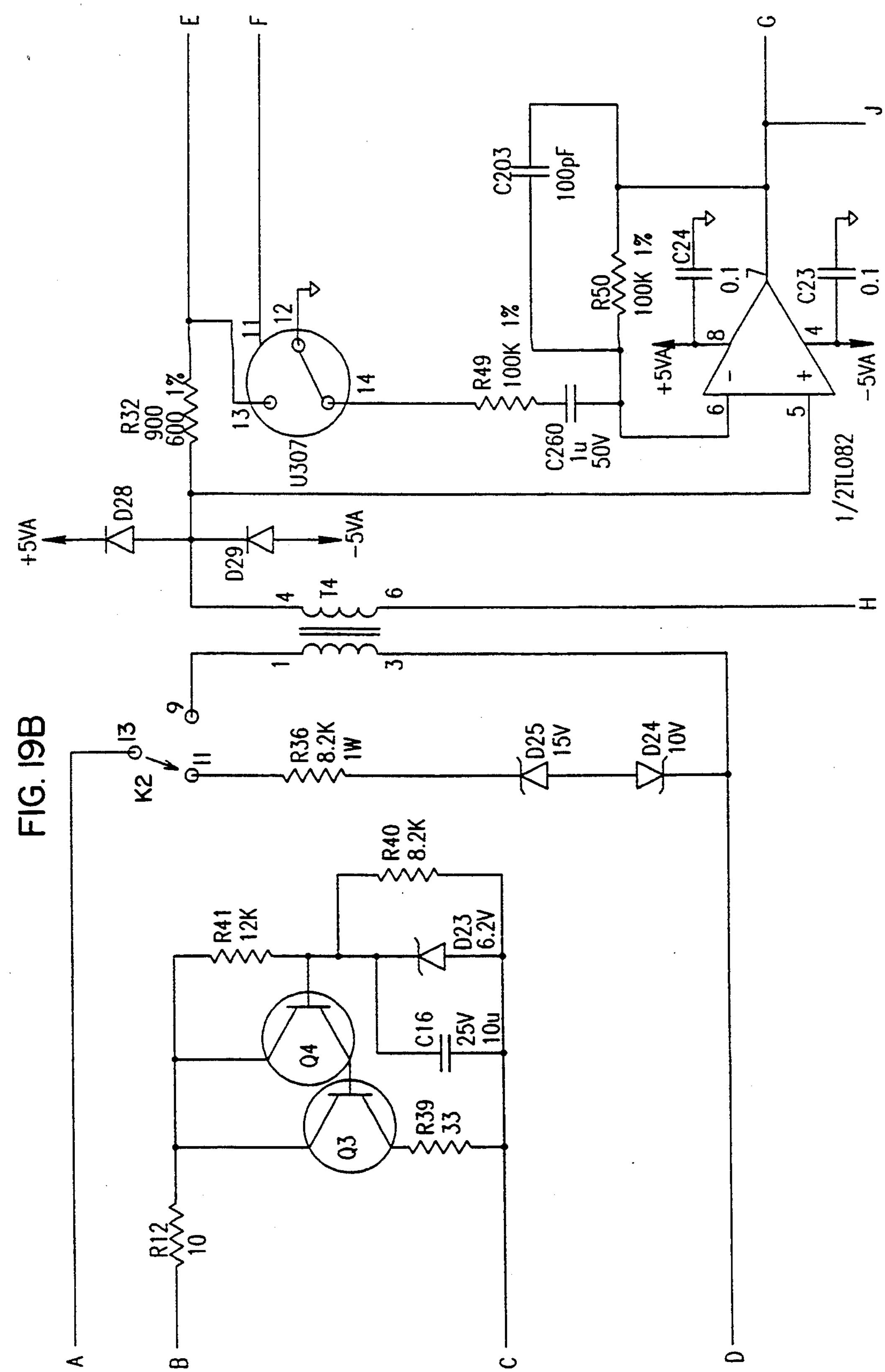
Figure 19C:
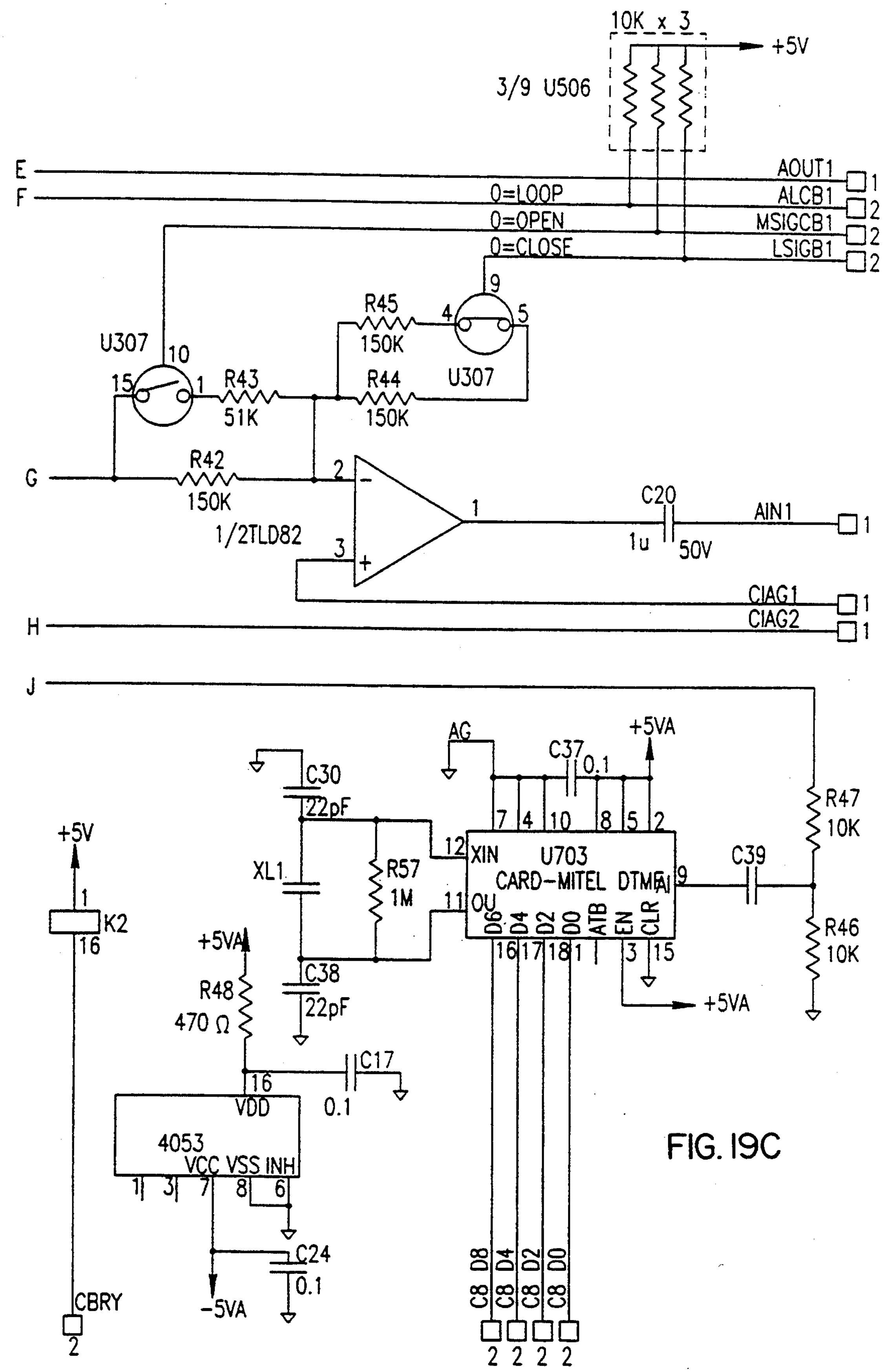
Figure 20A:
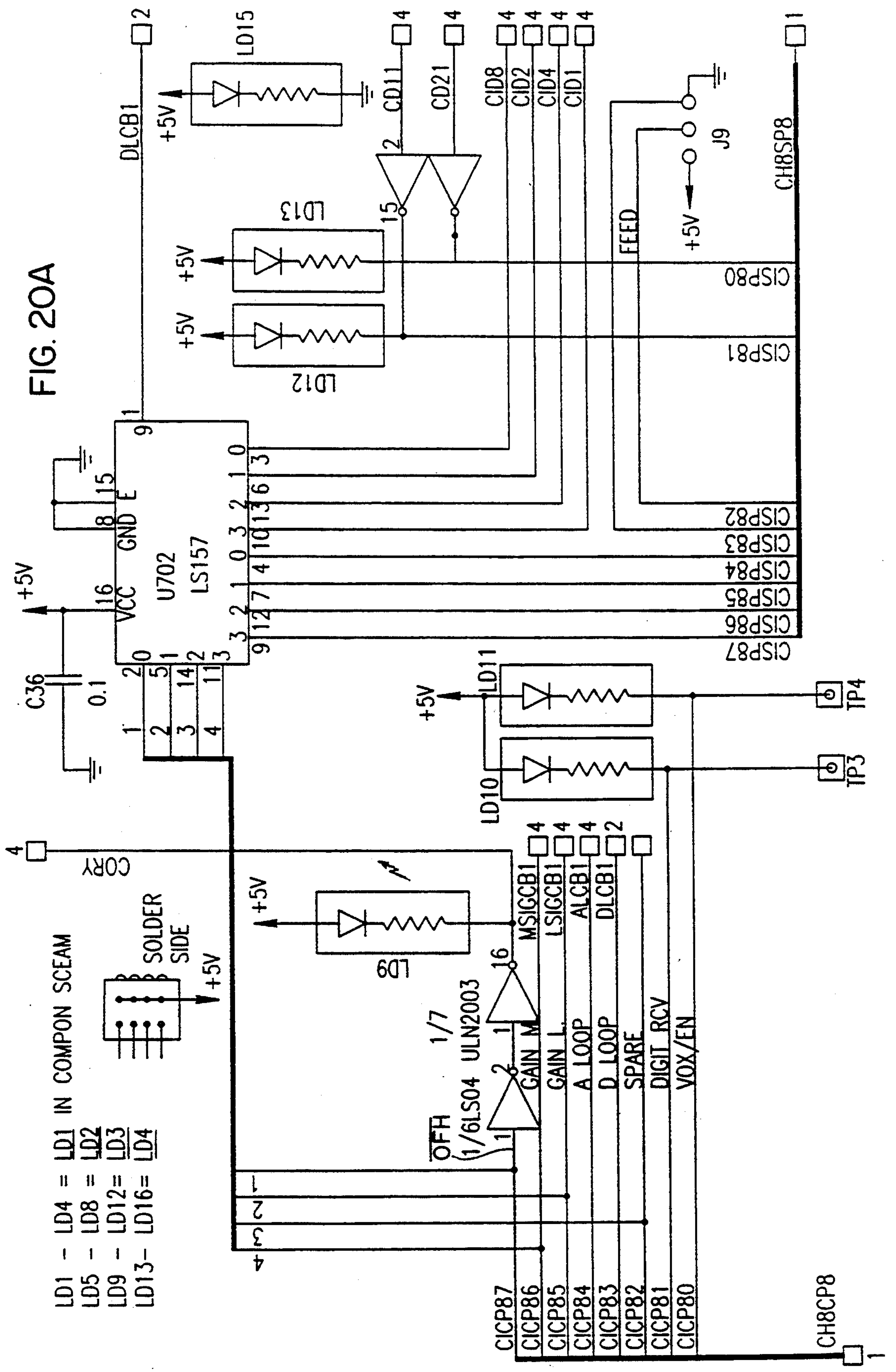
Figure 20B:
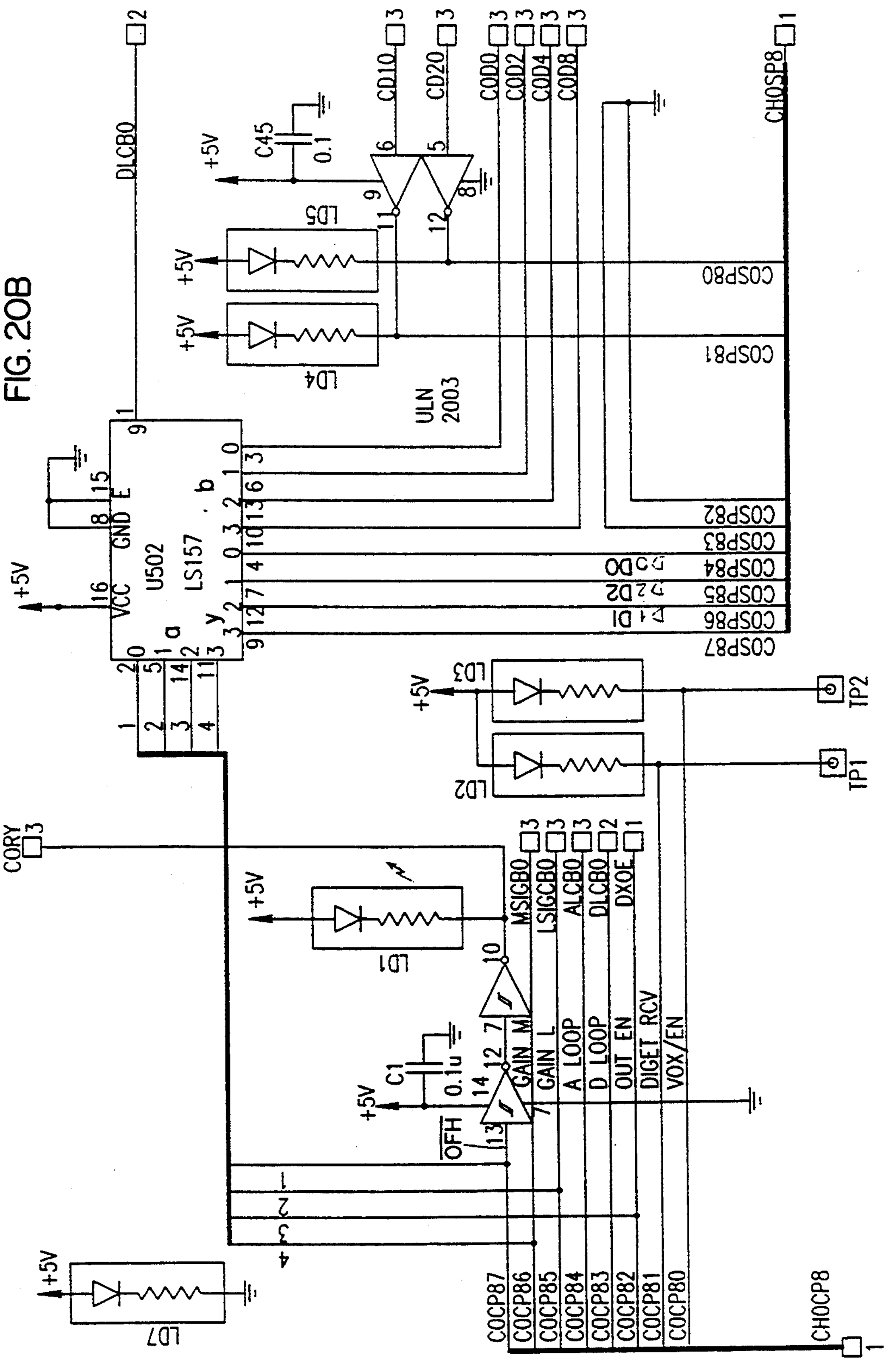
Figure 21A:
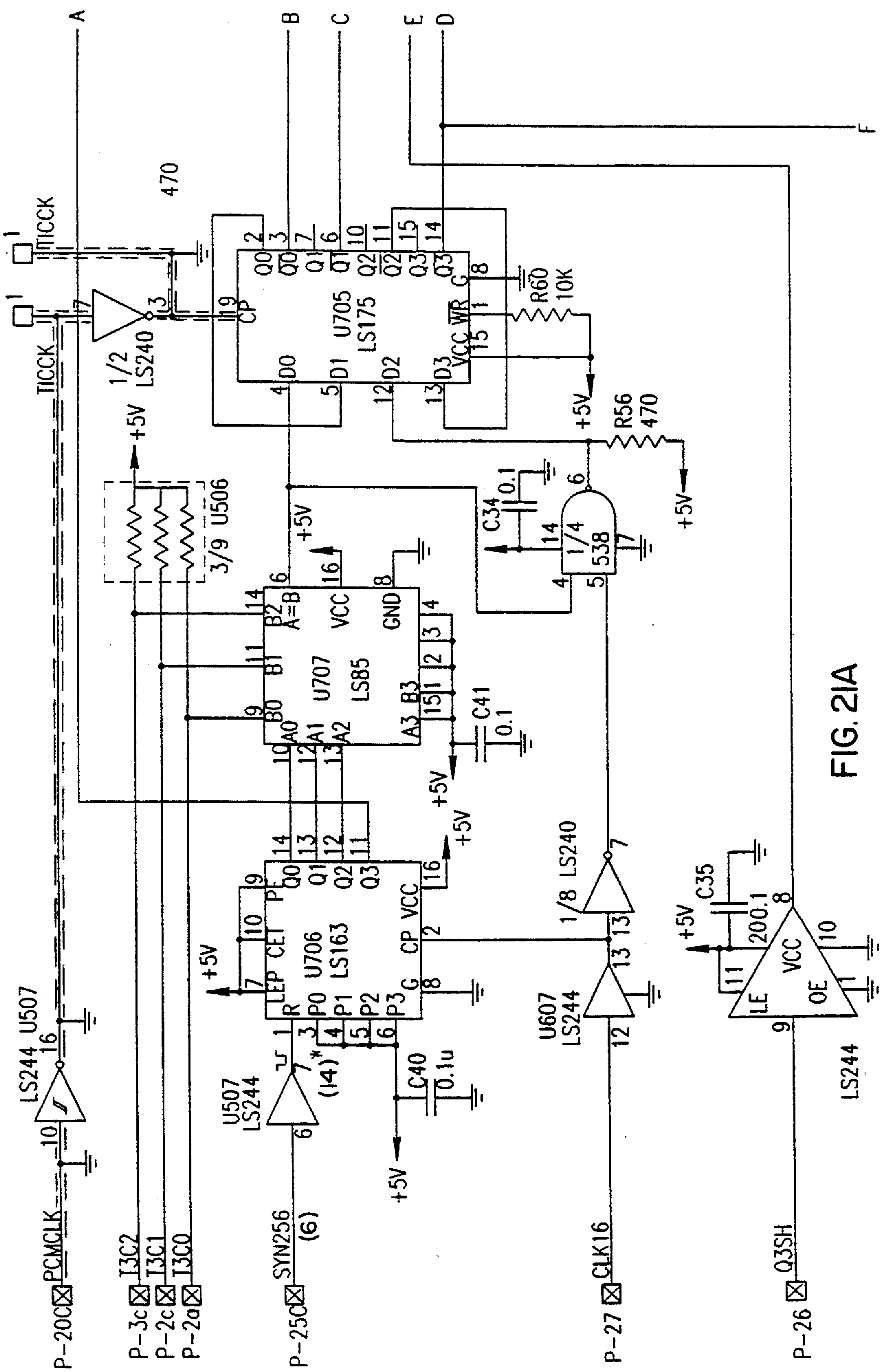
Figure 21B:
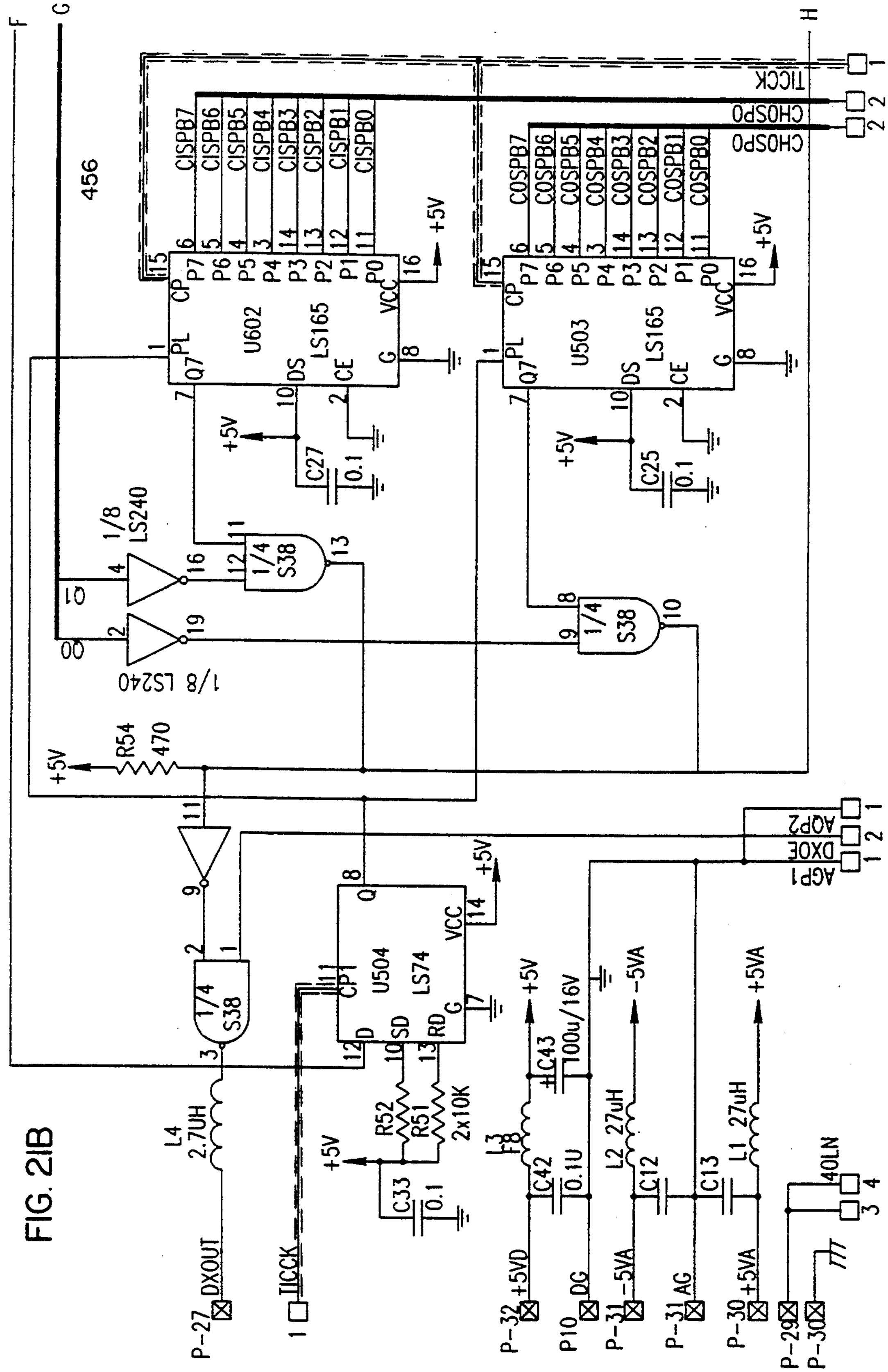
Figure 2I:
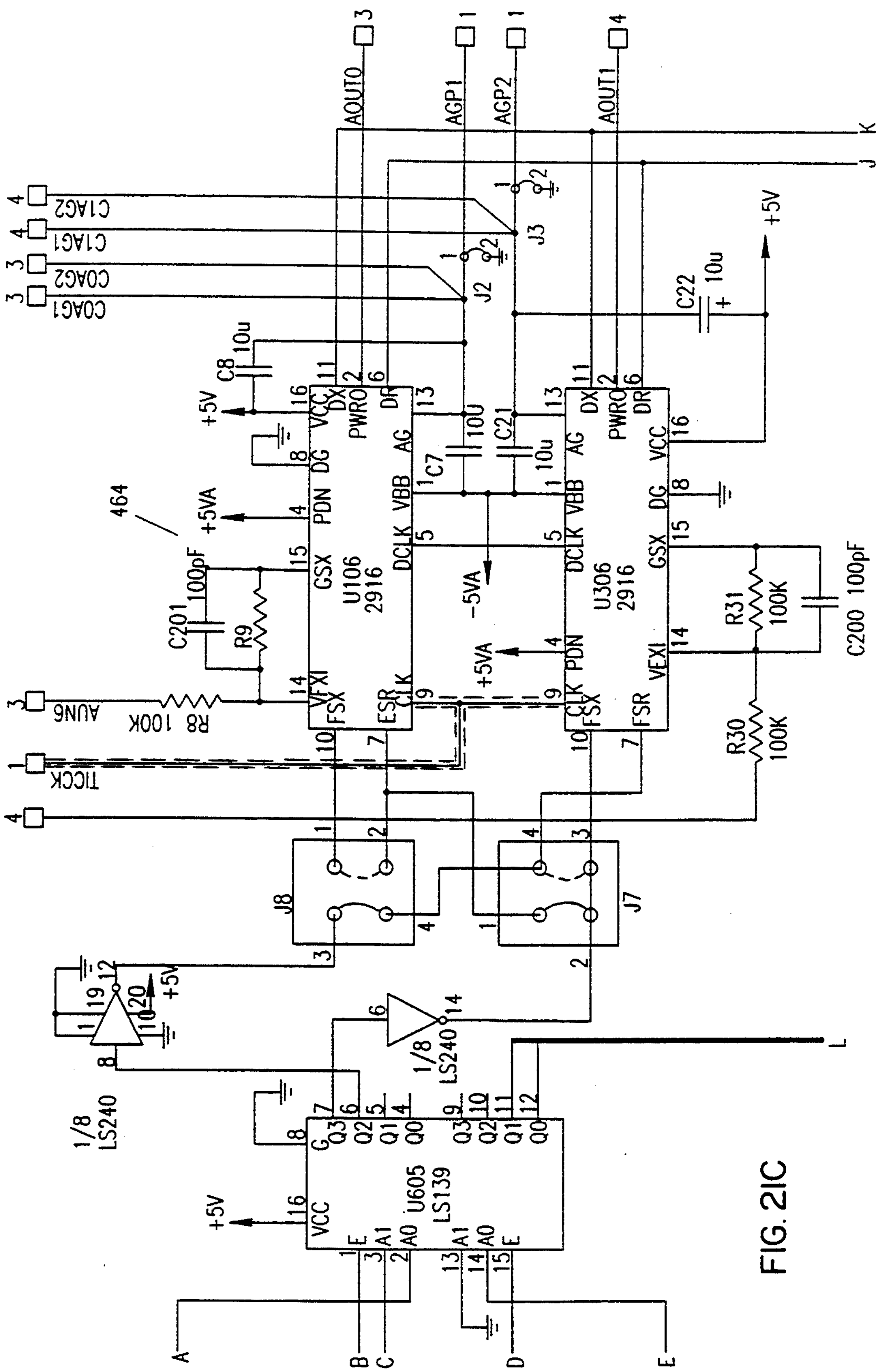
Figure 2D:
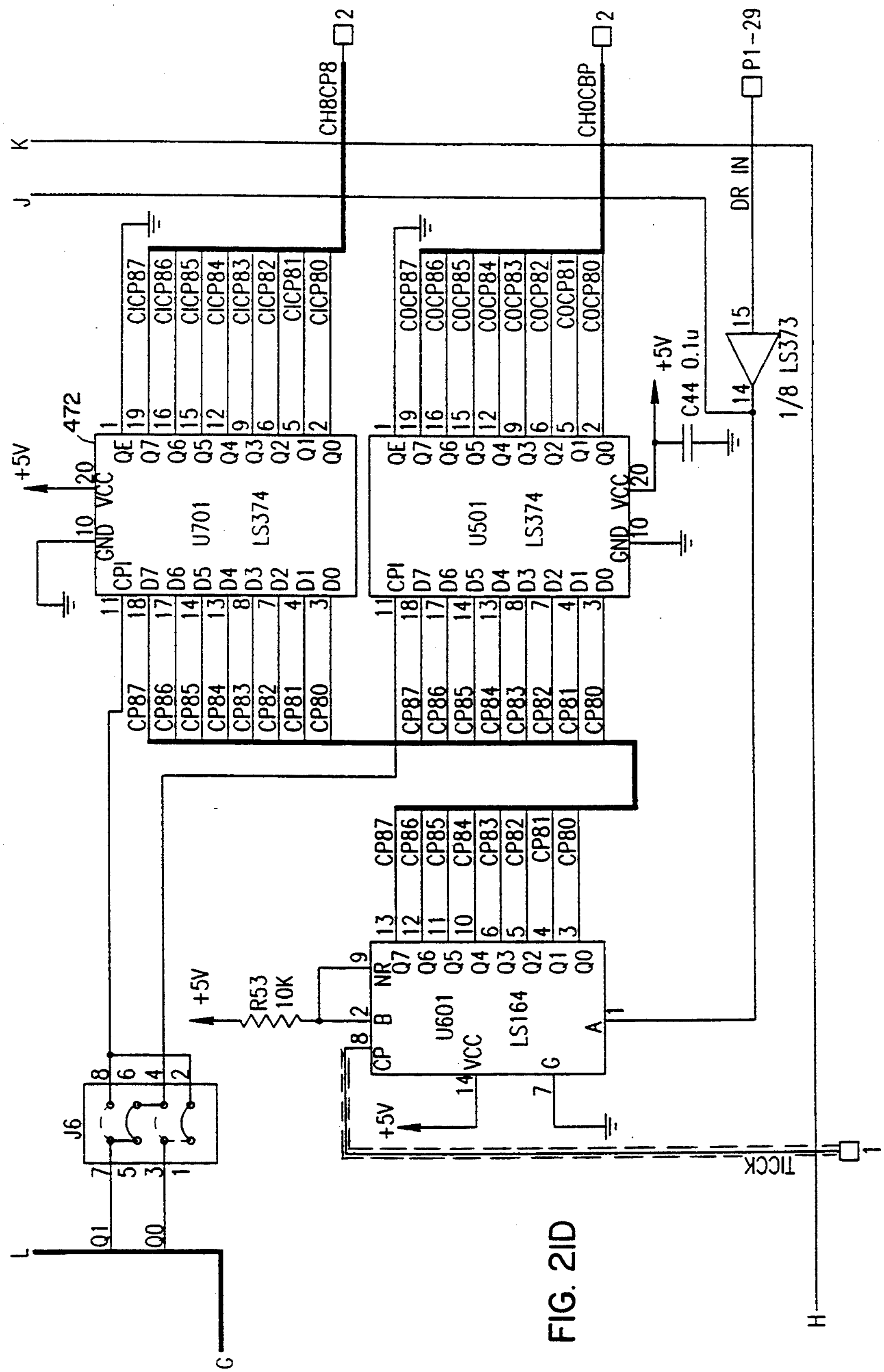
Figure 22A:
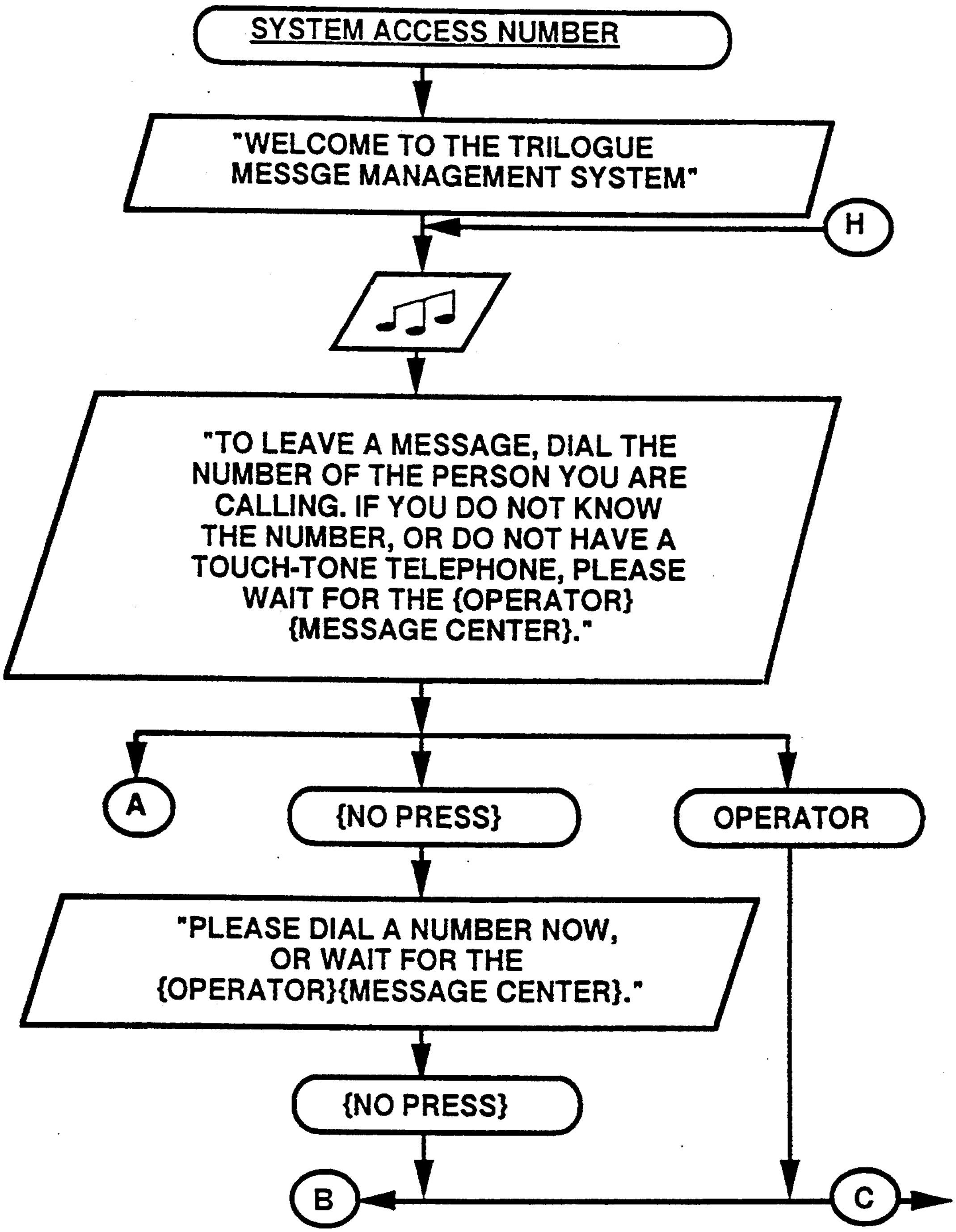
FIGS. 22A–40C are flow chart representations describing the man/machine interface of the system of the present invention.
Figure 22B:
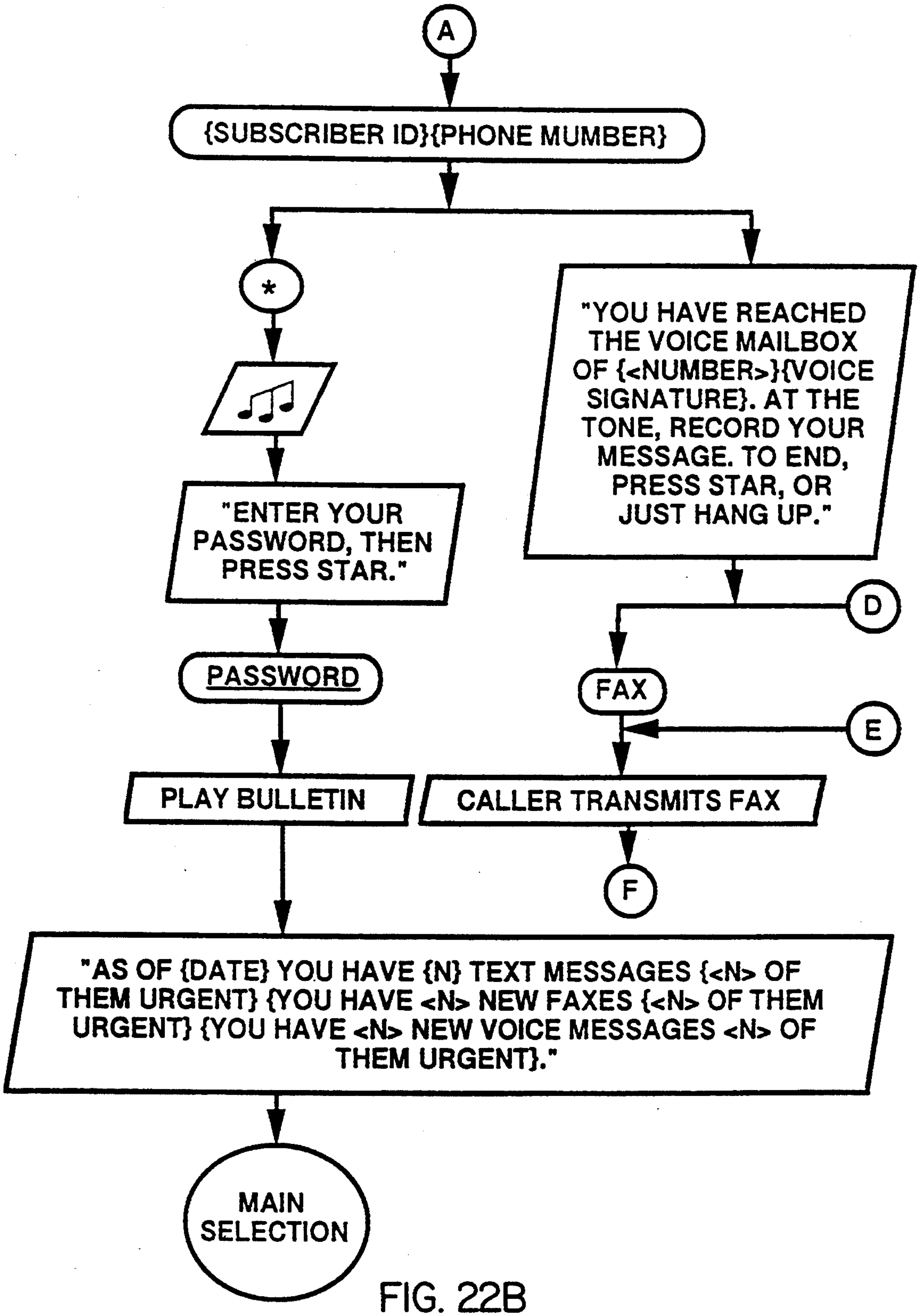
Figure 22C:
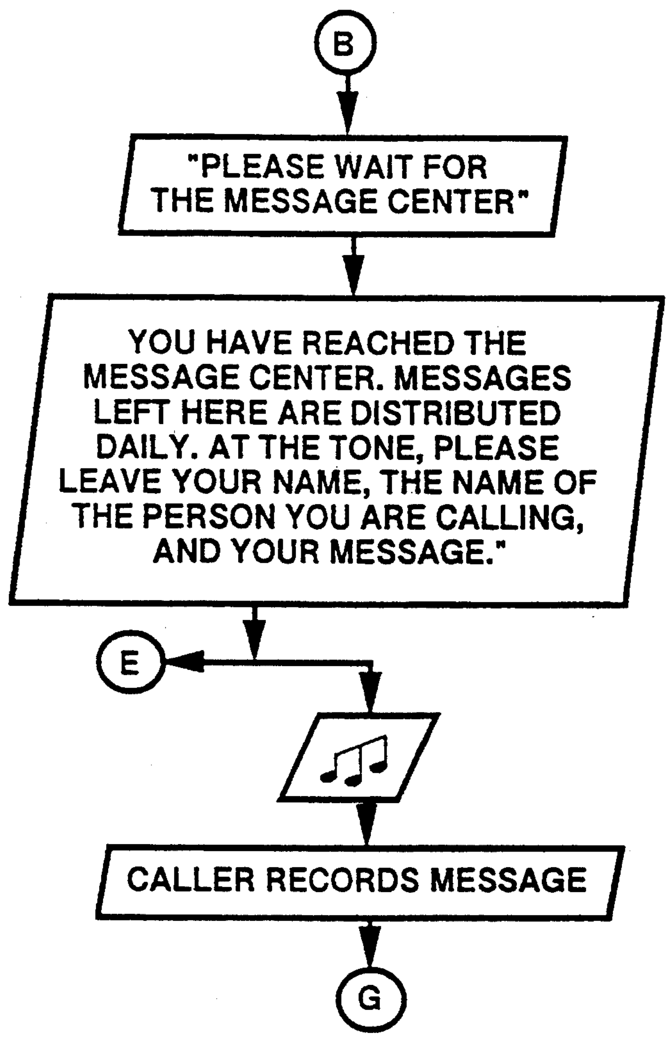
Figure 22D:
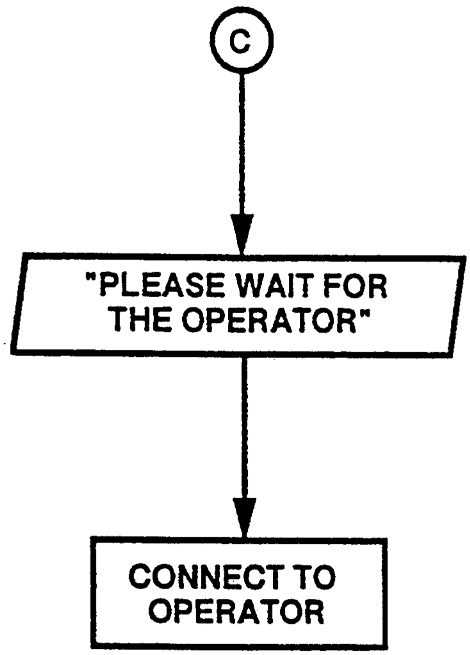
Figure 22E:
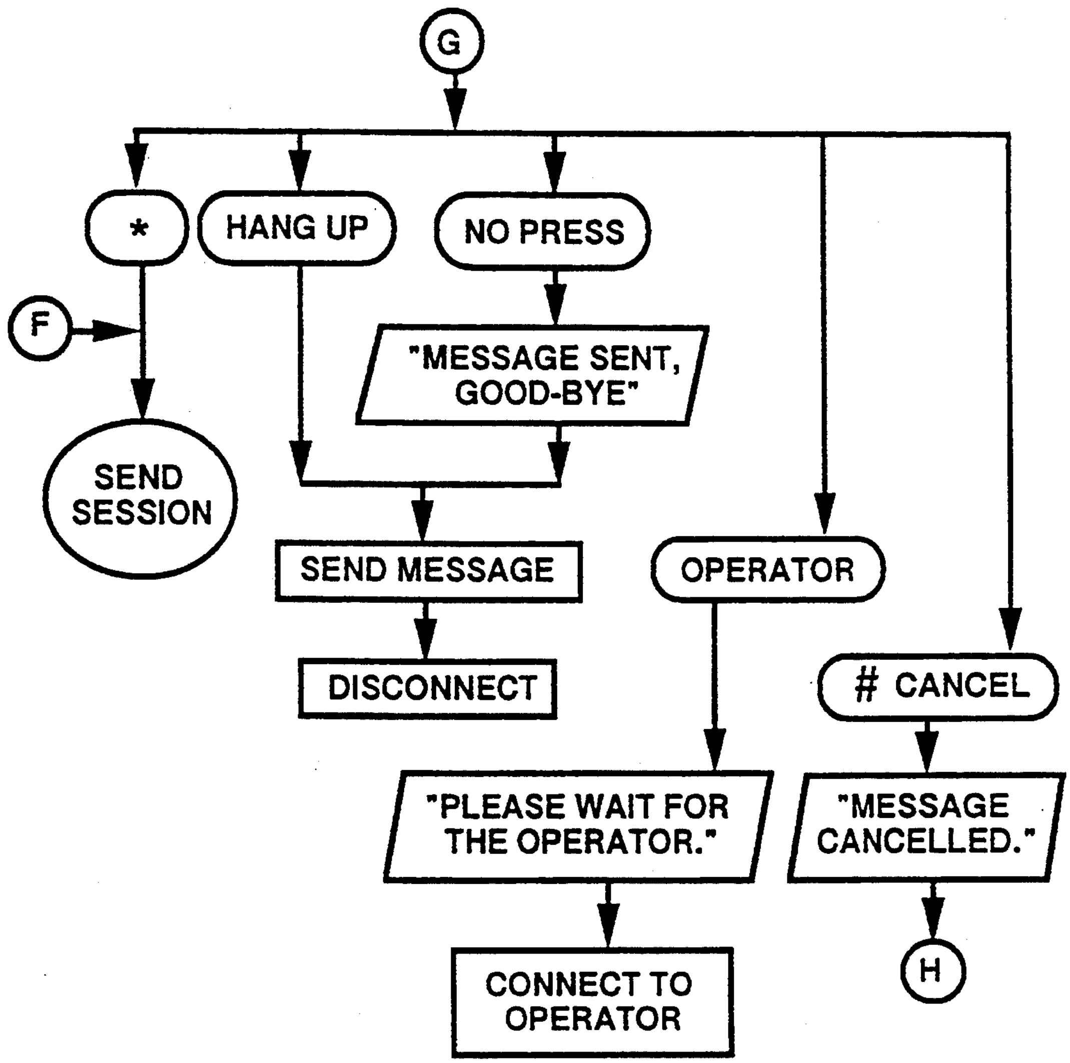
Figure 23:
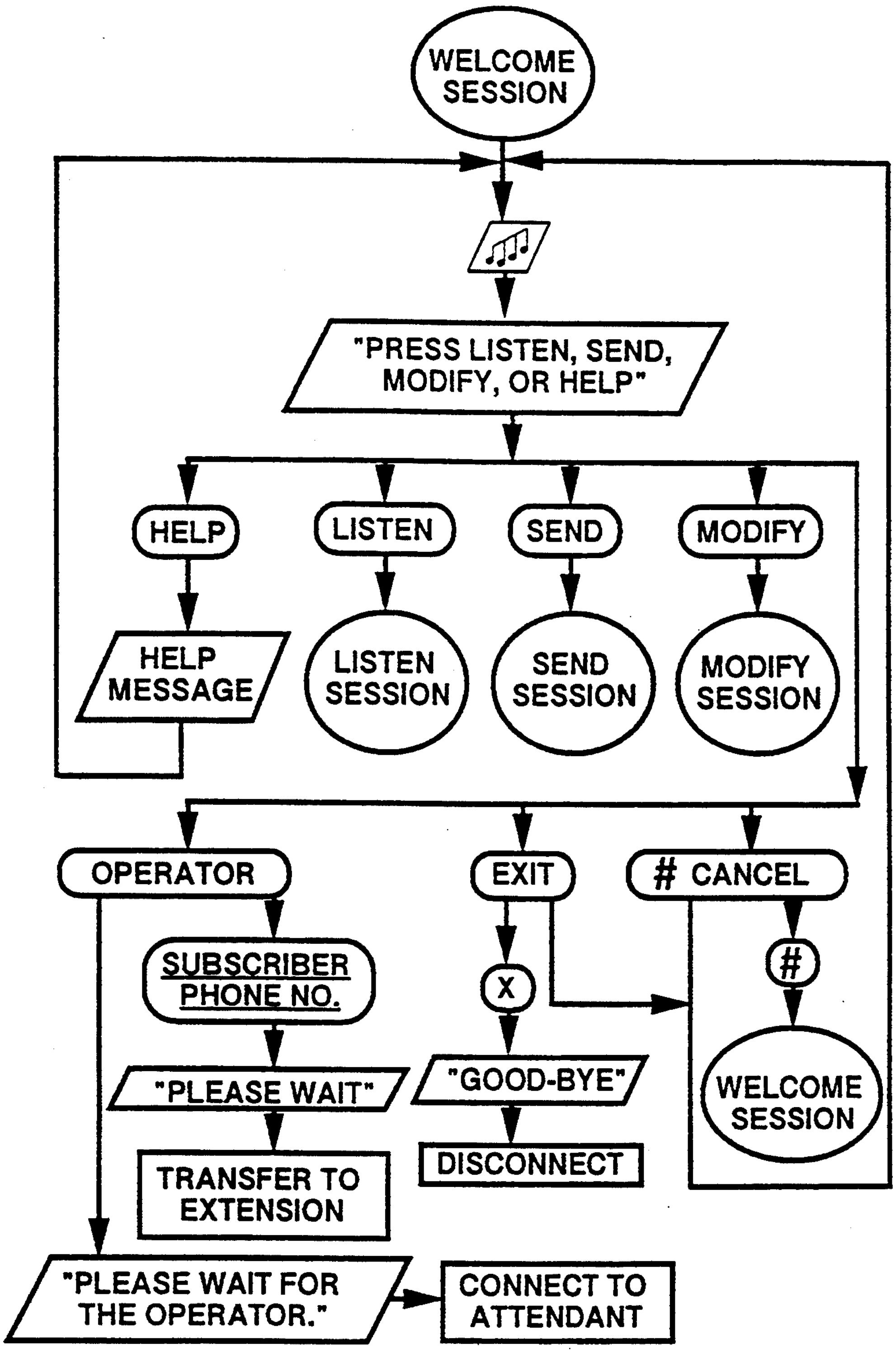
Figure 24:
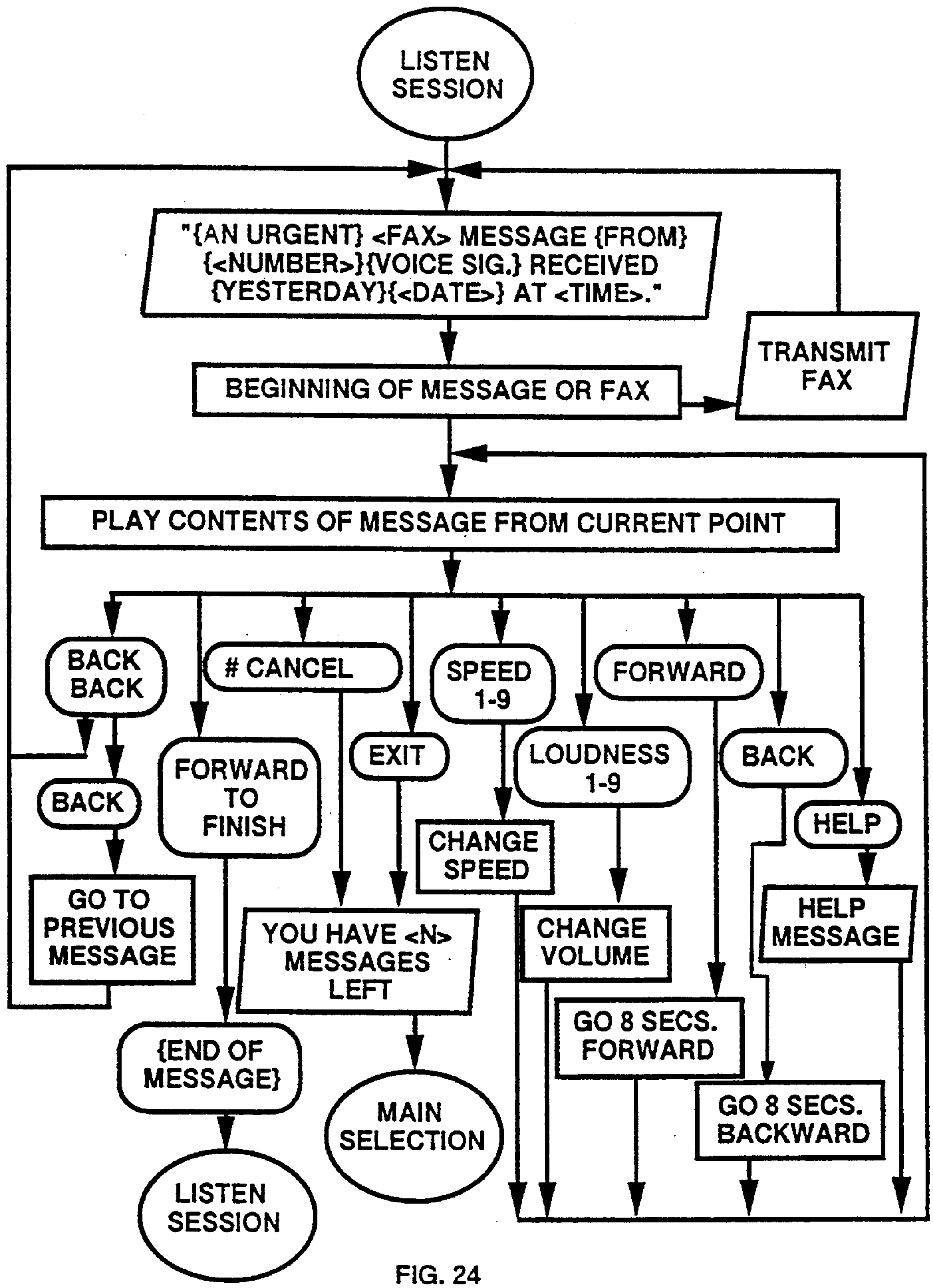
Figure 25A:
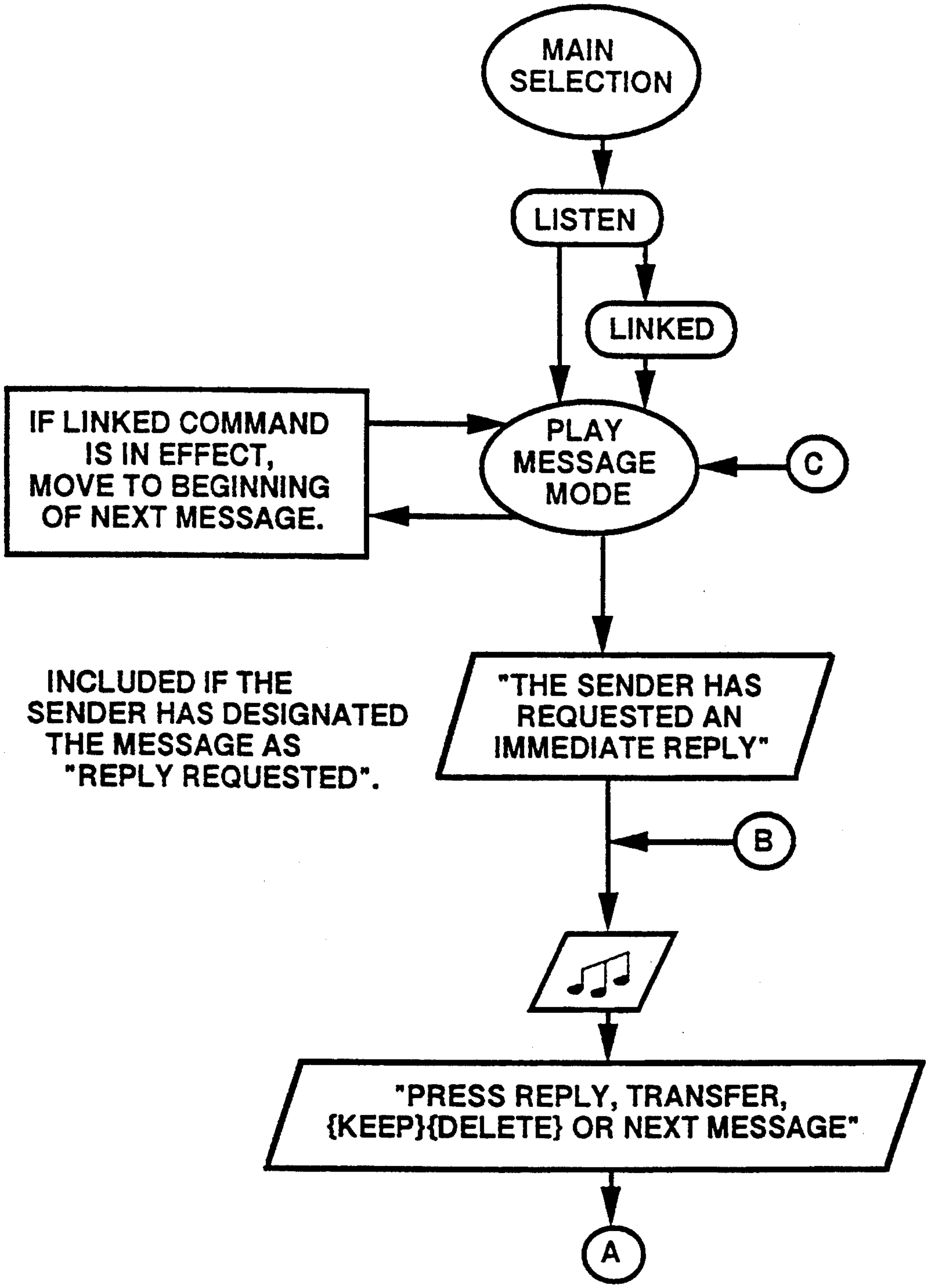
Figure 25B:
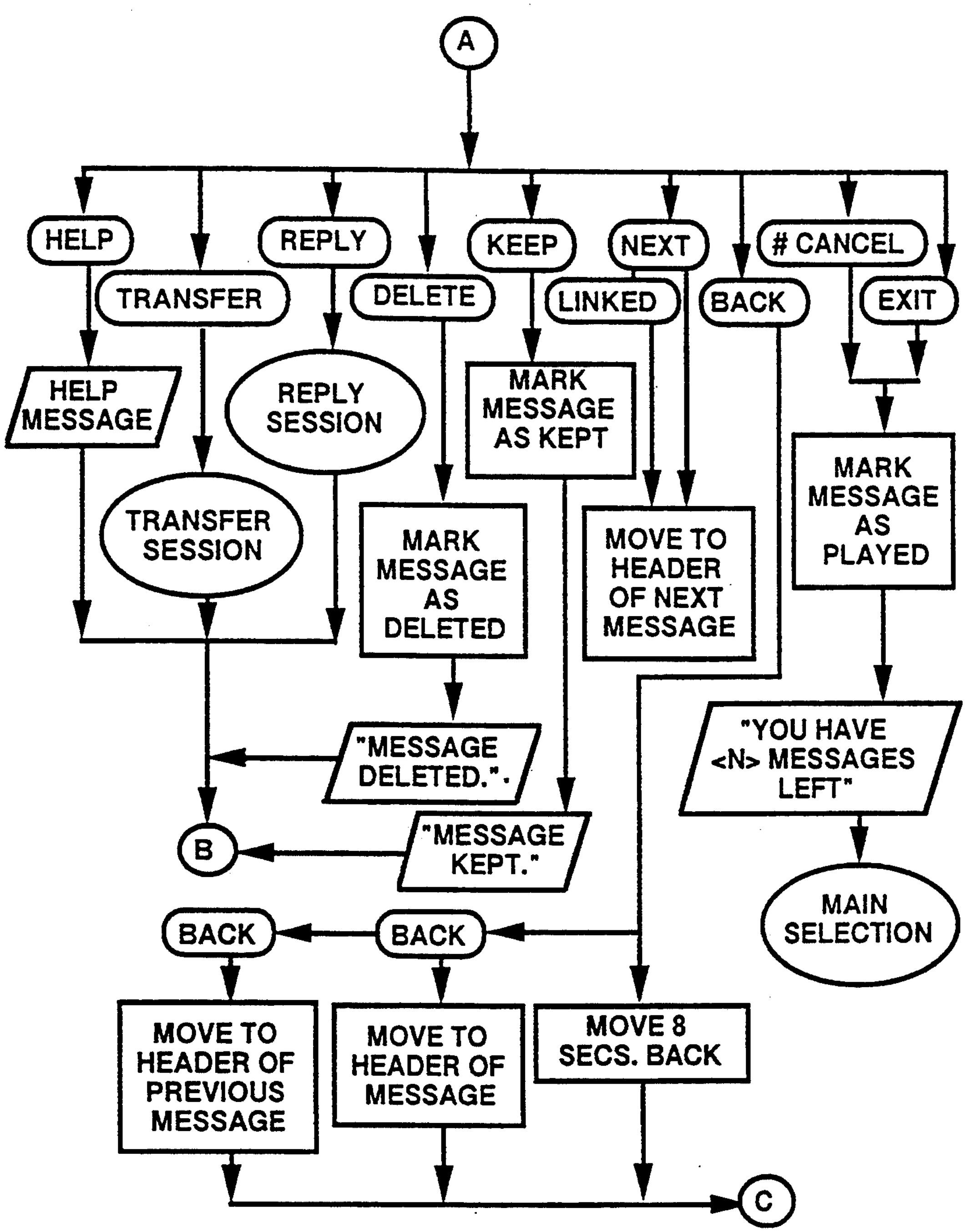
Figure 26A:
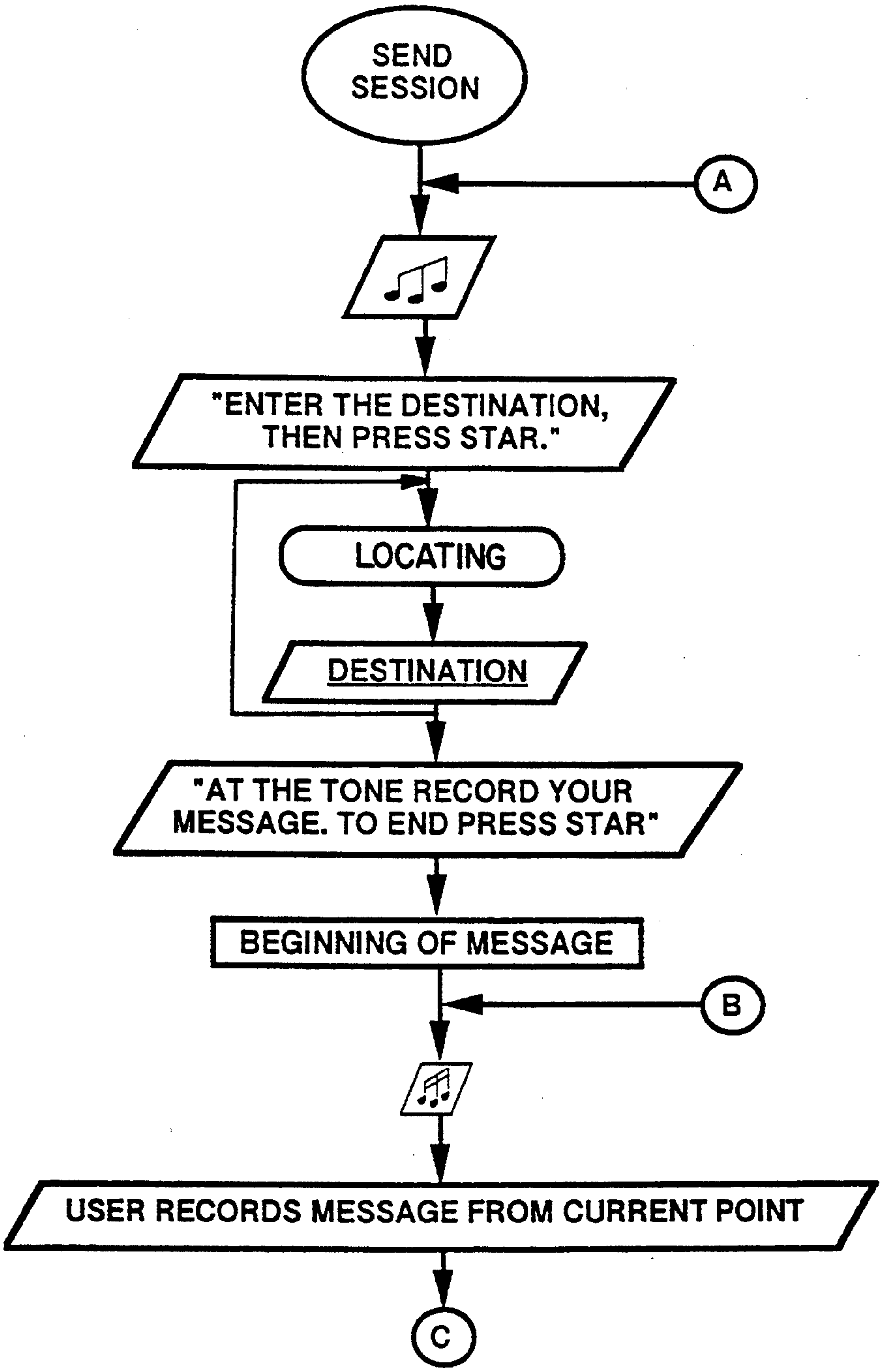
Figure 26B:
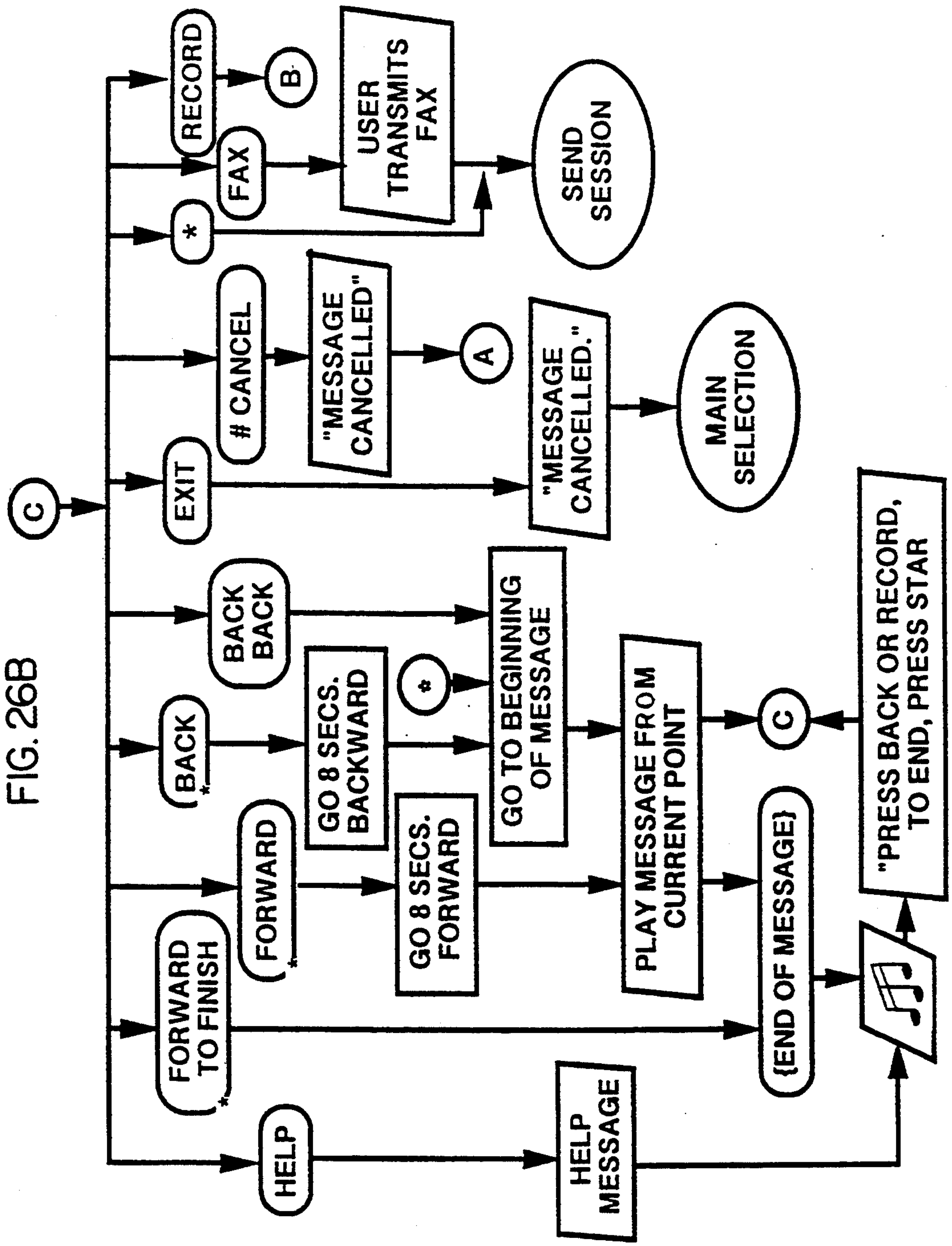
Figure 27A:
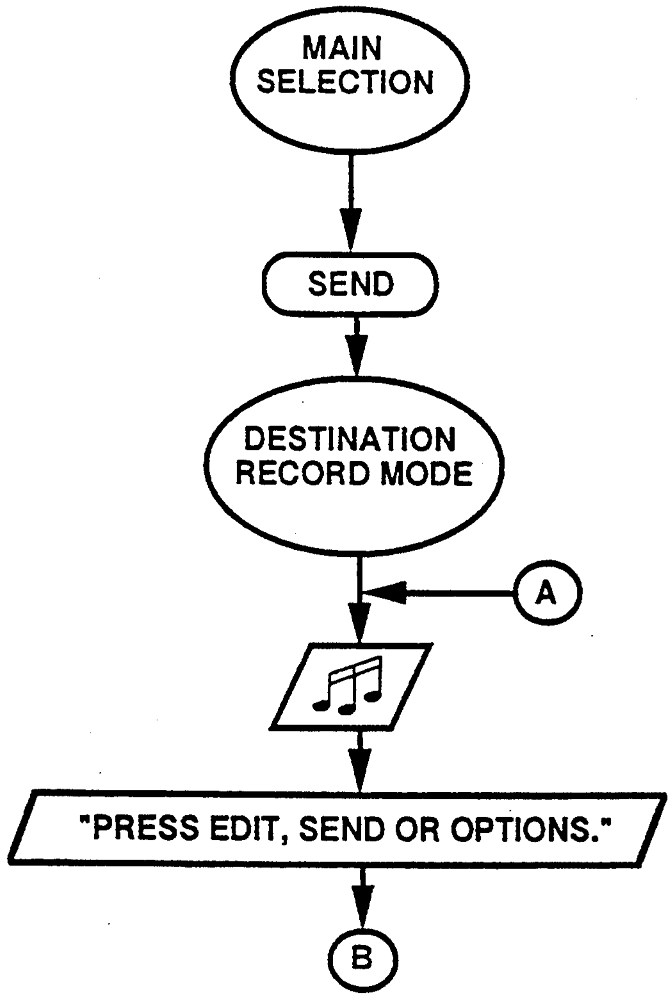
Figure 27B:
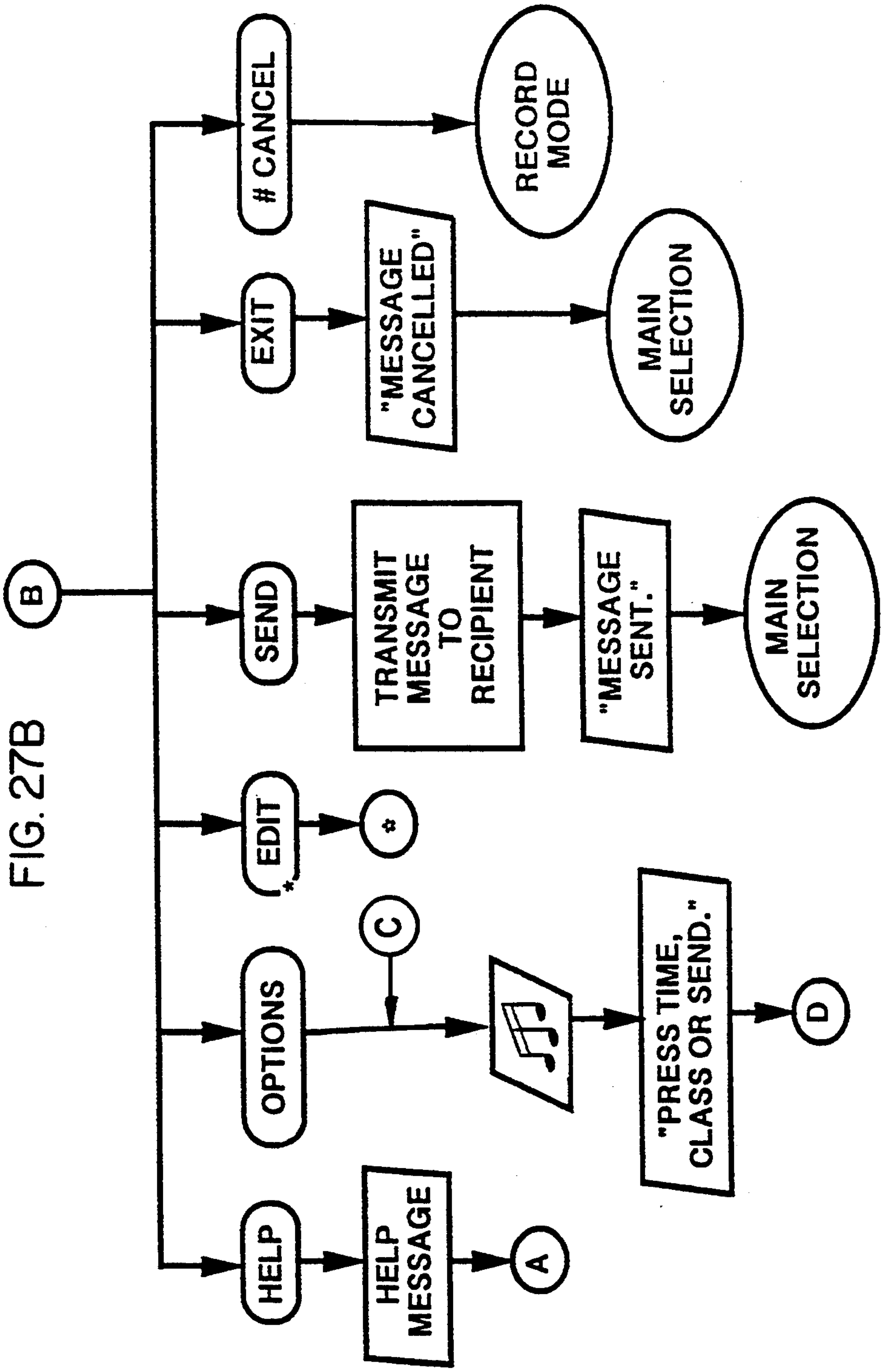
Figure 27C:
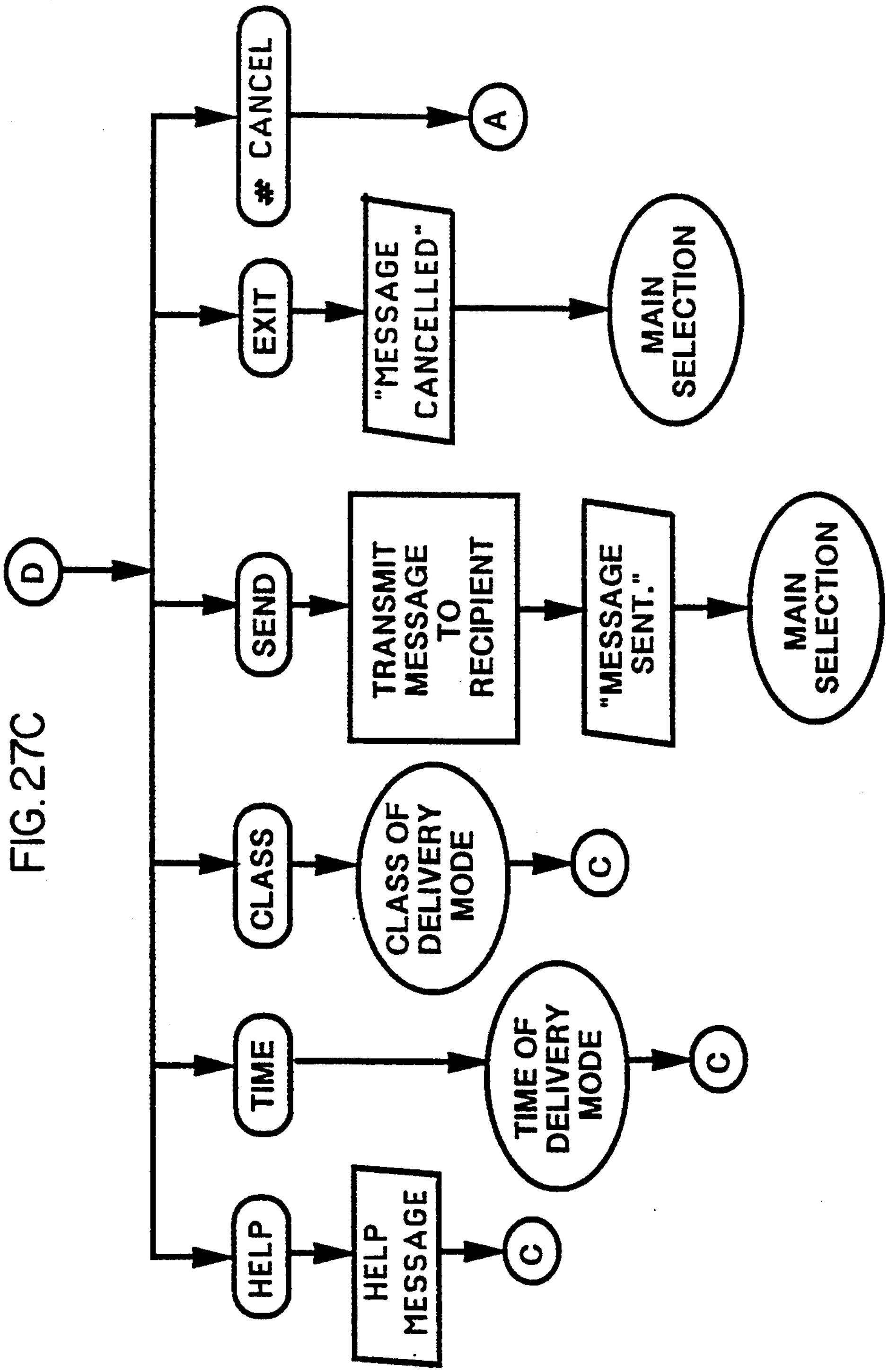
Figure 28:
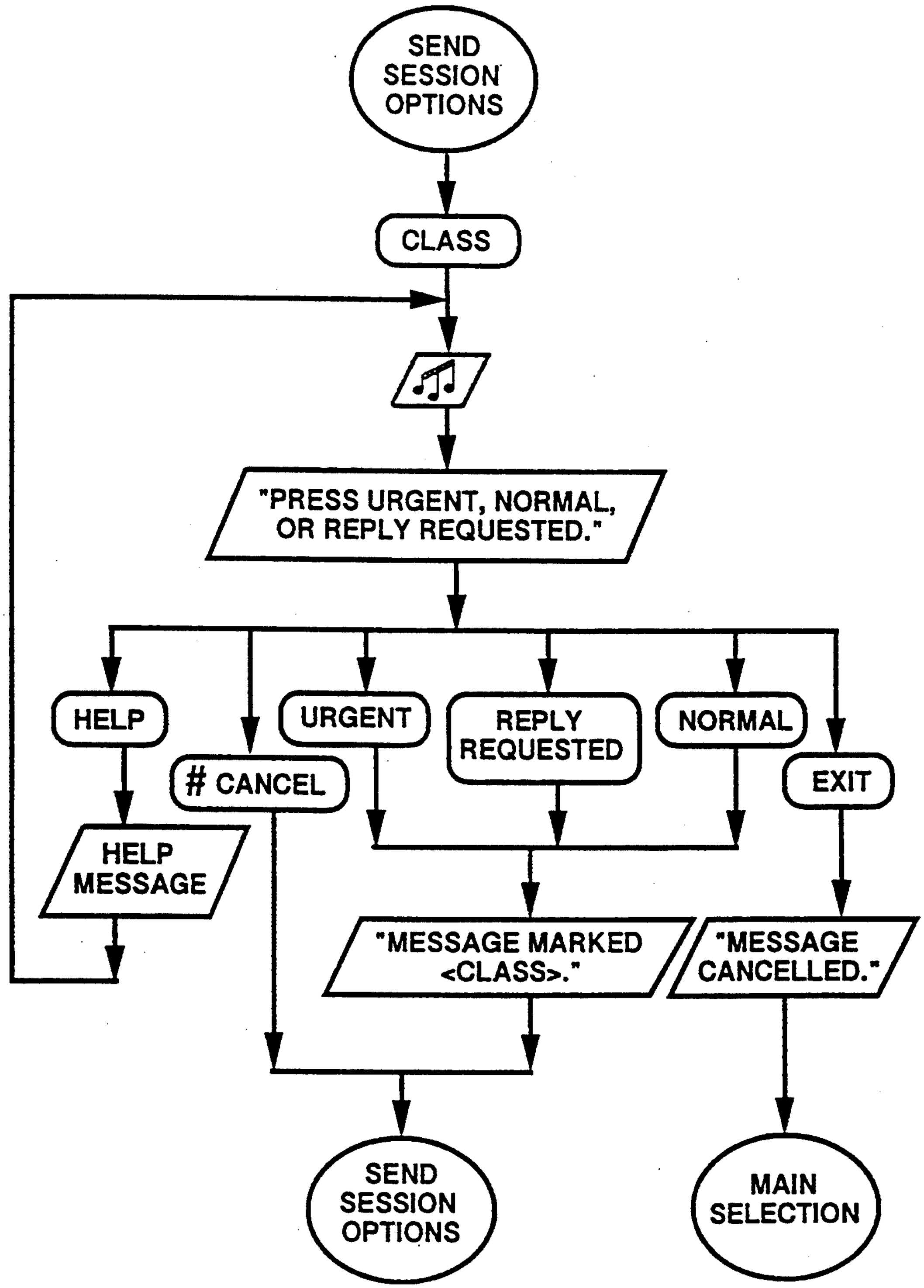
Figure 29:
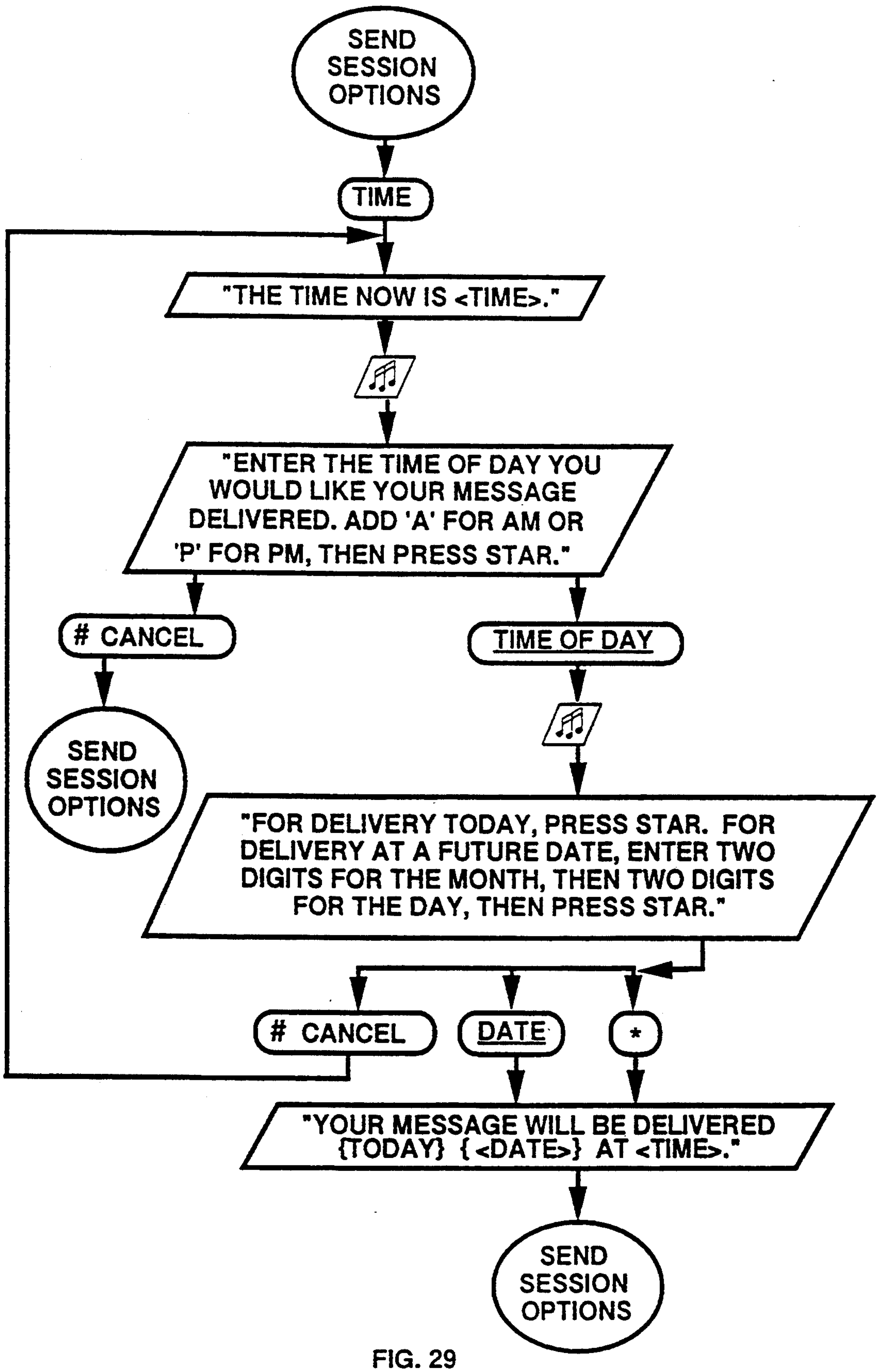
Figure 30A:
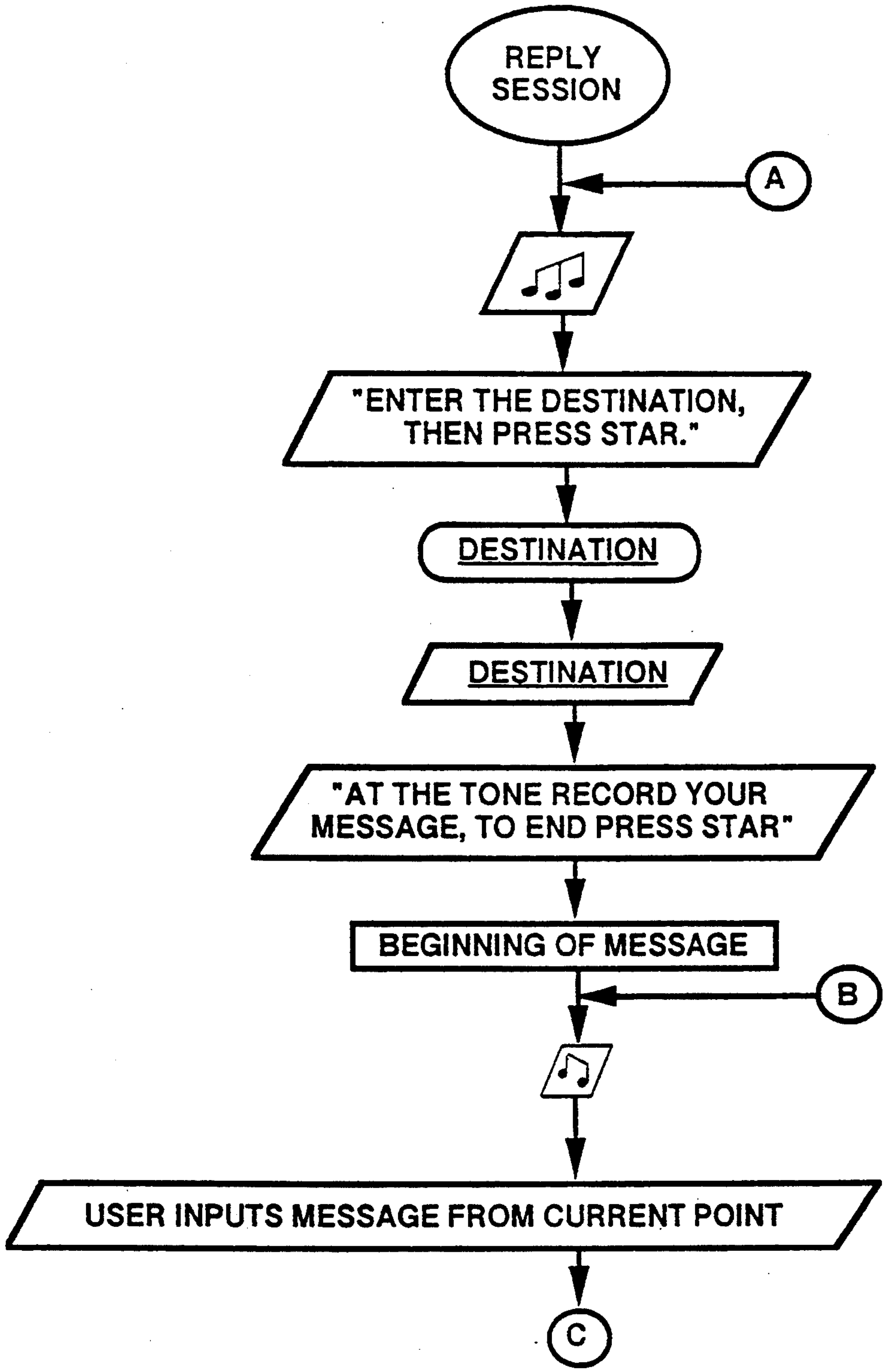
Figure 30B:
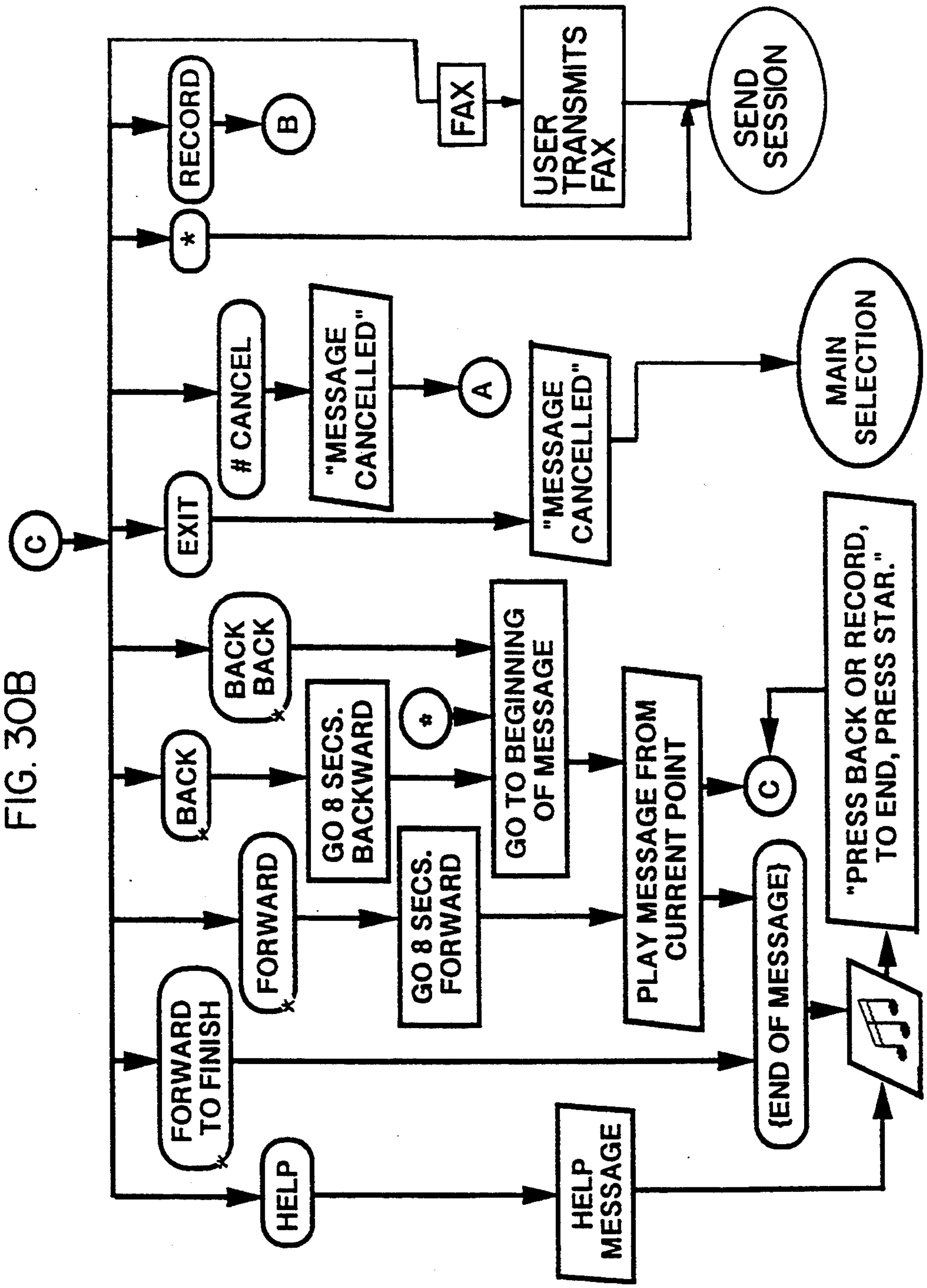
Figure 31A:
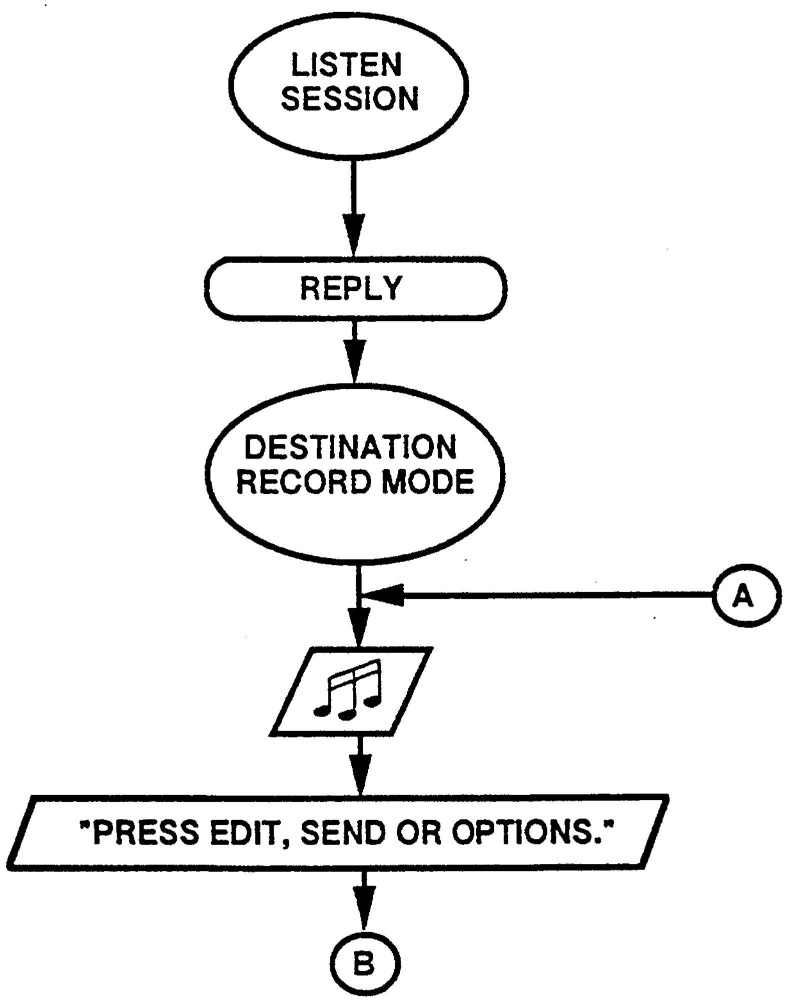
Figure 31B:
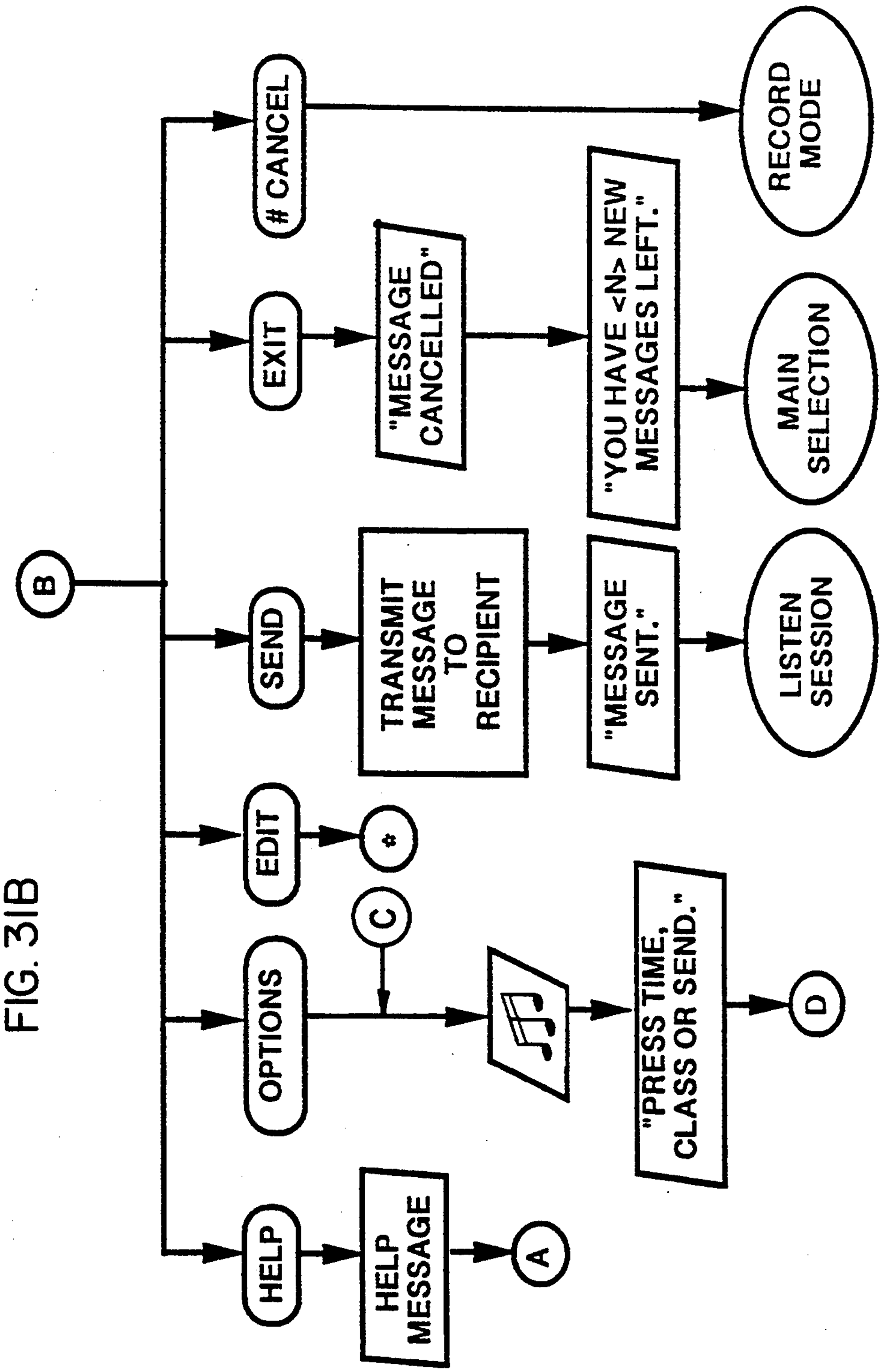
Figure 31C:
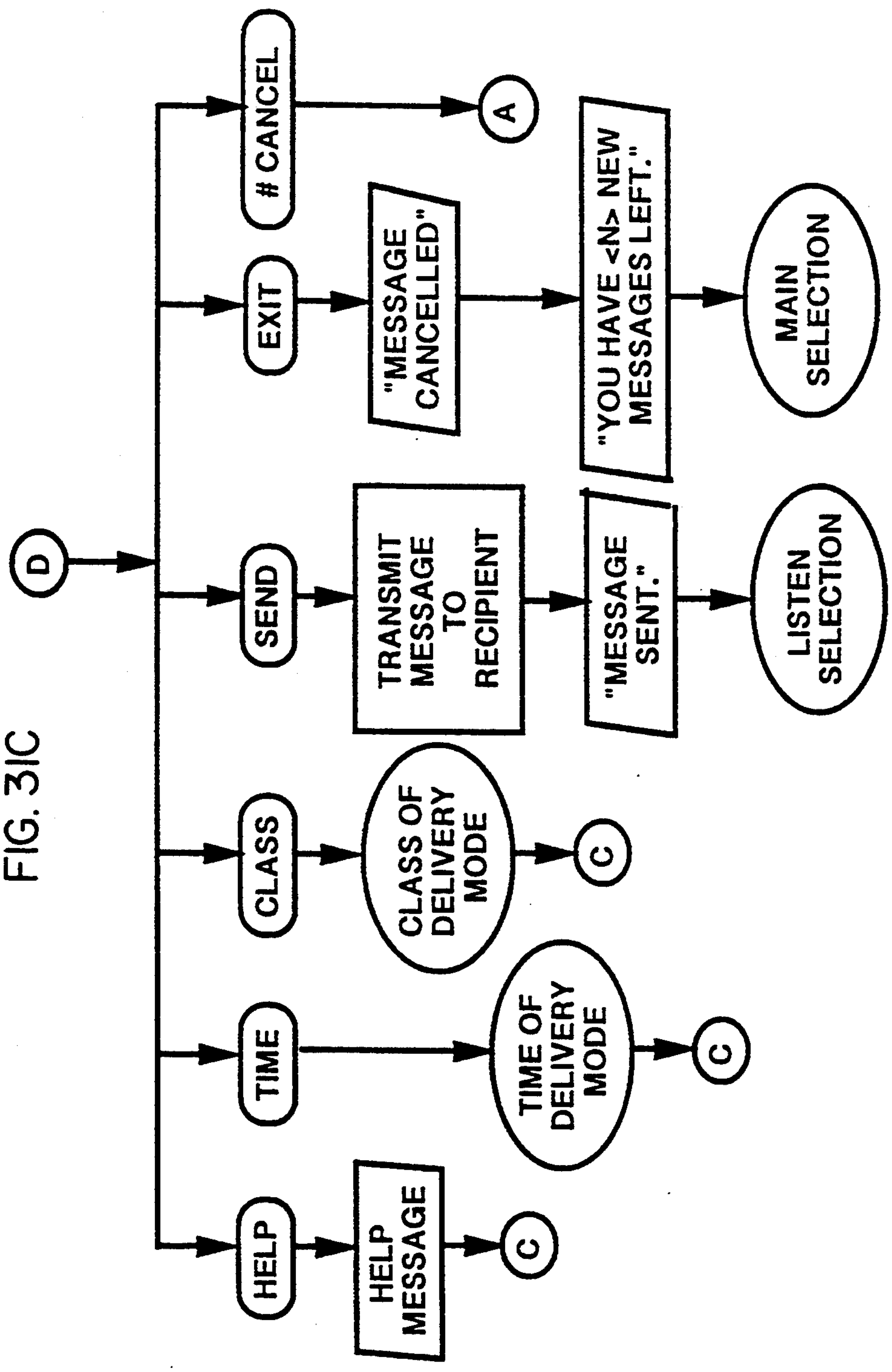
Figure 32A:
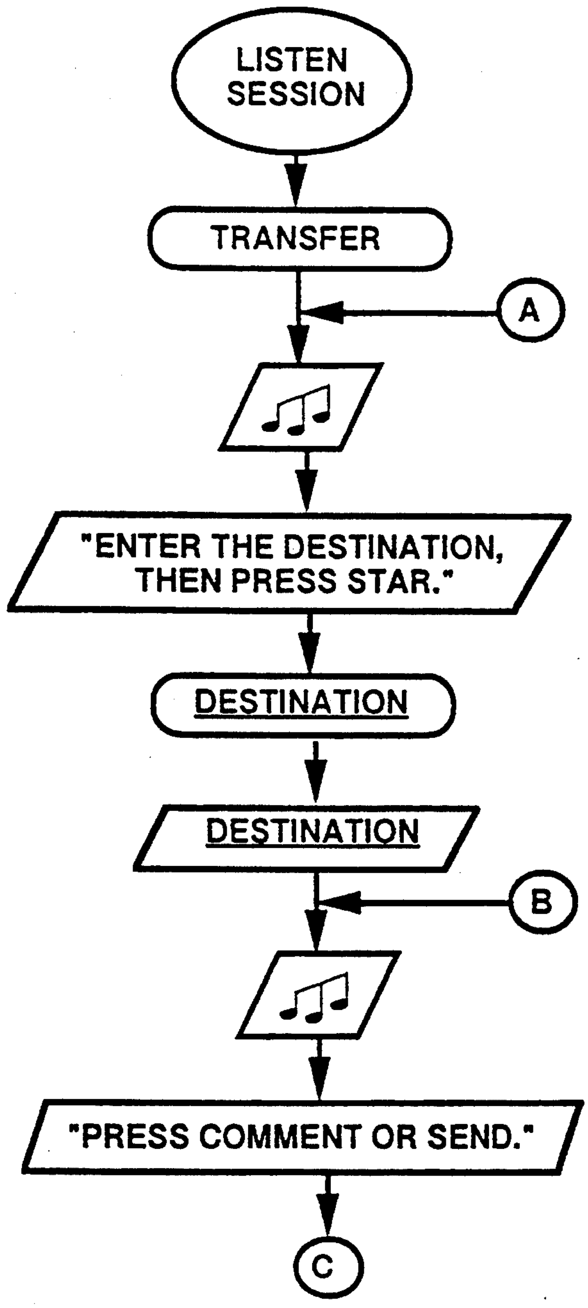
Figure 32B:
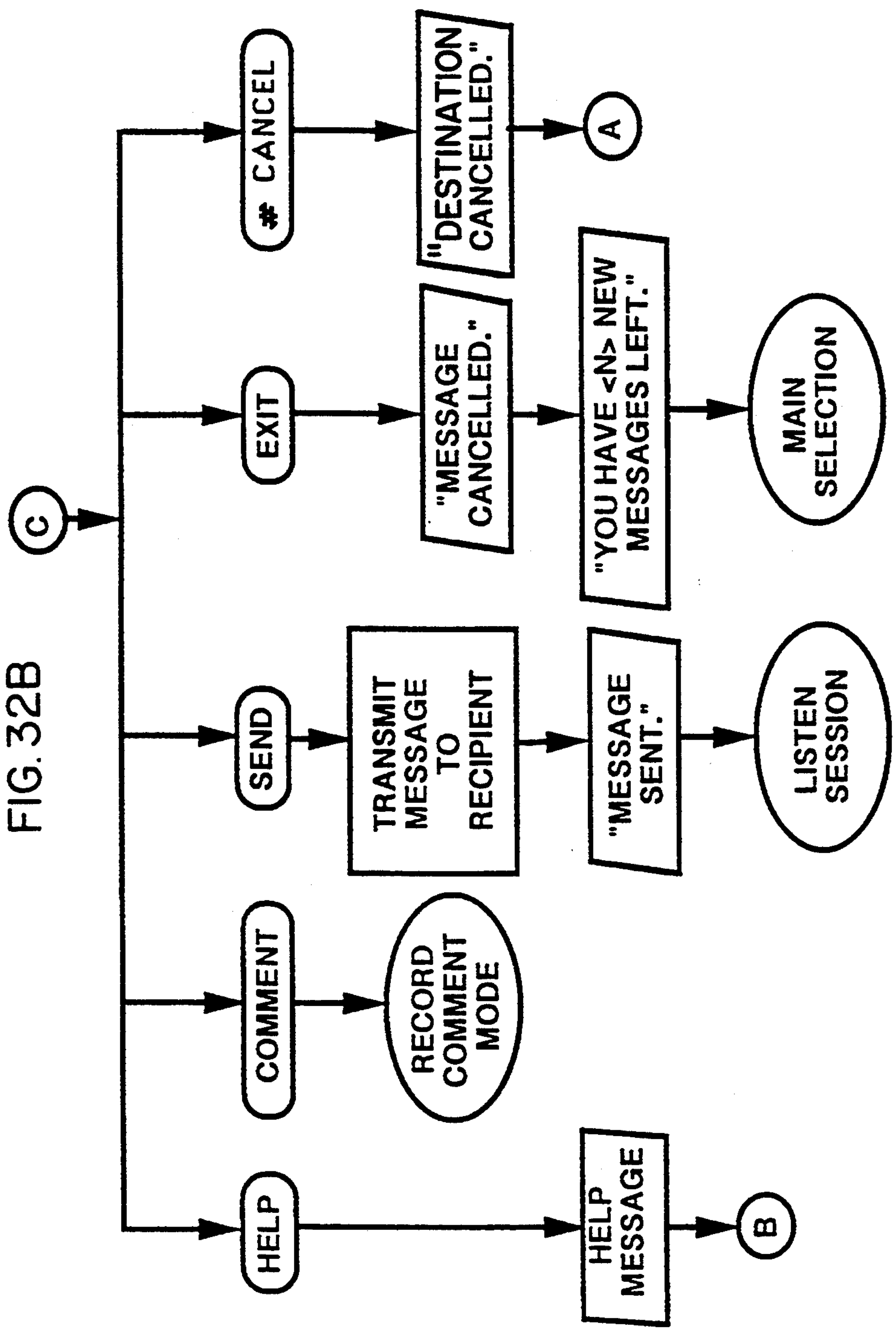
Figure 33A:
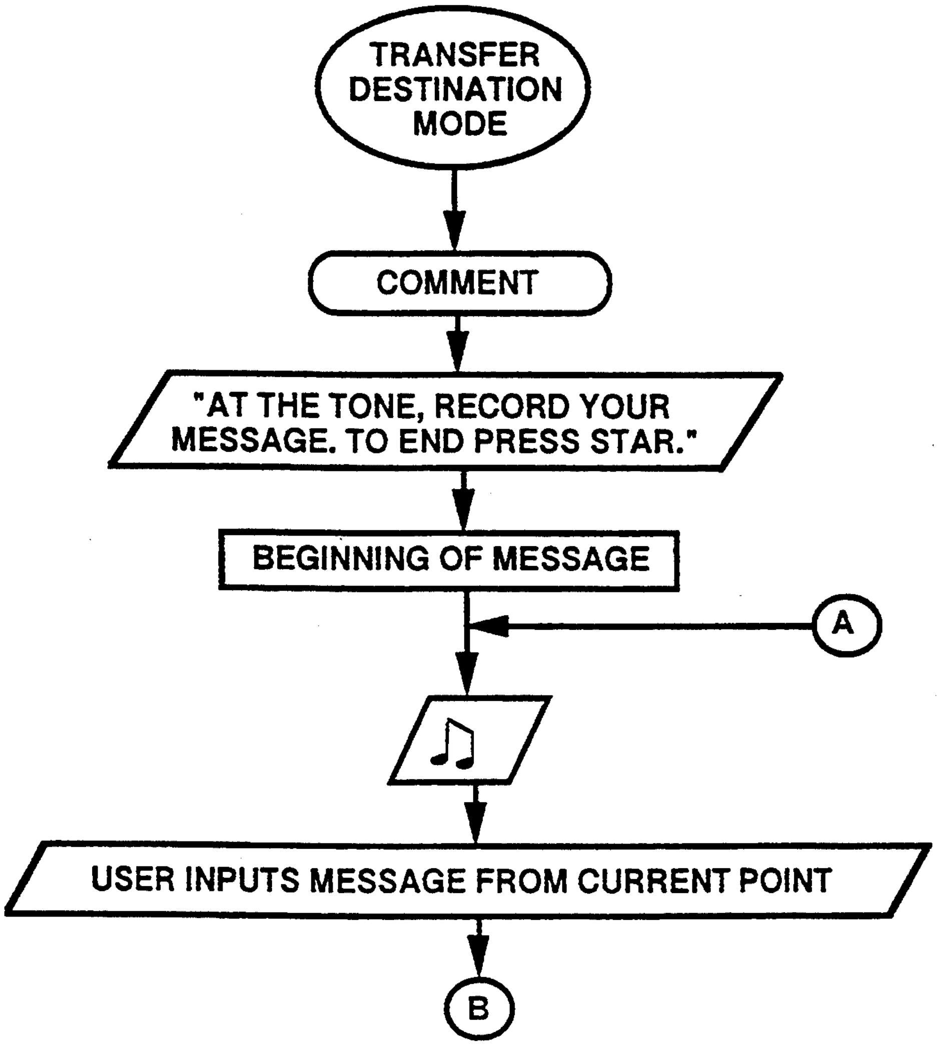
Figure 33B:
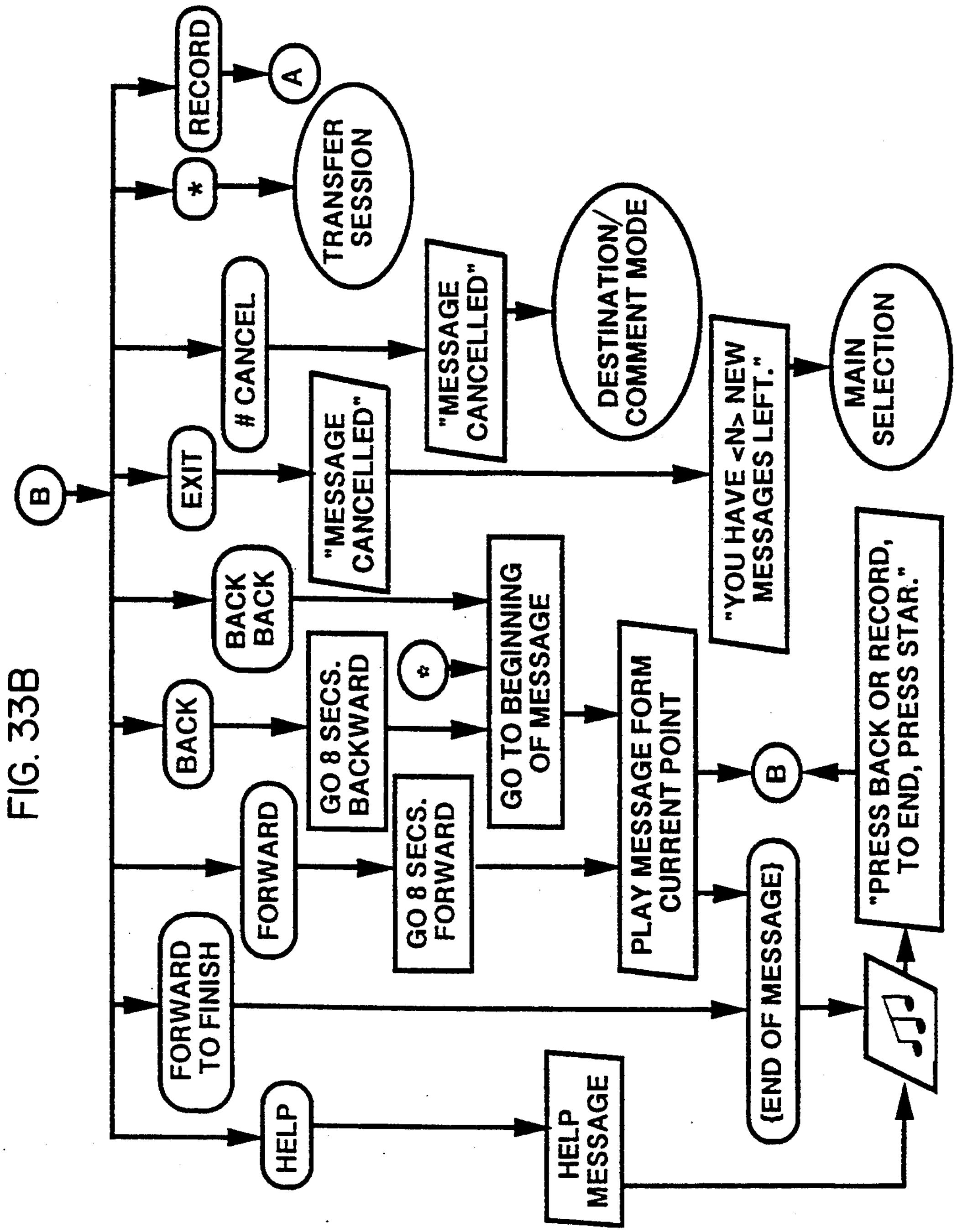
Figure 34A:
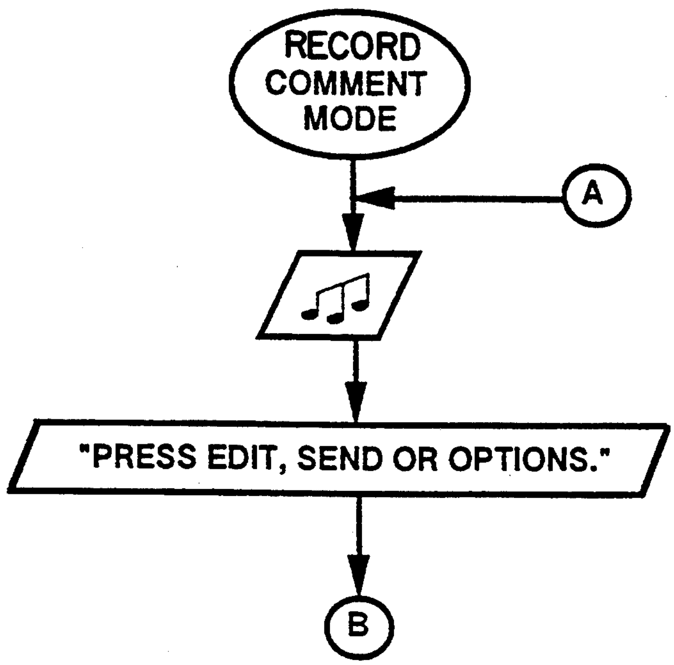
Figure 34B:
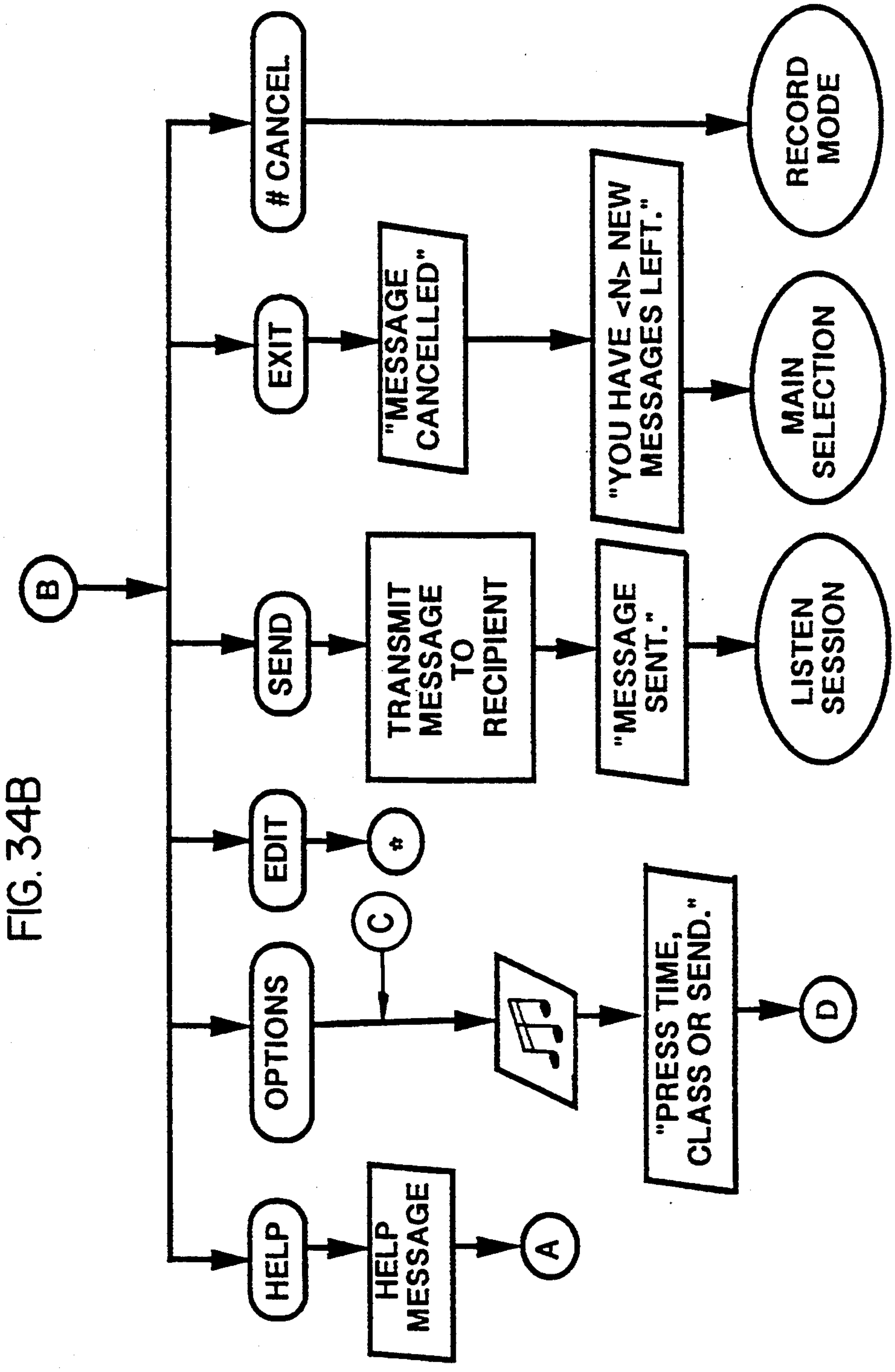
Figure 34C:
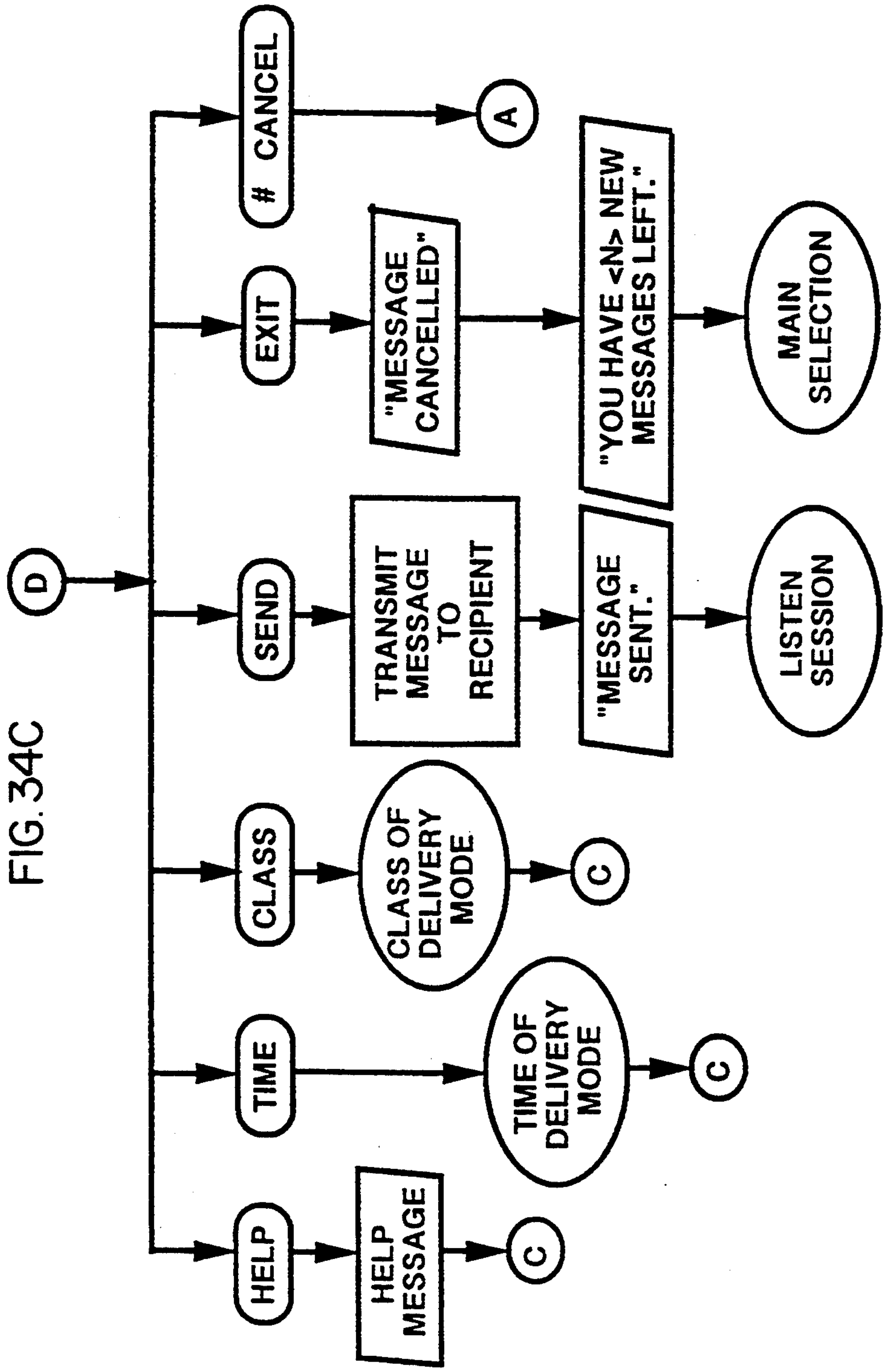
Figure 35A:
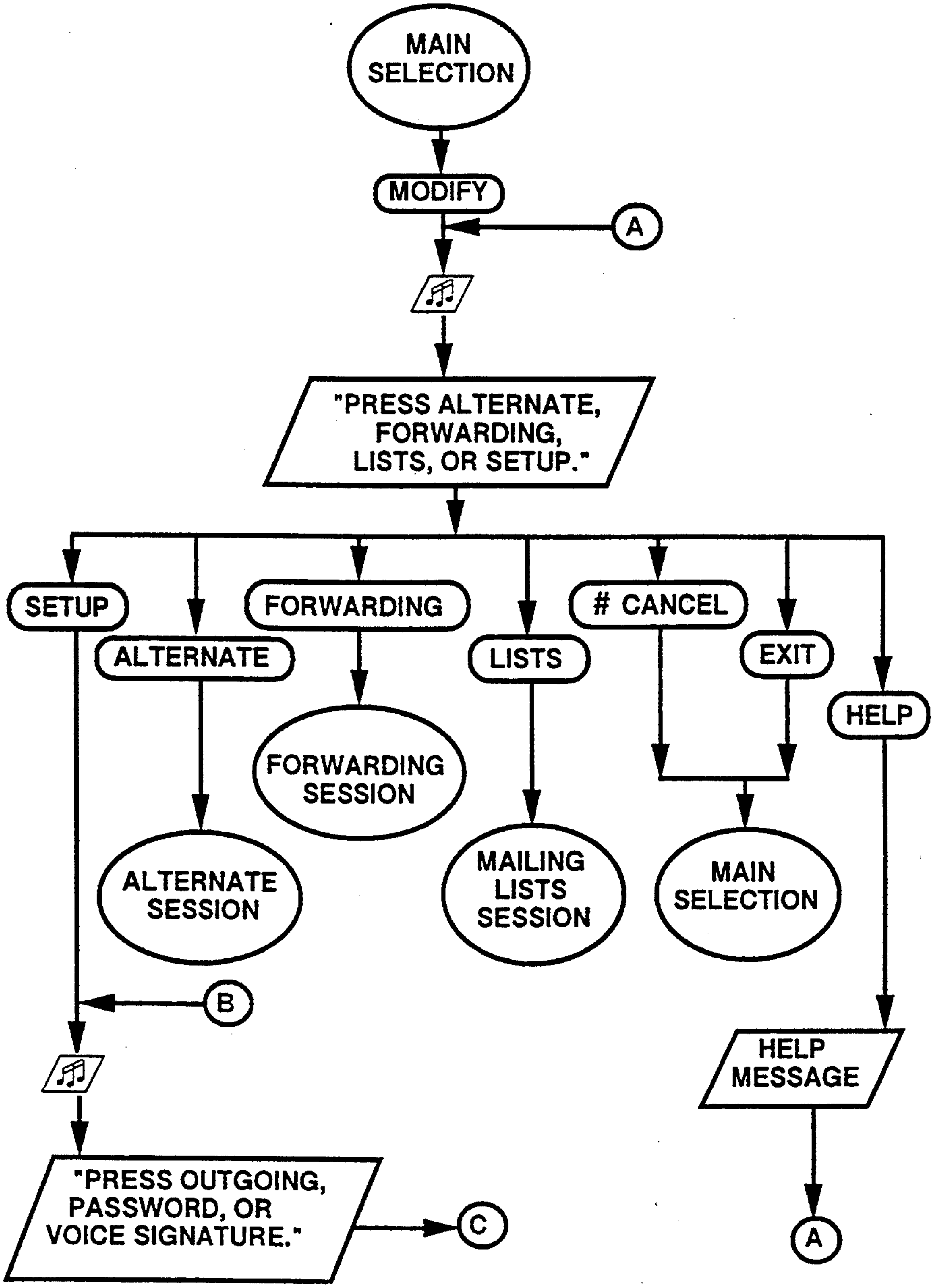
Figure 35B:
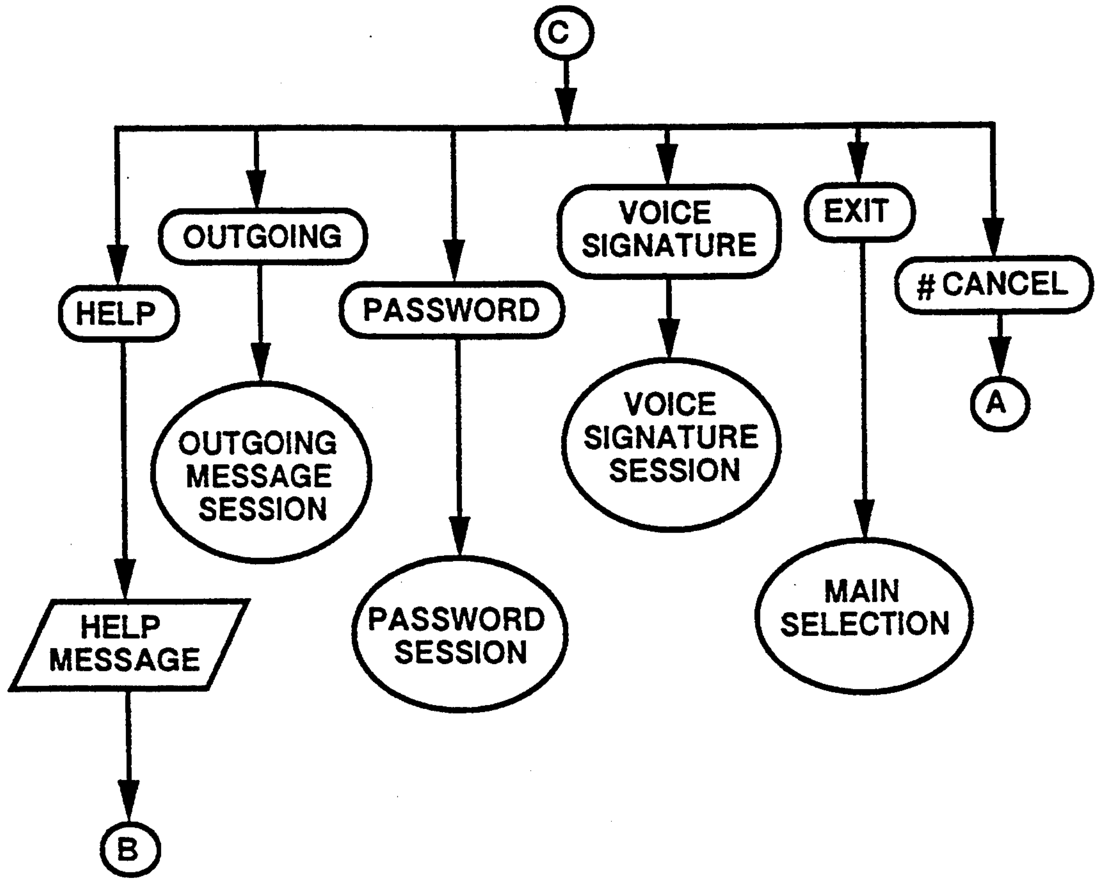
Figure 36A:
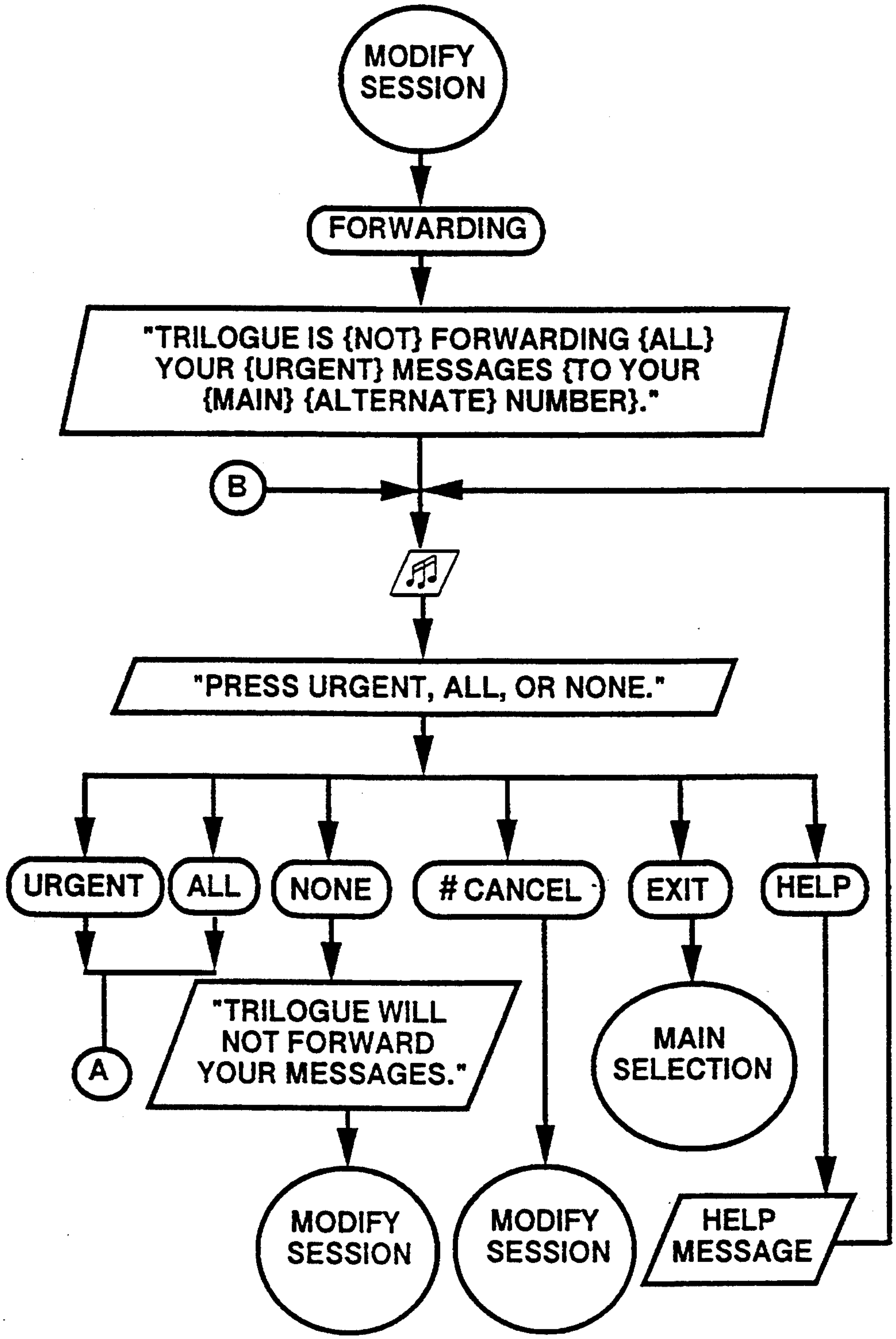
Figure 36B:
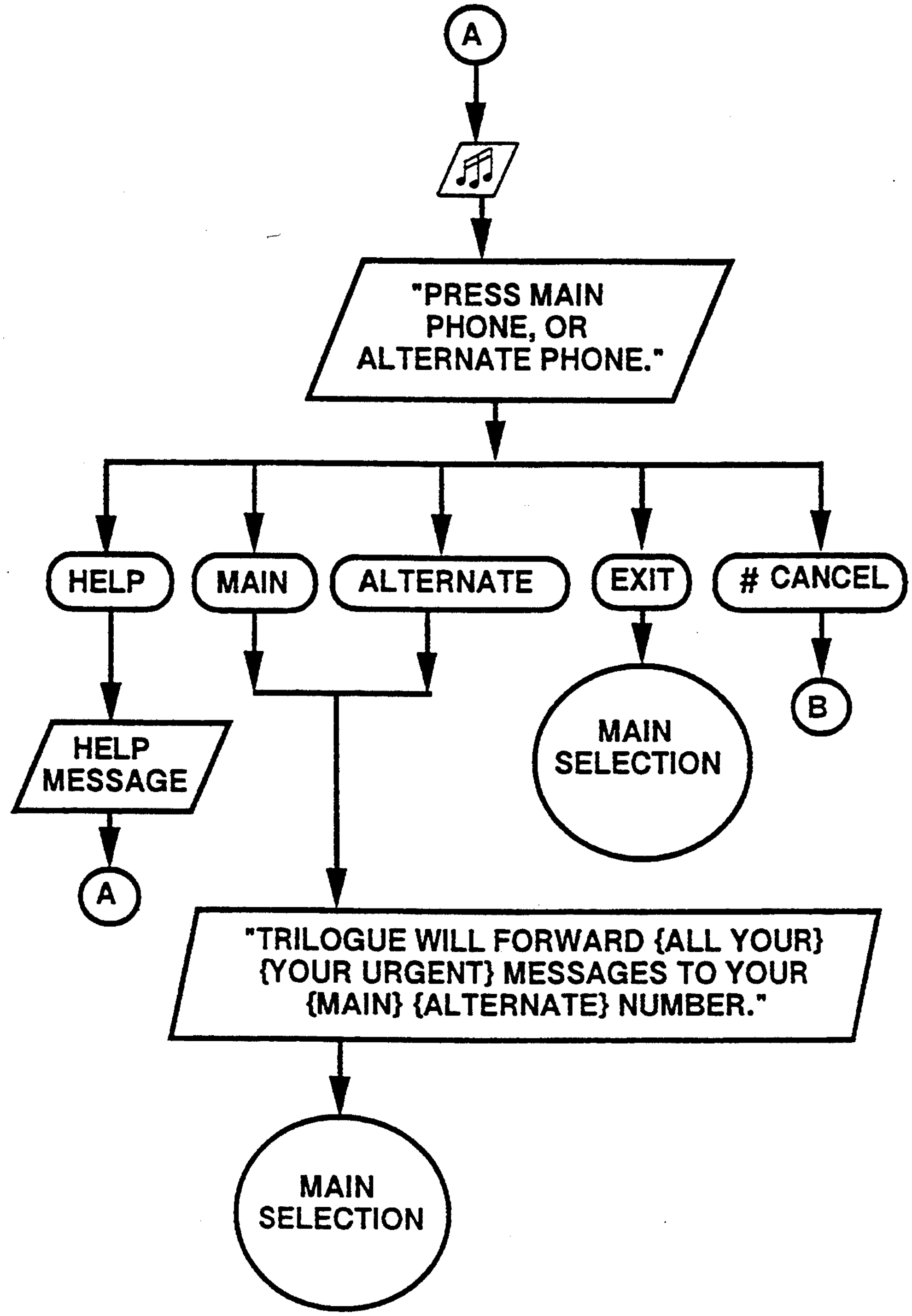
Figure 37A:
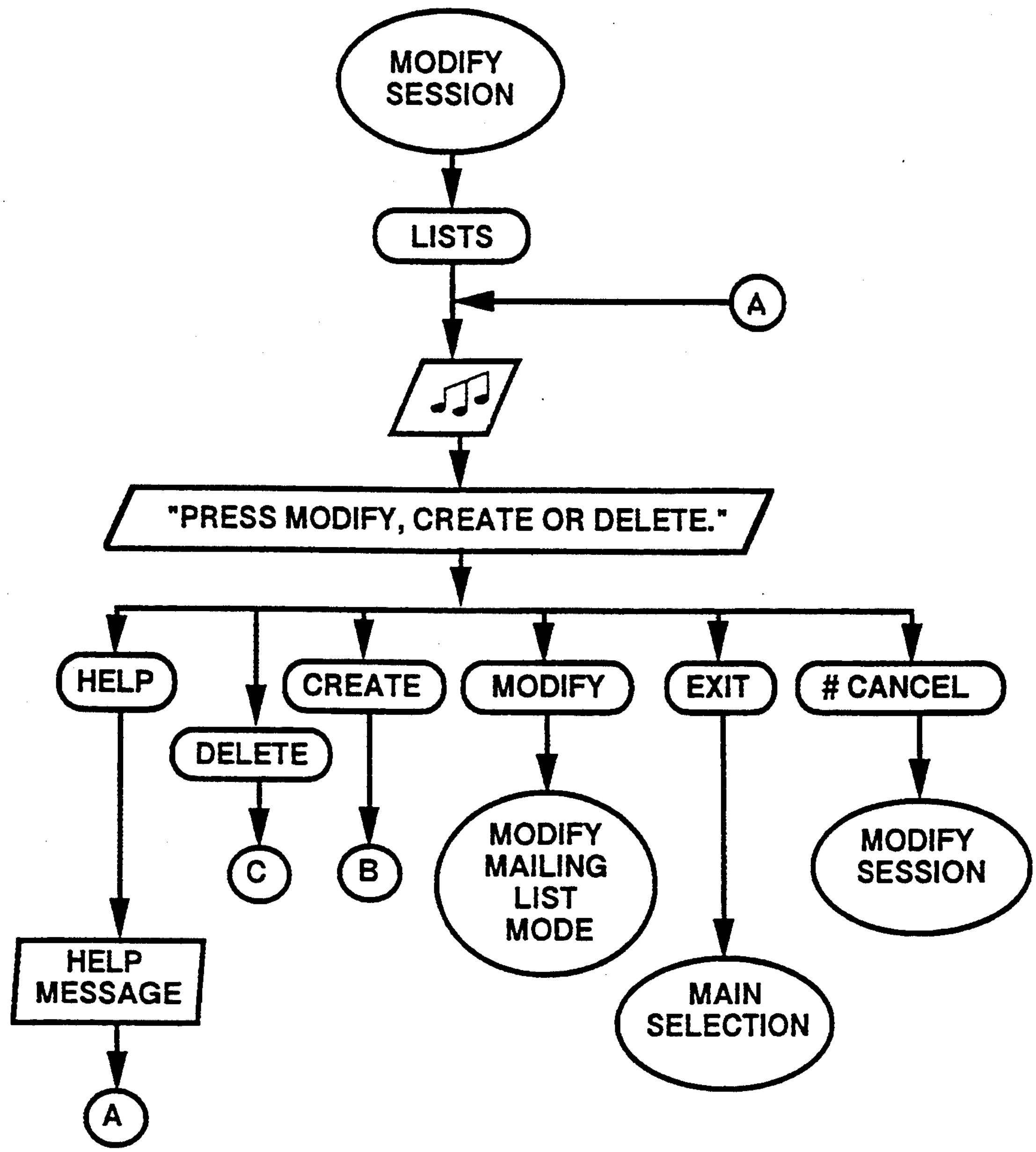
Figure 37B:
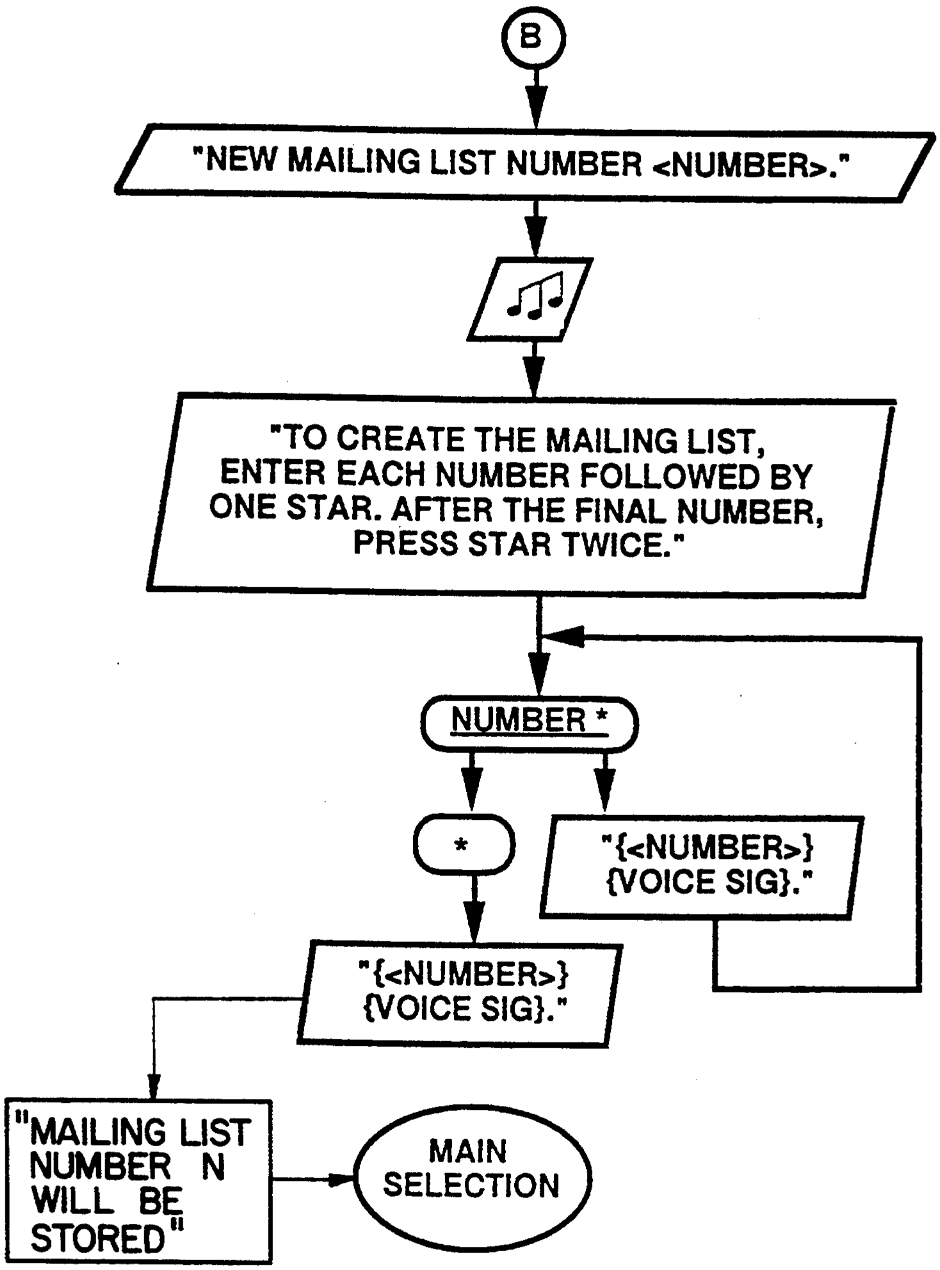
Figure 37C:
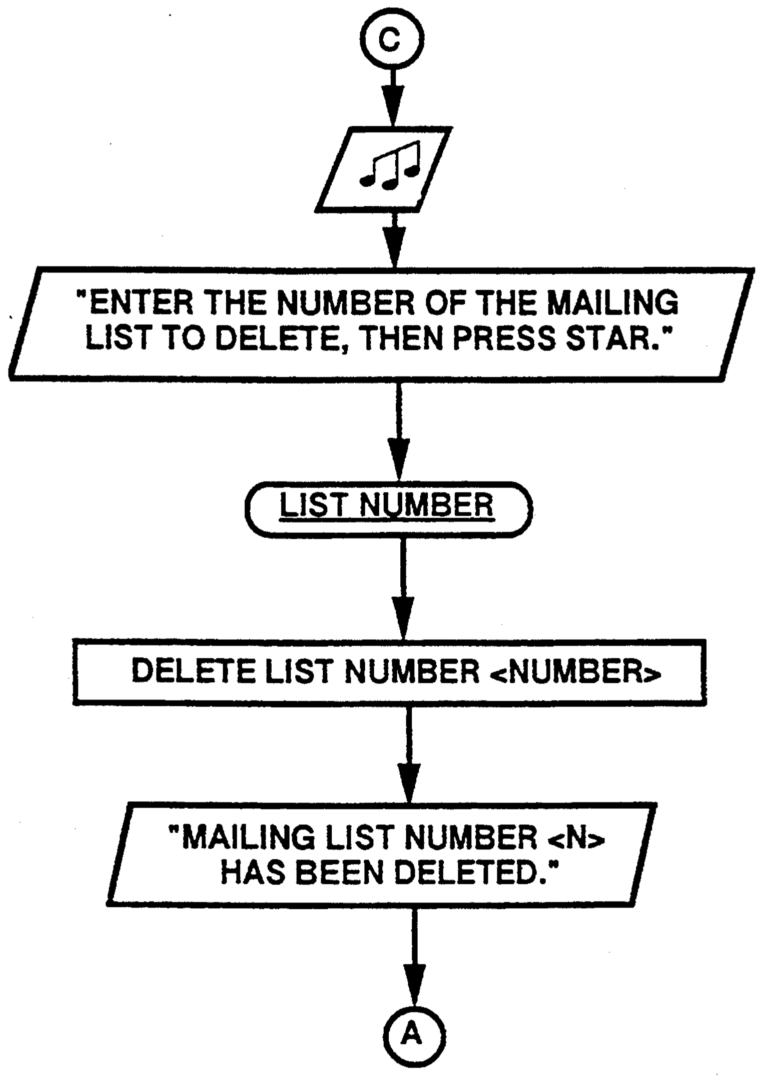
Figure 38A:
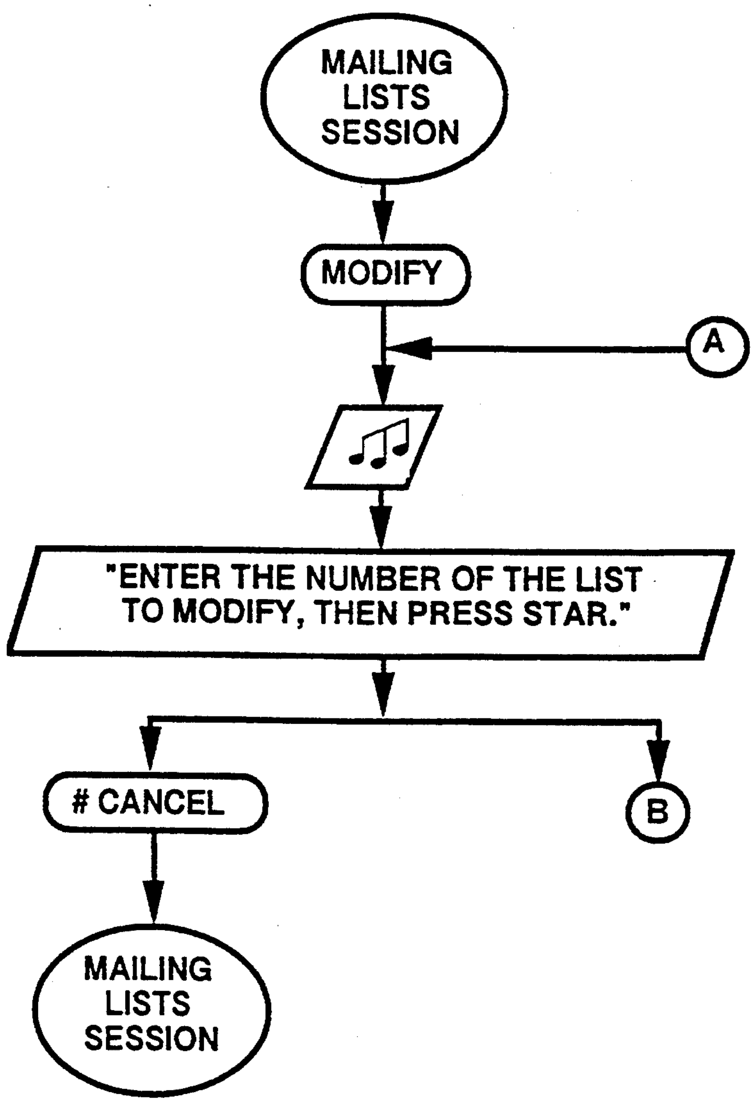
Figure 38B:
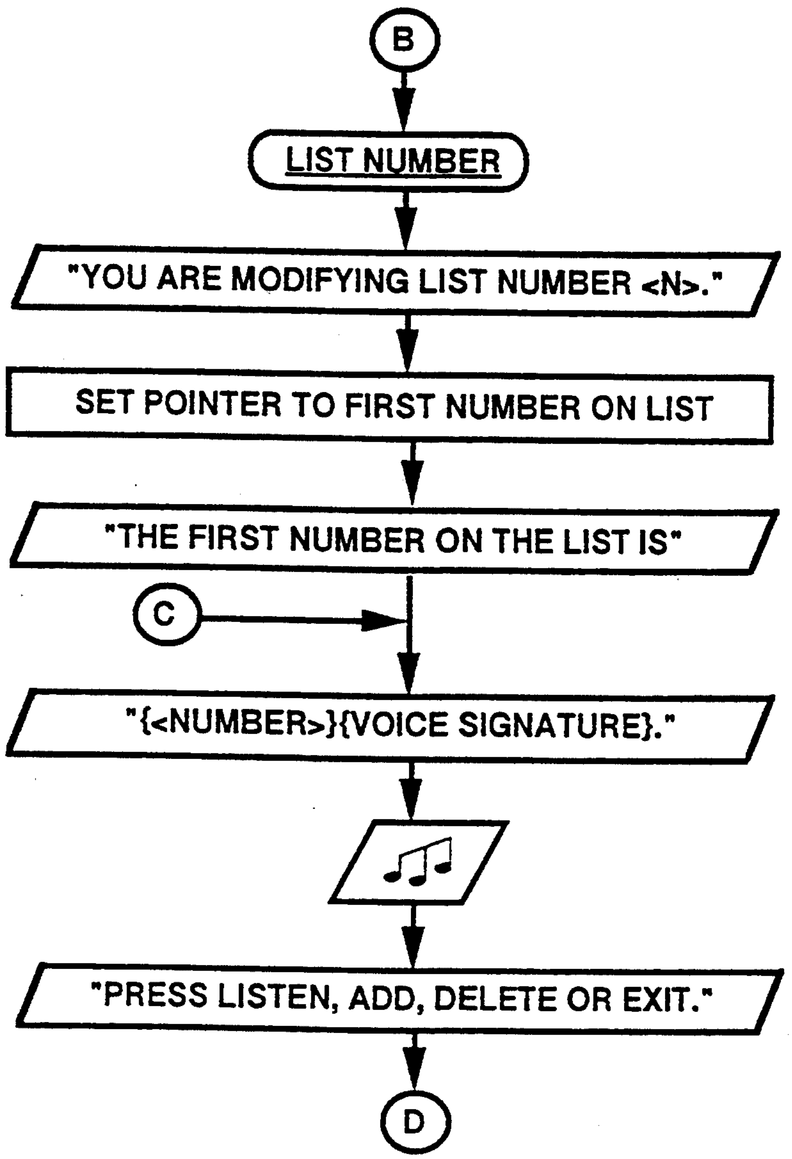
Figure 38C:
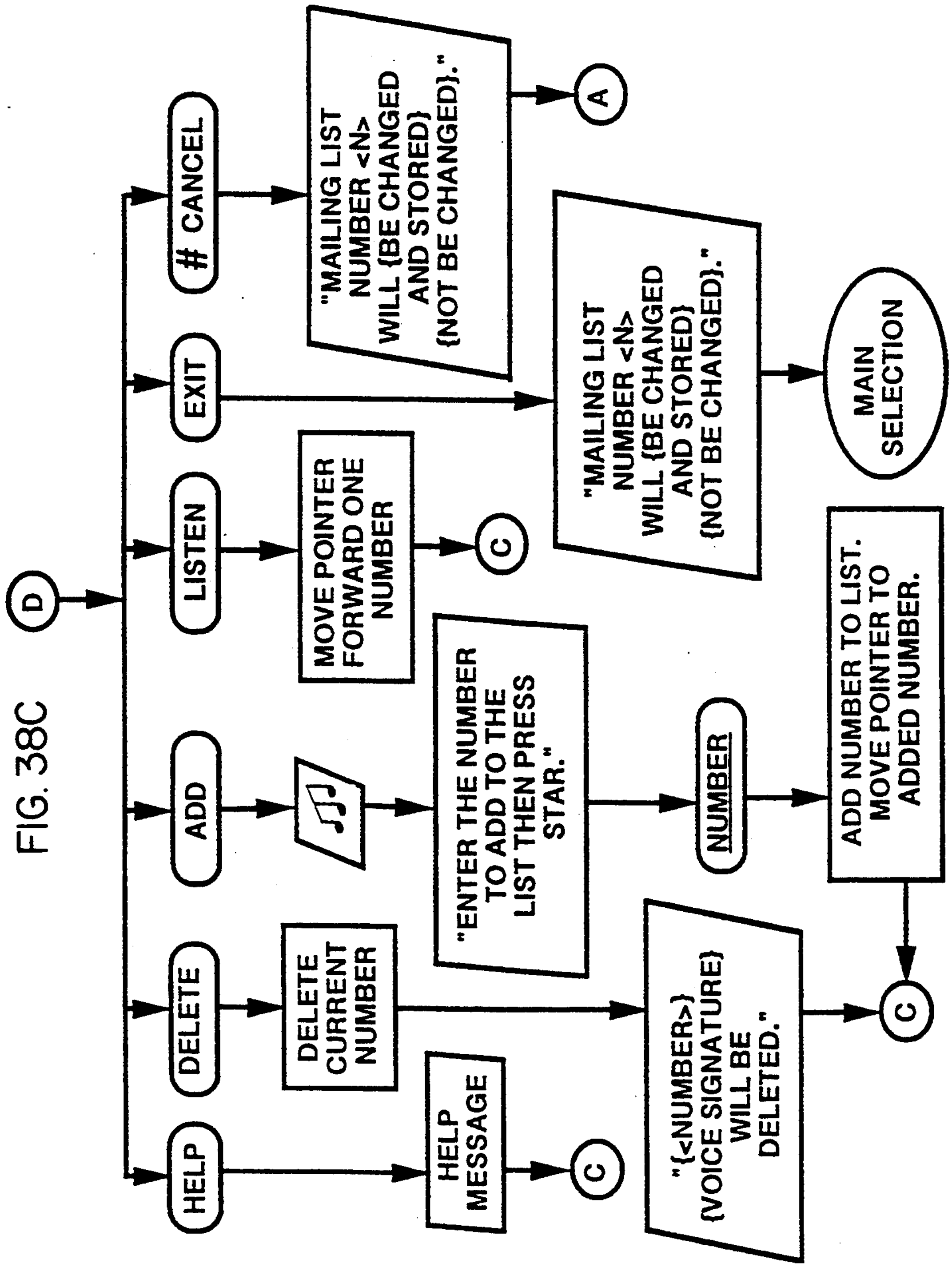
Figure 39A:
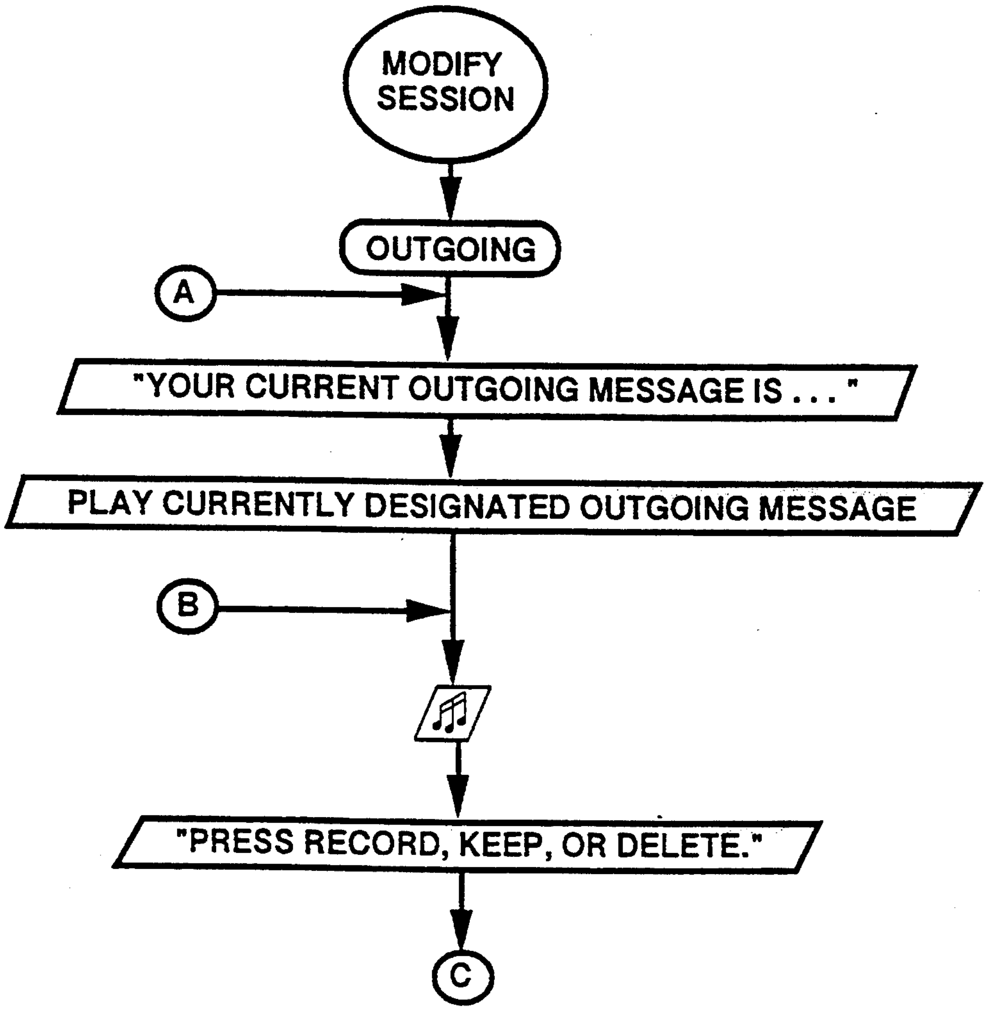
Figure 39B:
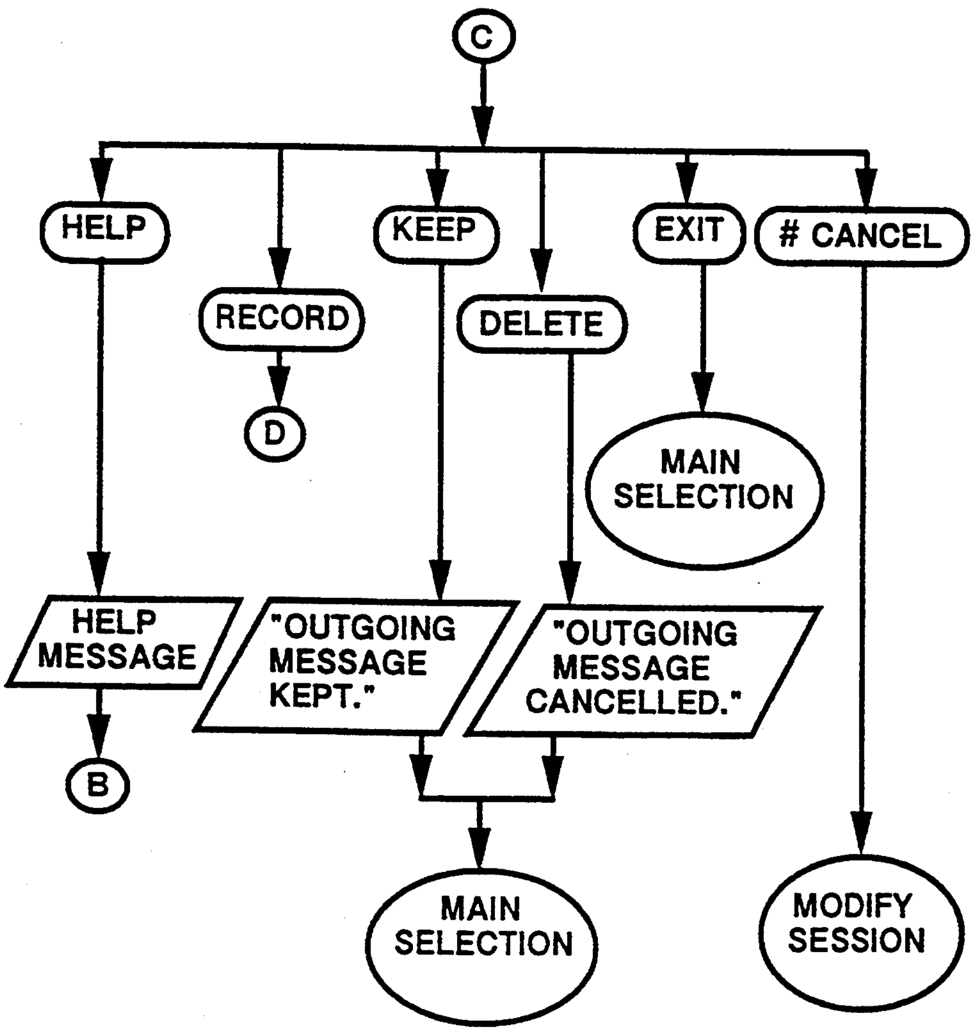
Figure 39C:
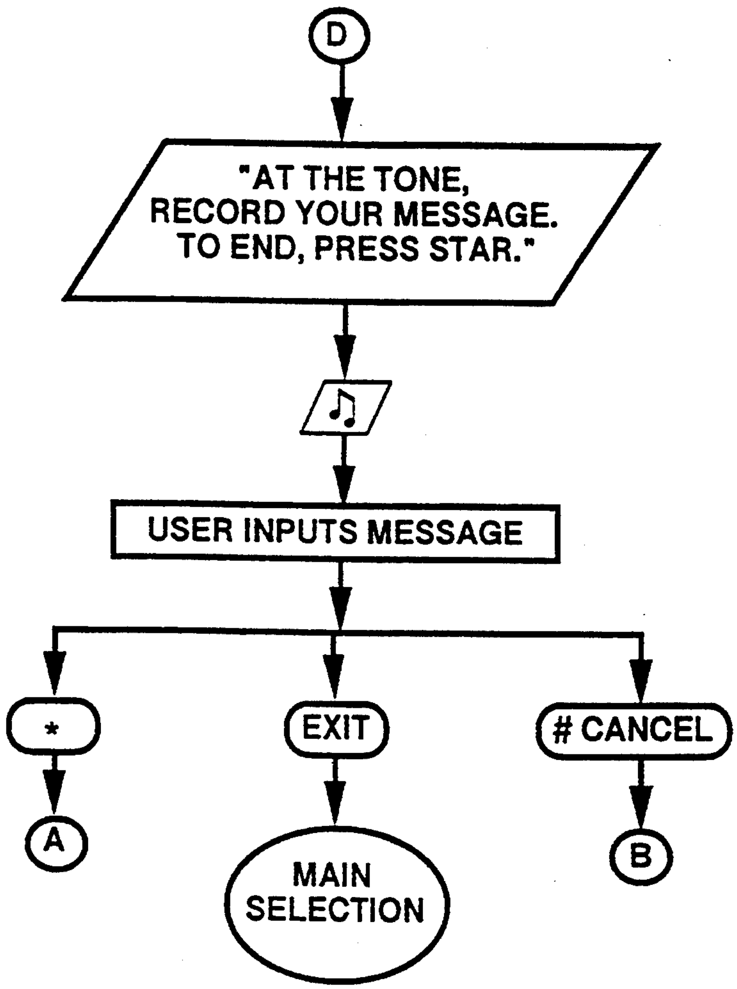
Figure 40A:
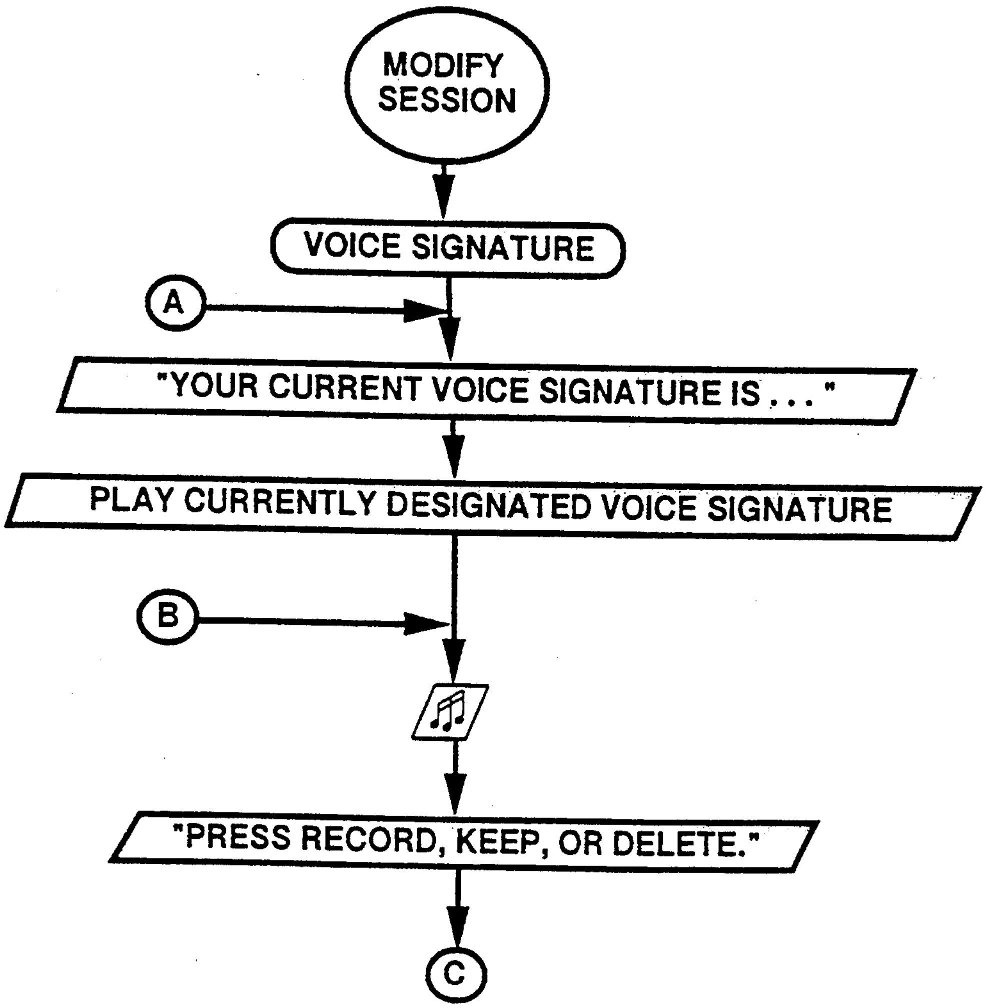
Figure 40B:
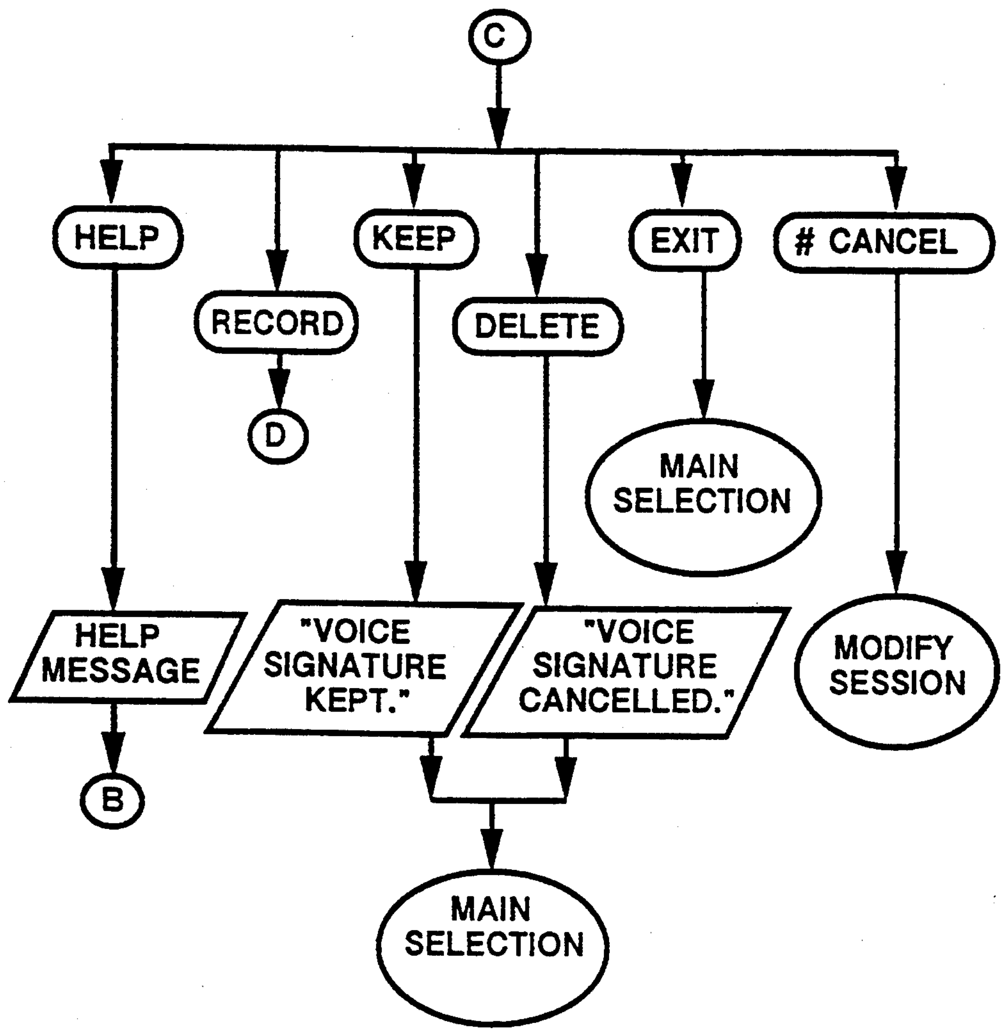
Figure 40C:
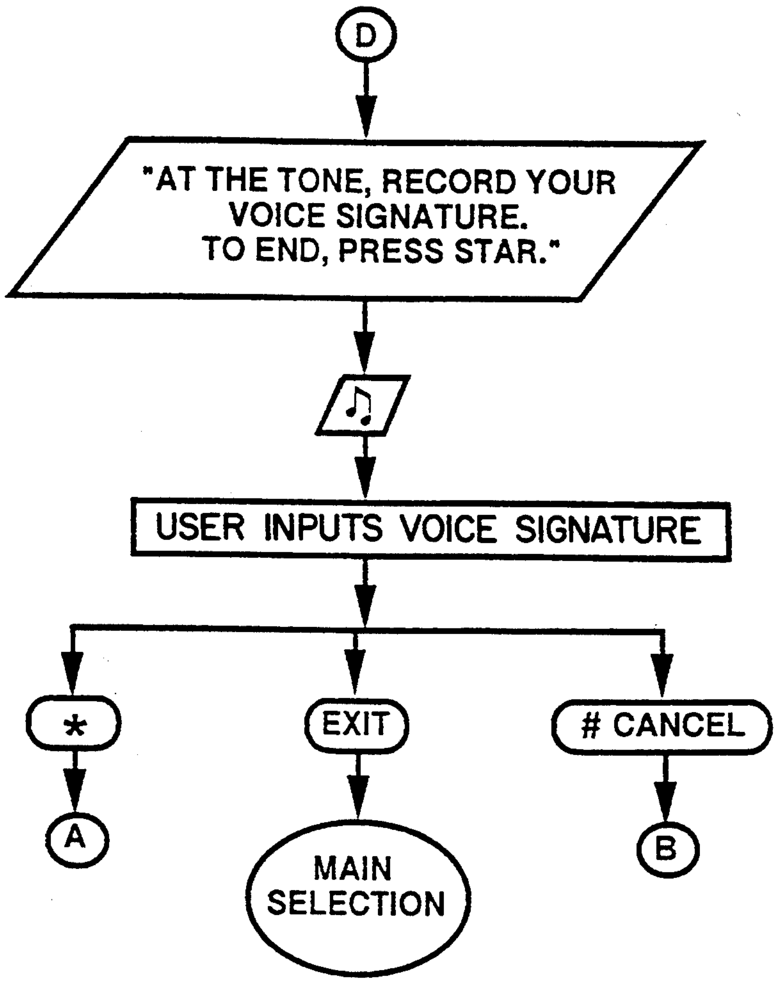
Figure 41A:
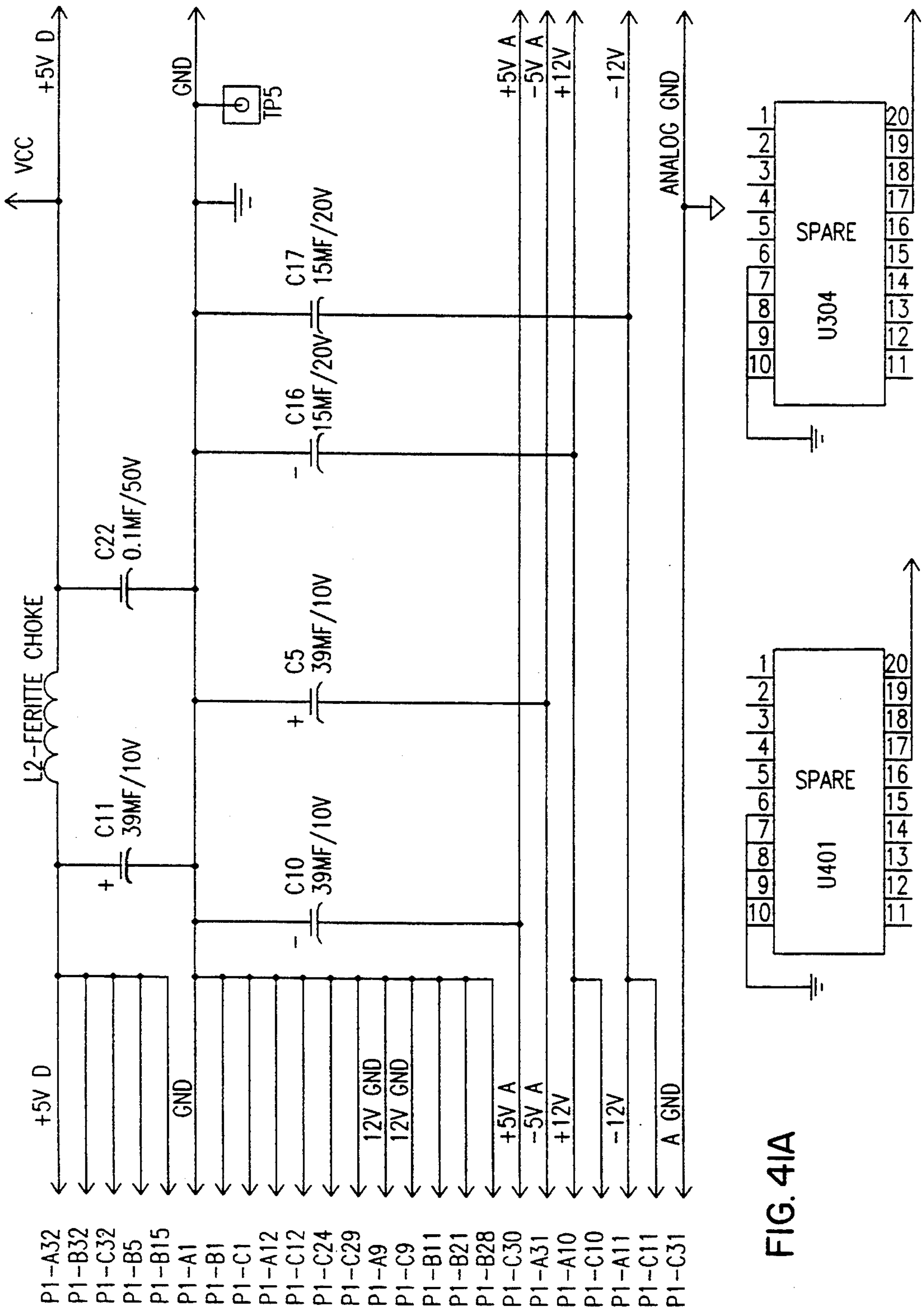
FIGS. 41A–41D are schematic illustrations of a facsimile processing unit (FPU) constructed and operative in accordance with a preferred embodiment of the present invention.
Figure 41B:
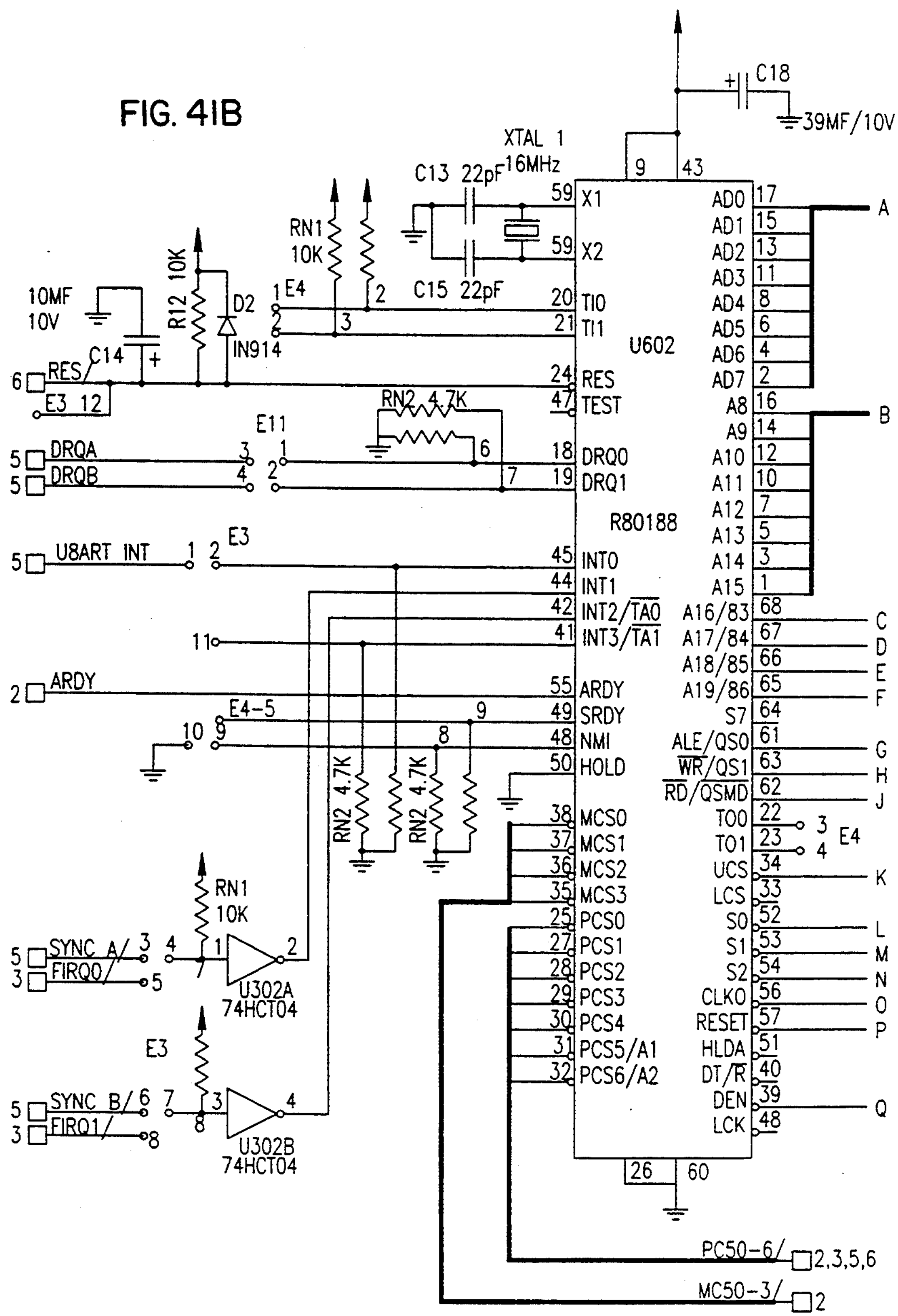
Figure 41C:
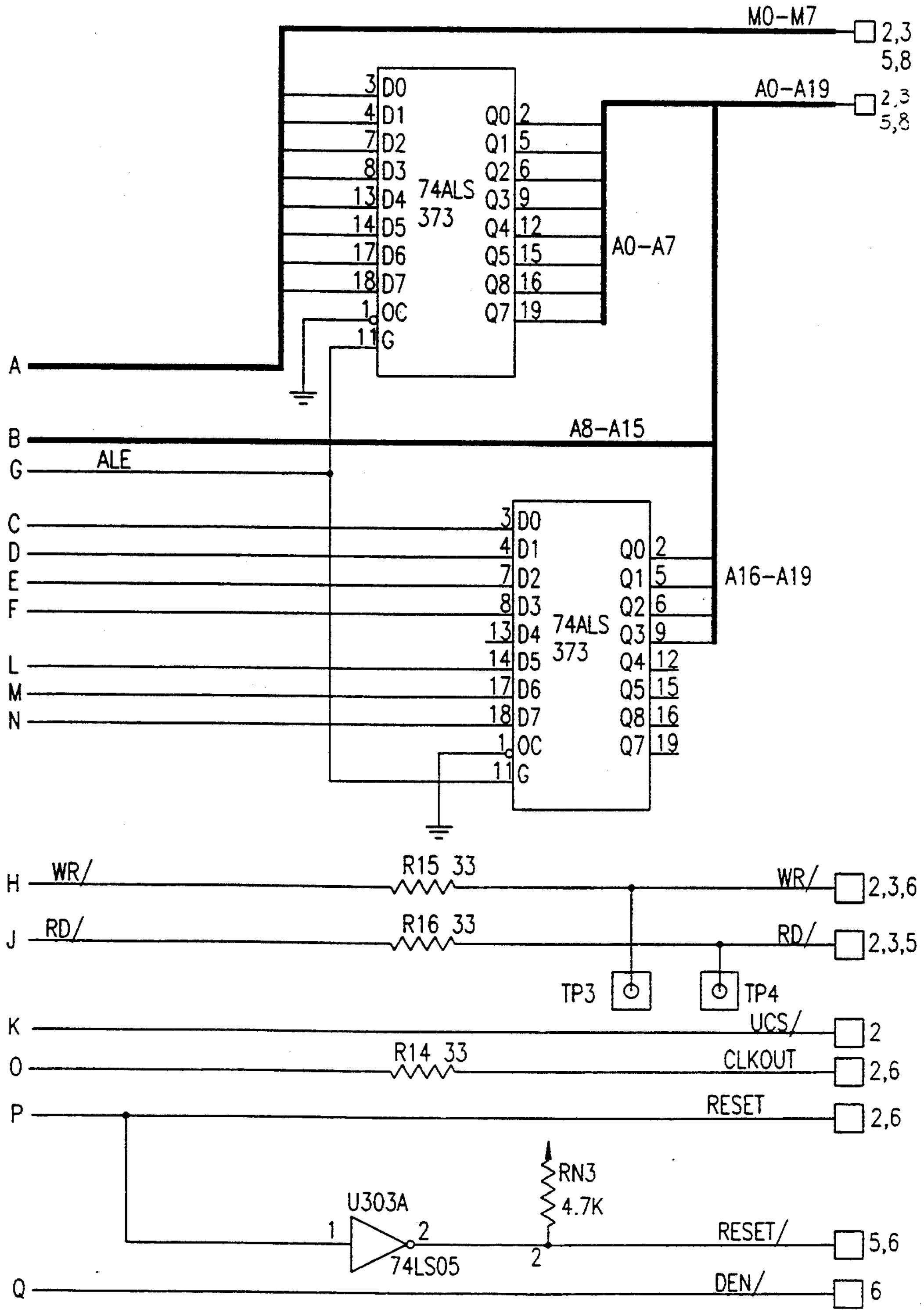
Figure 41D:
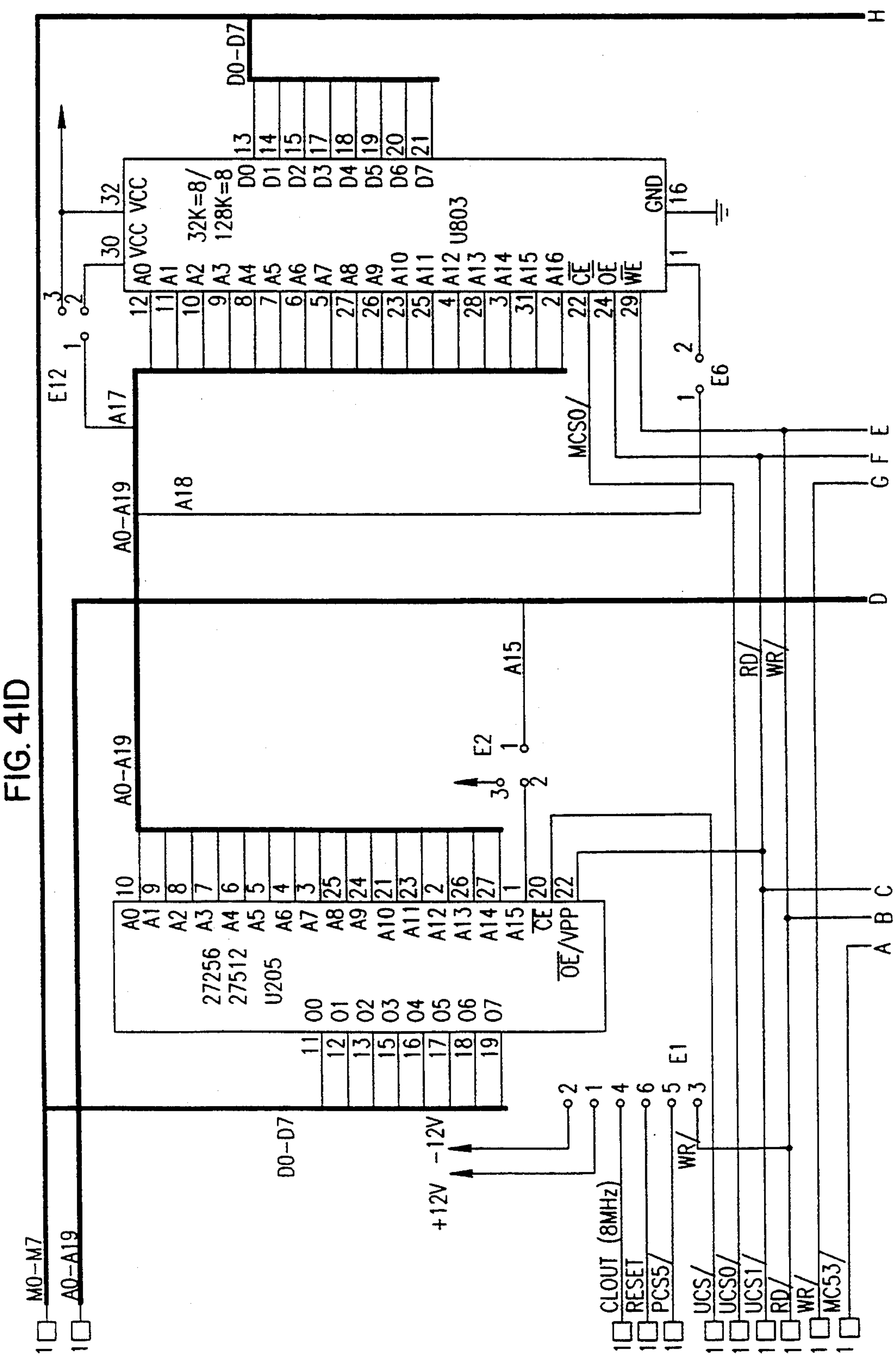
Figure 41E:
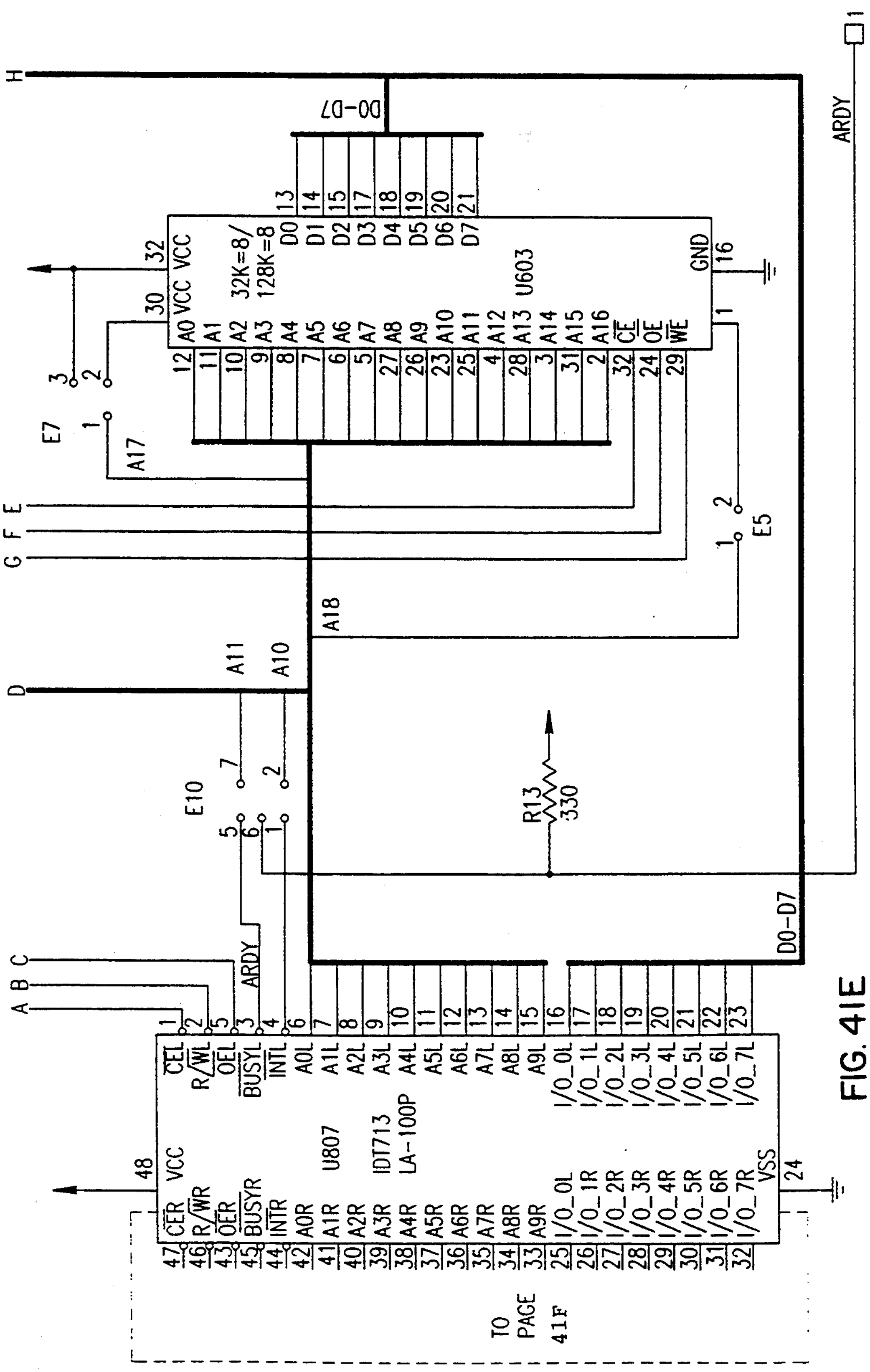
Figure 41F:
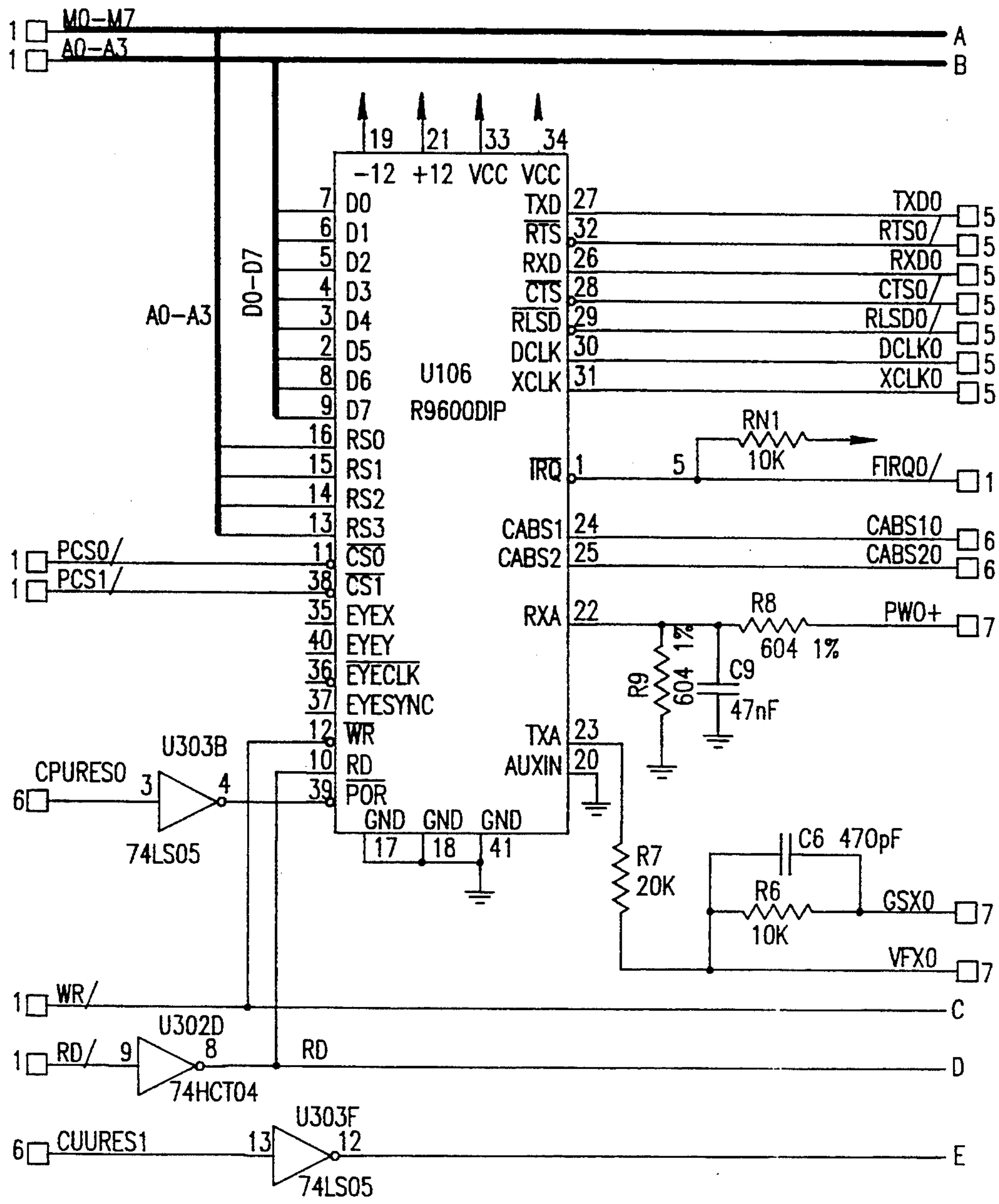
Figure 41G:
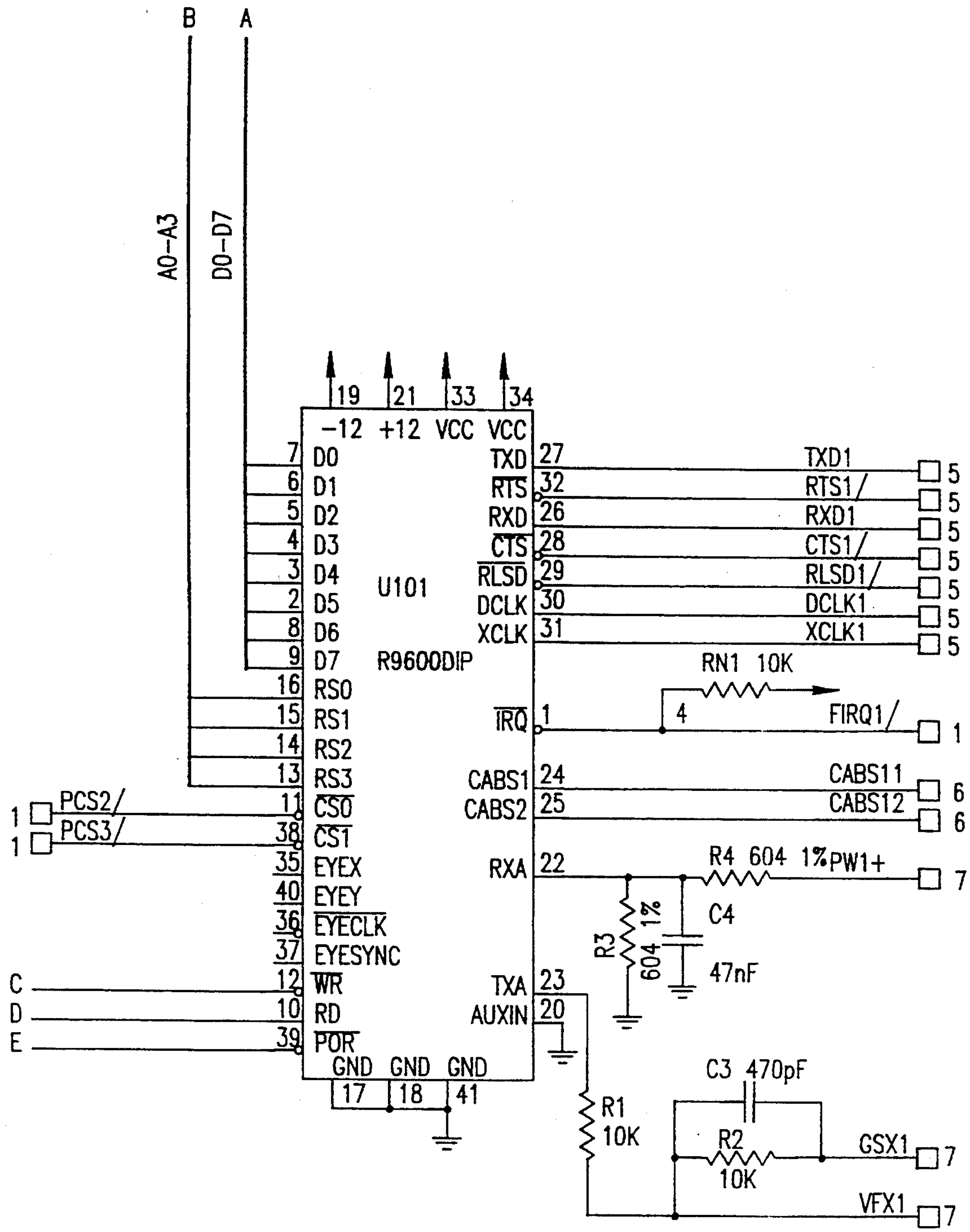
Figure 4I:
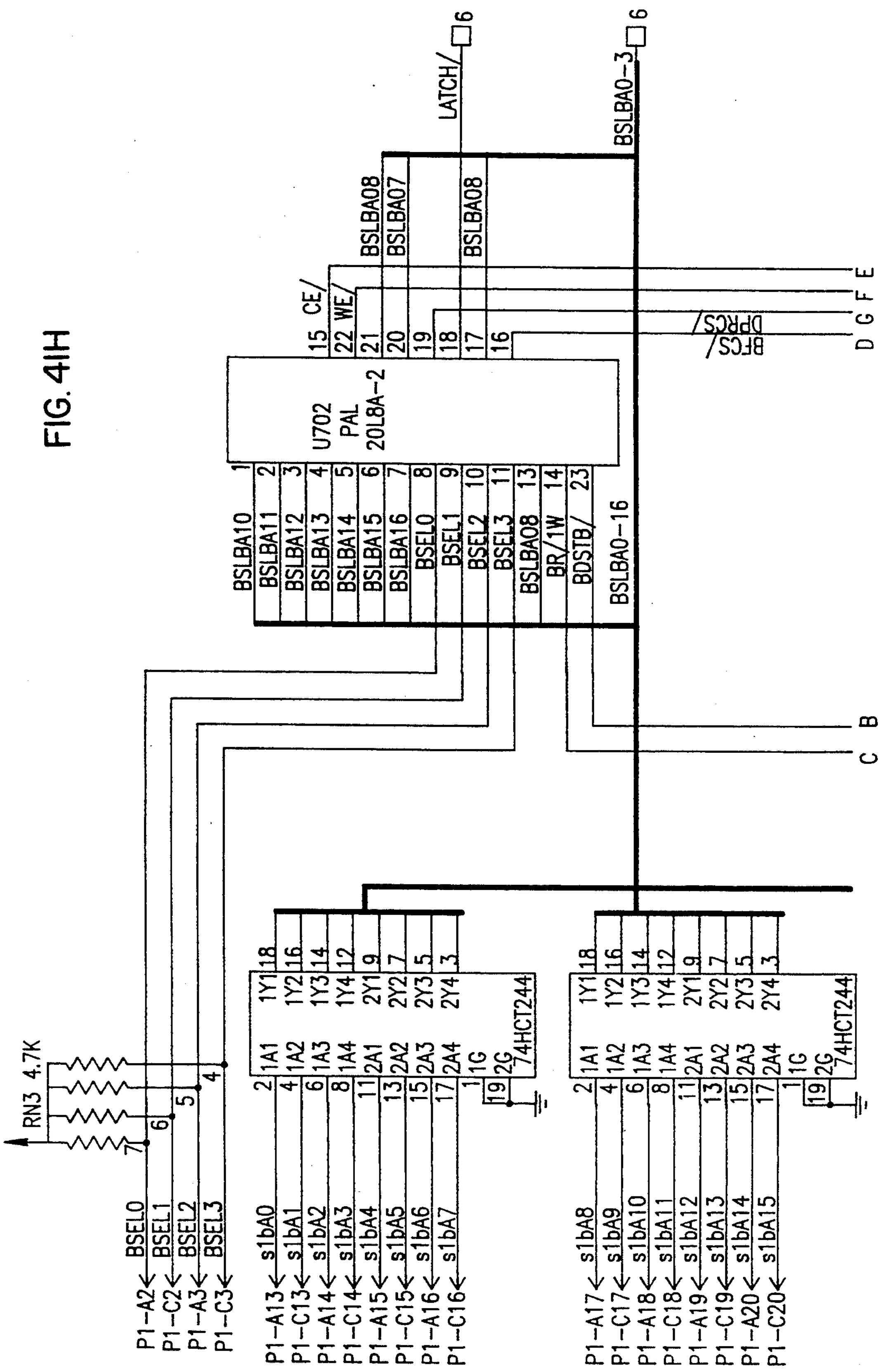
Figure 41I:
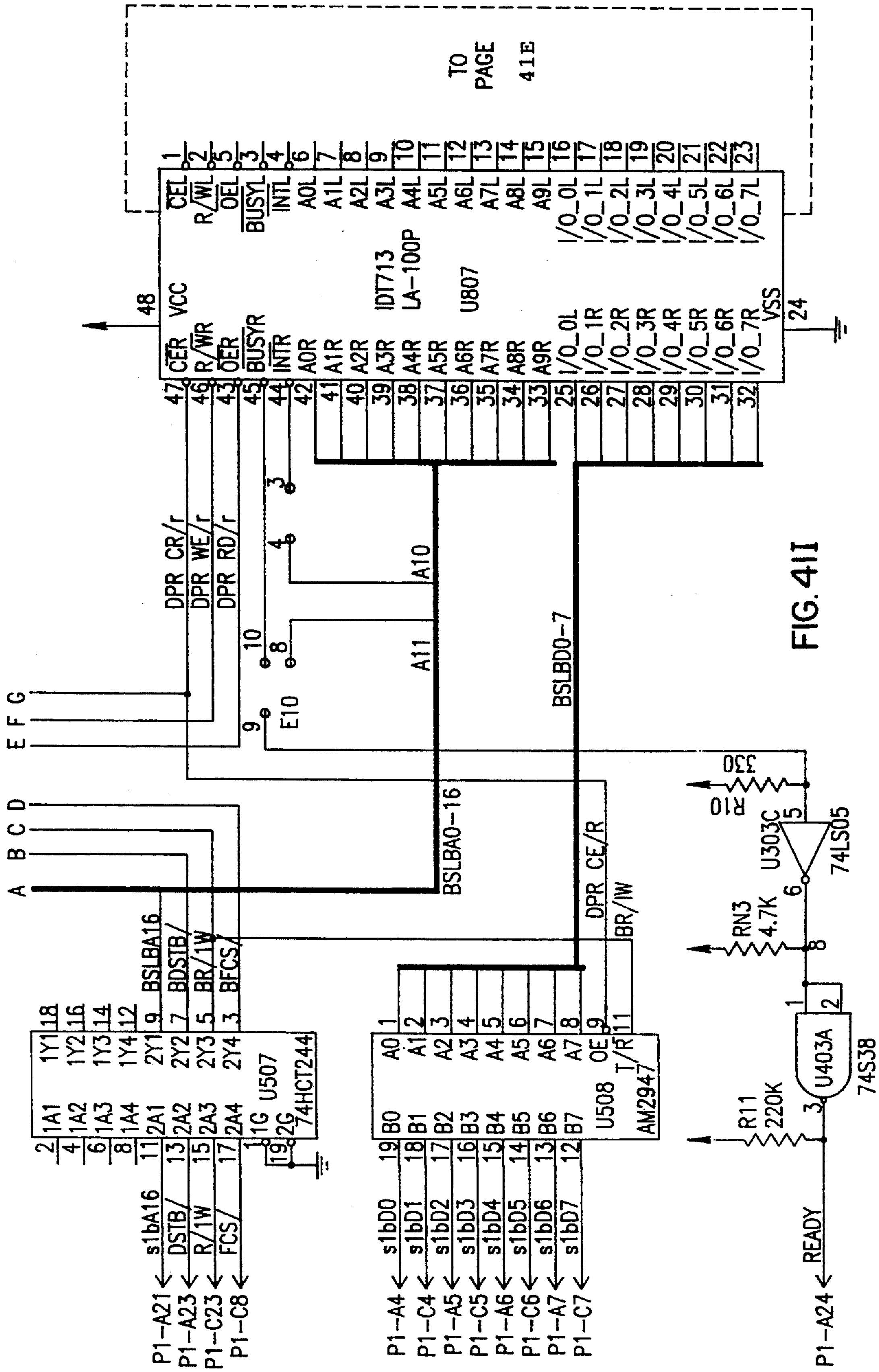
Figure 4I:
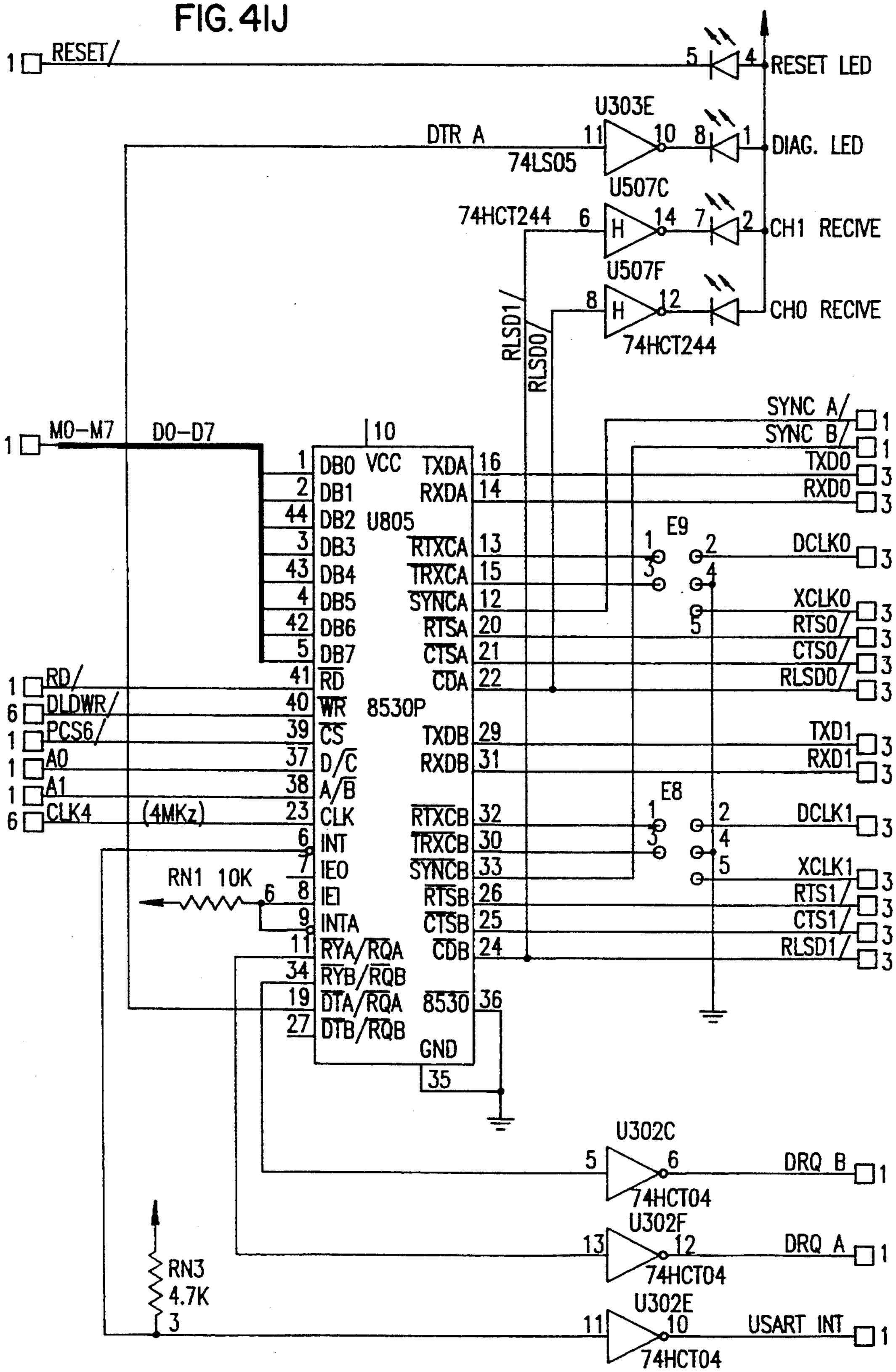
Figure 4I:
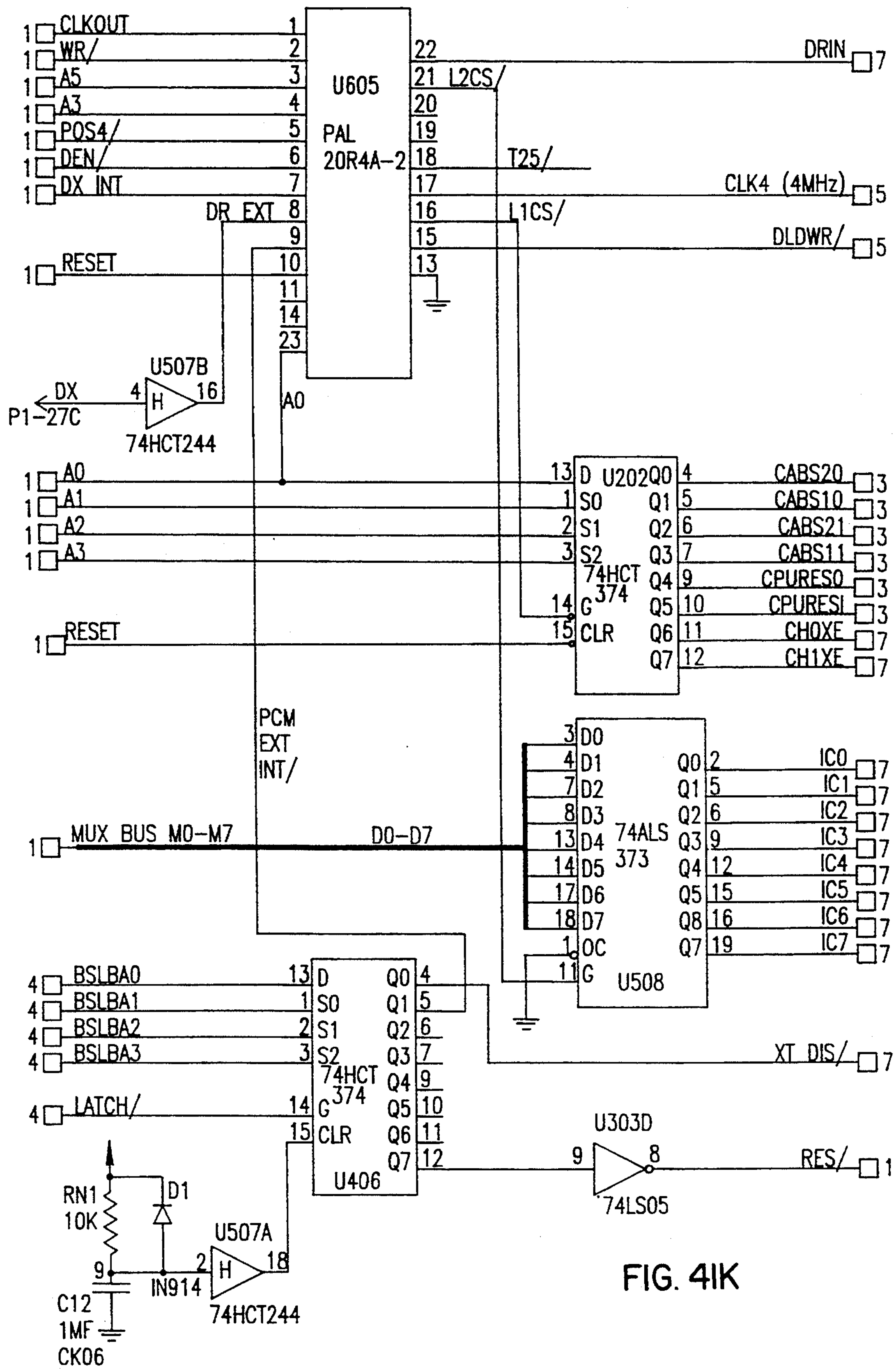
Figure 41L:
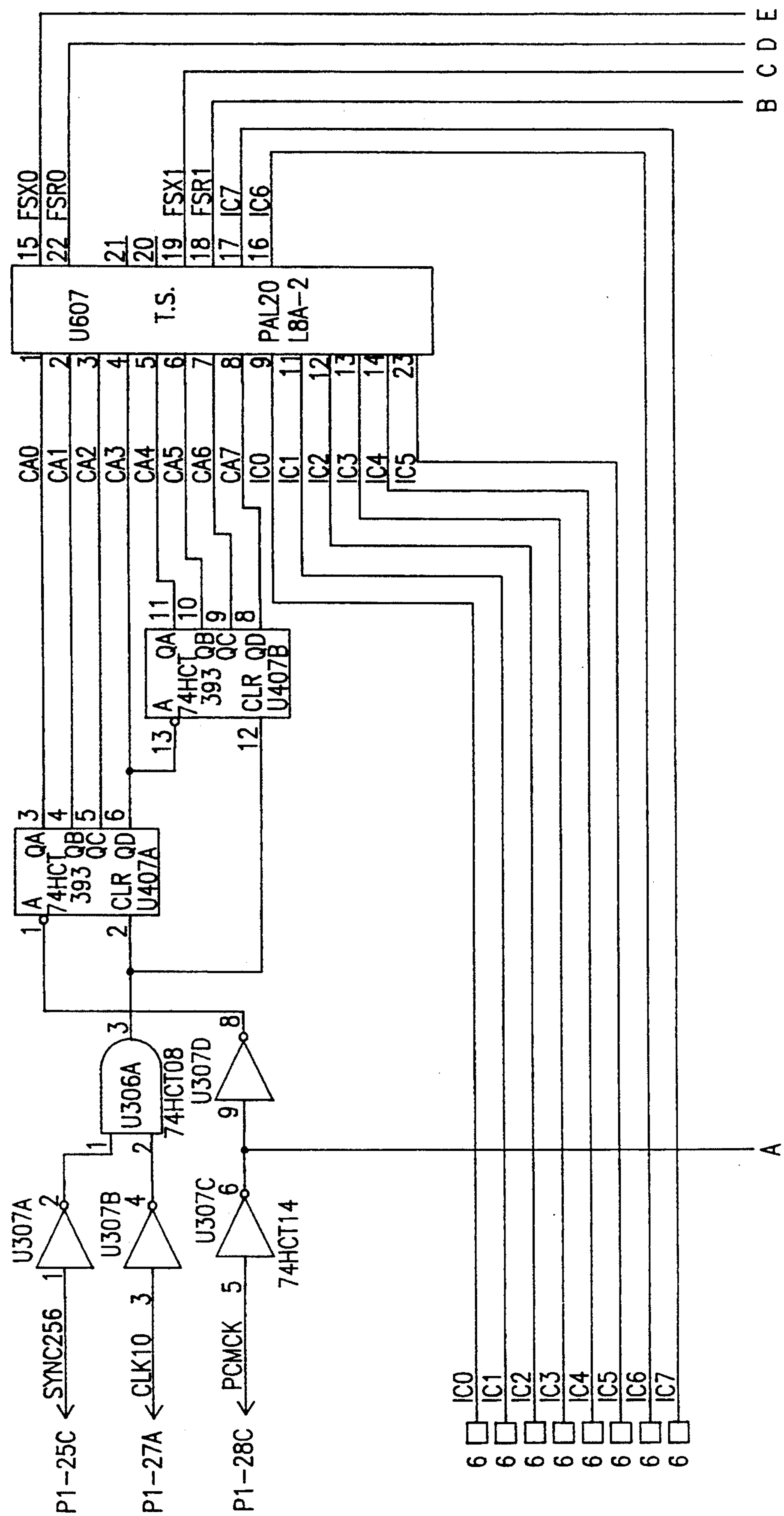
Figure 4I:
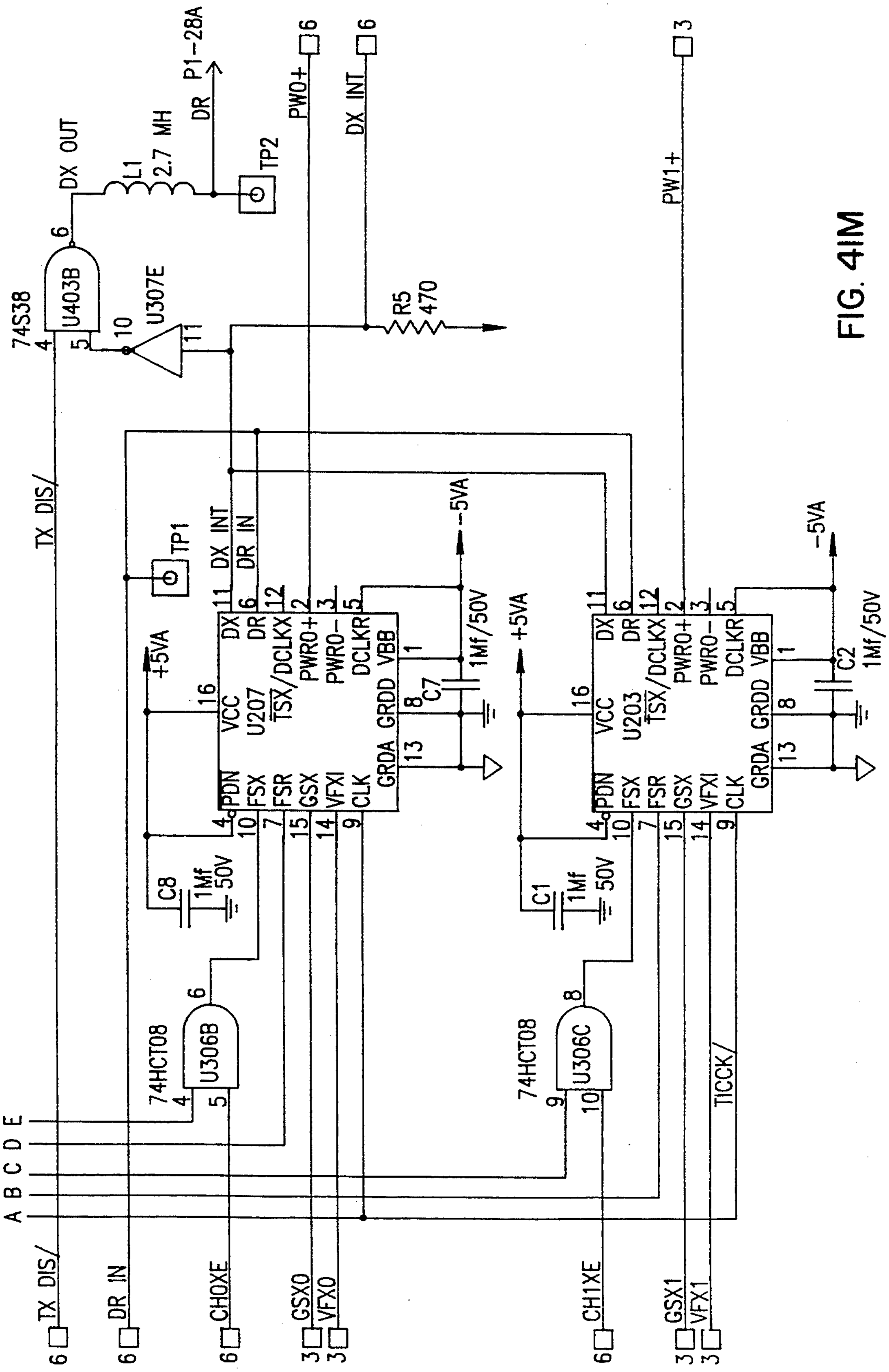
Figure 4I:
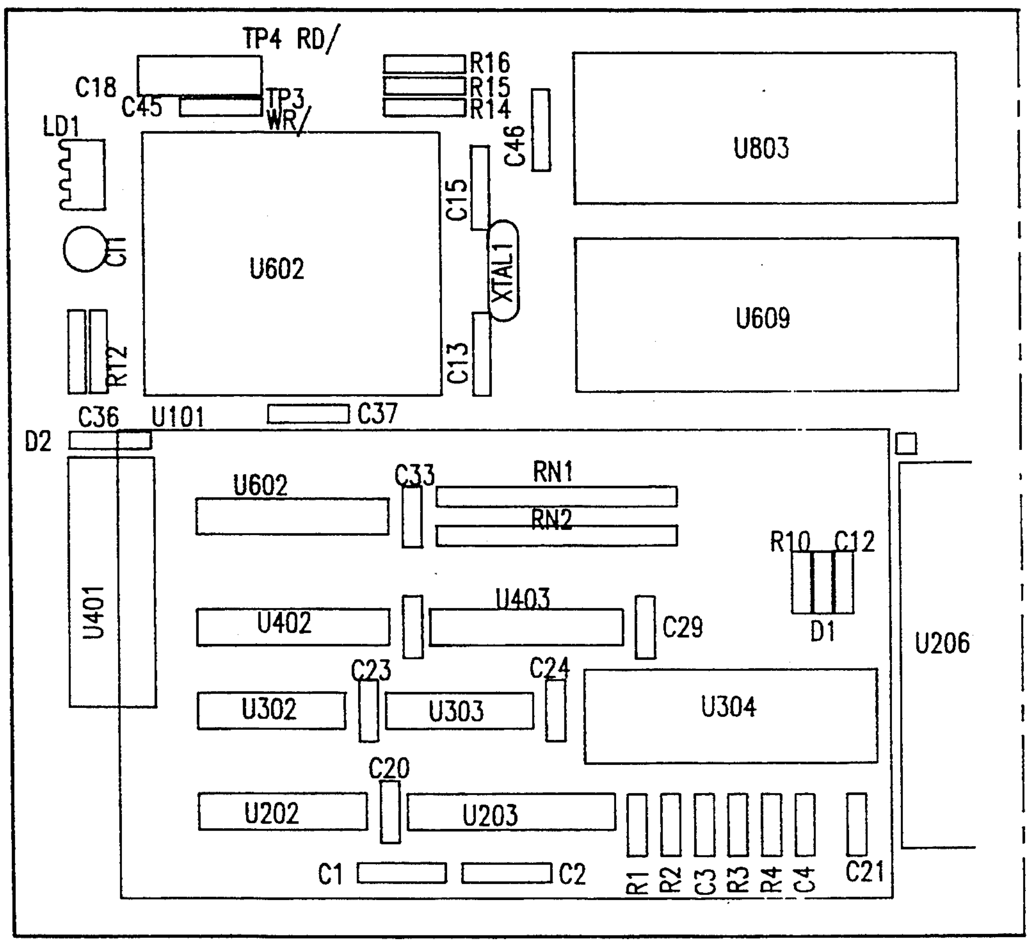
Figure 410:
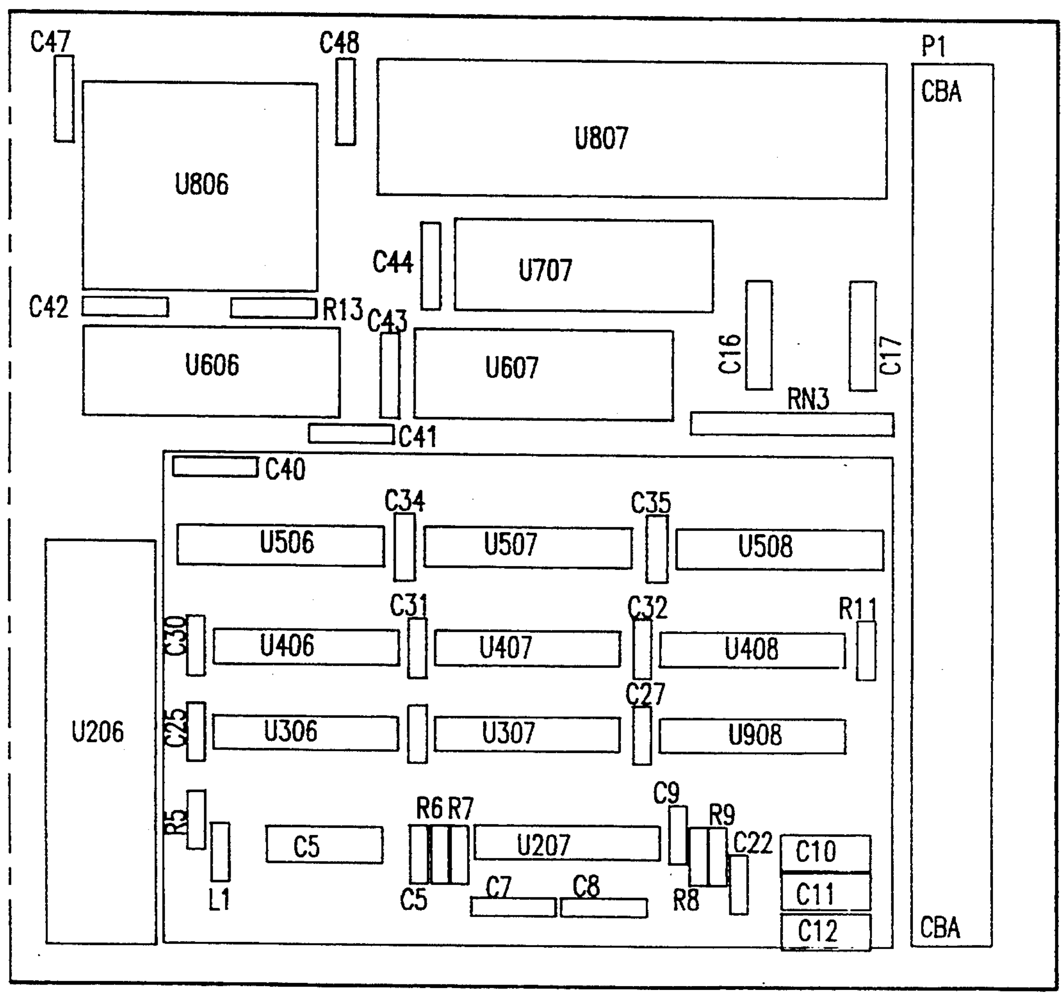
Figure 42A:
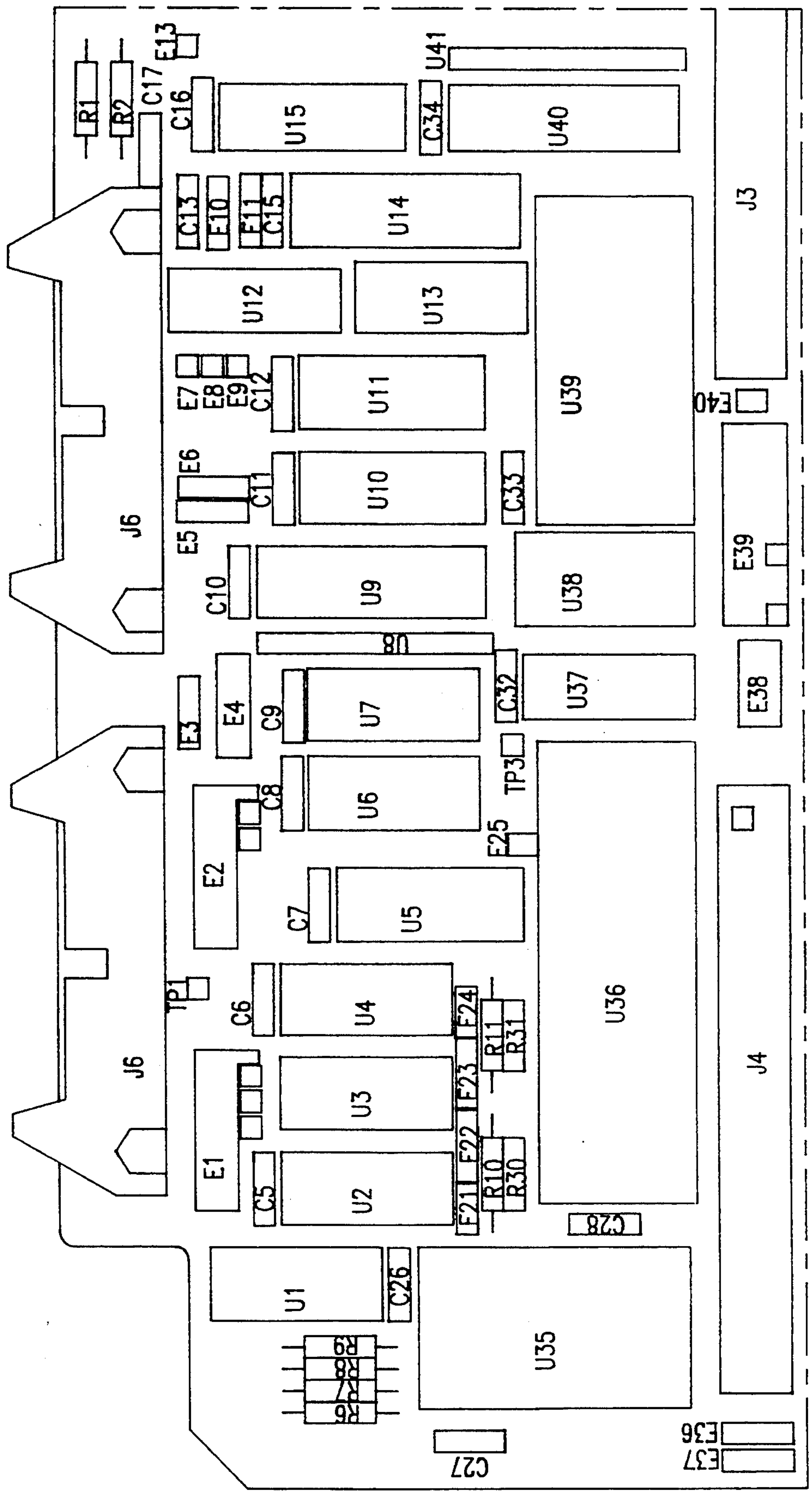
FIGS. 42A–42Y and 43A–43K are schematic illustrations of line control unit circuitry (LCU) constructed and operative in accordance with a preferred embodiment of the present invention.
Figure 42B:
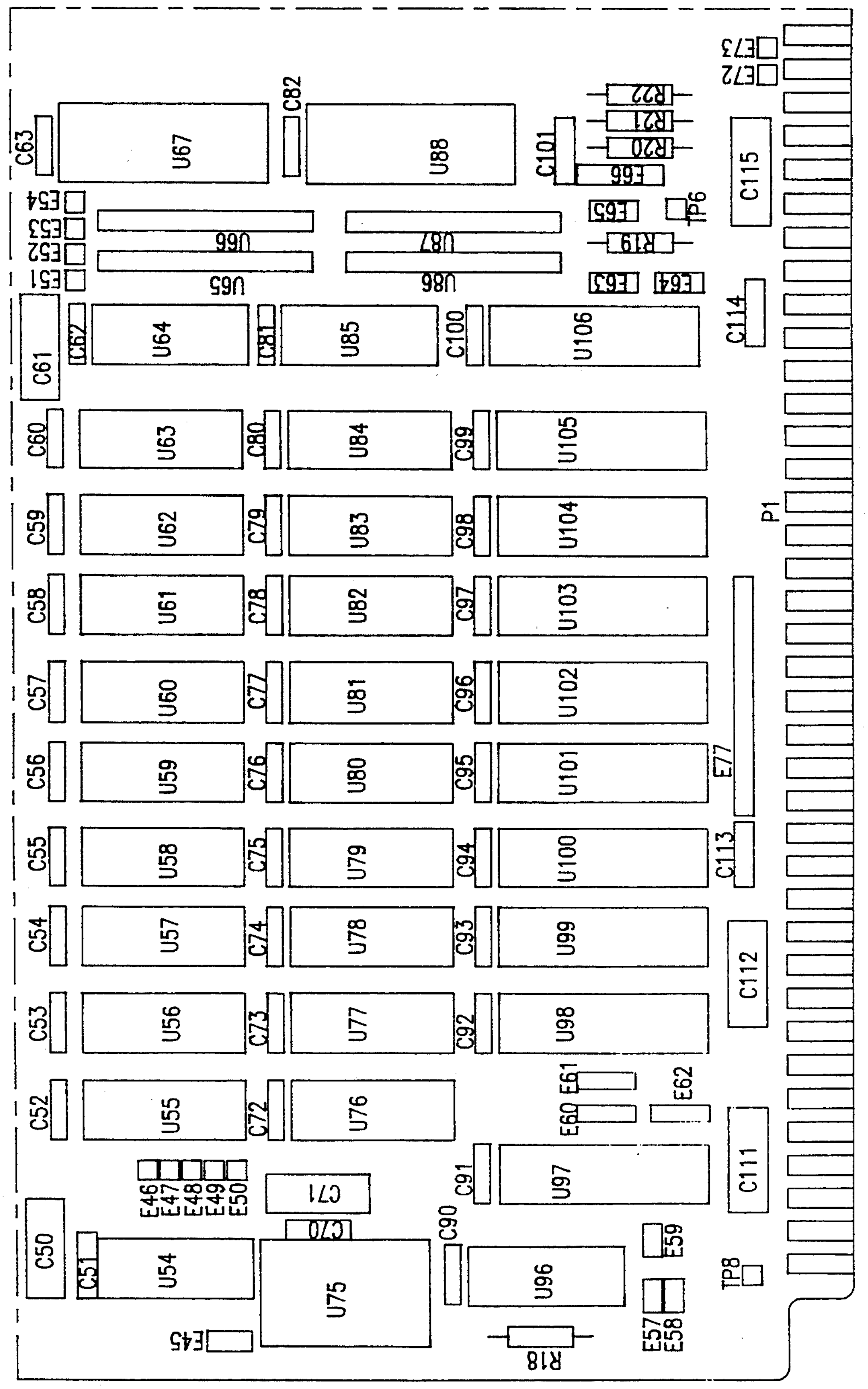
Figure 42C:
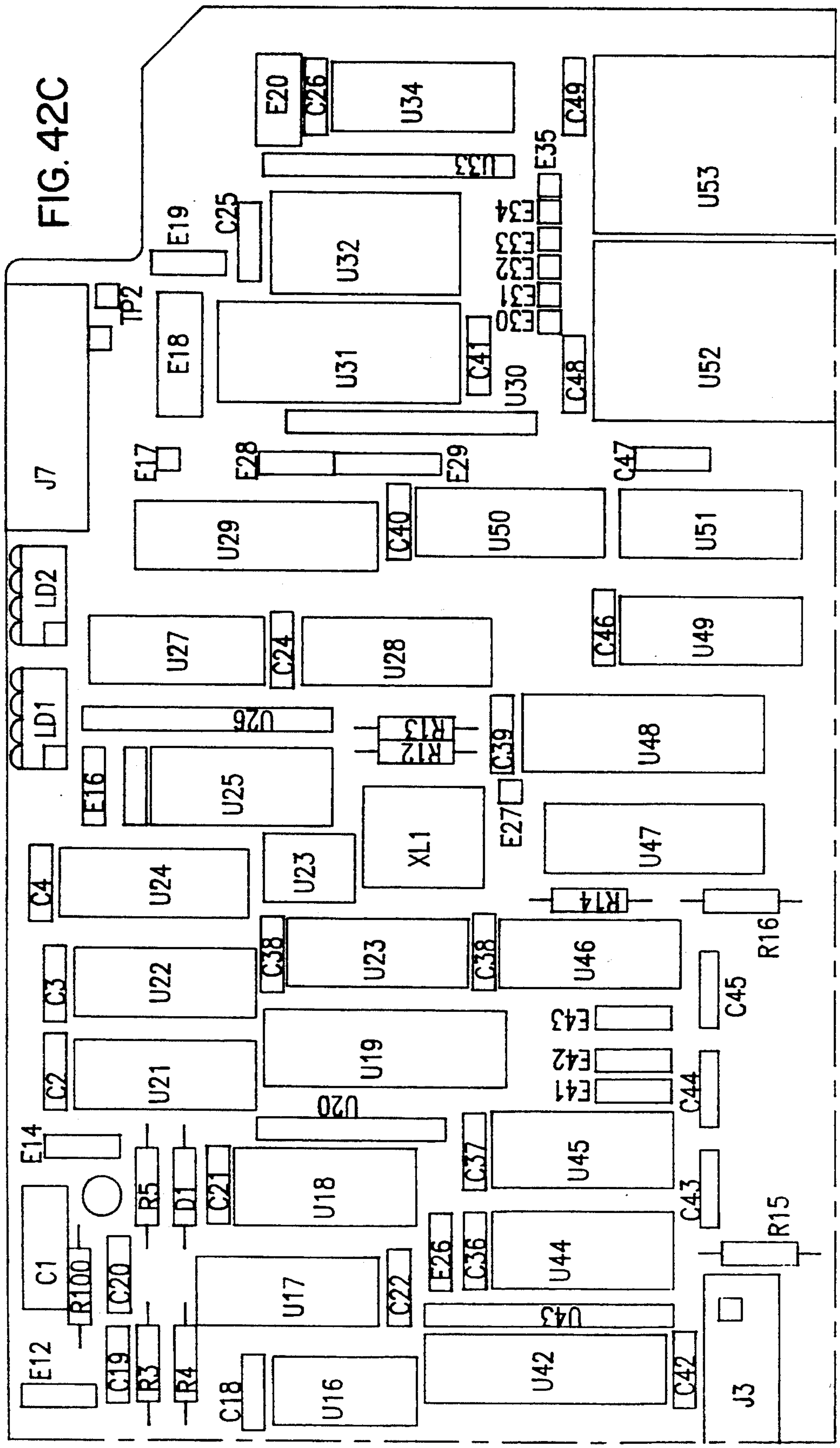
Figure 42D:
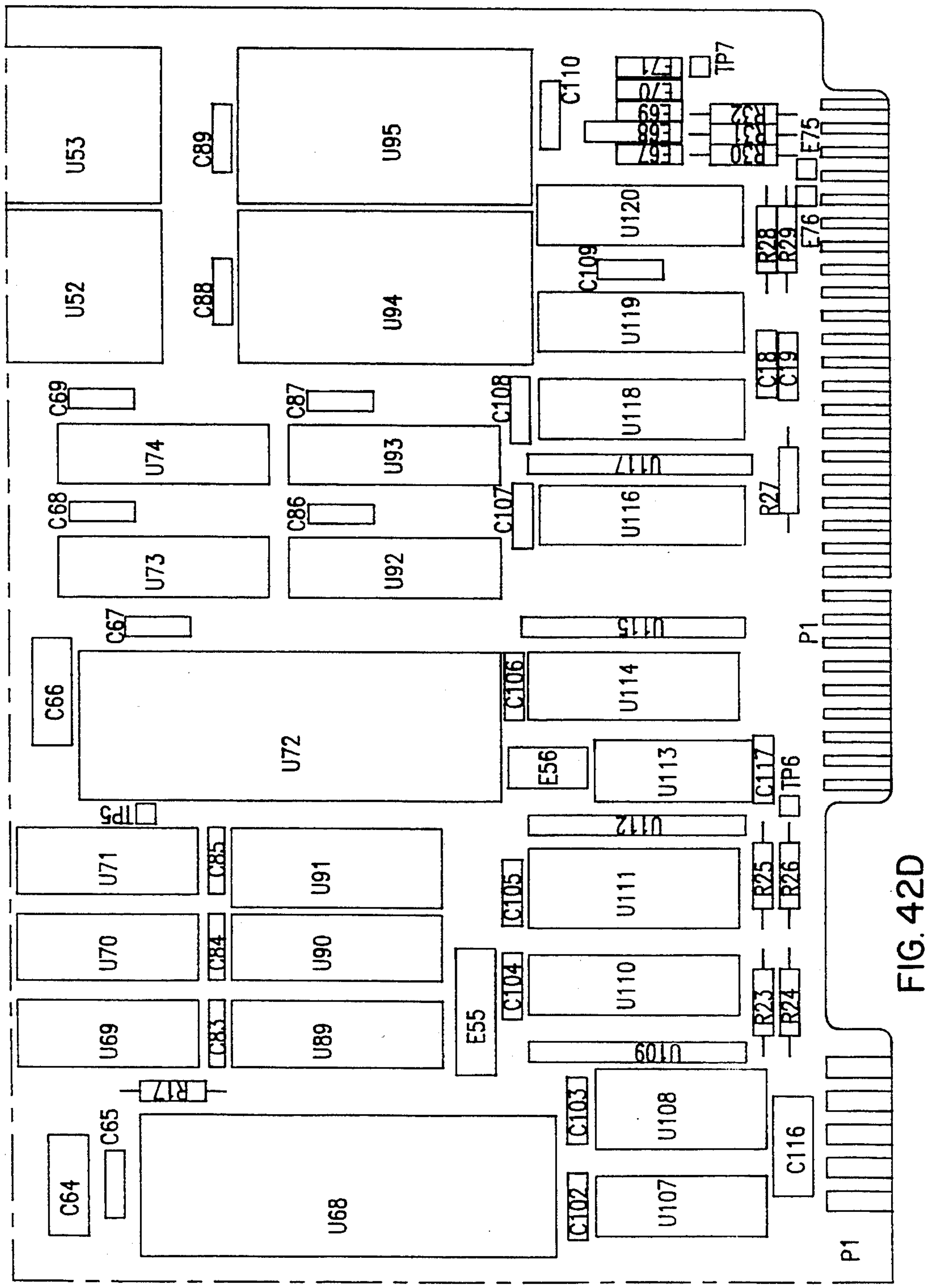
Figure 42E:
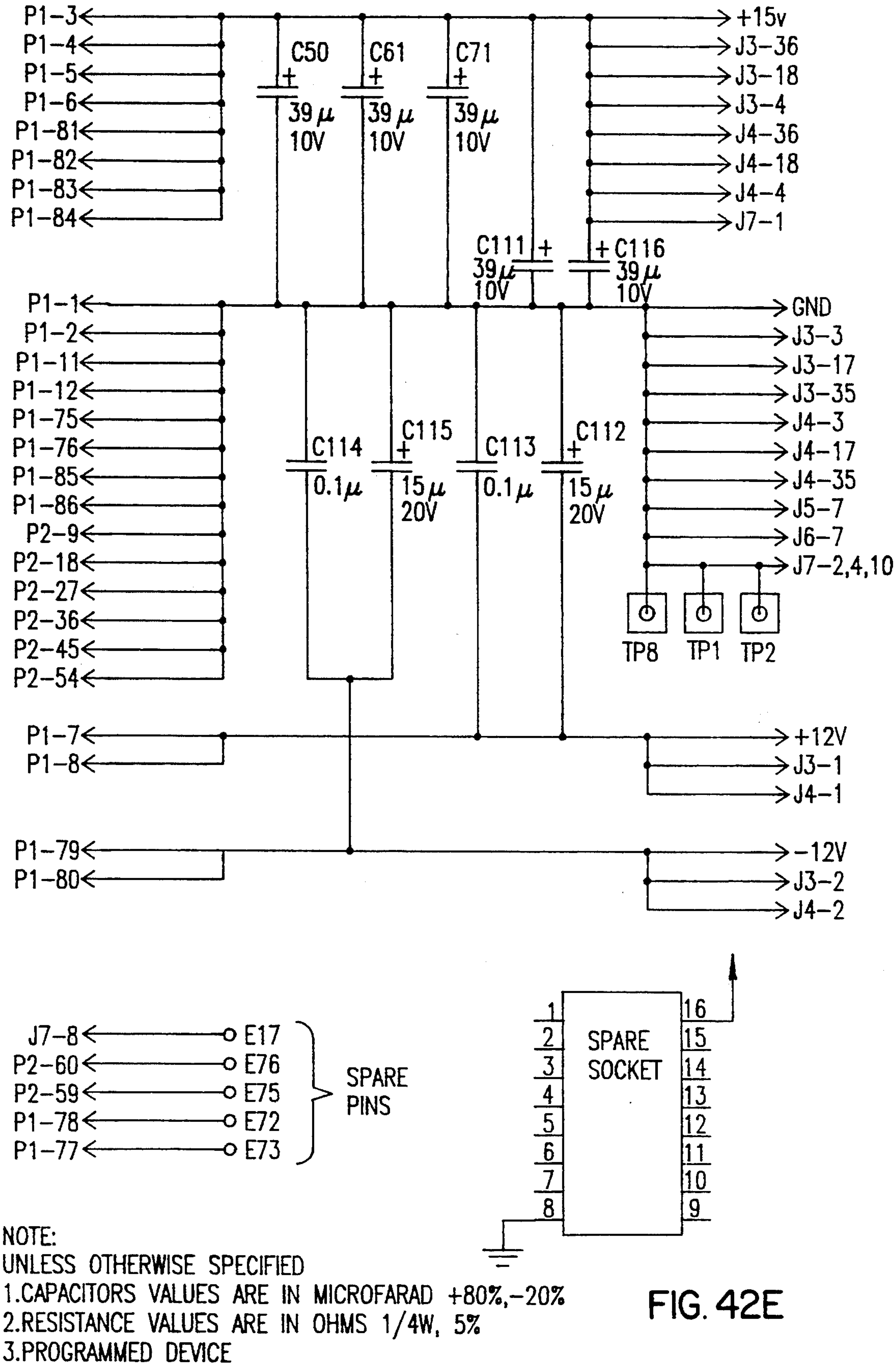
Figure 42F:
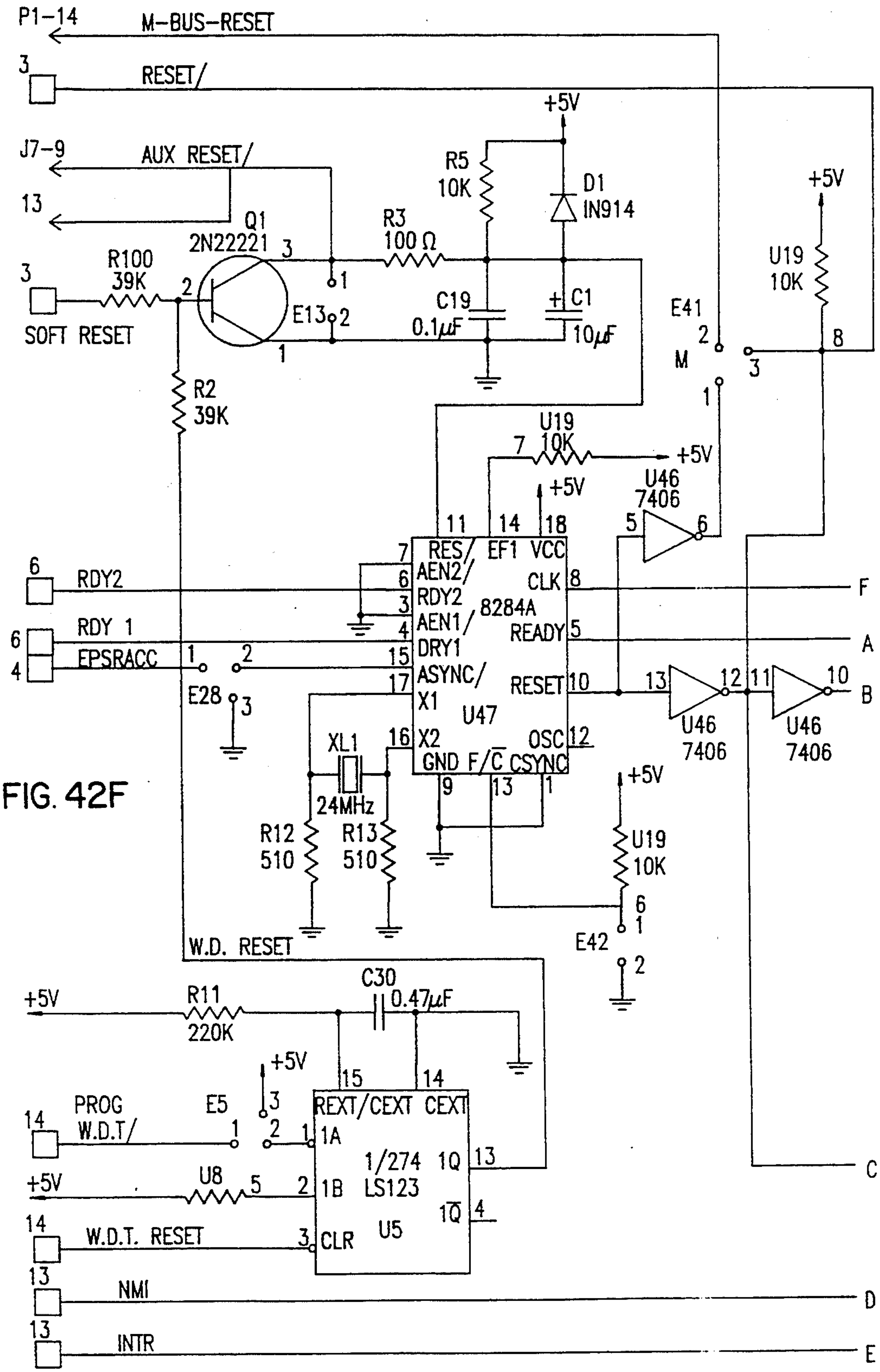
Figure 42G:
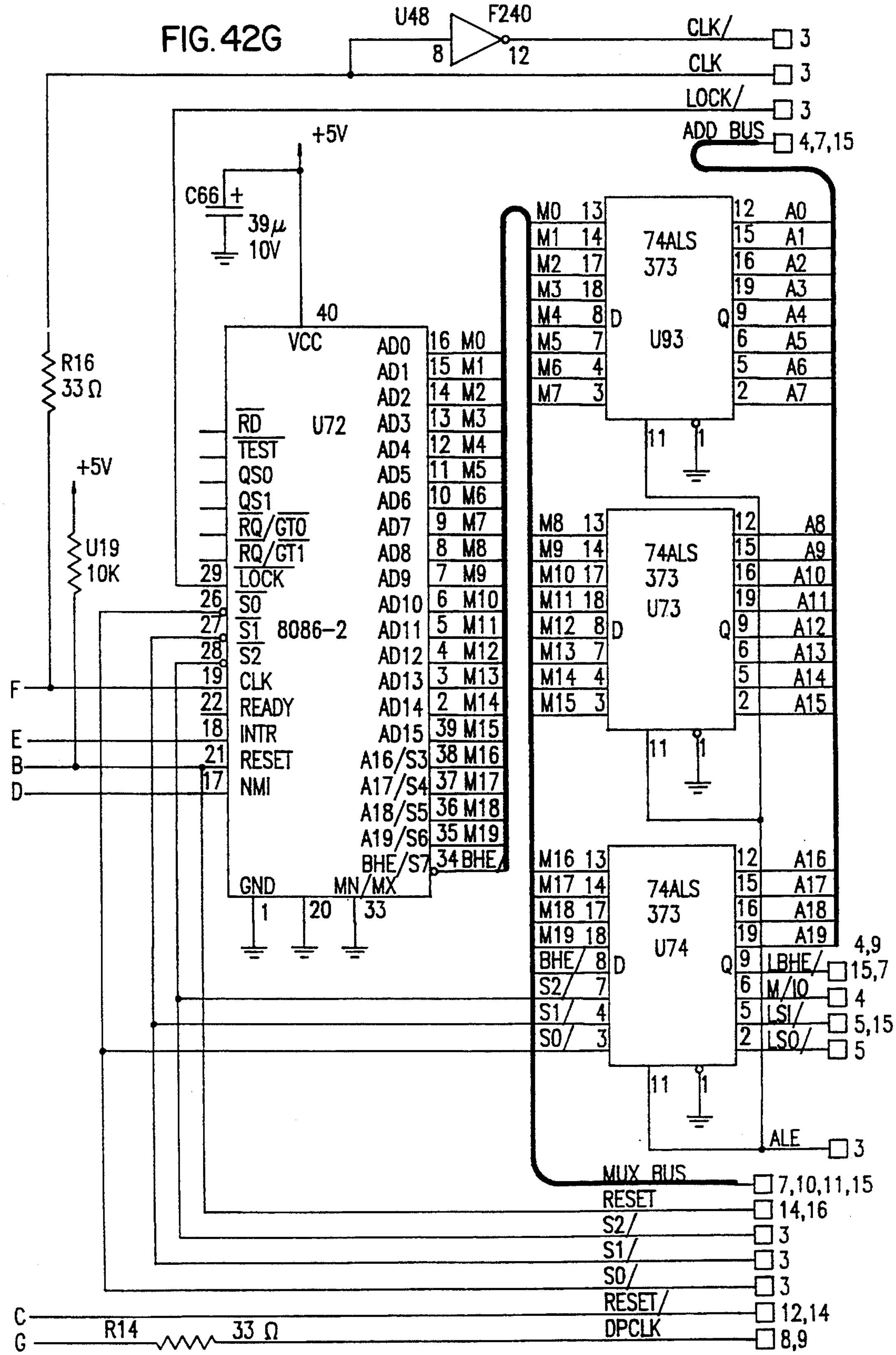
Figure 42H:
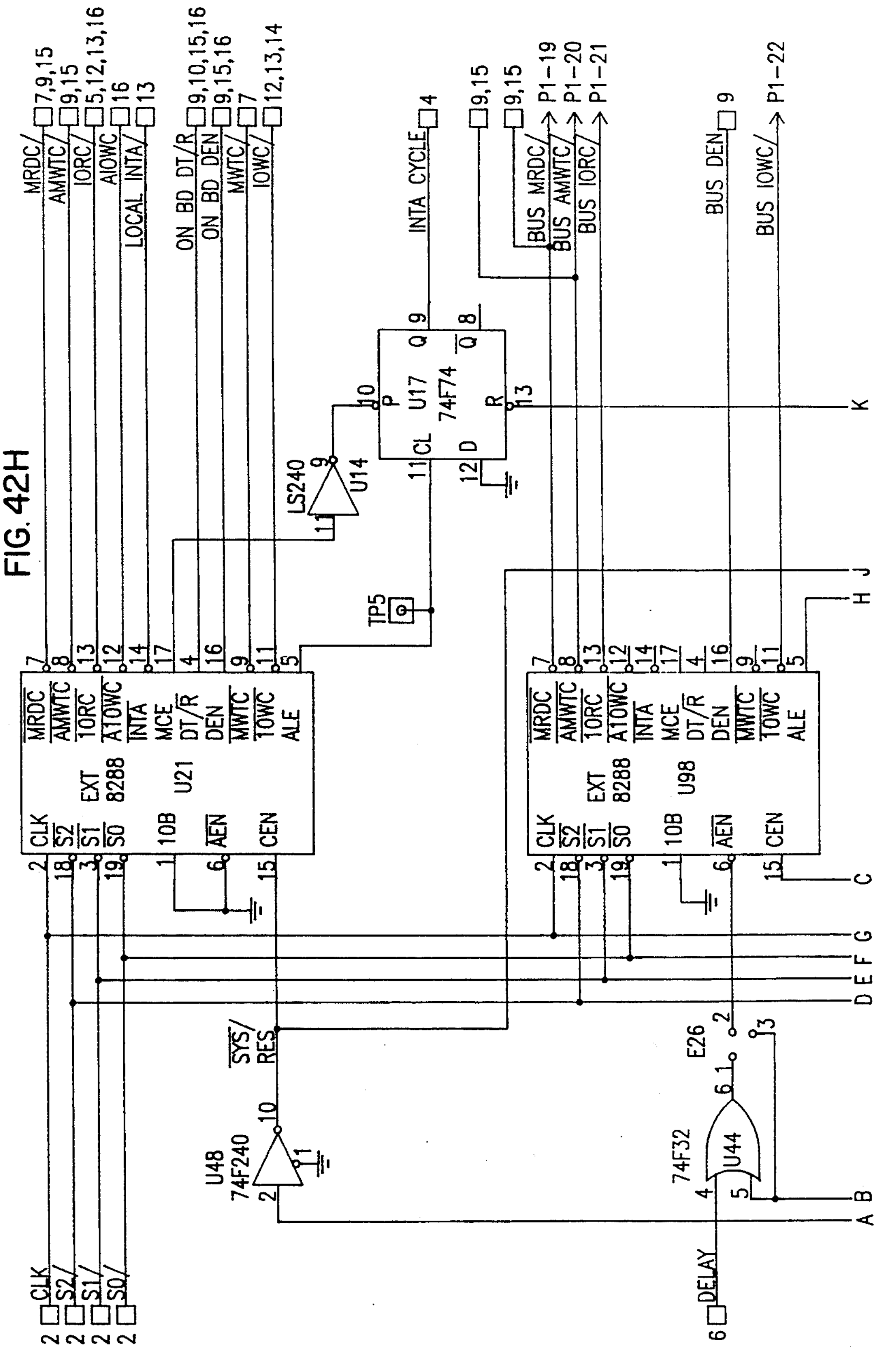
Figure 42I:
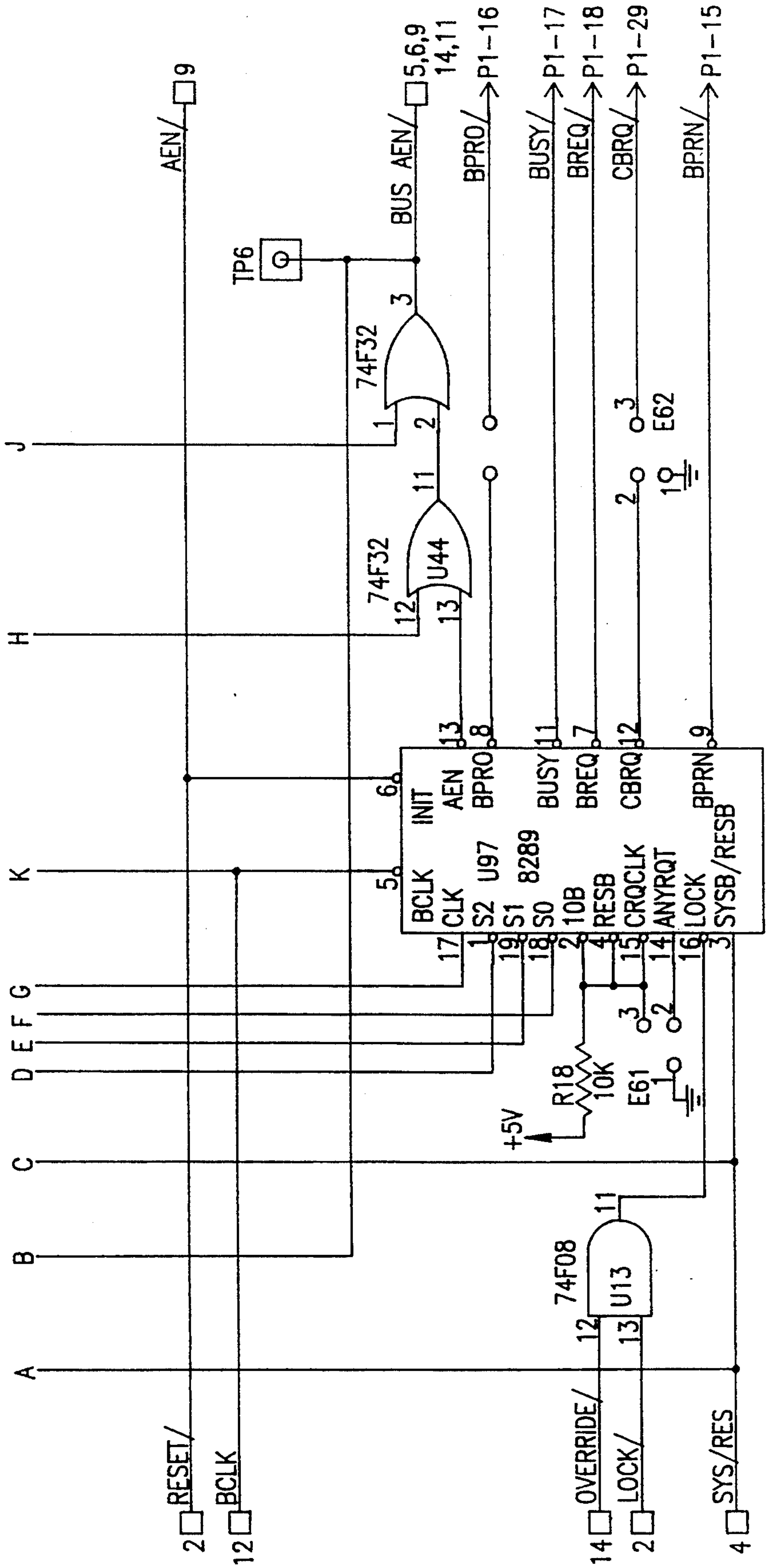
Figure 42J:
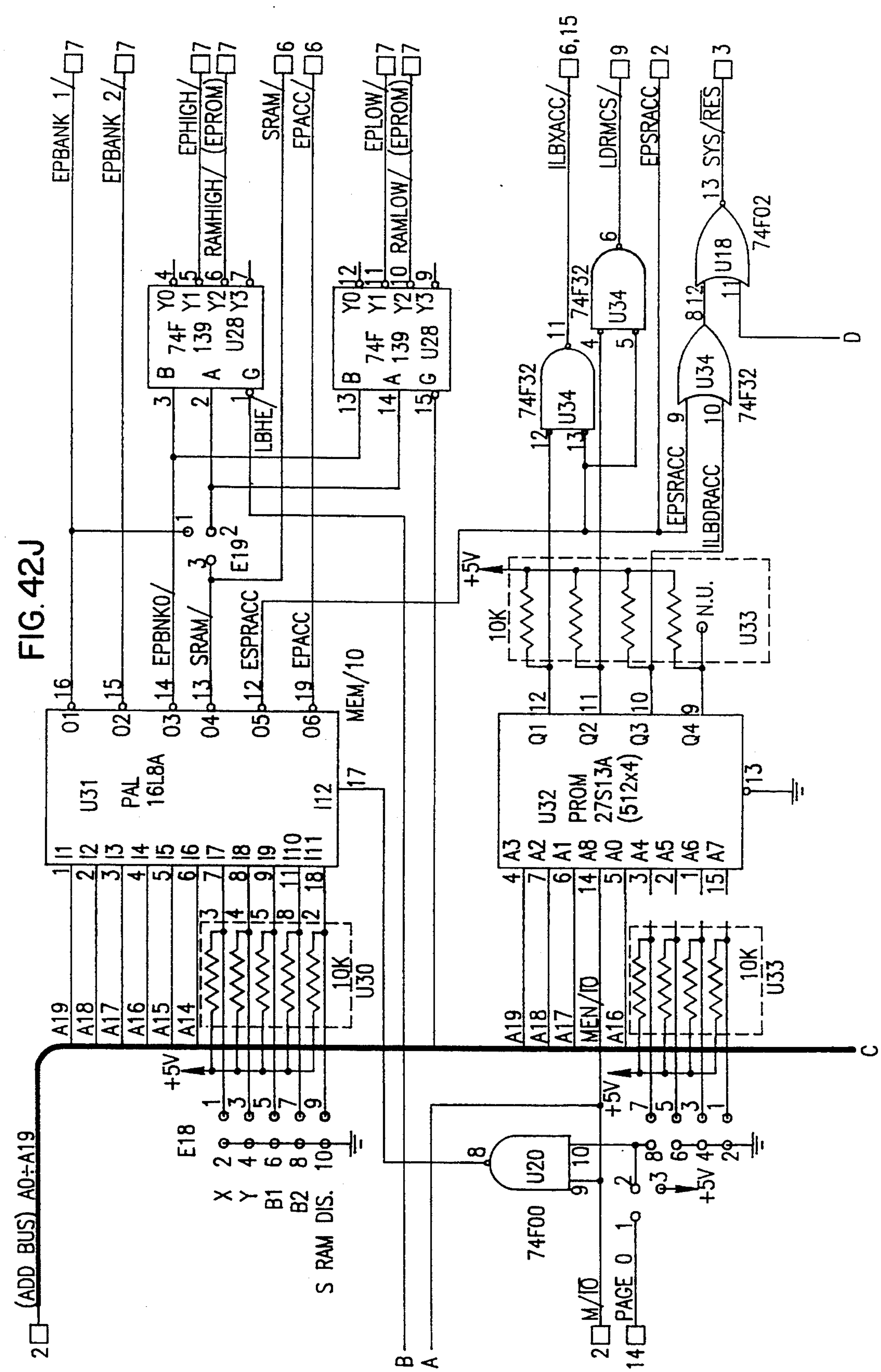
Figure 42K:
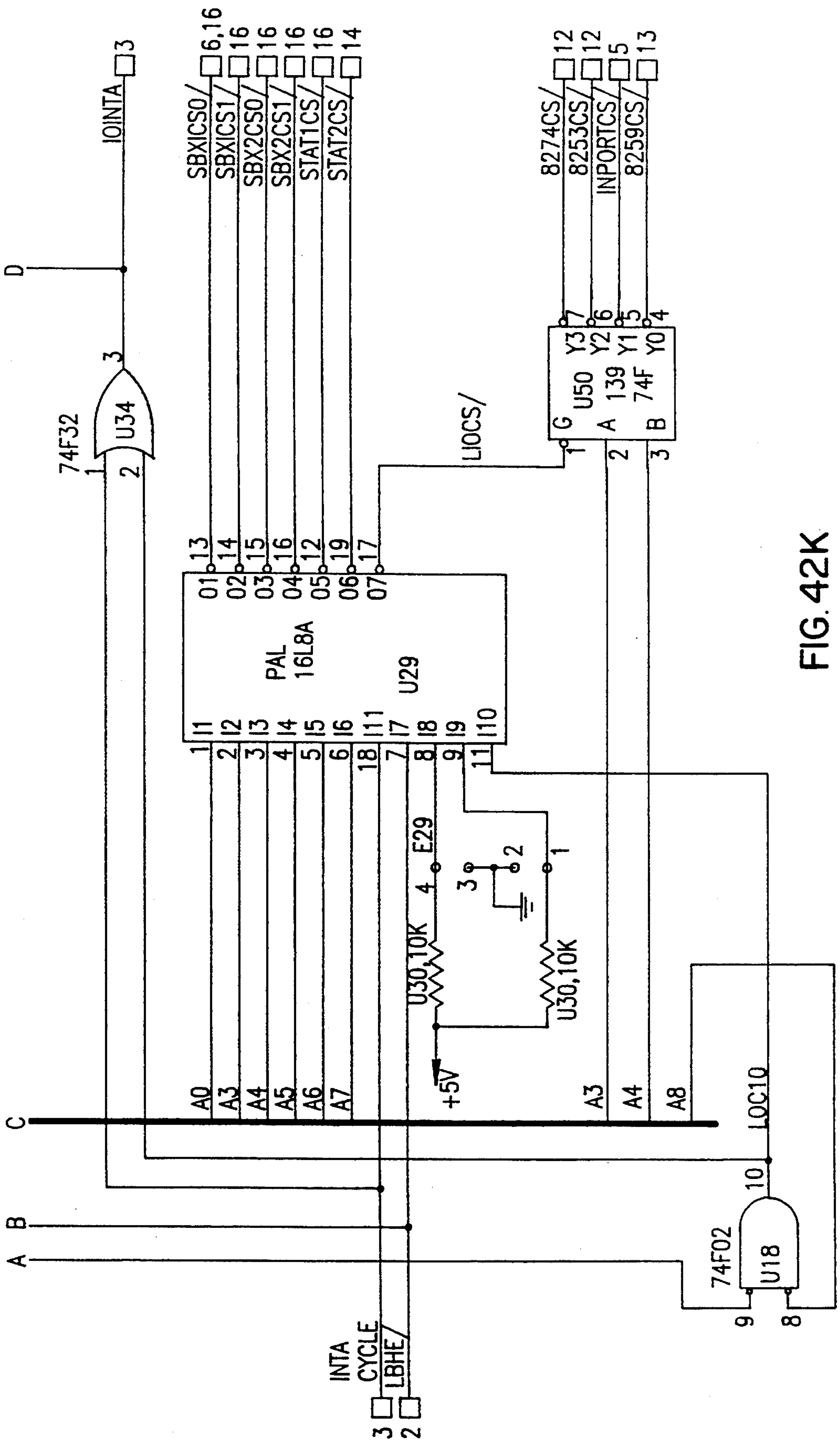
Figure 42L:
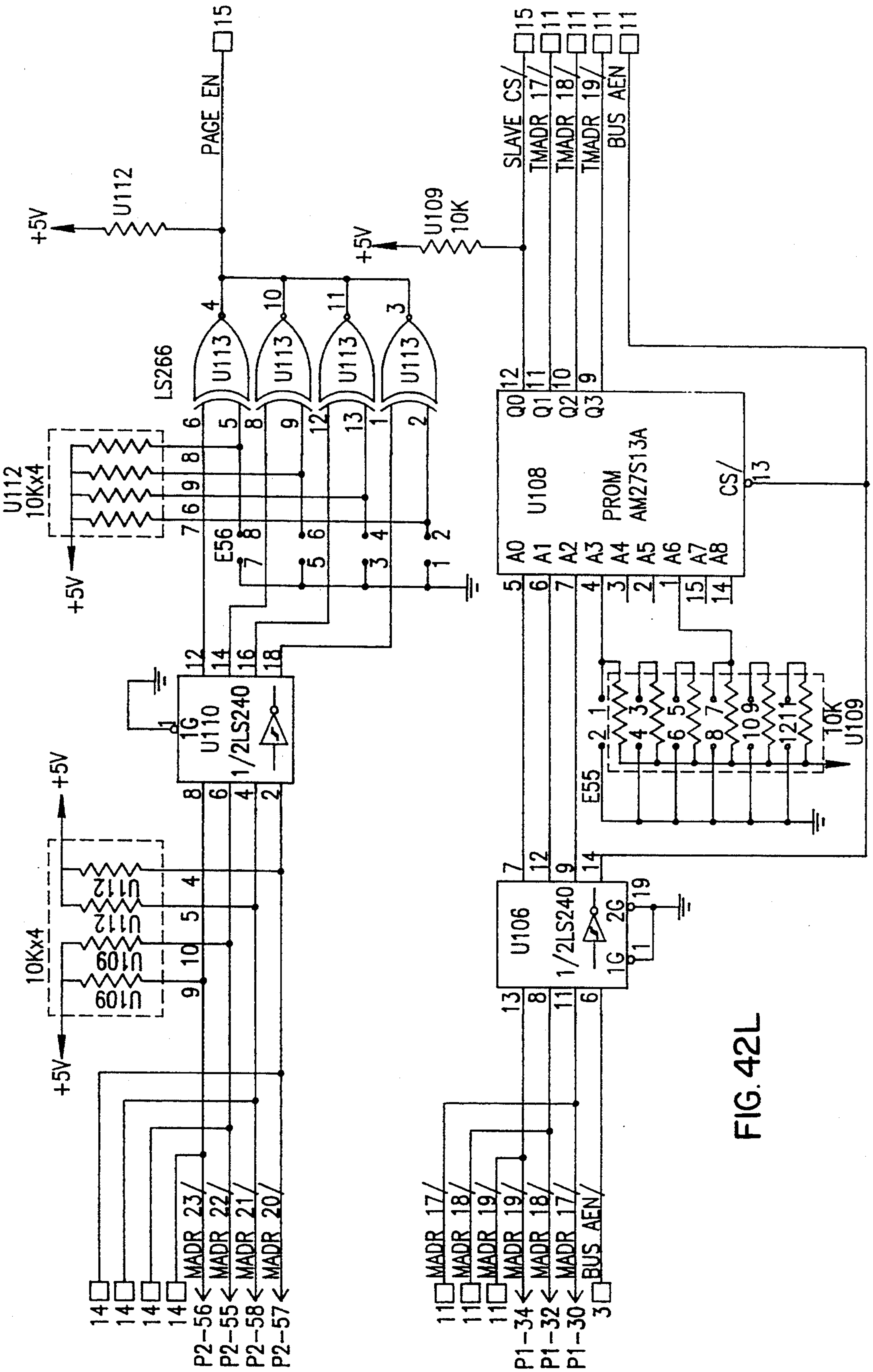
Figure 42M:
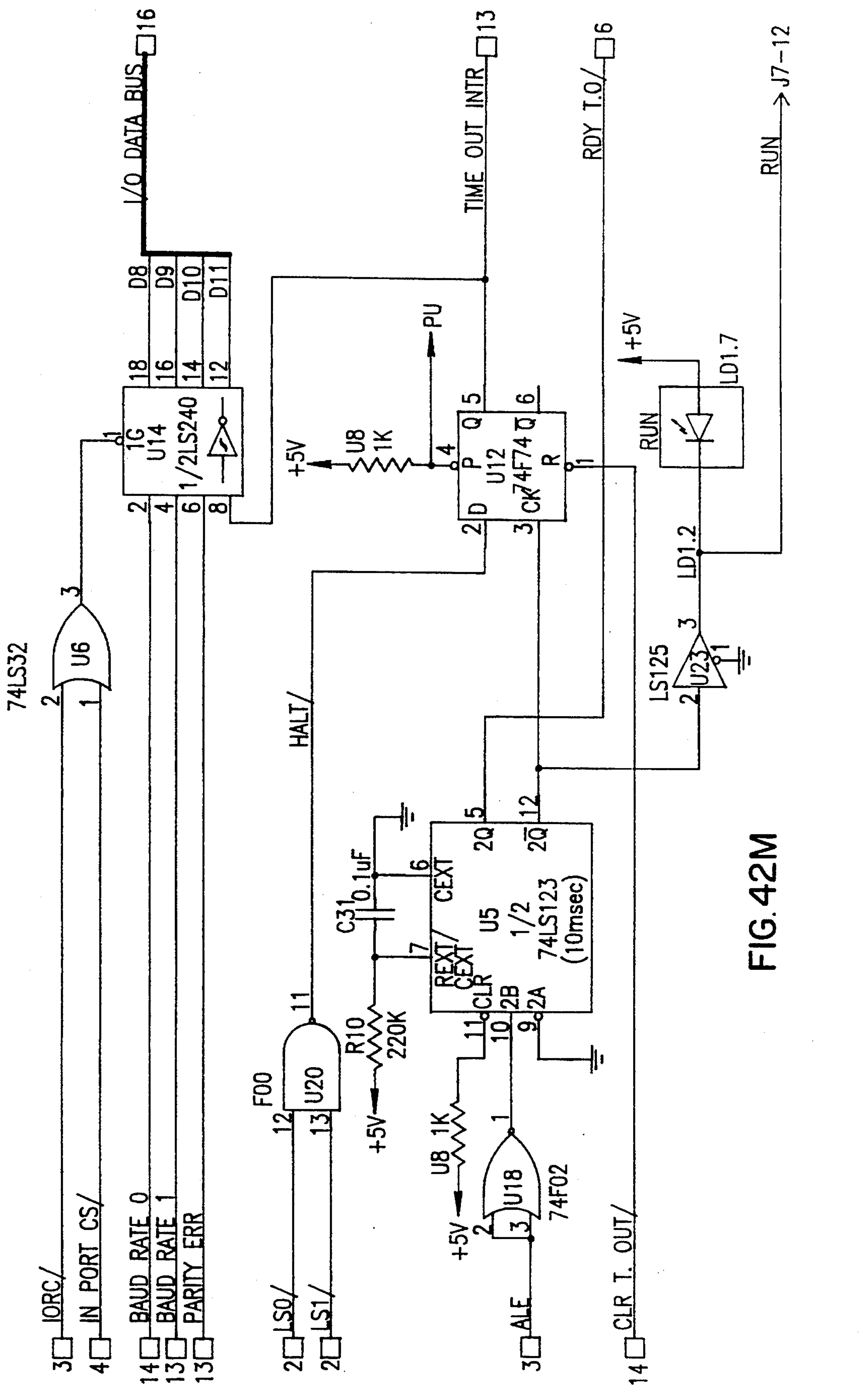
Figure 42N:
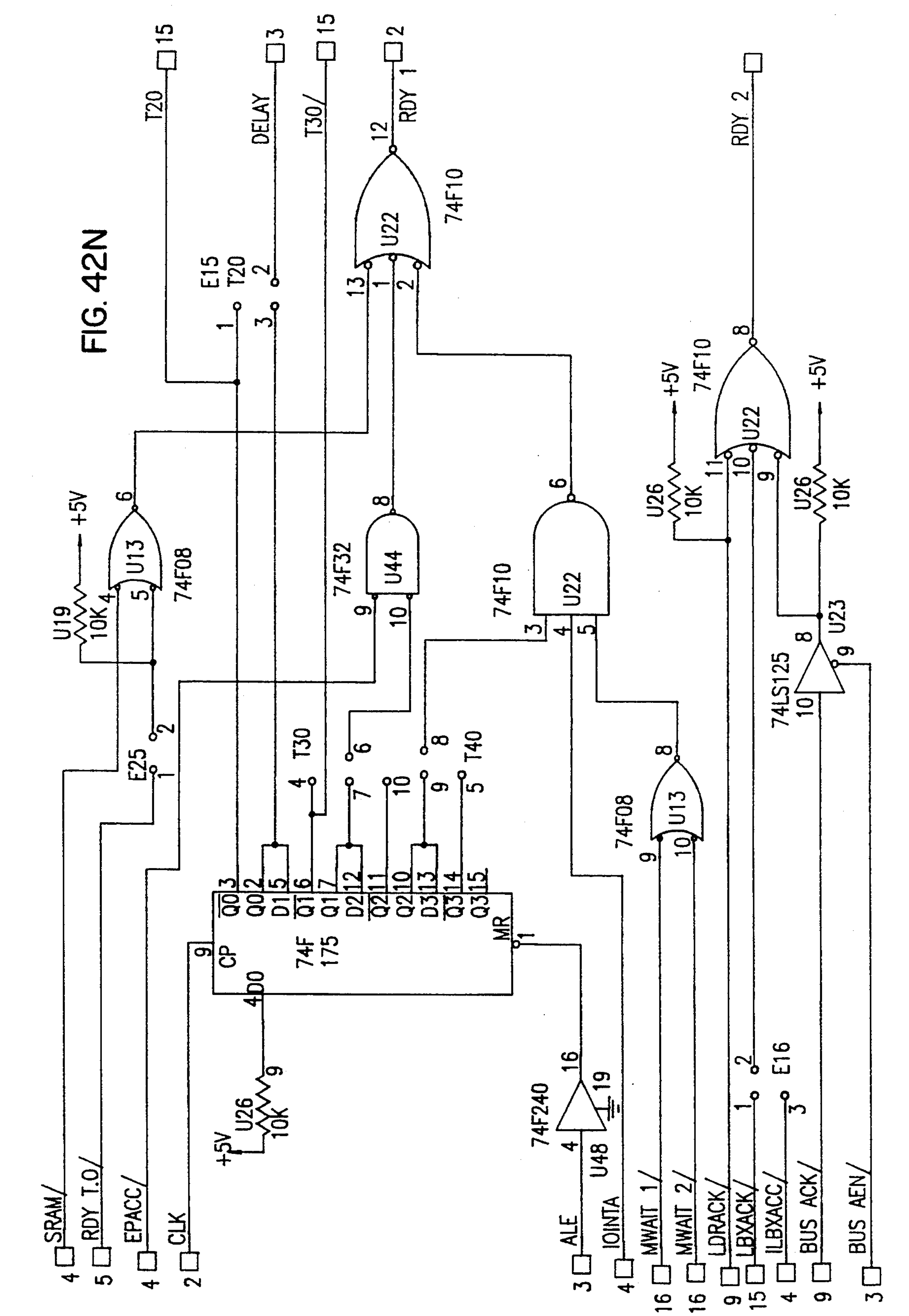
Figure 42O:
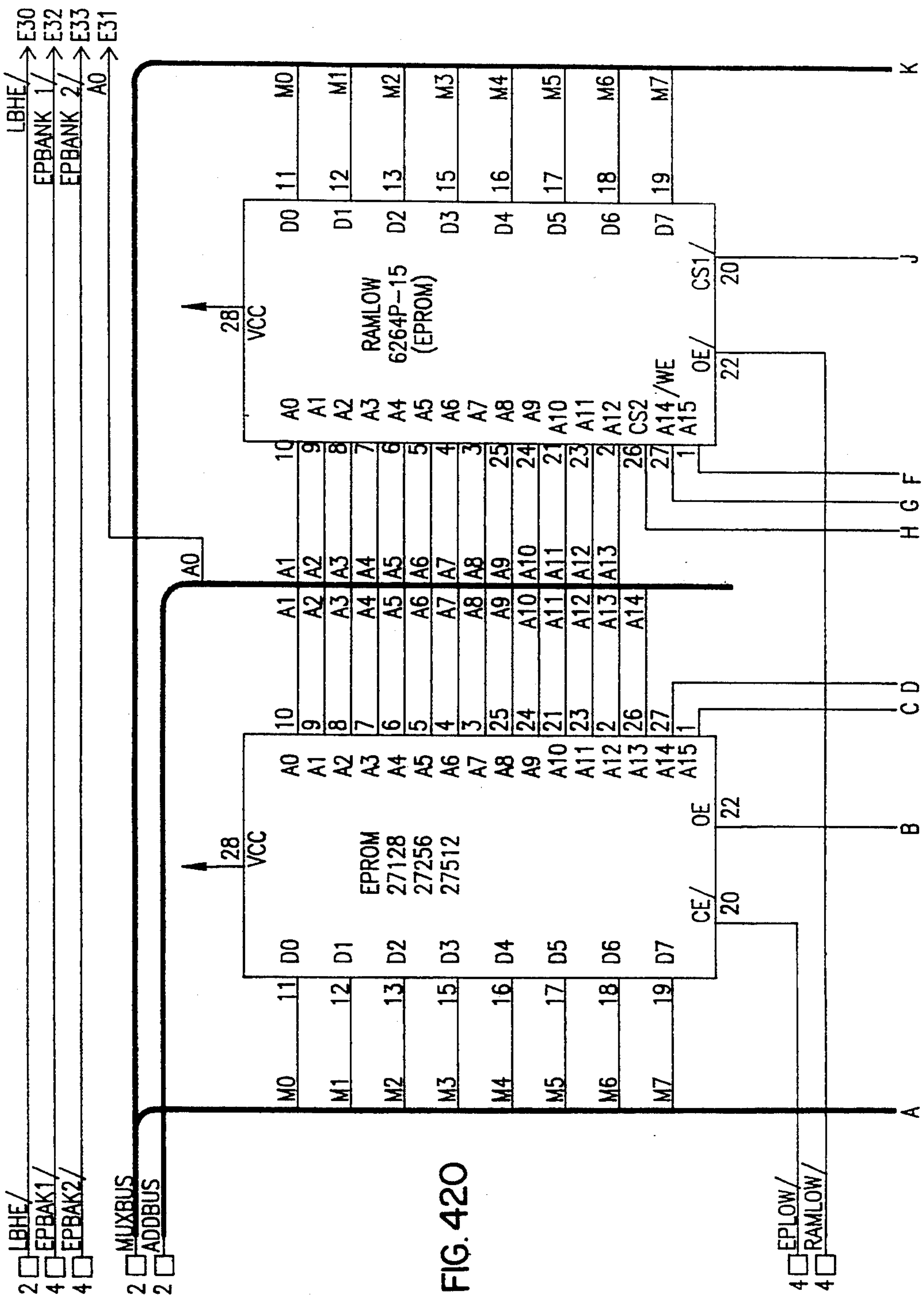
Figure 42P:
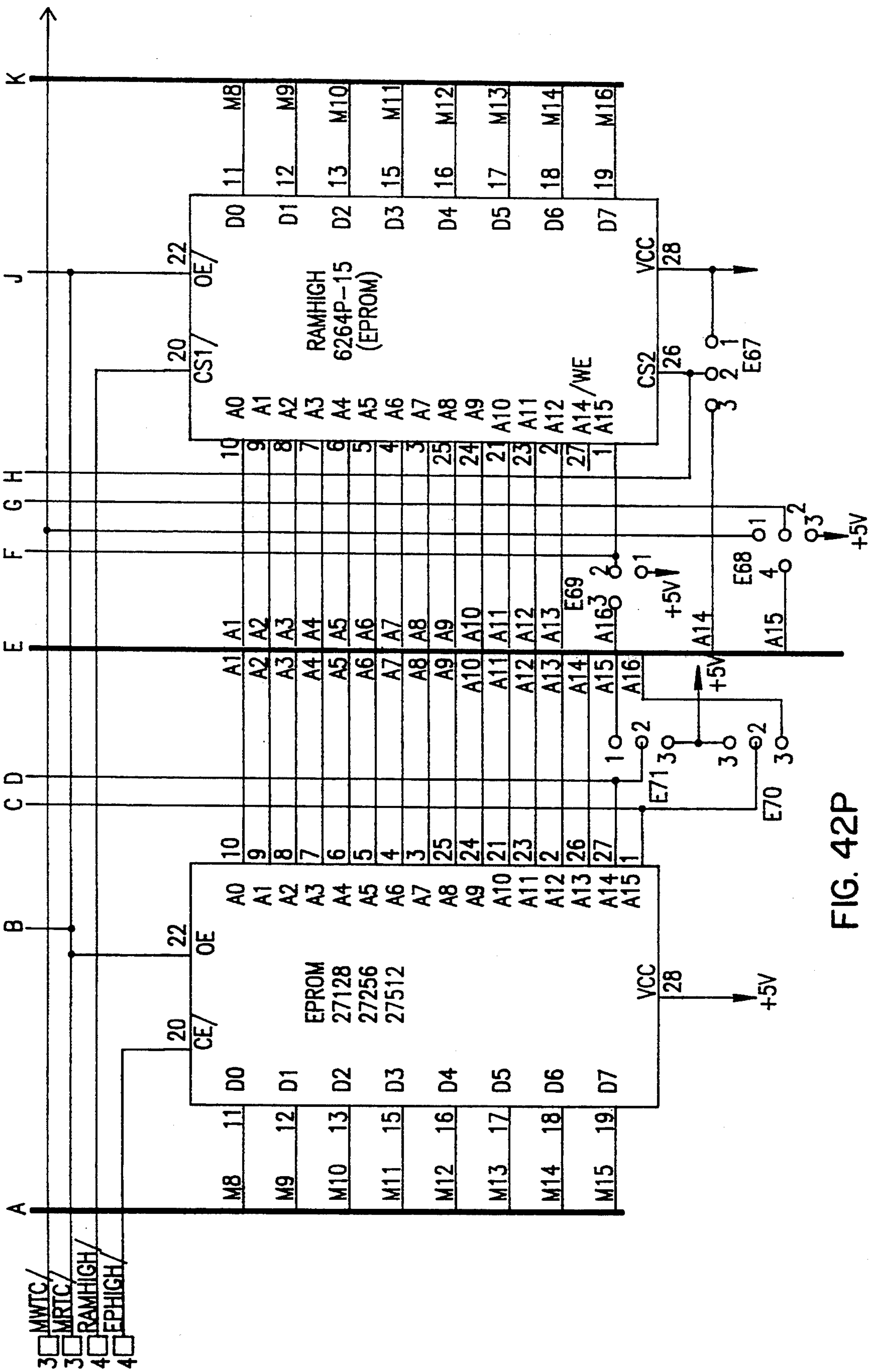
Figure 42Q:
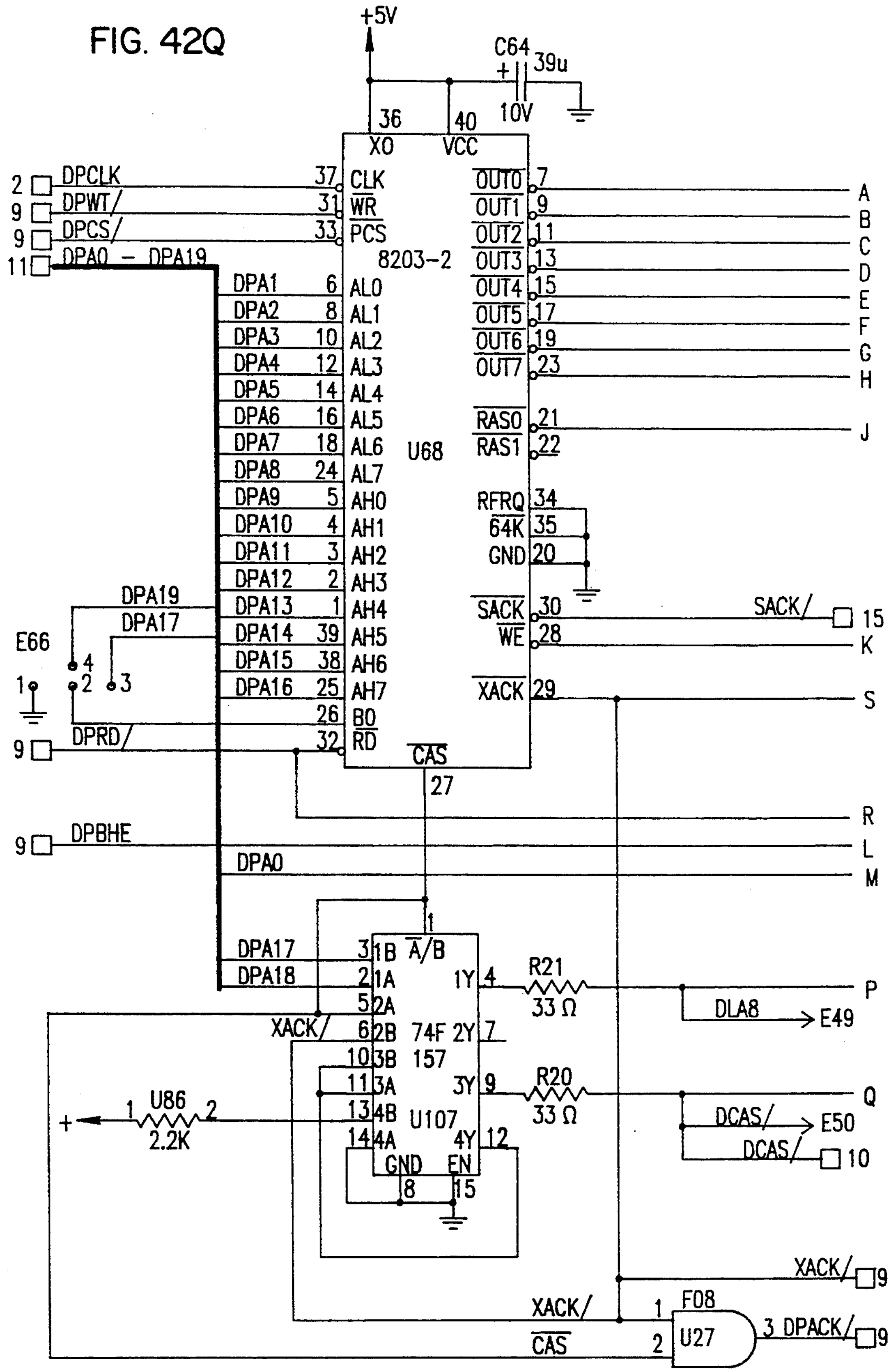
Figure 42R:
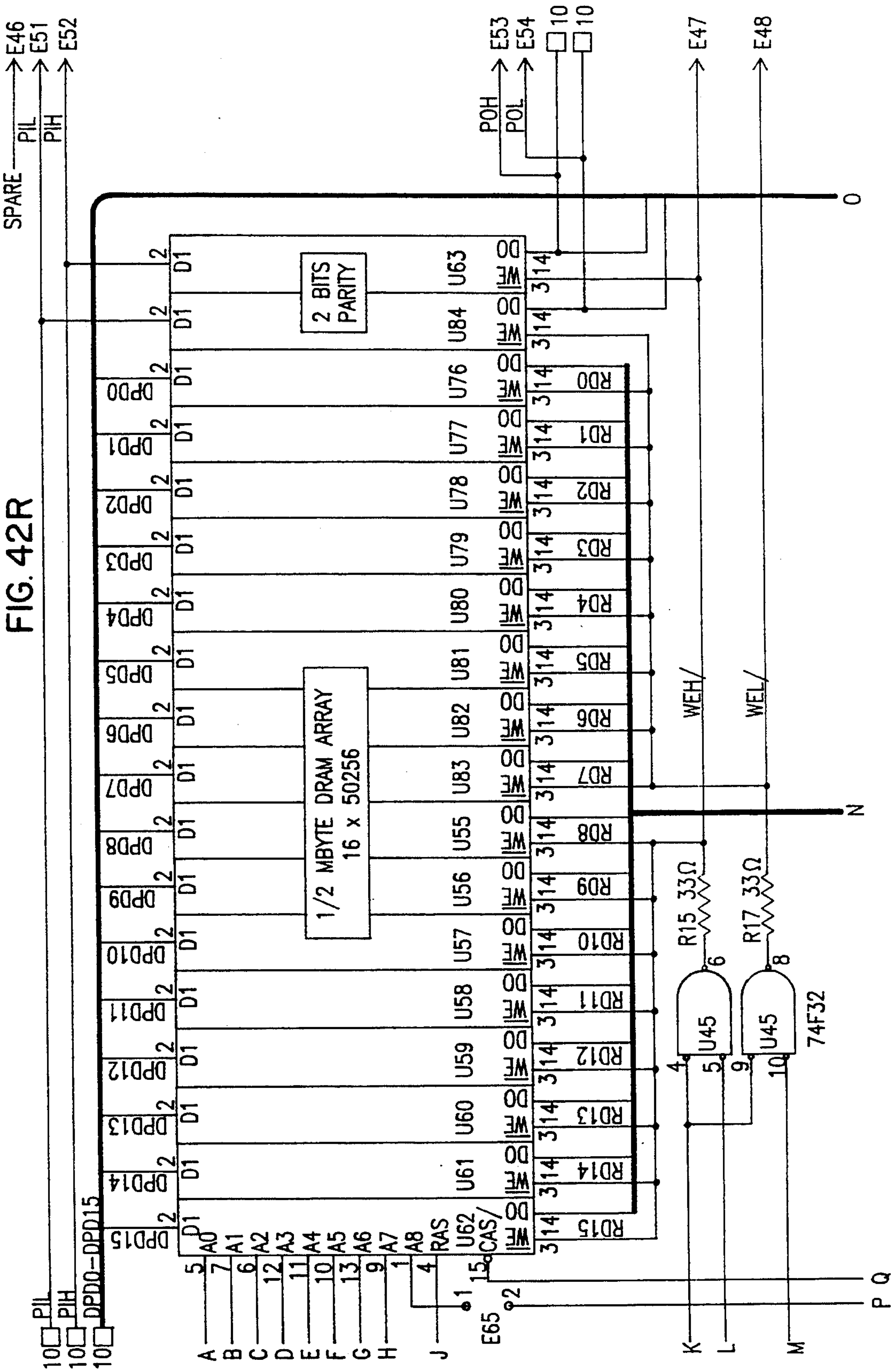
Figure 42S:
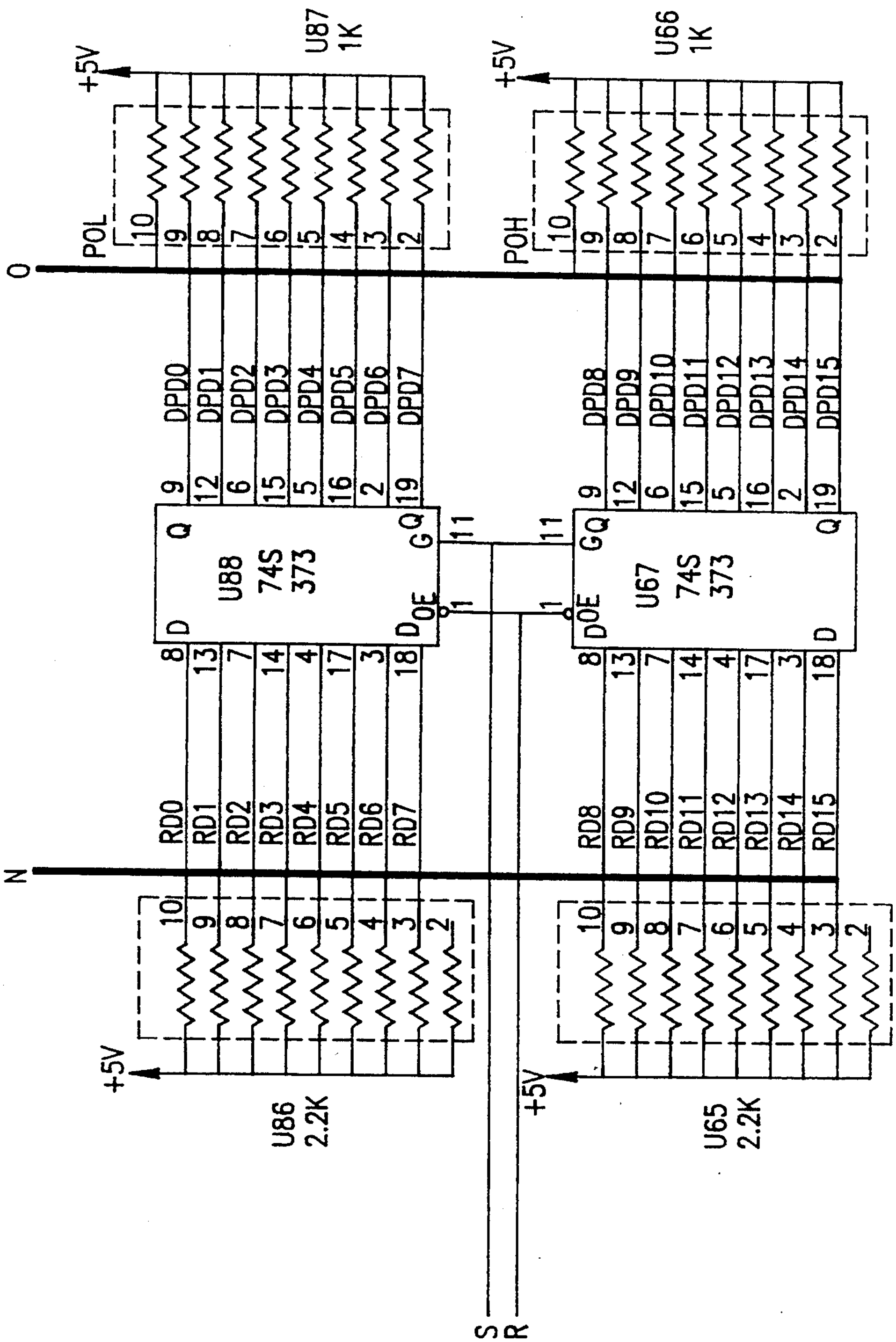
Figure 42T:
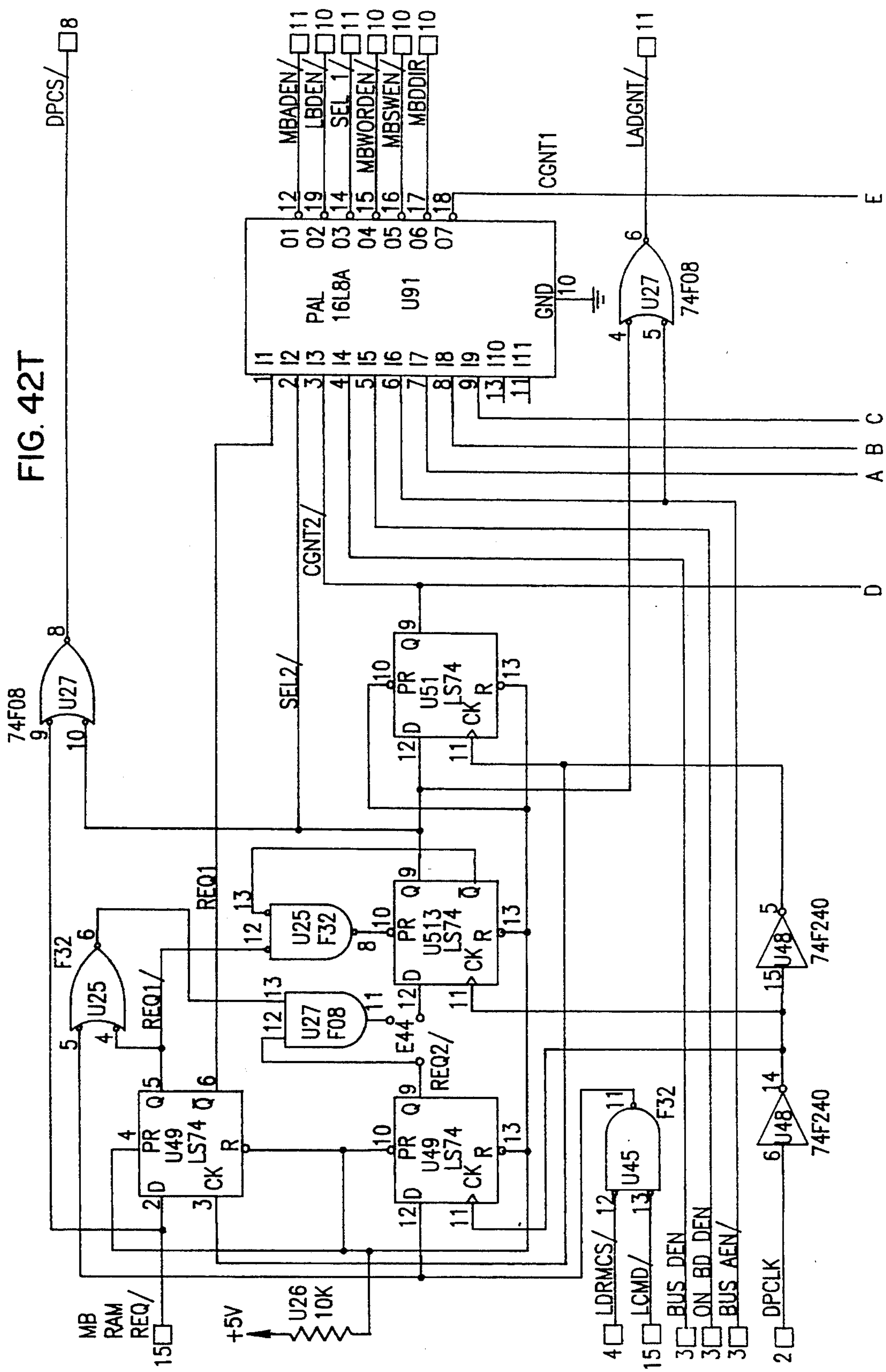
Figure 42U:
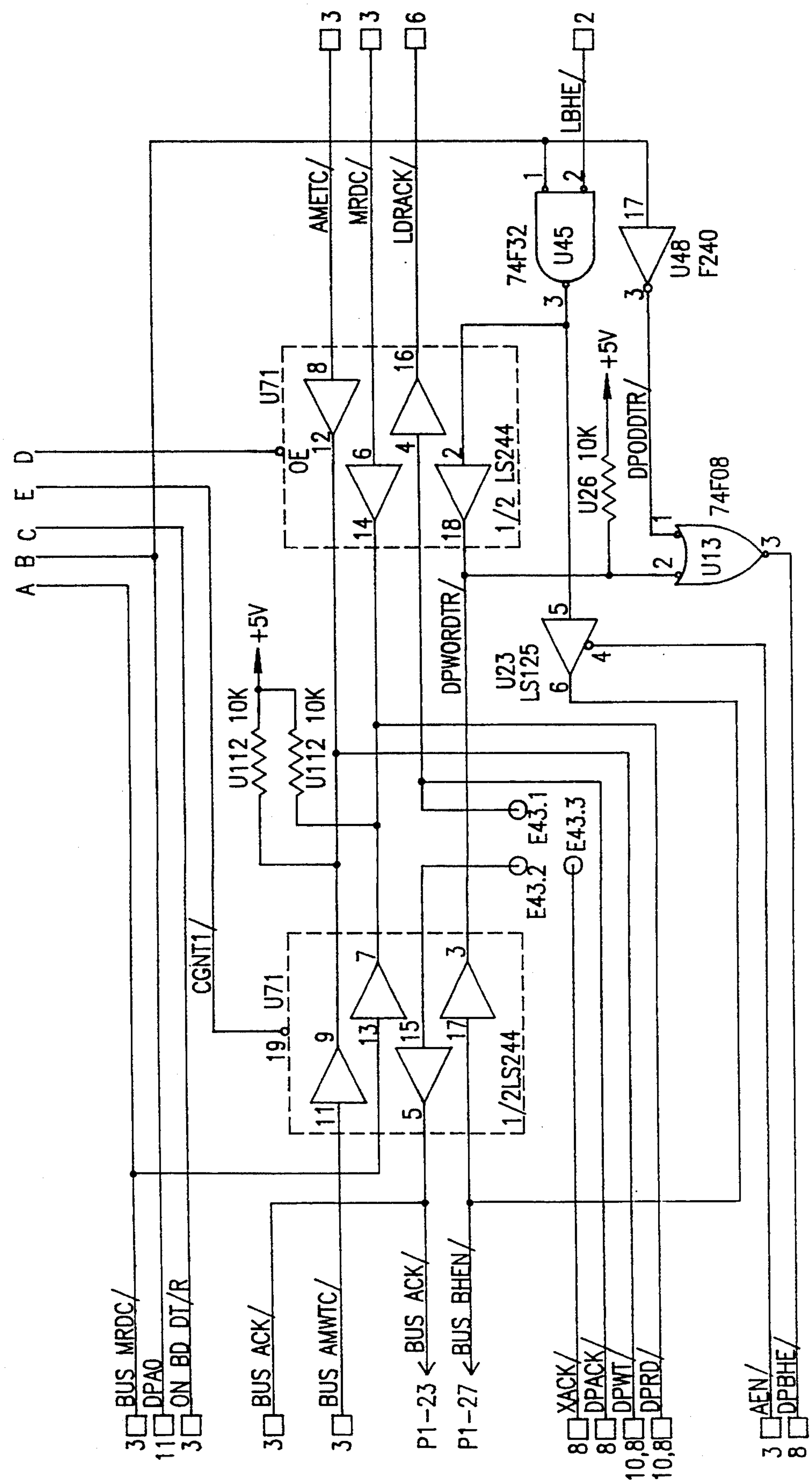
Figure 42V:
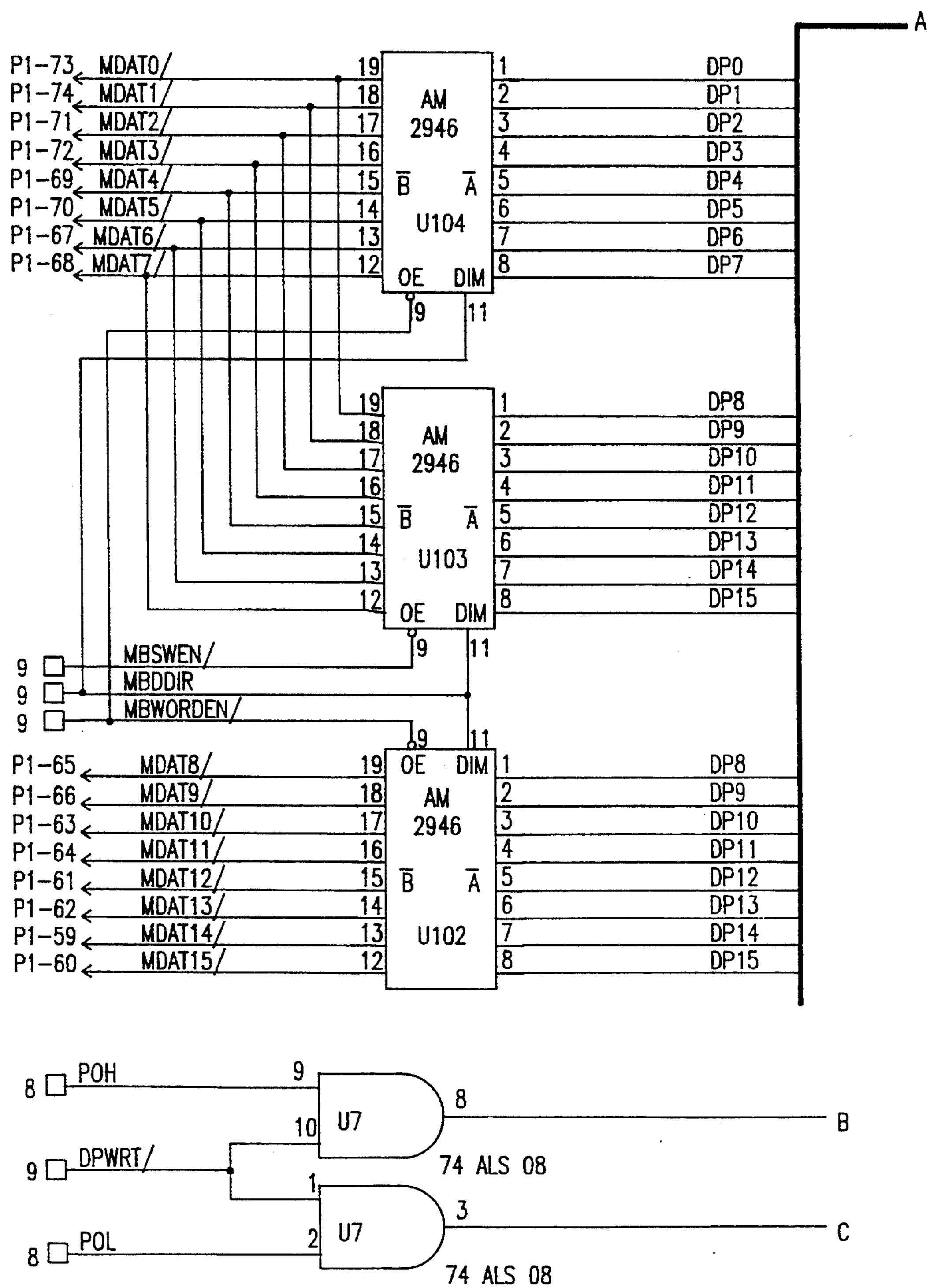
Figure 42W:
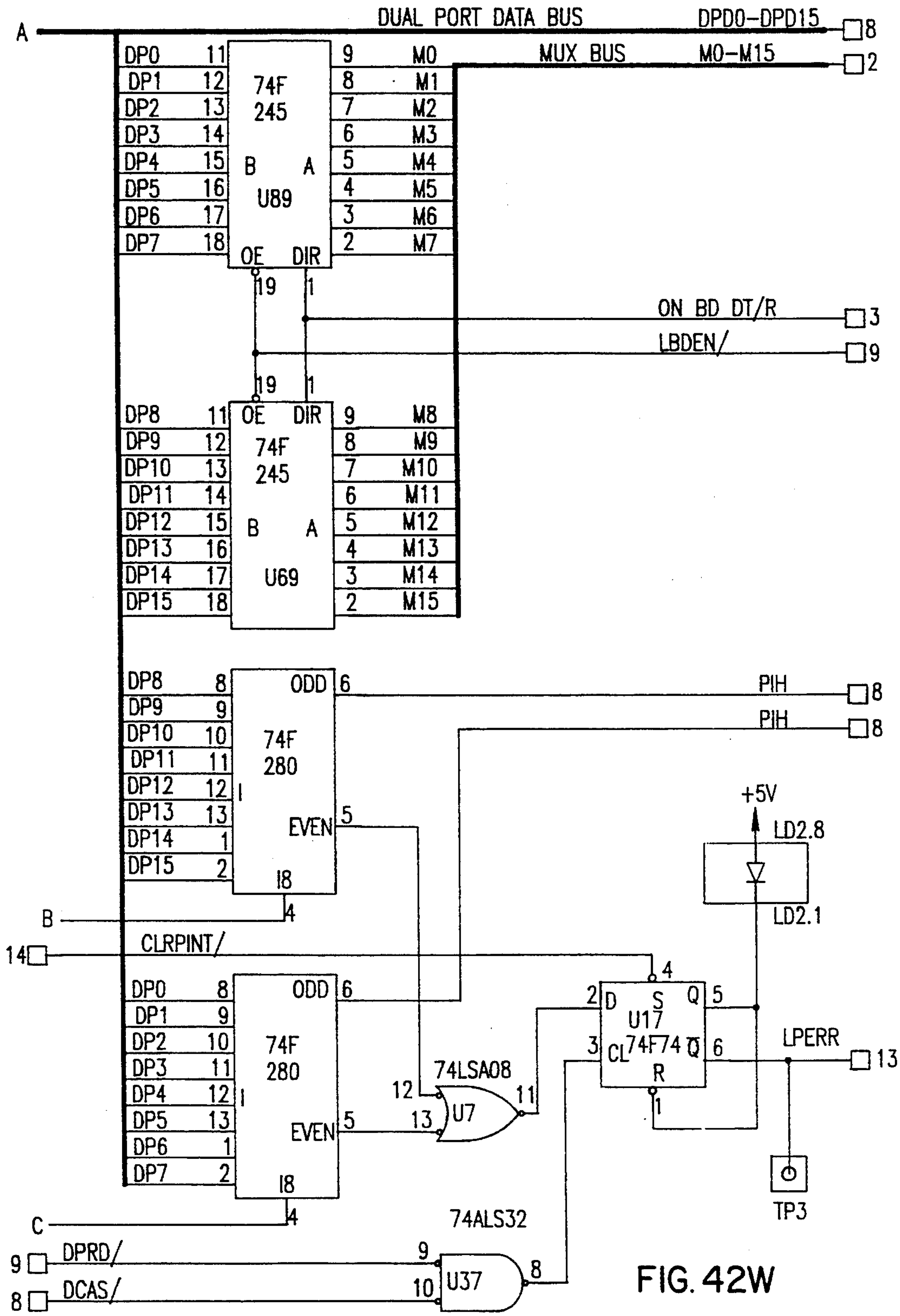
Figure 42X:
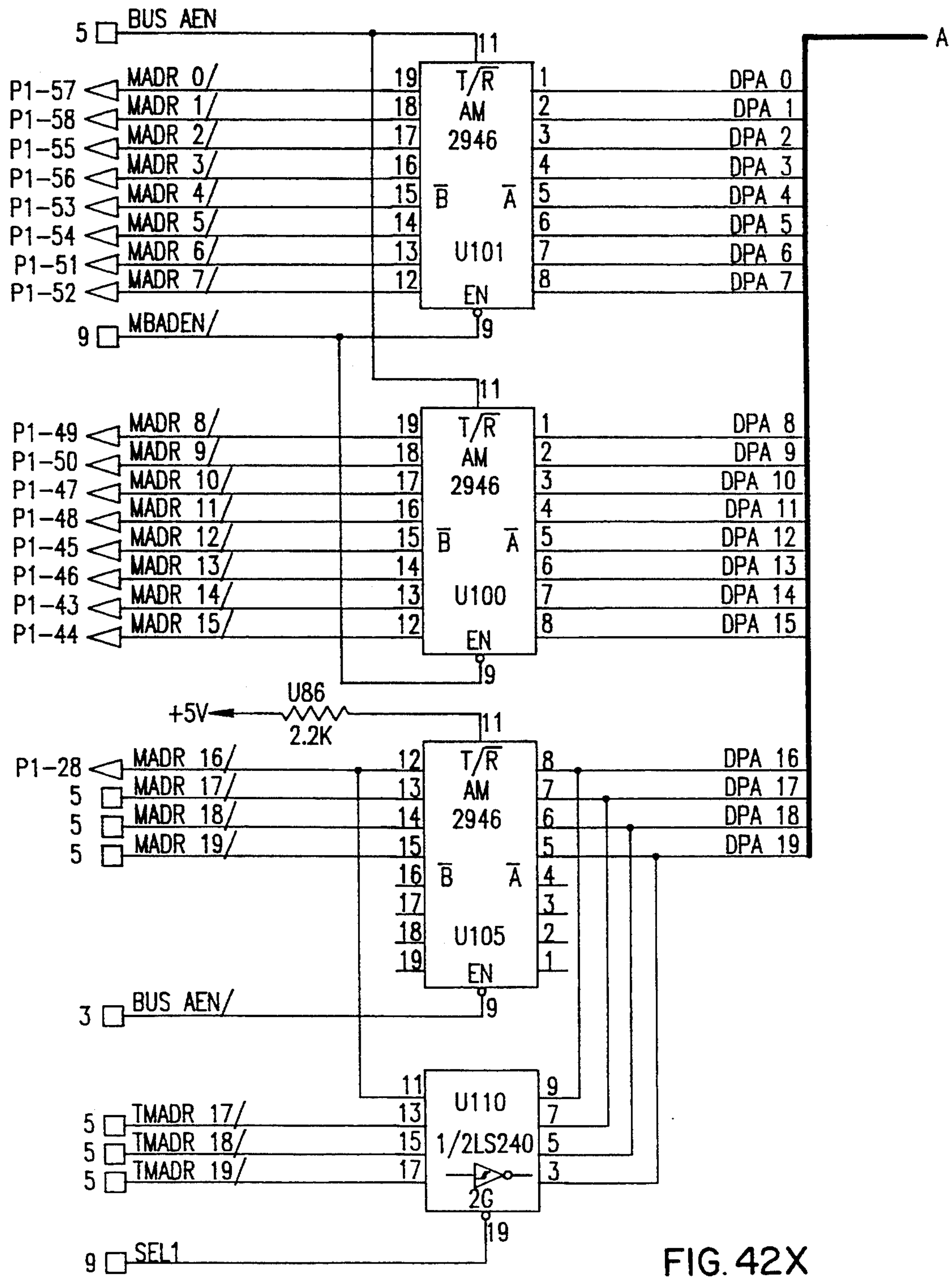
Figure 42Y:
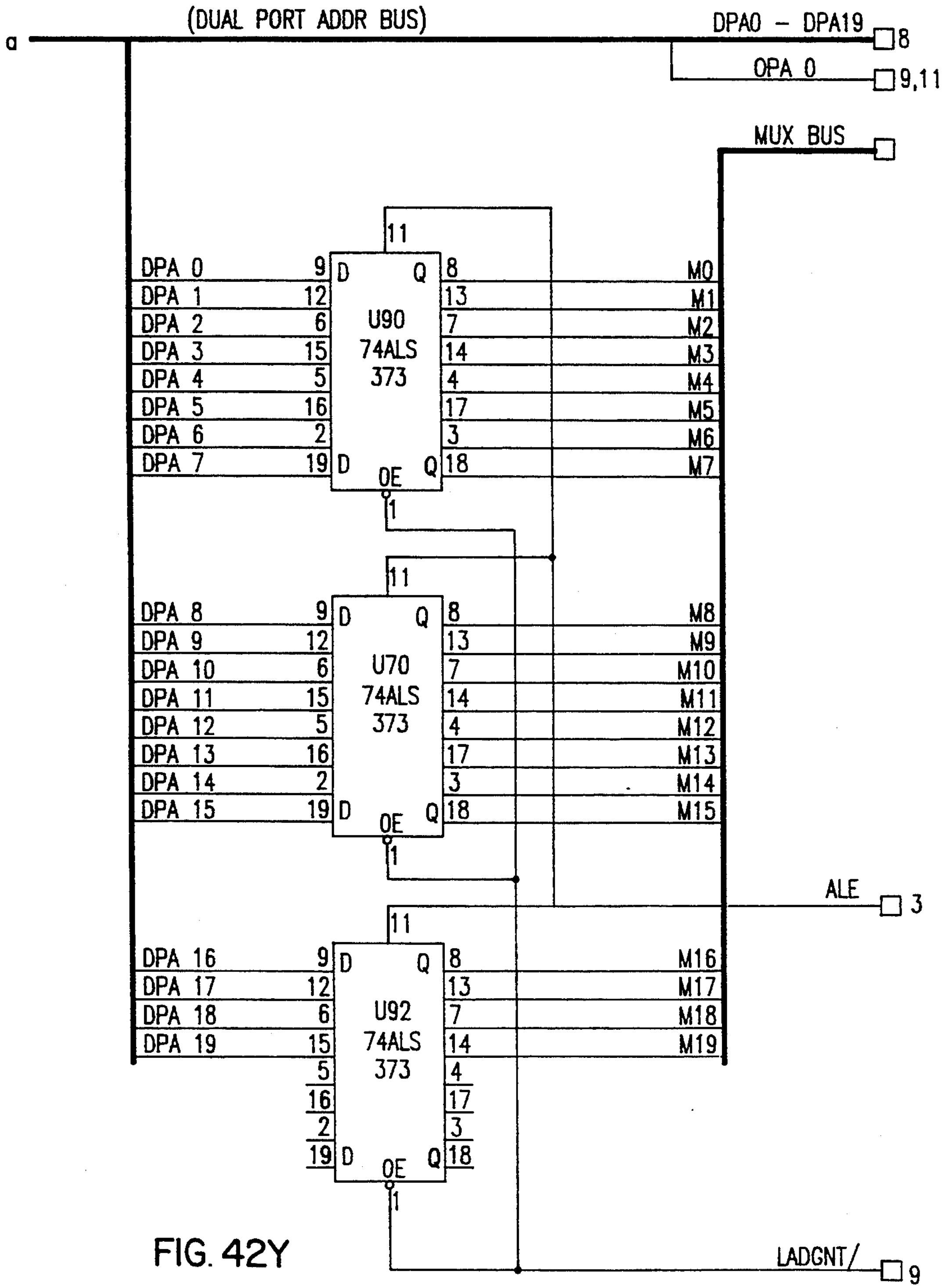

It is appreciated that the circuitry of FIGS. 19A–19C is identical to that of FIGS. 18A–18C and provides support for additional telephone subscriber line interfaces.

TIU circuitry 60 is controlled by gating and timing signals generated by timing circuitry 470. Whenever the SPU requires control of an operation such as OFF HOOK of OUTPUT GAIN SELECT, it issues, via the PCM highway 56, an appropriate digital code which is then latched onto registers 472 and then fed to the remainder of the circuitry, as shown in FIGS. 17 and 21A–21D.

An oscillator 406 (FIG. 11C) generates a 16 MHZ signal and, together with counters 408 and flip flops 410 and 412 generates timing signals CLK and CK2 for devices 352 and 354 and a latch 414 which is used to drive indication LEDs 416.

FIGS. 22A–40C are flow chart representations describing the man/machine interface of the emergency mobilization apparatus forming part of the present invention. In view of the fact that they are self-explanatory and in the interest of conciseness, no further explanation thereof is provided herein.

Figure 43A:
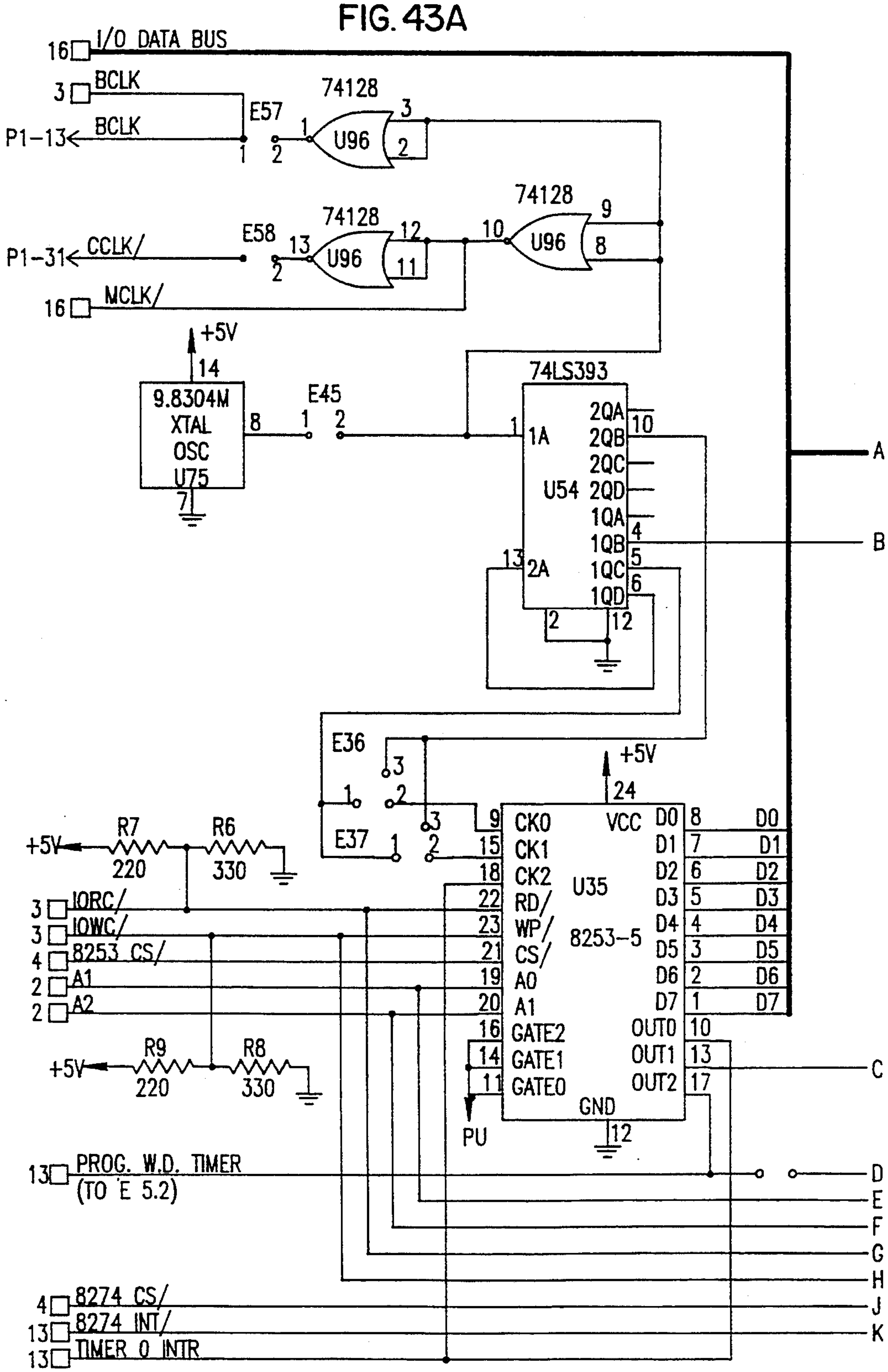
Figure 43B:
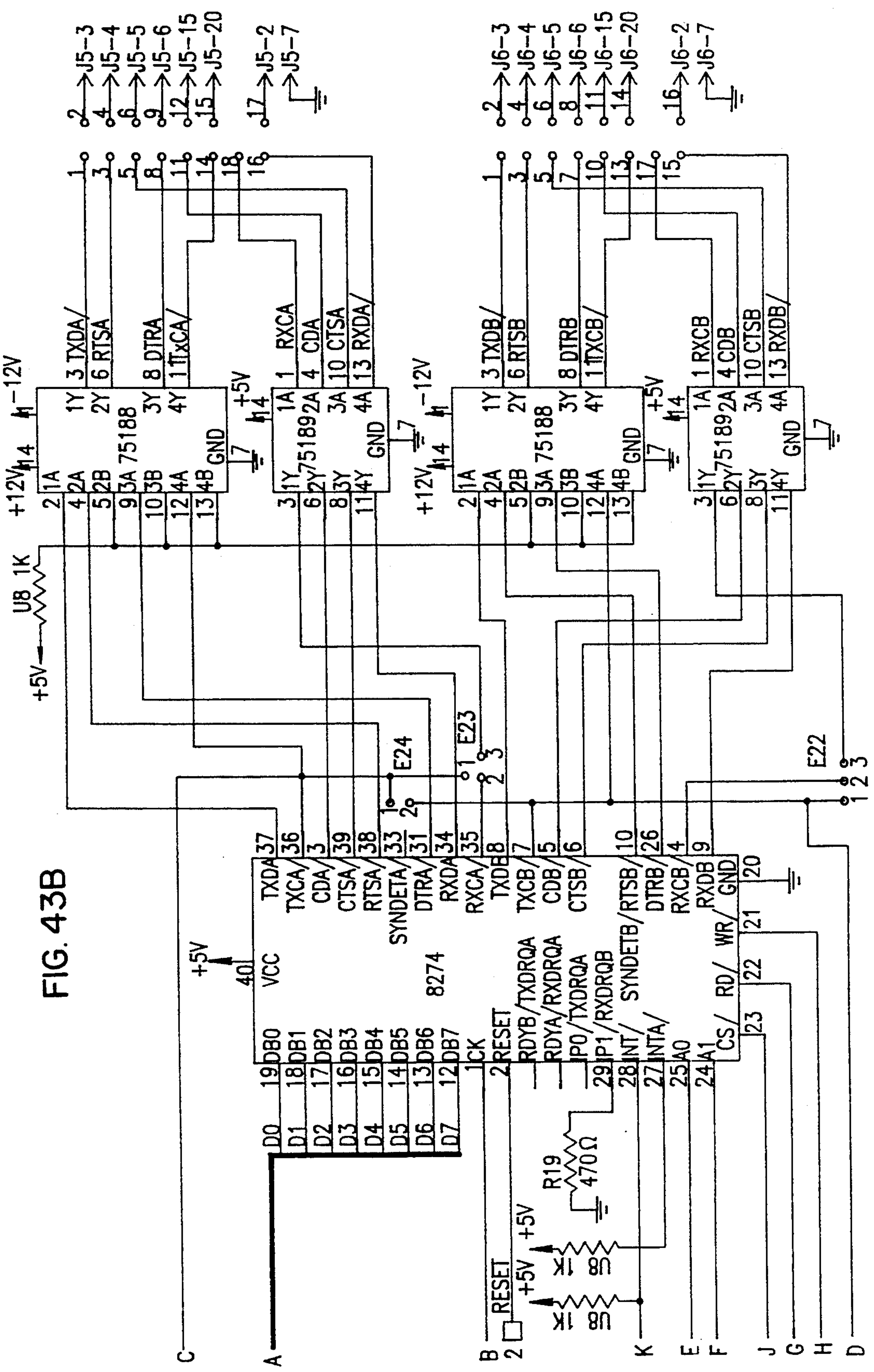
Figure 43C:
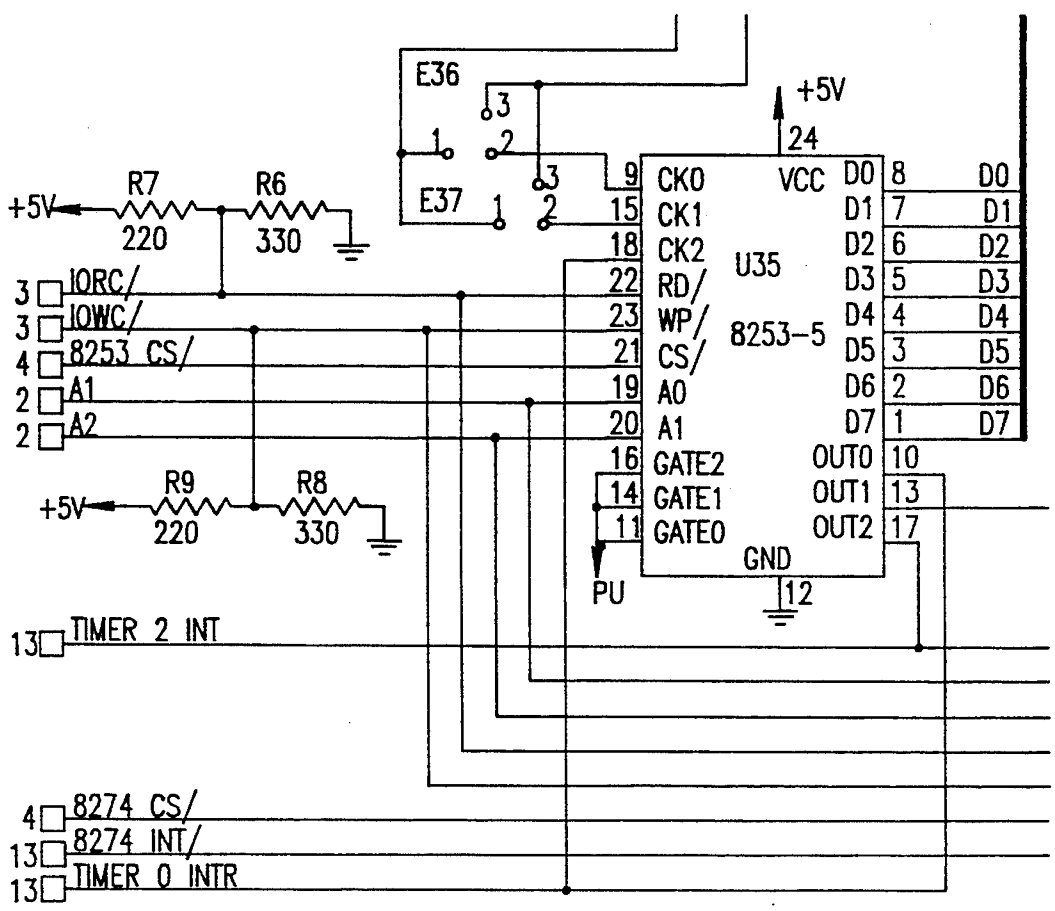
Figure 43D:
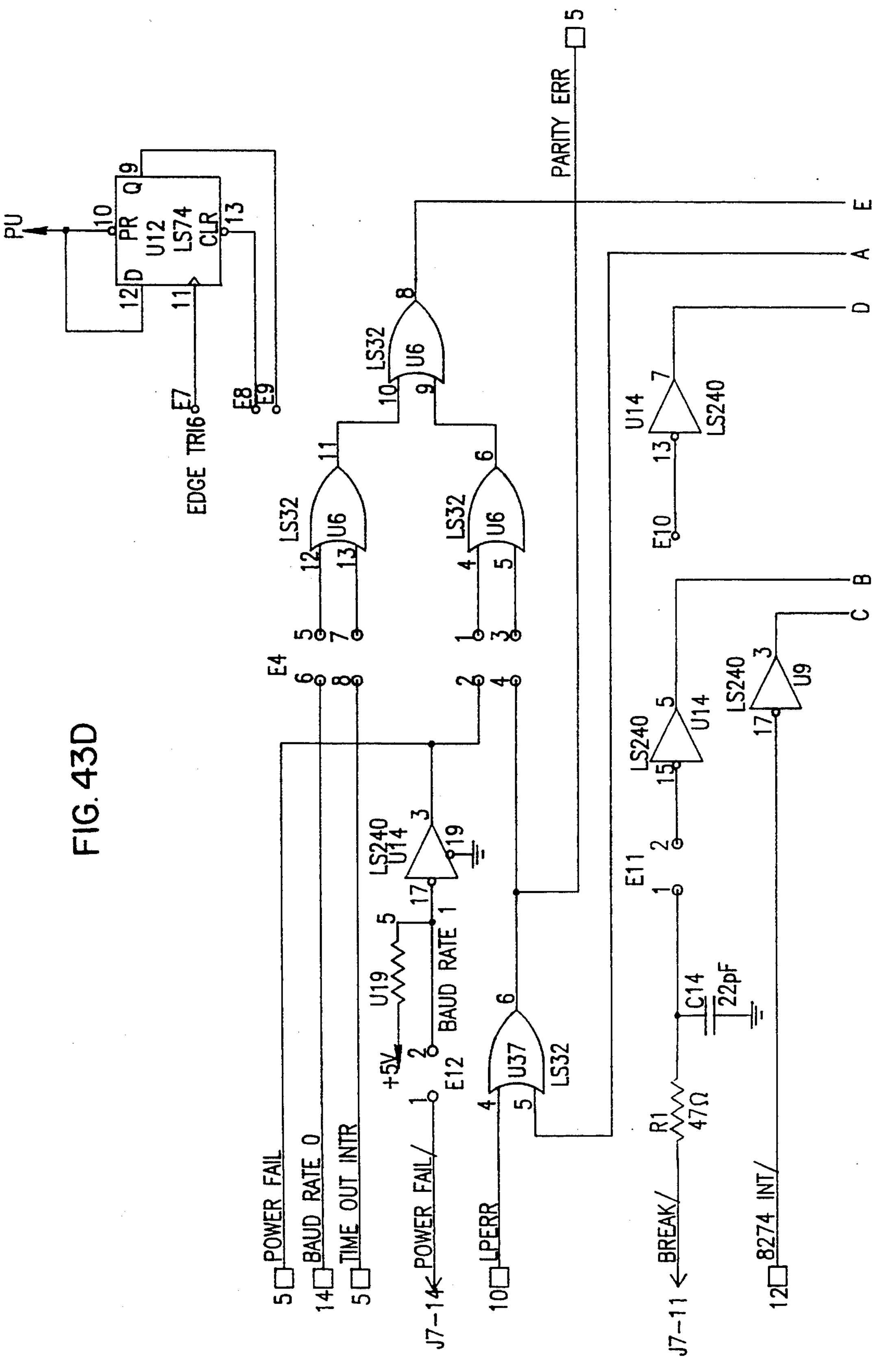
Figure 43E:
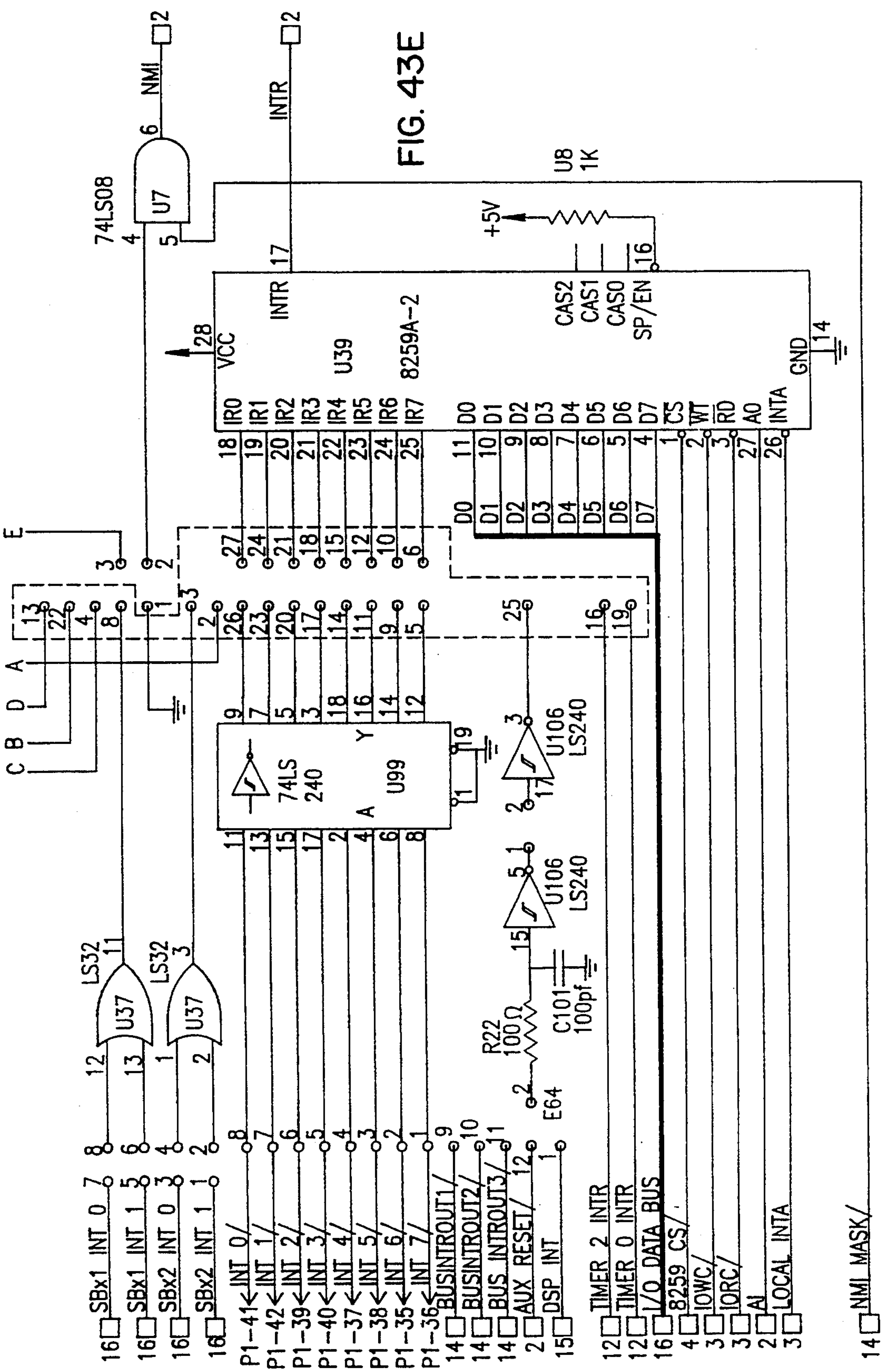
Figure 43F:
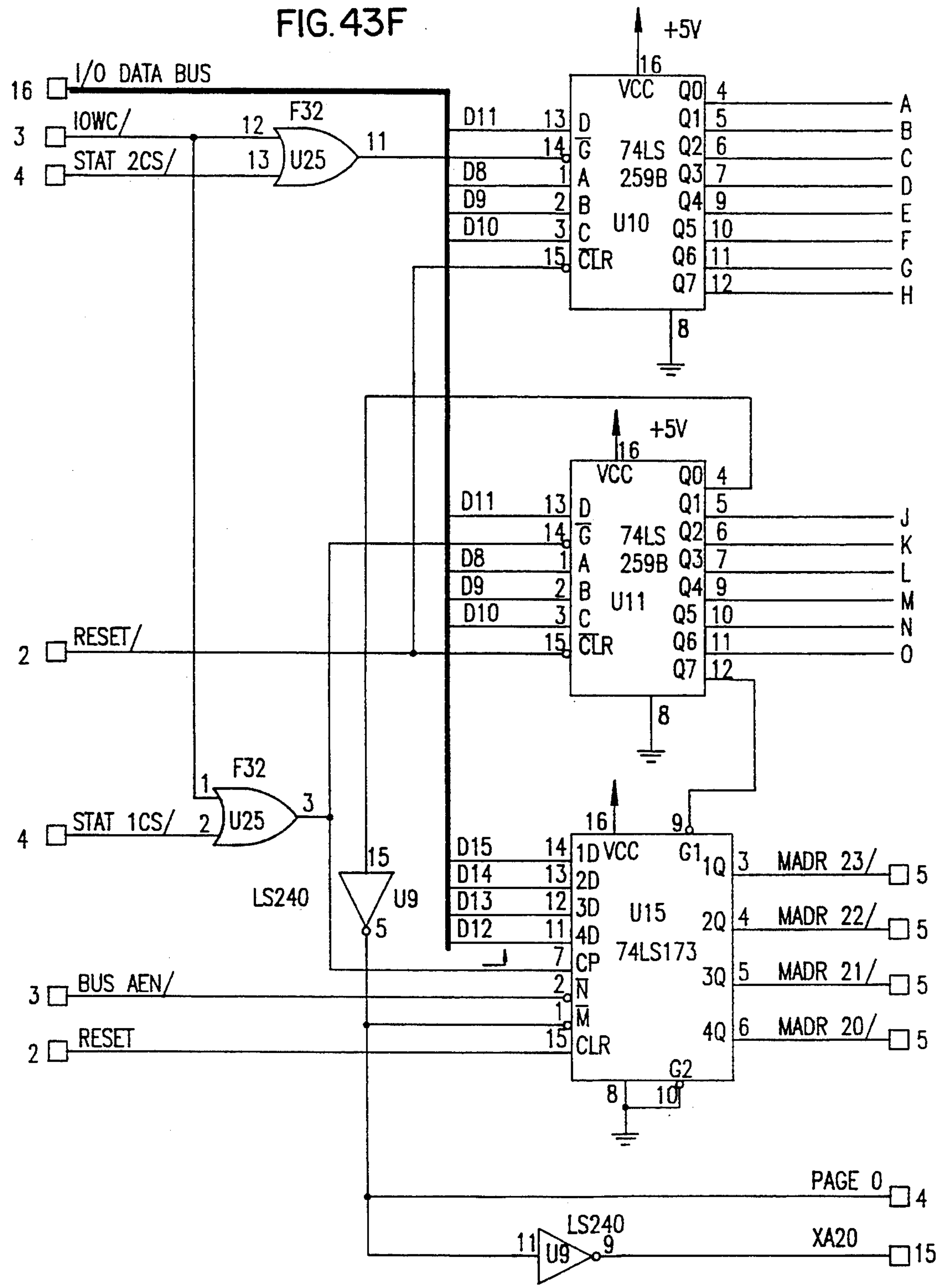
Figure 43G:
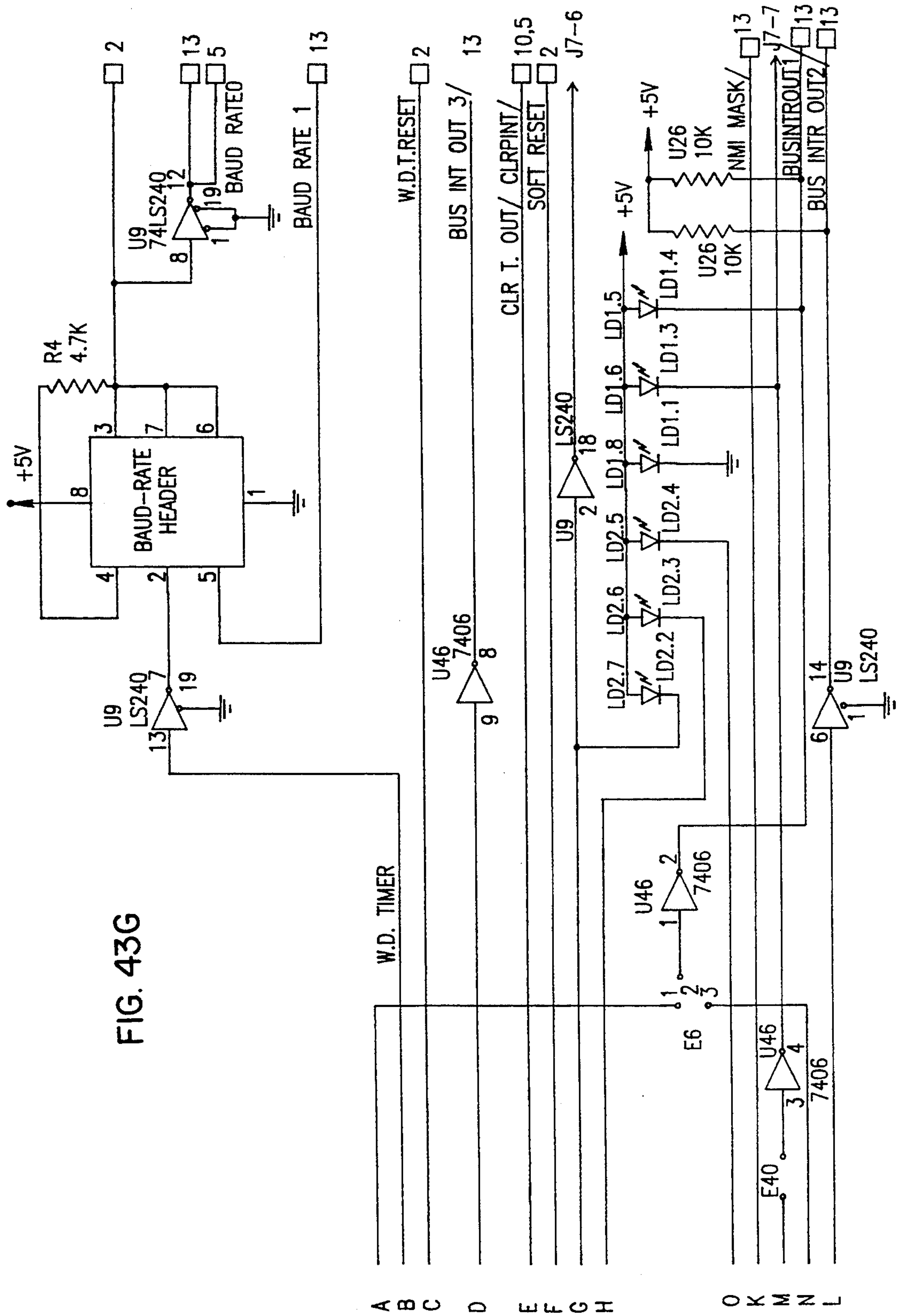
Figure 43H:
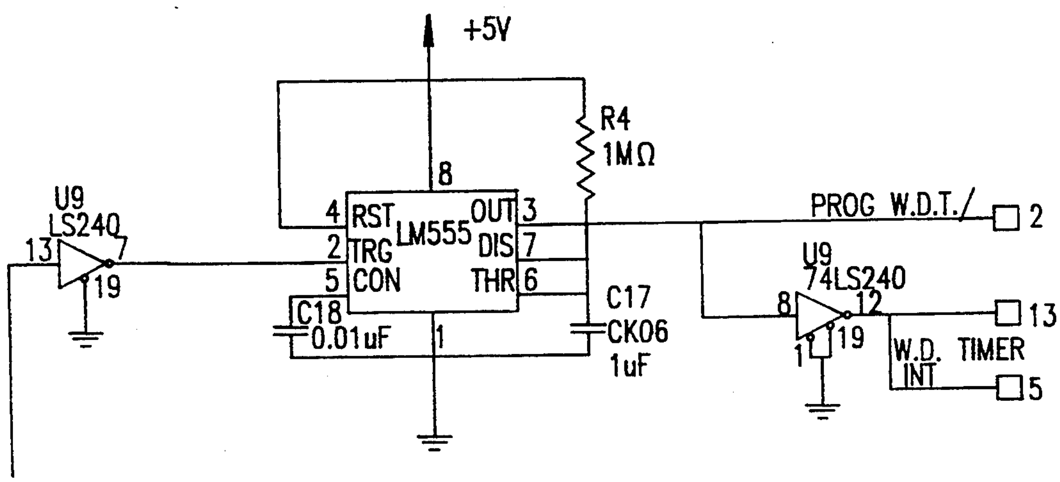
Figure 43I:
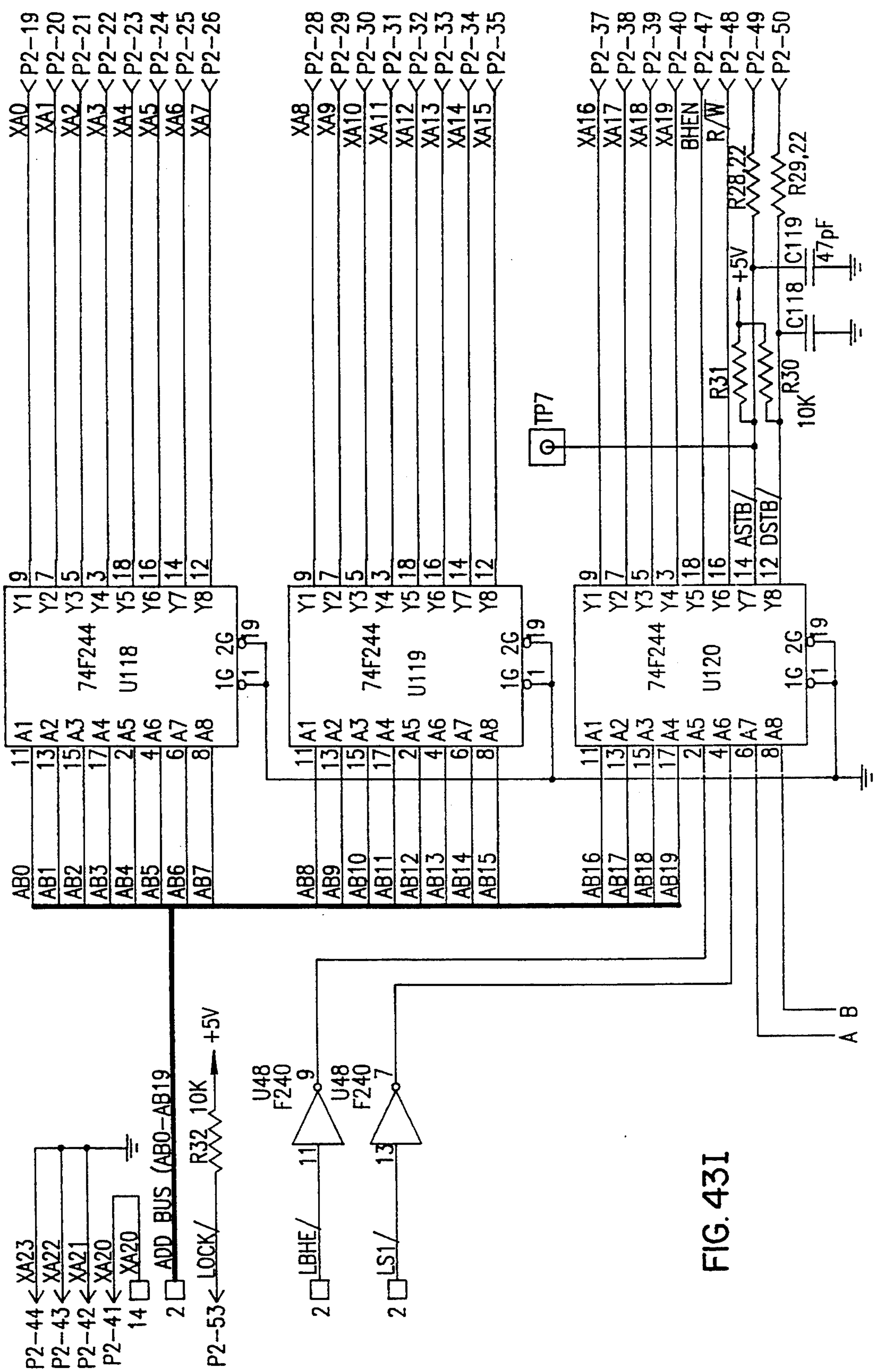
Figure 43J:
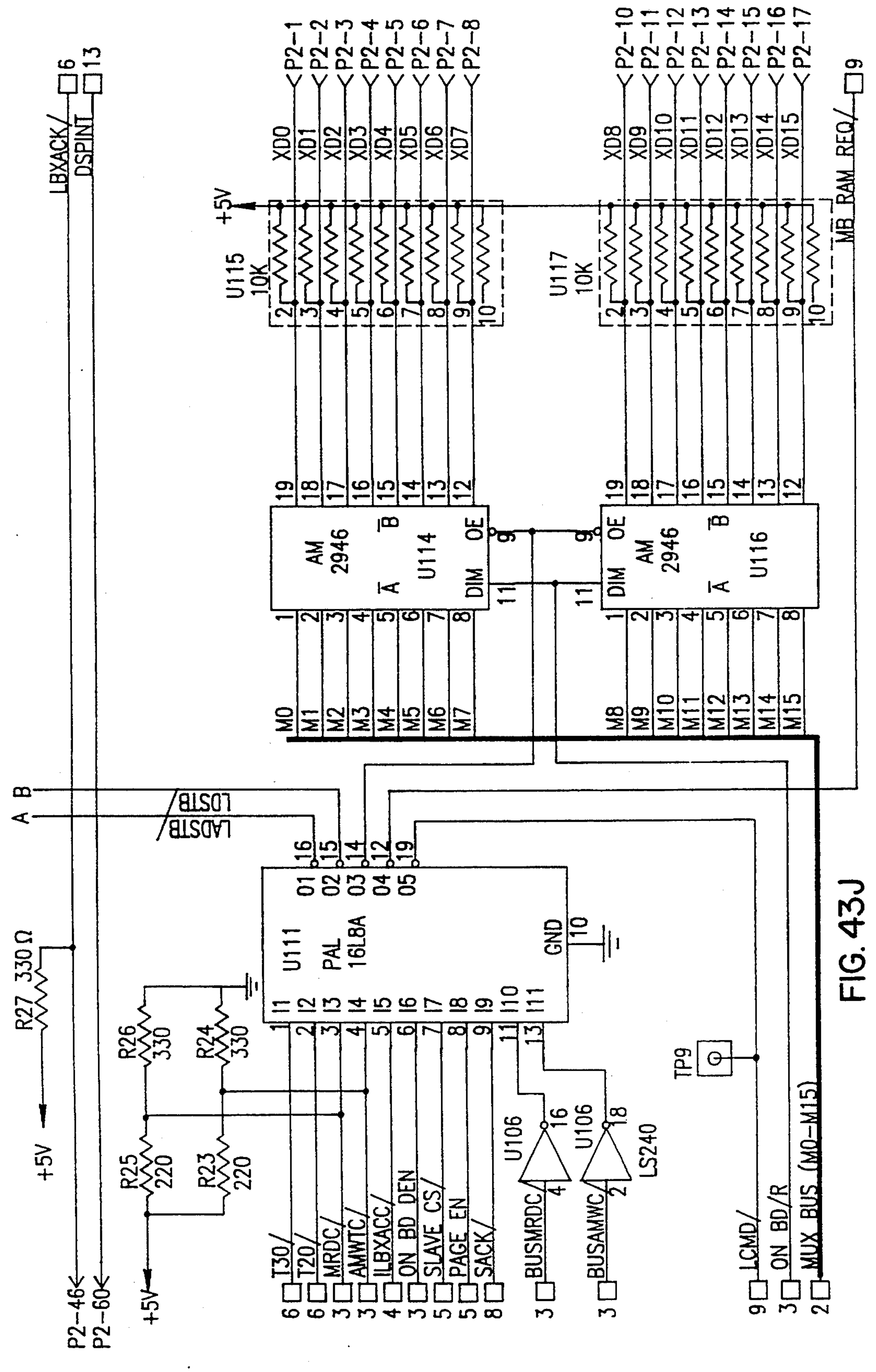
Figure 43K:
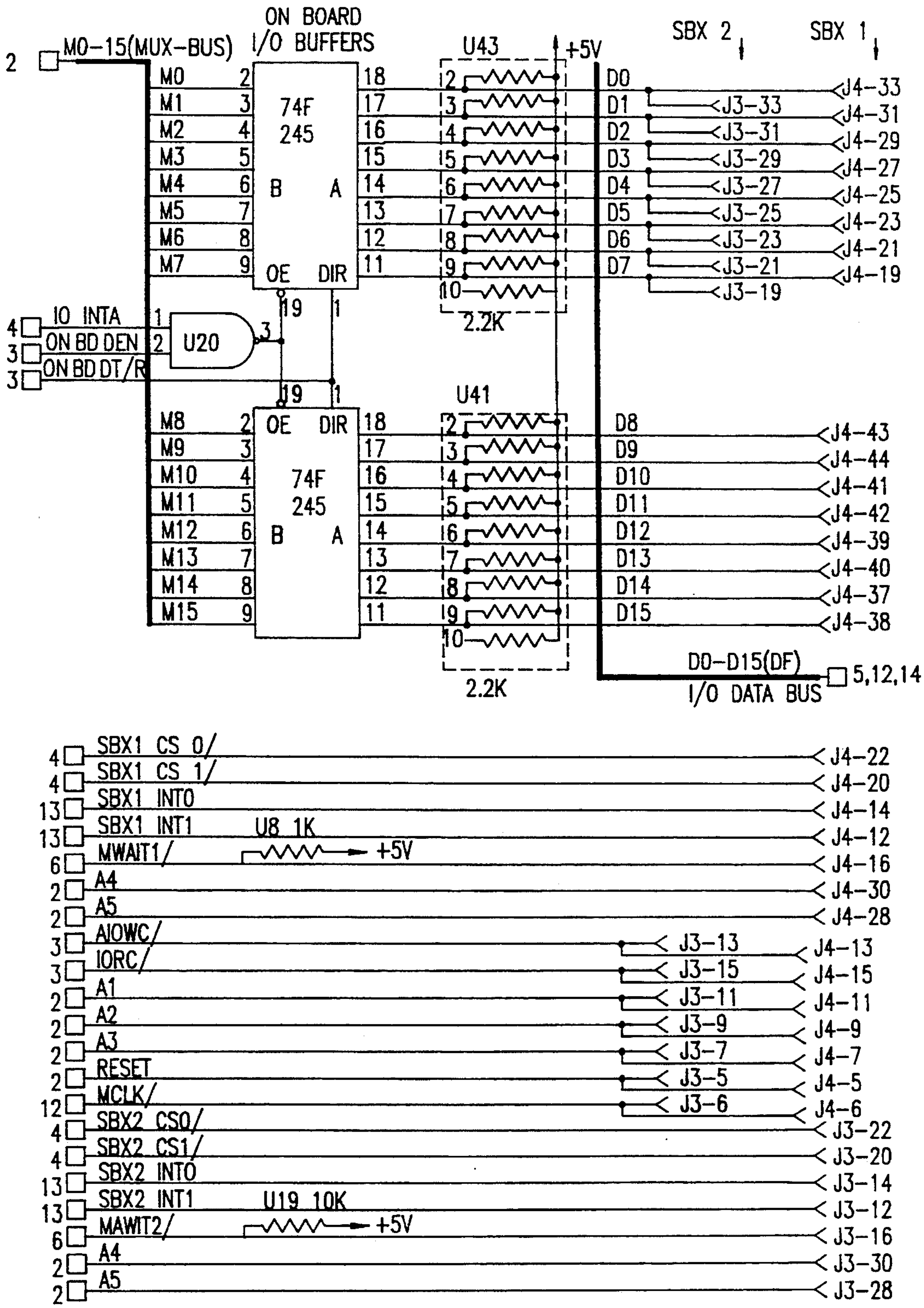

Note that FIG. 43C is an alternative configuration for the lower portion of FIG. 43A. Also, 43H is an alternative configuration for the upper right portion of FIG. 43G.

It will be appreciated by persons skilled in the art that the present invention is not limited by what has been particularly shown and described hereinabove. Rather the scope of the present invention is defined only by the claims which Follow:

What is claimed is:

1. An emergency mobilization system comprising:

a network of mobilization devices each comprising:

a message generator; and a transmitter for transmitting at least one message by telephone to each of a plurality of recipient stations each associated with at least one recipient, said transmitter being operative to send a multiplicity of copies of said messages on a multiplicity of separate telephone lines, wherein said at least one message includes at least one of mobilization messages and notifications that a message awaits the recipient, and wherein said transmitter for transmitting comprises means for sending said mobilization message to mailboxes belonging to said recipients, means for dialing to said recipient stations, means for outputting a notification to each recipient only if each recipient station goes OFF-HOOK and means for outputting said mobilization message only when a recipient identifies himself to said mailbox.

2. An emergency mobilization system according to claim 1 and wherein if said recipient station is OFF-HOOK, said means for dialling redials to said recipient station until either said recipient responds of a predetermined number of redials has elapsed.

3. An emergency mobilization system according to claim 2 and wherein said means for dialling redials to said recipient station in accordance with a predefined plan.

4. An emergency mobilization system according to claim 3 and wherein said predefined plan states the number of redials and the time between the redials in accordance with the dial result, the number of previous redials, and with the priority attached to said mobilization message.

5. An emergency mobilization system according to claim 1 and wherein if said recipient station remains ON-HOOK for a predetermined time, said means for dialling redials to said recipient station until either said recipient accesses his mailbox or a predetermined number of redials has elapsed.

6. An emergency mobilization system according to claim 5 and wherein said means for dialling redials to said recipient station in accordance with a predefined plan.

7. An emergency mobilization system according to claim 6 and wherein said predefined plan states the number of redials and the time between the redials in accordance with the dial result, the number of previous redials, and with the priority attached to said mobilization message.

8. An emergency mobilization system according to claim 1 and wherein each of said mobilization devices include means for defining a backup recipient for each recipient and wherein said backup recipient will receive said mobilization message if said recipient is unavailable.

9. An emergency mobilization system according to claim 1 and wherein said means for outputting is responsive to a subsequent call from a subscriber who identifies himself to the system.

10. An emergency mobilization system according to claim 1 and wherein each of said mobilization devices include means for creating and storing a plurality of mobilization lists wherein each of said mobilization lists is a list of at least one recipient to be mobilized.

11. An emergency mobilization system according to claim 10 and wherein said mobilization list comprises a locating list for mobilizing a first predefined number of recipients on said mobilization list who are successfully contacted.

12. An emergency mobilization system according to claim 10 and wherein said means for creating and storing comprise at least one of a telephone, a console attached to said mobilization device, and a host computer connected to said mobilization device.

13. An emergency mobilization system according to claim 1 and wherein said mobilization message comprises a prerecorded message.

14. An emergency mobilization system according to claim 1 and wherein said messages generator records said mobilization message shortly before the time of transmission of said mobilization message.

15. An emergency mobilization system according to claim 1 and wherein said transmitter sends a multiplicity of versions of said messages on a multiplicity of separate telephone lines.

16. An emergency mobilization system according to claim 1 and wherein each of said mobilization devices include means for providing information on the status of the mobilization via at least one of telephones, facsimile reports, printers, and communication with a host computer.

17. An emergency mobilization system according to claim 1 and wherein each mobilization device is operative to mobilize recipient station located within a local region of said mobilization device.

18. An emergency mobilization system according to claim 1 and wherein for each of said mobilization devices in said network at least one backup mobilization device is defined wherein said backup mobilization device belongs to said network.

19. An emergency mobilization system according to claim 1 and wherein each of said mobilization devices in said network is a twin mobilization device.

20. An emergency mobilization system according to claim 1 and wherein said message generator comprises at least one of telephone apparatus, telephone apparatus in association with DTMF acoustic diallets, telephone apparatus in association with facsimile machines and telephone apparatus associated with computer apparatus.

21. An emergency mobilization system according to claim 1 also comprising means for providing a store and forward function.

22. An emergency mobilization system according to claim 21 and wherein the means for providing a store and forward function also comprises:

interconnect subsystem apparatus arranged to interconnect with telephone switching apparatus;

a control subsystem for providing control instructions to the interconnect subsystem apparatus, including instructions for transmitting and receiving voice messages;

and mass storage subsystem apparatus coupled to the control subsystem for storing voice transmissions.

23. An emergency mobilization system according to claim 1 and wherein each mobilization device also comprises means for storing voice messages, images, and messages combining voice and images.

24. An emergency mobilization system according to claim 1 and wherein said recipient means comprises at least one of facsimile machines, pagers, telephones, computers, and computer terminals connected to a host computer.

25. An emergency mobilization system according to claim 1 and wherein said means for transmitting comprises means for receiving acknowledgements of receipt of said messages from said recipients and indications of non-receipt of said messages.

26. An emergency mobilization system according to claim 25 and wherein said means for receiving acknowledgements comprises means for receiving vocal replies.

27. An emergency mobilization system according to claim 25 and wherein said means for receiving acknowledgements comprises means for receiving DTMF dialed codes.

28. An emergency mobilization system according to claim 1 and wherein said at least one message includes at least one of mobilization messages and notifications that a message awaits the recipient.

29. An emergency mobilization system according to claim 28 and wherein said means for transmitting comprises means for dialing to said recipient means and means for outputting said mobilization message to said at least one recipient only if said recipient means goes OFF-HOOK.

30. An emergency mobilization system comprising:

a network of mobilization devices each comprising:

a message generator; and a transmitter for transmitting at least one message by telephone to each of a plurality of recipient stations each associated with at least one recipient, said transmitter being operative to send a multiplicity of copies of said messages on a multiplicity of separate telephone lines, wherein one of said mobilization devices in said network originates an emergency mobilization procedure and instructs a multiplicity of said mobilization devices in said network to perform the mobilization.

* * * * *

UNITED STATES PATENT AND TRADEMARK OFFICE

CERTIFICATE OF CORRECTION

PATENT NO. : 5,448,618

DATED : Sep. 5, 1995

INVENTOR(S) : SANDLERMAN

It is certified that error appears in the above-identified patent and that said Letters Patent is hereby corrected as shown below:

ON THE COVER PAGE:
Reads:

item [73] Assignee: Comberse Technology Inc., Woodbury, N.Y.

Should Read:

[73] Assignee: Comverse Technology Inc., Woodbury, N.Y.

Signed and Sealed this

Seventh Day of May, 1996

Attest:

BRUCE LEHMAN

*Attesting Officer* — *Commissioner of Patents and Trademarks*